United States Patent
Haba et al.

(10) Patent No.: US 11,459,448 B2
(45) Date of Patent: Oct. 4, 2022

(54) TIRES

(71) Applicant: SUMITOMO RUBBER INDUSTRIES, LTD., Kobe (JP)

(72) Inventors: Toshifumi Haba, Kobe (JP); Tatsuhiro Tanaka, Kobe (JP); Yumi Sakaguchi, Kobe (JP); Yukino Inoue, Kobe (JP); Kazuhisa Fushihara, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 357 days.

(21) Appl. No.: 16/886,332

(22) Filed: May 28, 2020

(65) Prior Publication Data
US 2020/0377698 A1 Dec. 3, 2020

(30) Foreign Application Priority Data
May 29, 2019 (JP) ............... JP2019-100356

(51) Int. Cl.
*C08L 9/00* (2006.01)
*B60C 1/00* (2006.01)
*B60C 11/00* (2006.01)
*C08K 3/04* (2006.01)
*C08K 3/36* (2006.01)

(52) U.S. Cl.
CPC ............. *C08L 9/00* (2013.01); *B60C 1/0016* (2013.01); *B60C 1/0025* (2013.01); *B60C 11/005* (2013.01); *C08K 3/04* (2013.01); *C08K 3/36* (2013.01); *B60C 2001/0066* (2013.01)

(58) Field of Classification Search
CPC ....... C08L 9/00; B60C 1/0016; B60C 1/0025; B60C 1/005
See application file for complete search history.

(56) References Cited

U.S. PATENT DOCUMENTS

2018/0229552 A1* 8/2018 Colvin .................. C08K 3/36

FOREIGN PATENT DOCUMENTS

| JP | 2015-205960 A | 11/2015 | |
| WO | WO-2017078522 A1 * | 5/2017 | ............... C08C 1/02 |

OTHER PUBLICATIONS

H. Mooibroek & K. Cornish, "Alternative Sources of Natural Rubber," 53 Appl Microbiol Biotechnol 355-365 (2000).*
Suvrajyoti Kar & Michael L. Greenfield, "Sizes and Shapes of Simulated Amorphous Cis- and Trans-1,4-Polybutadiene," 62 Polymer 129-138 (2015).*
Adrien Bouty et al., "Interplay Between Polymer Chain Conformation and Nanoparticle Assembly in Model Industrial Silica/Rubber Nanocomposites," 186 Faraday Discuss. 325-43 (2016).*

* cited by examiner

*Primary Examiner* — Nicholas E Hill
(74) *Attorney, Agent, or Firm* — Birch, Stewart, Kolasch & Birch, LLP

(57) ABSTRACT

Provided are tires that are excellent in tire properties such as fuel economy, abrasion resistance, wet grip performance, snow and ice performance, fracture resistance, and flex crack growth resistance. Included is a tire containing a rubber composition containing a natural rubber derived from *Taraxacum kok-saghyz* having a weight average molecular weight (Mw) of 5,000,000 or more and including polymers having a radius of gyration (Rz) of 130 nm or larger, wherein the Mw and Rz values are measured by FFF-MALS.

24 Claims, No Drawings

TIRES

TECHNICAL FIELD

The present invention relates to tires.

BACKGROUND ART

The demand for tires having improved durability has increased due to the recent social demand on energy and resource saving. For this reason, natural rubber has been widely used as a rubber material having excellent fracture resistance, abrasion resistance, and crack growth resistance. In general, natural rubber is produced from *Hevea brasiliensis* (rubber trees) cultivated in subtropical zones, including Indonesia, Thailand, and Malaysia.

Along with the trend of increasing tire production in the world in recent years, the use of natural rubber has been on an increasing trend. However, since rubber trees are currently cultivated only in subtropical zones, their supply and cost are undeniably unstable. Moreover, as the demand for tire properties including fuel economy, abrasion resistance, and fracture resistance has been growing, there has been a demand for widely-used natural rubber having improvements in these properties.

Several approaches have been studied, including: epoxy modification of natural rubber; introduction of ultra-high molecular weight components by addition of crosslinking agents; and production of synthetic polyisoprene having an increased cis content. Nevertheless, further improvements in properties are desired (see Patent Literature 1). Moreover, indeed, these approaches require high production costs and have only small advantages in terms of price.

CITATION LIST

Patent Literature

Patent Literature 1: JP 2015-205960 A

SUMMARY OF INVENTION

Technical Problem

The present invention aims to solve the above problems and provide tires that are excellent in tire properties such as fuel economy, abrasion resistance, wet grip performance, snow and ice performance, fracture resistance, and flex crack growth resistance.

Solution to Problem

The present invention relates to a tire, including a rubber composition,
the rubber composition containing
a natural rubber derived from *Taraxacum kok-saghyz* having a weight average molecular weight (Mw) of 5,000,000 or more and including polymers having a radius of gyration (Rz) of 130 nm or larger, wherein the Mw and Rz values are measured by FFF-MALS.

Preferably, the tire includes a breaker formed from the rubber composition which further contains at least one of carbon black or silica.

Preferably, the tire includes a sidewall formed from the rubber composition which further contains at least one of carbon black or silica.

Preferably, the rubber composition contains, per 100 parts by mass of a rubber component therein, 30 parts by mass or more of carbon black.

Preferably, the rubber composition contains, based on 100% by mass of a rubber component therein, 1% by mass or more of the natural rubber derived from *Taraxacum kok-saghyz*, and
the rubber composition contains, per 100 parts by mass of the rubber component, 10 parts by mass or more of a silica having a nitrogen adsorption specific surface area of 40 $m^2/g$ or more.

Preferably, the rubber composition contains, based on 100% by mass of a rubber component therein, 0.1 to 10.0% by mass of the natural rubber derived from *Taraxacum kok-saghyz*, and
the rubber composition contains, per 100 parts by mass of the rubber component, 10 parts by mass or more of a silica having a nitrogen adsorption specific surface area of 40 $m^2/g$ or more.

Preferably, the rubber composition contains, per 100 parts by mass of a rubber component therein, 5 parts by mass or more of a silica having a nitrogen adsorption specific surface area of 40 $m^2/g$ or more.

Preferably, the tire includes a base tread formed from the rubber composition,
the rubber composition contains, based on 100% by mass of a rubber component therein, 1% by mass or more of the natural rubber derived from *Taraxacum kok-saghyz*, and
the rubber composition contains, per 100 parts by mass of the rubber component, 10 parts by mass or more of silica.

The present invention relates to a tire, including a rubber composition,
the rubber composition containing
a natural rubber derived from *Taraxacum kok-saghyz* having a weight average molecular weight (Mw) of 5,000,000 or more and including polymers having an average radius of gyration (Rz) of 130 nm or larger over a weight average molecular weight (Mw) range of 5,000,000 to 50,000,000, wherein the Mw and Rz values are measured by FFF-MALS.

Preferably, the tire includes a breaker formed from the rubber composition which further contains at least one of carbon black or silica.

Preferably, the tire includes a sidewall formed from the rubber composition which further contains at least one of carbon black or silica.

Preferably, the rubber composition contains, per 100 parts by mass of a rubber component therein, 30 parts by mass or more of carbon black.

Preferably, the rubber composition contains, based on 100% by mass of a rubber component therein, 1% by mass or more of the natural rubber derived from *Taraxacum kok-saghyz*, and
the rubber composition contains, per 100 parts by mass of the rubber component, 10 parts by mass or more of a silica having a nitrogen adsorption specific surface area of 40 $m^2/g$ or more.

Preferably, the rubber composition contains, based on 100% by mass of a rubber component therein, 0.1 to 10.0% by mass of the natural rubber derived from *Taraxacum kok-saghyz*, and
the rubber composition contains, per 100 parts by mass of the rubber component, 10 parts by mass or more of a silica having a nitrogen adsorption specific surface area of 40 $m^2/g$ or more.

Preferably, the rubber composition contains, per 100 parts by mass of a rubber component therein, 5 parts by mass or more of a silica having a nitrogen adsorption specific surface area of 40 m²/g or more.

Preferably, the tire includes a base tread formed from the rubber composition, the rubber composition contains, based on 100% by mass of a rubber component therein, 1% by mass or more of the natural rubber derived from *Taraxacum kok-saghyz*, and the rubber composition contains, per 100 parts by mass of the rubber component, 10 parts by mass or more of silica.

The present invention relates to a tire, including a rubber composition, the rubber composition containing a natural rubber derived from *Taraxacum kok-saghyz* having a weight average molecular weight (Mw) of 5,000,000 or more and including polymers having a first regression line from a plot of logarithm of radius of gyration (Rz) (log Rz) versus logarithm of weight average molecular weight (Mw) (log Mw), the first regression line having a slope of 0.25 or greater over a weight average molecular weight (Mw) range of 5,000,000 to 50,000,000, wherein the Mw and Rz values are measured by FFF-MALS.

Preferably, the tire includes a breaker formed from the rubber composition which further contains at least one of carbon black or silica.

Preferably, the tire includes a sidewall formed from the rubber composition which further contains at least one of carbon black or silica.

Preferably, the rubber composition contains, per 100 parts by mass of a rubber component therein, 30 parts by mass or more of carbon black.

Preferably, the rubber composition contains, based on 100% by mass of a rubber component therein, 1% by mass or more of the natural rubber derived from *Taraxacum kok-saghyz*, and the rubber composition contains, per 100 parts by mass of the rubber component, 10 parts by mass or more of a silica having a nitrogen adsorption specific surface area of 40 m²/g or more.

Preferably, the rubber composition contains, based on 100% by mass of a rubber component therein, 0.1 to 10.0% by mass of the natural rubber derived from *Taraxacum kok-saghyz*, and the rubber composition contains, per 100 parts by mass of the rubber component, 10 parts by mass or more of a silica having a nitrogen adsorption specific surface area of 40 m²/g or more.

Preferably, the rubber composition contains, per 100 parts by mass of a rubber component therein, 5 parts by mass or more of a silica having a nitrogen adsorption specific surface area of 40 m²/g or more.

Preferably, the tire includes a base tread formed from the rubber composition, the rubber composition contains, based on 100% by mass of a rubber component therein, 1% by mass or more of the natural rubber derived from *Taraxacum kok-saghyz*, and the rubber composition contains, per 100 parts by mass of the rubber component, 10 parts by mass or more of silica.

Advantageous Effects of Invention

The present invention provides tires, including tires containing a rubber composition containing a natural rubber derived from *Taraxacum kok-saghyz* having a weight average molecular weight (Mw) of 5,000,000 or more and including polymers having a radius of gyration (Rz) of 130 nm or larger, wherein the Mw and Rz values are measured by FFF-MALS. The tires thus provide excellent tire properties such as fuel economy, abrasion resistance, wet grip performance, snow and ice performance, fracture resistance, and flex crack growth resistance.

DESCRIPTION OF EMBODIMENTS

As described above, the tires of the present invention include: (1) a tire including a rubber composition containing a natural rubber derived from *Taraxacum kok-saghyz* having a weight average molecular weight (Mw) of 5,000,000 or more and including polymers having a radius of gyration (Rz) of 130 nm or larger, wherein the Mw and Rz values are measured by FFF-MALS; (2) a tire including a rubber composition containing a natural rubber derived from *Taraxacum kok-saghyz* having a weight average molecular weight (Mw) of 5,000,000 or more and including polymers having an average radius of gyration (Rz) of 130 nm or larger over a weight average molecular weight (Mw) range of 5,000,000 to 50,000,000, wherein the Mw and Rz values are measured by FFF-MALS; and (3) a tire including a rubber composition containing a natural rubber derived from *Taraxacum kok-saghyz* having a weight average molecular weight (Mw) of 5,000,000 or more and including polymers having a first regression line from a plot of logarithm of radius of gyration (Rz) (log Rz) versus logarithm of weight average molecular weight (Mw) (log Mw), the first regression line having a slope of 0.25 or greater over a weight average molecular weight (Mw) range of 5,000,000 to 50,000,000, wherein the Mw and Rz values are measured by FFF-MALS. Then, described are specific exemplary embodiments of these tires, including heavy duty tires, all-season tires, summer tires, and cold weather tires.

[Heavy Duty Tires]
(Rubber Component)

The present invention relates to the heavy duty tires (tires for use with heavy loads, such as for trucks and buses) (1) to (3) described below. These tires use a combination of a specific natural rubber derived from *Taraxacum kok-saghyz* and carbon black at a predetermined ratio and thus provide significantly (synergistically) improved overall performance in terms of fuel economy, abrasion resistance, and wet grip performance. Moreover, since *Taraxacum kok-saghyz* is an annual plant which grows in temperate zones with wider cultivable areas (including Asia, North America, and Europe) than subtropical zones, the natural rubber supply risk can be diversified away.

(1) A first heavy duty tire, including a tread formed from a rubber composition which contains a natural rubber derived from *Taraxacum kok-saghyz* having a weight average molecular weight (Mw) of 5,000,000 or more and including polymers having a radius of gyration (Rz) of 130 nm or larger, wherein the Mw and Rz values are measured by FFF-MALS, and carbon black at a predetermined ratio.

(2) A second heavy duty tire, including a tread formed from a rubber composition which contains a natural rubber derived from *Taraxacum kok-saghyz* having a weight average molecular weight (Mw) of 5,000,000 or more and including polymers having an average radius of gyration (Rz) of 130 nm or larger over a weight average molecular weight (Mw) range of 5,000,000 to 50,000,000, wherein the Mw and Rz values are measured by FFF-MALS, and carbon black at a predetermined ratio.

(3) A third heavy duty tire, including a tread formed from a rubber composition which contains a natural rubber derived from *Taraxacum kok-saghyz* having a weight average molecular weight (Mw) of 5,000,000 or more and including polymers having a first regression line from a plot of logarithm of radius of gyration (Rz) (log Rz) versus logarithm of weight average molecular weight (Mw) (log Mw), the first regression line having a slope of 0.25 or greater over a weight average molecular weight (Mw) range of 5,000,000 to 50,000,000, wherein the Mw and Rz values are measured by FFF-MALS, and carbon black at a predetermined ratio.

The reason (mechanism) for the significant (synergistic) improvement in overall performance in terms of excellent fuel economy, abrasion resistance, and wet grip performance is not exactly clear but is believed to be as follows.

Each natural rubber derived from *Taraxacum kok-saghyz* specified in the present application has a higher Mw than a natural rubber derived from *Hevea brasiliensis* and includes a large amount of high molecular weight components, thereby providing higher properties such as tensile strength. Moreover, the natural rubber derived from *Taraxacum kok-saghyz* has a lower degree of branching than a natural rubber derived from *Hevea brasiliensis* and includes a large amount of linear polymers, thereby having a large Rz of polymers. Therefore, the large Rz of polymers can cause an increase in entanglement between the polymers and an increase in probability of polymer/filler contact and thus in interaction with fillers, thereby resulting in enhanced reinforcing properties and improved properties such as fracture properties, abrasion resistance, and wet grip performance.

Furthermore, since each natural rubber derived from *Taraxacum kok-saghyz* specified in the present application has a lower degree of branching than a natural rubber derived from *Hevea brasiliensis* and includes a large amount of linear polymers, it has a smaller number of polymer molecular ends. Therefore, the smaller number of free molecular ends leads to a decrease in the amount of hysteresis loss-producing components, thereby resulting in excellent low heat build-up properties.

Thus, it is believed that the combined use of such a natural rubber derived from *Taraxacum kok-saghyz* and carbon black provides significantly (synergistically) improved overall performance in terms of fuel economy, abrasion resistance, and wet grip performance.

The natural rubbers derived from *Taraxacum kok-saghyz* in the first to third heavy duty tires have a weight average molecular weight (Mw) of 5,000,000 or more as measured by FFF-MALS (a field-flow fractionation (FFF) system and a multi-angle light scattering (MALS) detector). The natural rubber having a Mw equal to or higher than the lower limit tends to have a higher mechanical strength, thereby improving properties such as abrasion resistance, wet grip performance, snow and ice performance, fracture resistance, and flex crack growth resistance. The Mw is preferably 5,050,000 or more, more preferably 5,070,000 or more. The upper limit of the Mw is not limited, and a higher Mw is suitable. From the standpoint of deterioration of processability due to high viscosity, the Mw is preferably 20,000,000 or less, more preferably 10,000,000 or less.

The natural rubbers derived from *Taraxacum kok-saghyz* in the first to third heavy duty tires preferably have a ratio of the weight average molecular weight (Mw) to the number average molecular weight (Mn) (Mw/Mn: molecular weight distribution) of 2.40 or lower, more preferably 2.20 or lower, still more preferably 2.00 or lower, particularly preferably 1.90 or lower, as measured by FFF-MALS (a field-flow fractionation (FFF) system and a multi-angle light scattering (MALS) detector). The natural rubber having a Mw/Mn ratio equal to or lower than the upper limit tends to have a higher mechanical strength, thereby improving properties such as abrasion resistance, wet grip performance, snow and ice performance, fracture resistance, and flex crack growth resistance. The lower limit of the Mw/Mn ratio is not limited, and a smaller Mw/Mn ratio is suitable. From the standpoint of deterioration of processability due to narrow molecular weight distribution, the Mw/Mn ratio is preferably 1.00 or higher, more preferably 1.50 or higher.

In view of tire properties such as fuel economy, abrasion resistance, wet grip performance, snow and ice performance, fracture resistance, and flex crack growth resistance, the natural rubbers derived from *Taraxacum kok-saghyz* in the first to third heavy duty tires preferably have a monodisperse molecular weight distribution, e.g., when represented by the molar mass (g/mol)-mass distribution relationship.

The natural rubber derived from *Taraxacum kok-saghyz* in the first heavy duty tire includes polymers having a radius of gyration (Rz) (the Rz of the whole polymers forming the natural rubber derived from *Taraxacum kok-saghyz*) of 130 nm or larger. The natural rubber with a Rz equal to or larger than the lower limit tends to have a higher mechanical strength, thereby improving properties such as abrasion resistance, wet grip performance, snow and ice performance, fracture resistance, and flex crack growth resistance. Additionally, it also tends to improve low heat build-up properties. The Rz is preferably 133 nm or larger, more preferably 135 nm or larger. The upper limit of the Rz is not limited, and a larger Rz is suitable. From the standpoint of deterioration of processability due to a small amount of branched polymers, the Rz is preferably 300 nm or smaller, more preferably 250 nm or smaller.

The natural rubber derived from *Taraxacum kok-saghyz* in the second heavy duty tire includes polymers having an average radius of gyration (Rz) of 130 nm or larger over a weight average molecular weight (Mw) range of 5,000,000 to 50,000,000. The average radius of gyration (Rz) of polymers over a weight average molecular weight (Mw) range of 5,000,000 to 50,000,000 refers to the average of Rz values determined for each Mw within a range of 5,000,000 to 50,000,000, where the Mw and Rz values are determined by FFF-MALS. For example, when the Mw values over a range of 5,000,000 to 50,000,000 and the corresponding Rz values are represented as: $(Mw_1, Rz_1), (Mw_2, Rz_2), \ldots, (Mw_n, Rz_n)$, the average Rz is $(Rz_1+Rz_2+ \ldots +Rz_n)/n$. The number (n) of data points may be any number appropriately selected within a Mw range of 5,000,000 to 50,000,000. For example, about 300 to about 500 data points may be obtained.

The natural rubber with an average Rz equal to or larger than the lower limit tends to have a higher mechanical strength, thereby improving properties such as abrasion resistance, wet grip performance, snow and ice performance, fracture resistance, and flex crack growth resistance. Additionally, it also tends to improve low heat build-up properties. The average Rz is preferably 150 nm or higher, more preferably 160 nm or higher, still more preferably 170 nm or higher, particularly preferably 180 nm or higher. The upper limit is not limited, and a higher average Rz is suitable. From the standpoint of deterioration of processability due to a small amount of branched polymers, the average Rz is preferably 250 nm or lower, more preferably 240 nm or lower.

The natural rubber derived from *Taraxacum kok-saghyz* in the third heavy duty tire includes polymers having a first regression line from a plot of logarithm of radius of gyration (Rz) (log Rz) versus logarithm of weight average molecular weight (Mw) (log Mw), wherein the first regression line has a slope of 0.25 or greater over a weight average molecular weight (Mw) range of 5,000,000 to 50,000,000. The slope of a first regression line from a plot of logarithm of radius of gyration (Rz) (log Rz) versus logarithm of weight average molecular weight (Mw) (log Mw) of polymers over a weight average molecular weight (Mw) range of 5,000,000 to 50,000,000 refers to the slope of a first regression line formed over a Mw range of 5,000,000 to 50,000,000 in a graph obtained by plotting the logarithm of Rz as a function of the logarithm of Mw, where the Mw and Rz values are determined by FFF-MALS.

Fitting to a first regression line may be carried out by conventionally known statistical techniques, such as by using a least squares method to determine a regression line (approximate straight line). Specifically, in a plot of log Rz versus log Mw, a regression line through the data points (log $Mw_1$, log $Rz_1$), (log $Mw_2$, log $Rz_2$), (log $Mw_n$, log $Rz_n$) in the xy plane (log Mw-log Rz plane) over a Mw range of 5,000,000 to 50,000,000 may be determined by a least squares method, for example. The number (n) of data points may be any number appropriately selected within a Mw range of 5,000,000 to 50,000,000. For example, about 300 to about 500 data points may be obtained.

The natural rubber with a slope equal to or greater than the lower limit tends to have a higher mechanical strength, thereby improving properties such as abrasion resistance, wet grip performance, snow and ice performance, fracture resistance, and flex crack growth resistance. Additionally, it also tends to improve low heat build-up properties. The slope is preferably 0.26 or greater, more preferably 0.28 or greater, still more preferably 0.30 or greater, particularly preferably 0.32 or greater. The upper limit of the slope is not limited, and a greater slope is suitable. From the standpoint of deterioration of processability due to a small amount of branched polymers, the slope is preferably 0.60 or smaller, more preferably 0.50 or smaller.

The FFF-MALS used to measure Mw and Rz is a system including a field-flow fractionation (FFF) system and a multi-angle light scattering (MALS) detector. A FFF system can perform molecular weight fractionation by applying a field to a sample solution flowing through, for example, 100 μm to 500 μm void (channel). The application of a field may be carried out using, for example, a centrifugal force, temperature gradient, or electric field. Asymmetric flow FFF systems are suitable. Specifically, a sample (rubber) may be dissolved in a solvent to give a rubber solution, which may then be measured using a FFF system equipped with a MALS detector and a differential refractometer (RI detector). Then, the data may be used to perform Debye plotting, thereby determining the Mw and Rz of the sample.

The organic solvent used to dissolve a sample (natural rubber derived from *Taraxacum kok-saghyz*) may be any solvent capable of dissolving the sample. Examples include tetrahydrofuran (THF), chloroform, toluene, and cyclohexane, each of which may be used alone or in admixture. Among these, THF is suitable because of its good dissolving ability. The sample concentration (the concentration of the natural rubber derived from *Taraxacum kok-saghyz*) in the organic solvent is preferably adjusted to 0.001% to 1% by mass. For example, a sample may be added to an organic solvent at a concentration adjusted as described above, followed by standing for 12 hours or longer to prepare a completely dissolved solution.

Herein, the Mw and Mn of the natural rubber derived from *Taraxacum kok-saghyz*, the Rz of polymers, the average Rz of polymers, and the slope of the first regression line are measured by the methods described in detail later in EXAMPLES.

The natural rubbers derived from *Taraxacum kok-saghyz* specified in the present application can be obtained by an extraction method described in, for example, US2019/0048101 A1 or US2019/0046895 A1, each of which is incorporated herein by reference.

The first to third heavy duty tires include a tread formed from a rubber composition which contains the corresponding natural rubber derived from *Taraxacum kok-saghyz* and carbon black at a predetermined ratio.

The amount of the natural rubber derived from *Taraxacum kok-saghyz* based on 100% by mass of the rubber component in the rubber composition is 1% by mass or more, preferably 10% by mass or more, more preferably 30% by mass or more, still more preferably 50% by mass or more, particularly preferably 65% by mass or more. The upper limit of the amount is not limited but is preferably 90% by mass or less, more preferably 85% by mass or less. When the amount is within the range indicated above, the overall performance in terms of fuel economy, abrasion resistance, and wet grip performance can be significantly improved.

In addition to the natural rubber derived from *Taraxacum kok-saghyz*, the rubber component of the rubber composition may contain additional rubbers. Examples of such additional rubbers include diene rubbers such as natural rubber (NR), polyisoprene rubber (IR), polybutadiene rubber (BR), styrene-butadiene rubber (SBR), styrene-isoprene rubber (SIR), styrene-isoprene-butadiene rubber (SIBR), ethylene-propylene-diene rubber (EPDM), chloroprene rubber (CR), acrylonitrile-butadiene rubber (NBR), and butyl rubber (IIR). The rubber component may be of a single type or a combination of two or more types. The rubber component may include either an unmodified rubber or a modified rubber. From the standpoint of overall performance in terms of fuel economy, abrasion resistance, and wet grip performance, BR is preferred among these.

Non-limiting examples of the BR include high-cis BR having high cis content, BR containing syndiotactic polybutadiene crystals, and BR synthesized using rare earth catalysts (rare earth-catalyzed BR). These may be used alone or in combinations of two or more. The BR may be an unmodified BR or a modified BR. To enhance properties such as abrasion resistance, it is preferably a high-cis BR having a cis content of 90% by mass or higher, among others.

The BR may suitably be a modified BR (modified conjugated diene polymer) produced by a method that includes: modification step (A) of performing a modification reaction to introduce an alkoxysilane compound having two or more reactive groups, including an alkoxysilyl group, into the active terminal of an active terminal-containing polybutadiene having a cis-1,4 bond content of 94.0% by mass or higher; and condensation step (B) of performing a condensation reaction of the residual group of the alkoxysilane compound introduced into the active terminal, in the presence of a condensation catalyst containing at least one element selected from the group consisting of the elements of Groups 4, 12, 13, 14, and 15 of the periodic table, wherein the polybutadiene is produced by polymerization in the presence of a catalyst composition mainly containing a mixture of the following components (a) to (c):

component (a): a lanthanoid-containing compound which contains at least one element selected from the group consisting of lanthanoids, or a reaction product obtained by reaction between the lanthanoid-containing compound and a Lewis base;

component (b): at least one compound selected from the group consisting of aluminoxanes and organoaluminum compounds represented by the formula (1): $AlR^1R^2R^3$ wherein $R^1$ and $R^2$ are the same or different and each represent a C1-C10 hydrocarbon group or a hydrogen atom, and $R^3$ is the same as or different from $R^1$ or $R^2$ and represents a C1-C10 hydrocarbon group; and component (c): an iodine-containing compound which contains at least one iodine atom in its molecular structure.

In other words, the modified BR (modified conjugated diene polymer) can be produced by performing a modification reaction to introduce an alkoxysilane compound into the active terminal of a polybutadiene having a cis-1,4 bond content of 94.0% by mass or higher, and then performing a condensation reaction of the residual group of the alkoxysilane compound introduced into the active terminal, in the presence of a condensation catalyst containing at least one of the elements of Groups 4, 12, 13, 14, and 15 of the periodic table. Examples of such modified BRs include the modified BRs (modified conjugated diene polymers) described in JP 2015-232112 A, which is incorporated herein by reference.

The modification step (A) includes performing a modification reaction to introduce an alkoxysilane compound having two or more reactive groups, including an alkoxysilyl group, into the active terminal of an active terminal-containing polybutadiene having a cis-1,4 bond content of 94.0% by mass or higher.

The polybutadiene is an active terminal-containing conjugated diene polymer having a cis-1,4 bond content of 94.0% by mass or higher. The cis-1,4 bond content is preferably 94.6% by mass or higher, more preferably 98.5% by mass or higher, still more preferably 99.0% by mass or higher, particularly preferably 99.2% by mass or higher. Herein, the cis-1,4-bond content (cis content) is calculated from signal intensities measured by NMR analysis.

With regard to the component (a), particularly preferred examples of the lanthanoid-containing compound include neodymium phosphates or carboxylates, with neodymium versatates or 2-ethylhexanoates being most preferred. Specific examples of the Lewis base include acetylacetone, tetrahydrofuran, pyridine, N,N-dimethylformamide, thiophene, diphenyl ether, triethylamine, organophosphorus compounds, and monohydric or dihydric alcohols.

With regard to the component (b), specific examples of the alumoxanes include methylalumoxane (hereinafter, also referred to as "MAO"), ethylalumoxane, n-propylalumoxane, n-butylalumoxane, isobutylalumoxane, t-butylalumoxane, hexylalumoxane, and isohexylalumoxane. Preferred among these is MAO.

Specific examples of the organoaluminum compounds of formula (1) include trimethylaluminum, triethylaluminum, tri-n-propylaluminum, triisopropylaluminum, tri-n-butylaluminum, triisobutylaluminum, tri-t-butylaluminum, tripentylaluminum, trihexylaluminum, tricyclohexylaluminum, trioctylaluminum, diethylaluminum hydride, di-n-propylaluminum hydride, di-n-butylaluminum hydride, diisobutylaluminum hydride, dihexylaluminum hydride, diisohexylaluminum hydride, dioctylaluminum hydride, diisooctylaluminum hydride, ethylaluminum dihydride, n-propylaluminum dihydride, and isobutylaluminum dihydride. Preferred among these are diisobutylaluminum hydride, triethylaluminum, triisobutylaluminum, and diethylaluminum hydride, with diisobutylaluminum hydride being particularly preferred.

With regard to the component (c), particularly preferred examples of the iodine-containing compound include iodine, trimethylsilyl iodide, triethylsilyl iodide, dimethylsilyl diiodo, methyl iodide, iodoform, and diiodomethane, with trimethylsilyl iodide being most preferred.

The mixing ratio of the components (components (a) to (c)) may be appropriately selected as needed, and may be as described in JP 2015-232112 A mentioned above.

The polybutadiene (conjugated diene polymer) used to prepare the modified BR (modified conjugated diene polymer) preferably has a ratio of the weight average molecular weight (Mw) to the number average molecular weight (Mn), namely a molecular weight distribution (Mw/Mn), of 3.5 or lower, more preferably 3.0 or lower, still more preferably 2.5 or lower, as measured by gel permeation chromatography. Herein, the Mw and Mn of the polymers other than the natural rubber derived from *Taraxacum kok-saghyz* can be determined by gel permeation chromatography (GPC) (GPC-8000 series available from Tosoh Corporation, detector: differential refractometer, column: TSKGEL SUPERMULTIPORE HZ-M available from Tosoh Corporation) calibrated with polystyrene standards.

The polybutadiene (conjugated diene polymer) preferably has a Mooney viscosity at 100° C. ($ML_{1+4}$, 100° C.) of 5 to 50, more preferably 10 to 40. The Mooney viscosity ($ML_{1+4}$, 100° C.) of the polybutadiene is measured in accordance with JIS K 6300 using an L rotor under the conditions including one minute of preheating, four minutes of rotor operation, and a temperature of 100° C.

The polybutadiene (conjugated diene polymer) preferably has a 1,2-vinyl bond content (1,2-vinyl content) of 0.5% by mass or lower, more preferably 0.4% by mass or lower, still more preferably 0.3% by mass or lower. The 1,2-vinyl bond content is preferably 0.001% by mass or higher, more preferably 0.01% by mass or higher. Herein, the 1,2-vinyl bond content is calculated from signal intensities measured by NMR analysis.

Examples of the alkoxysilane compound used in the modification step (A) (hereinafter, also referred to as "modifier") include compounds having two or more reactive groups, including an alkoxysilyl group. The type of reactive group other than the alkoxysilyl group is not limited but is preferably, for example, at least one functional group selected from the group consisting of (f) an epoxy group, (g) an isocyanate group, (h) a carbonyl group, and (i) a cyano group.

Particularly preferred examples of the alkoxy silane Compound (modifier) include 3-glycidoxypropyltrimethoxysilane, 2-(3,4-epoxycyclohexyl)ethyltrimethoxysilane, 3-isocyanatopropyltrimethoxysilane, 3-methacryloyloxypropyltrimethoxysilane, and 3-cyanopropyltrimethoxysilane, with 3-glycidoxypropyltrimethoxysilane being most preferred. Partial condensates of the foregoing alkoxysilane compounds may also be used.

The amount of the alkoxysilane compound used in the modification reaction in the modification step (A) is preferably 0.01 to 200 mol, more preferably 0.1 to 150 mol per mole of the component (a).

In the modification step (A), it is preferred to add, in addition to the modifier, an agent which can be consumed by a condensation reaction with the alkoxysilane compound residue, i.e., the modifier introduced into the active terminal, in the condensation step (B). Specifically, it is preferred to add a functional group-introducing agent.

The functional group-introducing agent may be any compound that substantially does not directly react with the active terminal but remains unreacted in the reaction system.

For example, the functional group-introducing agent is preferably an alkoxysilane compound that is different from the alkoxysilane compound used as the modifier, i.e., an alkoxysilane compound that contains at least one functional group selected from the group consisting of (j) an amino group, (k) an imino group, and (l) a mercapto group. The alkoxysilane compound used as the functional group-introducing agent may be in the form of a partial condensate or a mixture of the partial condensate and an alkoxysilane compound that can be used as a functional group-introducing agent but is not a partial condensate.

Particularly preferred examples of the functional group-introducing agent include 3-diethylaminopropyl(triethoxy)silane, 3-dimethylaminopropyl(triethoxy)silane, 3-aminopropyltriethoxysilane, 3-(1-hexamethyleneimino)propyl(triethoxy)silane, N-(1-methylpropylidene)-3-(triethoxysilyl)-1-propaneamine, N-(1,3-dimethylbutylidene)-3-(triethoxysilyl)-1-propaneamine, 3-(1-hexamethyleneimino)propyl(triethoxy)silane, (1-hexamethyleneimino)methyl(trimethoxy)silane, 1-[3-(triethoxysilyl)propyl]-4,5-dihydroimidazole, 1-[3-(trimethoxysilyl)propyl]-4,5-dihydroimidazole, N-[3-(triethoxysilyl)propyl]-4,5-dihydroimidazole, and 3-mercaptopropyltriethoxysilane, with 3-aminopropyltriethoxysilane being most preferred.

When an alkoxysilane compound is used as the functional group-introducing agent, the amount thereof is preferably 0.01 to 200 mol, more preferably 0.1 to 150 mol per mole of the component (a).

The condensation step (B) includes performing a condensation reaction of the residual group of the alkoxysilane compound introduced into the active terminal, in the presence of a condensation catalyst containing at least one element selected from the group consisting of the elements of Groups 4, 12, 13, 14, and 15 of the periodic table.

The condensation catalyst may be any catalyst that contains at least one element selected from the group consisting of the elements of Groups 4, 12, 13, 14, and 15 of the periodic table. Preferably, for example, the condensation catalyst contains at least one element selected from the group consisting of titanium (Ti) (Group 4), tin (Sn) (Group 14), zirconium (Zr) (Group 4), bismuth (Bi) (Group 15), and aluminum (Al) (Group 13).

Suitable examples of the condensation catalyst include titanium (Ti)-containing condensation catalysts. Among the titanium (Ti)-containing condensation catalysts, alkoxides, carboxylates, and acetylacetonate complex salts of titanium (Ti) are more preferred, with tetra-i-propoxytitanium (tetraisopropyl titanate) being particularly preferred.

With regard to the amount of the condensation catalyst, the number of moles of the above-mentioned compounds that may be used as the condensation catalyst is preferably 0.1 to 10 mol, particularly preferably 0.3 to 5 mol per mole of the total alkoxysilyl groups in the reaction system.

After the condensation reaction is performed as described above, a conventional post treatment may be performed to obtain a target modified BR (modified conjugated diene polymer).

The modified BR (modified conjugated diene polymer) preferably has a Mooney viscosity ($ML_{1+4}$, 125° C.) of 10 to 150, more preferably 20 to 100. The Mooney viscosity ($ML_{1+4}$, 125° C.) of the modified BR is measured in accordance with JIS K 6300 using an L rotor under the conditions including one minute of preheating, four minutes of rotor operation, and a temperature of 125° C.

The modified BR (modified conjugated diene polymer) preferably has a molecular weight distribution (Mw/Mn) of 3.5 or less, more preferably 3.0 or less, still more preferably 2.5 or less.

The modified BR (modified conjugated diene polymer) preferably has a cold flow value (mg/min) of 1.0 or lower, more preferably 0.8 or lower. Herein, the cold flow value (mg/min) is measured by extruding the polymer through a ¼ inch orifice at a pressure of 3.5 lb/in$^2$ and a temperature of 50° C. After allowing 10 minutes for the polymer to reach steady state, the rate of extrusion is measured and reported in milligrams per minute (mg/min).

The modified BR (modified conjugated diene polymer) preferably has a temporal stability rating of 0 to 5, more preferably 0 to 2. Herein, the temporal stability is determined by measuring the Mooney viscosity ($ML_{1+4}$, 125° C.) after storage in a thermostatic bath at 90° C. for two days, and using it in the expression below. A smaller value indicates better temporal stability.

[Mooney viscosity ($ML_{1+4}$, 125° C.) after storage in a thermostatic bath at 90° C. for two days]–[Mooney viscosity ($ML_{1+4}$, 125° C.) measured immediately after the synthesis]        Expression:

The modified BR (modified conjugated diene polymer) preferably has a glass transition temperature of –40° C. or lower, more preferably –43° C. or lower, still more preferably –46° C. or lower, particularly preferably –50° C. or lower. Moreover, the lower limit of the glass transition temperature is not limited. The glass transition temperature (Tg) of the modified BR is defined as the glass transition onset temperature measured using a differential scanning calorimeter (Q200, TA Instruments Japan) at a temperature increase rate of 10° C./min in accordance with JIS K 7121.

The BR may be a commercial product available from, for example, Ube Industries, Ltd., JSR Corporation, Asahi Kasei Corporation, or Zeon Corporation.

The amount of the BR based on 100% by mass of the rubber component in the rubber composition is preferably 1% by mass or more, more preferably 5% by mass or more, still more preferably 10% by mass or more. The upper limit is preferably 50% by mass or less, more preferably 40% by mass or less, still more preferably 30% by mass or less. When the amount is within the range indicated above, the overall performance in terms of fuel economy, abrasion resistance, and wet grip performance can be significantly improved.

(Carbon Black)

The rubber composition contains carbon black.

The carbon black may be one generally used in tire production, and examples include SAF, ISAF, HAF, FF, FEF, and GPF. These types of carbon black may be used alone or in combinations of two or more.

The carbon black preferably has a nitrogen adsorption specific surface area ($N_2SA$) of 50 m$^2$/g or more, more preferably 70 m$^2$/g or more, still more preferably 85 m$^2$/g or more, but preferably 300 m$^2$/g or less, more preferably 250 m$^2$/g or less, still more preferably 200 m$^2$/g or less. When the $N_2SA$ of the carbon black is not less than the lower limit, excellent properties such as abrasion resistance and wet grip performance tend to be obtained. The carbon black having a $N_2SA$ of not more than the upper limit tends to disperse well, resulting in excellent fuel economy.

The $N_2SA$ of the carbon black can be measured in accordance with JIS K 6217-2:2001.

The carbon black preferably has a dibutyl phthalate oil absorption (DBP) of 50 mL/100 g or more, More preferably 100 mL/100 g or more, still more preferably 110 mL/100 g or more, but preferably 250 mL/100 g or less, more preferably 200 mL/100 g or less, still more preferably 180 mL/100 g or less. When the DBP is not less than the lower limit, excellent properties such as abrasion resistance and wet grip performance tend to be obtained. The carbon black having a DBP of not more than the upper limit tends to disperse well, resulting in excellent fuel economy.

The DBP of the carbon black can be measured in accordance with JIS K 6217-4:2001.

From the standpoint of overall performance in terms of fuel economy, abrasion resistance, and wet grip performance, the carbon black may suitably be a carbon black having an oil absorption number of compressed sample of 100 to 180 mL/100 g (hereinafter, also referred to as high structure carbon black).

The oil absorption number of compressed sample (COAN) of the high structure carbon black is 100 mL/100 g or more, preferably 110 mL/100 g or more, more preferably 120 mL/100 g or more, while the COAN is 180 mL/100 g or less, preferably 170 mL/100 g or less, more preferably 150 mL/100 g or less. When the COAN is within the range indicated above, good overall performance in terms of fuel economy, abrasion resistance, and wet grip performance tends to be obtained.

Herein, the COAN of the carbon black can be determined in accordance with JIS K 6217-4. The oil used is dibutyl phthalate.

The high structure carbon black preferably has a nitrogen adsorption specific surface area ($N_2SA$) of 100 $m^2/g$ or more, more preferably 150 $m^2/g$ or more, but preferably 600 $m^2/g$ or less, more preferably 450 $m^2/g$ or less, still more preferably 300 $m^2/g$ or less, particularly preferably 250 $m^2/g$ or less. When the $N_2SA$ is within the range indicated above, good overall performance in terms of fuel economy, abrasion resistance, and wet grip performance tends to be obtained.

The high structure carbon black preferably has a volatile matter content at 900° C. of 0.50% by mass or lower, more preferably 0.46% by mass or lower. When the volatile matter content is not higher than the upper limit, good overall performance in terms of fuel economy, abrasion resistance, and wet grip performance tends to be obtained.

Moreover, the lower limit of the volatile matter content is not limited.

Herein, the volatile matter content of the carbon black can be determined in accordance with JIS K 6221 (1994).

The high structure carbon black preferably has a volatile matter content at 1500° C. of 1.00% by mass or lower, more preferably 0.70% by mass or lower. When the volatile matter content is not higher than the upper limit, good overall performance in terms of fuel economy, abrasion resistance, and wet grip performance tends to be obtained.

Moreover, the lower limit of the volatile matter content is not limited.

The high structure carbon black preferably has a pH of 6.0 or higher, more preferably 7.0 or higher, still more preferably 8.5 or higher, but preferably 12.0 or lower, more preferably 11.0 or lower, as measured in accordance with JIS K 6220-1. When the pH is within the range indicated above, good overall performance in terms of fuel economy, abrasion resistance, and wet grip performance tends to be obtained.

The high structure carbon black may be produced by conventionally known methods such as a furnace process or a channel process, for example, as described in JP 2013-116940 A, which is incorporated herein by reference.

The amount of the carbon black per 100 parts by mass of the rubber component in the rubber composition is 30 parts by mass or more, preferably 35 parts by mass or more, more preferably 40 parts by mass or more, still more preferably 45 parts by mass or more. Moreover, the upper limit of the amount is not limited but is preferably 150 parts by mass or less, more preferably 120 parts by mass or less, still more preferably 100 parts by mass or less. When the amount is not less than the lower limit, good properties such as abrasion resistance and wet grip performance tend to be obtained. When the amount is not more than the upper limit, good fuel economy tends to be obtained.

(Silica)

From the standpoint of overall performance in terms of fuel economy, abrasion resistance, and wet grip performance, the rubber composition preferably contains silica.

Non-limiting examples of the silica include dry silica (anhydrous silicic acid) and wet silica (hydrous silicic acid). Wet silica is preferred because it has a large number of silanol groups.

The silica preferably has a nitrogen adsorption specific surface area ($N_2SA$) of 50 $m^2/g$ or more, more preferably 80 $m^2/g$ or more, still more preferably 100 $m^2/g$ or more, but preferably 300 $m^2/g$ or less, more preferably 250 $m^2/g$ or less. When the $N_2SA$ is not less than the lower limit, excellent properties such as abrasion resistance and wet grip performance tend to be obtained. The silica having a $N_2SA$ of not more than the upper limit tends to disperse well, resulting in excellent fuel economy.

The $N_2SA$ of the silica can be measured in accordance with ASTM D3037-81.

The silica may suitably be a silica having a nitrogen adsorption specific surface area ($N_2SA$) of 160 $m^2/g$ or more (hereinafter, also referred to as "fine particle silica"). The lower limit of the $N_2SA$ of the fine particle silica is preferably 165 $m^2/g$ or more, more preferably 170 $m^2/g$ or more. The upper limit is preferably 300 $m^2/g$ or less, more preferably 250 $m^2/g$ or less. When the $N_2SA$ is not less than the lower limit, excellent properties such as abrasion resistance and wet grip performance tend to be obtained. The silica having a $N_2SA$ of not more than the upper limit tends to disperse well, resulting in excellent fuel economy.

The amount of the silica (total amount of all types of silica) per 100 parts by mass of the rubber component in the rubber composition is preferably 5 parts by mass or more, more preferably 10 parts by mass or more, still more preferably 15 parts by mass or more, but is preferably 80 parts by mass or less, more preferably 50 parts by mass or less, still more preferably 40 parts by mass or less. When the amount is not less than the lower limit, excellent properties such as abrasion resistance and wet grip performance tend to be obtained. When the amount is not more than the upper limit, the silica tends to disperse well, resulting in excellent fuel economy.

The combined amount of the carbon black and silica per 100 parts by mass of the rubber component in the rubber composition is preferably 20 parts by mass or more, more preferably 35 parts by mass or more, still more preferably 40 parts by mass or more, but is preferably 120 parts by mass or less, more preferably 90 parts by mass or less, still more preferably 70 parts by mass or less. When the combined amount is not less than the lower limit, excellent properties such as abrasion resistance and wet grip performance tend to be obtained. When the combined amount is not more than the upper limit, the silica tends to disperse well, resulting in excellent fuel economy.

(Silane Coupling Agent)

When the rubber composition contains silica, it preferably contains a silane coupling agent together with the silica. Non-limiting examples of the silane coupling agent include sulfide silane coupling agents such as bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(2-triethoxysilylethyl)trisulfide, bis(4-trimethoxysilylbutyl)trisulfide, bis(3-triethoxysilylpropyl)disulfide, bis(2-triethoxysilylethyl)disulfide, bis(4-triethoxysilylbutyl)disulfide, bis(3-trimethoxysilylpropyl)disulfide, bis(2-trimethoxysilylethyl)disulfide, bis(4-trimethoxysilylbutyl)disulfide, 3-trimethoxysilylpropyl-N,N-dimethylthiocarbamoyl tetrasulfide, 2-triethoxysilylethyl-N,N-dimethylthiocarbamoyl tetrasulfide, and 3-triethoxysilylpropyl methacrylate monosulfide; mercapto silane coupling agents such as 3-mercaptopropyltrimethoxysilane and 2-mercaptoethyltriethoxysilane; vinyl silane coupling agents such as vinyltriethoxysilane and vinyltrimethoxysilane; amino silane coupling agents such as 3-aminopropyltriethoxysilane and 3-aminopropyltrimethoxysilane; glycidoxy silane coupling agents such as γ-glycidoxypropyltriethoxysilane and γ-glycidoxypropyltrimethoxysilane; nitro silane coupling agents such as 3-nitropropyltrimethoxysilane and 3-nitropropyltriethoxysilane; and chloro silane coupling agents such as 3-chloropropyltrimethoxysilane and 3-chloropropyltriethoxysilane. Examples of commercial products include products available from Degussa, Momentive, Shin-Etsu Silicone, Tokyo Chemical Industry Co., Ltd., AZmax. Co., and Dow Corning Toray Co., Ltd. These silane coupling agents may be used alone or in combinations of two or more. From the standpoint of overall performance in terms of fuel economy, abrasion resistance, and wet grip performance, sulfide silane coupling agents and mercapto silane coupling agents are preferred among these, with mercapto silane coupling agents being more preferred.

Examples of the mercapto silane coupling agents include silane coupling agents having mercapto groups and silane coupling agents having protected mercapto groups. These may be used alone or in combinations of two or more.

Suitable mercapto silane coupling agents include (i) silane coupling agents represented by the following formula (2-1) and (ii) silane coupling agents containing linking units A and B represented by the following formulas (2-2) and (2-3), respectively.

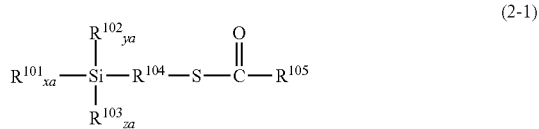

(2-1)

In formula (2-1), $R^{101}$ represents a monovalent group selected from —Cl, —Br, —$OR^{106}$, —$O(O{=})CR^{106}$, —$ON{=}CR^{106}R^{107}$, —$ON{=}CR^{106}R^{107}$, —$NR^{106}R^{107}$, or —$(OSiR^{106}R^{107})_h(OSiR^{106}R^{107}R^{108})$ where $R^{106}$, $R^{107}$, and $R^{108}$ may be the same or different and each represent a hydrogen atom or a C1-C18 monovalent hydrocarbon group, and h represents an average number of 1 to 4; $R^{102}$ represents $R^{101}$, a hydrogen atom, or a C1-C18 monovalent hydrocarbon group; $R^{103}$ represents the group: —$[O(R^{109}O)_j]$— where $R^{109}$ represents a C1-C18 alkylene group, and j represents an integer of 1 to 4; $R^{104}$ represents a C1-C18 divalent hydrocarbon group; $R^{105}$ represents a C1-C18 monovalent hydrocarbon group; and xa, ya, and za are numbers satisfying the following relations: $xa+ya+2za=3$, $0 \le xa \le 3$, $0 \le ya \le 2$, and $0 \le za \le 1$.

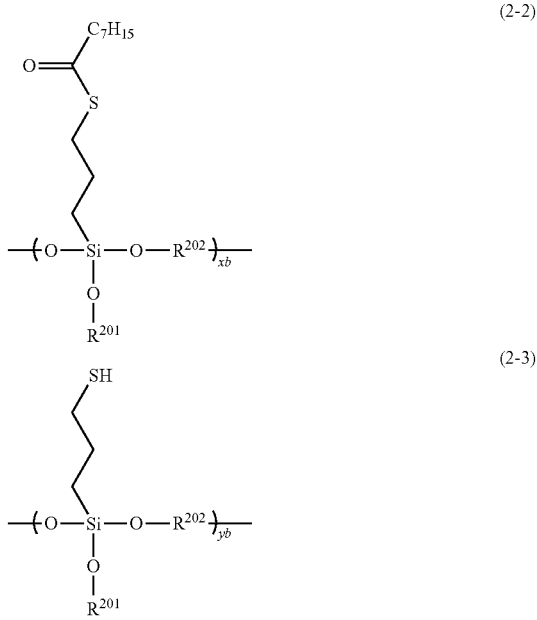

In formulas (2-2) and (2-3), xb represents an integer of 0 or more; yb represents an integer of 1 or more; $R^{201}$ represents a hydrogen atom, a halogen atom, a branched or unbranched C1-C30 alkyl group, a branched or unbranched C2-C30 alkenyl group, a branched or unbranched C2-C30 alkynyl group, or the alkyl group in which a terminal hydrogen atom is replaced with a hydroxyl or carboxyl group; and $R^{202}$ represents a branched or unbranched C1-C30 alkylene group, a branched or unbranched C2-C30 alkenylene group, or a branched or unbranched C2-C30 alkynylene group, provided that $R^{201}$ and $R^{202}$ may together form a cyclic structure.

Specific examples of $R^{102}$, $R^{105}$, $R^{106}$, $R^{107}$, and $R^{108}$ in formula (2-1) include a methyl group, an ethyl group, a n-propyl group, an isopropyl group, a n-butyl group, an isobutyl group, a sec-butyl group, a tert-butyl group, a pentyl group, a hexyl group, an octyl group, a decyl group, a dodecyl group, a cyclopentyl group, a cyclohexyl group, a vinyl group, a propenyl group, an allyl group, a hexenyl group, an octenyl group, a cyclopentenyl group, a cyclohexenyl group, a phenyl group, a tolyl group, a xylyl group, a naphthyl group, a benzyl group, a phenethyl group, and a naphthylmethyl group.

Examples of linear alkylene groups that may be used as $R^{109}$ in formula (2-1) include a methylene group, an ethylene group, a n-propylene group, a n-butylene group, and a hexylene group. Examples of branched alkylene groups that may be used as $R^{109}$ include an isopropylene group, an isobutylene group, and a 2-methylpropylene group.

Specific examples of the silane coupling agents of formula (2-1) include 3-hexanoylthiopropyltriethoxysilane, 3-octanoylthiopropyltriethoxysilane, 3-decanoylthiopropyltriethoxysilane, 3-lauroylthiopropyltriethoxysilane, 2-hexanoylthioethyltriethoxysilane, 2-octanoylthioethyltriethoxysilane, 2-decanoylthioethyltriethoxysilane, 2-lauroylthioethyltriethoxysilane, 3-hexanoylthiopropyltrimethoxysilane, 3-octanoylthiopropyltrimethoxysilane, 3-decanoylthiopropyltrimethoxysilane, 3-lauroylthiopropyltrimethoxysilane, 2-hexanoylthioethyltrimethoxysilane, 2-octanoylthioethyltrimethoxysilane, 2-decanoylthioethyltrimethoxysilane, and 2-lauroylthioethyltrimethoxysilane. Among these, 3-octanoylthiopropyltriethoxysilane (NXT available from Momentive) is particularly preferred. These silane coupling agents may be used alone or in combinations of two or more.

When the silane coupling agents containing linking units A and B of formulas (2-2) and (2-3) are used, the increase in viscosity during processing can be reduced as compared to when using polysulfidesilanes such as bis(3-triethoxysilylpropyl)tetrasulfide. This is probably because, since the sulfide moiety of the linking unit A is a C—S—C bond, these silane coupling agents are thermally more stable than tetrasulfides and disulfides, and thus the Mooney viscosity is less likely to increase.

Moreover, the decrease in scorch time can be reduced as compared to when using mercaptosilanes such as 3-mercaptopropyltrimethoxysilane. This is probably because, though the linking unit B has a mercaptosilane structure, the —$C_7H_{15}$ moiety of the linking unit A covers the —SH group of the linking unit B to inhibit it from reacting with the polymer, and therefore scorching is less likely to occur.

The linking unit A content of the silane coupling agent of the above structure is preferably 30 mol % or higher, more preferably 50 mol % or higher, but is preferably 99 mol % or lower, more preferably 90 mol % or lower. Moreover, from the standpoint of reactivity with silica, the linking unit B content is preferably 1 mol % or higher, more preferably 5 mol % or higher, still more preferably 10 mol % or higher, but is preferably 70 mol % or lower, more preferably 65 mol % or lower, still more preferably 55 mol % or lower. Moreover, the combined content of the linking units A and B is preferably 95 mol % or higher, more preferably 98 mol % or higher, particularly preferably 100 mol %.

The linking unit A or B content refers to the amount including the linking unit A or B present at the end of the silane coupling agent, if any. In the case where the linking unit A or B is present at the end of the silane coupling agent, its form is not limited as long as it forms a unit corresponding to formula (2-2) representing the linking unit A or formula (2-3) representing the linking unit B.

Examples of the halogen atom for $R^{201}$ include chlorine, bromine, and fluorine.

Examples of the branched or unbranched C1-C30 alkyl group for $R^{201}$ include a methyl group, an ethyl group, a n-propyl group, an isopropyl group, a n-butyl group, an iso-butyl group, a sec-butyl group, a tert-butyl group, a pentyl group, a hexyl group, a heptyl group, a 2-ethylhexyl group, an octyl group, a nonyl group, and a decyl group. The alkyl group preferably has 1 to 12 carbon atoms.

Examples of the branched or unbranched C2-C30 alkenyl group for $R^{201}$ include a vinyl group, a 1-propenyl group, a 2-propenyl group, a 1-butenyl group, a 2-butenyl group, a 1-pentenyl group, a 2-pentenyl group, a 1-hexenyl group, a 2-hexenyl group, and a 1-octenyl group. The alkenyl group preferably has 2 to 12 carbon atoms.

Examples of the branched or unbranched C2-C30 alkynyl group for $R^{201}$ include an ethynyl group, a propynyl group, a butynyl group, a pentynyl group, a hexynyl group, a heptynyl group, an octynyl group, a nonynyl group, a decynyl group, an undecynyl group, and a dodecynyl group. The alkynyl group preferably has 2 to 12 carbon atoms.

Examples of the branched or unbranched C1-C30 alkylene group for $R^{202}$ include an ethylene group, a propylene group, a butylene group, a pentylene group, a hexylene group, a heptylene group, an octylene group, a nonylene group, a decylene group, an undecylene group, a dodecylene group, a tridecylene group, a tetradecylene group, a pentadecylene group, a hexadecylene group, a heptadecylene group, and an octadecylene group. The alkylene group preferably has 1 to 12 carbon atoms.

Examples of the branched or unbranched C2-C30 alkenylene group for $R^{202}$ include a vinylene group, a 1-propenylene group, a 2-propenylene group, a 1-butenylene group, a 2-butenylene group, a 1-pentenylene group, a 2-pentenylene group, a 1-hexenylene group, a 2-hexenylene group, and a 1-octenylene group. The alkenylene group preferably has 2 to 12 carbon atoms.

Examples of the branched or unbranched C2-C30 alkynylene group for $R^{202}$ include an ethynylene group, a propynylene group, a butynylene group, a pentynylene group, a hexynylene group, a heptynylene group, an octynylene group, a nonynylene group, a decynylene group, an undecynylene group, and a dodecynylene group. The alkynylene group preferably has 2 to 12 carbon atoms.

In the silane coupling agent containing linking units A and B of formulas (2-2) and (2-3), the total number of repetitions (xb+yb) consisting of the sum of the number of repetitions (xb) of the linking unit A and the number of repetitions (yb) of the linking unit B is preferably in the range of 3 to 300. When the total number of repetitions is within the above-mentioned range, the —$C_7H_{15}$ moiety of the linking unit A covers the mercaptosilane of the linking unit B to reduce the decrease in scorch time while ensuring good reactivity with silica and the rubber component.

Examples of the silane coupling agents containing linking units A and B of formulas (2-2) and (2-3) include NXT-Z30, NXT-Z45, and NXT-Z60 all available from Momentive. These silane coupling agents may be used alone or in combinations of two or more.

Other suitable mercapto silane coupling agents include (iii) silane coupling agents represented by the following formula (2-4).

(2-4)

In formula (2-4), $R^6$ to $R^8$ may be the same as or different from one another and each represent a branched or unbranched C1-C12 alkyl group, a branched or unbranched C1-C12 alkoxy group, or a group represented by —O—$(R^{10}$—O$)_z$—$R^{11}$ where $R^{10}$ groups, the number of which is indicated by z, may be the same as or different from one another and each represent a branched or unbranched divalent C1-C30 hydrocarbon group, $R^{11}$ represents a branched or unbranched C1-C30 alkyl group, a branched or unbranched C2-C30 alkenyl group, a C6-C30 aryl group, or a C7-C30 aralkyl group, and z represents an integer of 1 to 30; and $R^9$ represents a branched or unbranched C1-C6 alkylene group.

$R^6$ to $R^8$ each represent a branched or unbranched C1-C12 alkyl group, a branched or unbranched C1-C12 alkoxy group, or a group represented by $(R^{10}$—O$)_z$—$R^{11}$. Preferably, at least one of $R^6$ to $R^8$ is a group represented by —O—$(R^{10}$—O$)_z$—$R^{11}$. More preferably, two of $R^6$ to $R^8$ are groups represented by $-(R^{10}-O)_z-R^{11}$ and the other is a branched or unbranched C1-C12 alkoxy group.

Examples of the branched or unbranched C1-C12, preferably C1-C5, alkyl group for $R^6$ to $R^8$ include a methyl group, an ethyl group, a n-propyl group, an isopropyl group, a n-butyl group, an iso-butyl group, a sec-butyl group, a tert-butyl group, a pentyl group, a hexyl group, a heptyl group, a 2-ethylhexyl group, an octyl group, and a nonyl group.

Examples of the branched or unbranched C1-C12, preferably C1-C5, alkoxy group for $R^6$ to $R^8$ include a methoxy group, an ethoxy group, a n-propoxy group, an isopropoxy group, a n-butoxy group, an iso-butoxy group, a sec-butoxy group, a tert-butoxy group, a pentyloxy group, a hexyloxy group, a heptyloxy group, a 2-ethylhexyloxy group, an octyloxy group, and a nonyloxy group.

In the group: $-O-(R^{10}-O)_z-R^{11}$ for $R^6$ to $R^8$, $R^{10}$ represents a branched or unbranched divalent hydrocarbon group having 1 to 30 carbon atoms, preferably 1 to 15 carbon atoms, more preferably 1 to 3 carbon atoms. Examples of the hydrocarbon group include branched or unbranched C1-C30 alkylene groups, branched or unbranched C2-C30 alkenylene groups, branched or unbranched C2-C30 alkynylene groups, and C6-C30 arylene groups, with branched or unbranched C1-C30 alkylene groups being preferred.

Examples of the branched or unbranched C1-C30, preferably C1-C15, more preferably C1-C3, alkylene groups for $R^{10}$ include a methylene group, an ethylene group, a propylene group, a butylene group, a pentylene group, a hexylene group, a heptylene group, an octylene group, a nonylene group, a decylene group, an undecylene group, a dodecylene group, a tridecylene group, a tetradecylene group, a pentadecylene group, a hexadecylene group, a heptadecylene group, and an octadecylene group.

Examples of the branched or unbranched C2-C30, preferably C2-C15, more preferably C2-C3, alkenylene groups for $R^{10}$ include a vinylene group, a 1-propenylene group, a 2-propenylene group, a 1-butenylene group, a 2-butenylene group, a 1-pentenylene group, a 2-pentenylene group, a 1-hexenylene group, a 2-hexenylene group, and a 1-octenylene group.

Examples of the branched or unbranched C2-C30, preferably C2-C15, more preferably C2-C3, alkynylene groups for $R^{10}$ include an ethynylene group, a propynylene group, a butynylene group, a pentynylene group, a hexynylene group, a heptynylene group, an octynylene group, a nonynylene group, a decynylene group, an undecynylene group, and a dodecynylene group.

Examples of the C6-C30, preferably C6-C15, arylene groups for $R^{10}$ include a phenylene group, a tolylene group, a xylylene group, and a naphthylene group.

The symbol z represents an integer of 1 to 30, preferably of 2 to 20, more preferably of 3 to 7, still more preferably of 5 or 6.

$R^{11}$ represents a branched or unbranched C1-C30 alkyl group, a branched or unbranched C2-C30 alkenyl group, a C6-C30 aryl group, or a C7-C30 aralkyl group, preferably a branched or unbranched C1-C30 alkyl group.

Examples of the branched or unbranched C1-C30, preferably C3-C25, more preferably C10-C15, alkyl group for $R^{11}$ include a methyl group, an ethyl group, a n-propyl group, an isopropyl group, a n-butyl group, an iso-butyl group, a sec-butyl group, a tert-butyl group, a pentyl group, a hexyl group, a heptyl group, a 2-ethylhexyl group, an octyl group, a nonyl group, a decyl group, an undecyl group, a dodecyl group, a tridecyl group, a tetradecyl group, a pentadecyl group, and an octadecyl group.

Examples of the branched or unbranched C2-C30, preferably C3-C25, more preferably C10-C15, alkenyl group for $R^{11}$ include a vinyl group, a 1-propenyl group, a 2-propenyl group, a 1-butenyl group, a 2-butenyl group, a 1-pentenyl group, a 2-pentenyl group, a 1-hexenyl group, a 2-hexenyl group, a 1-octenyl group, a decenyl group, an undecenyl group, a dodecenyl group, a tridecenyl group, tetradecenyl group, a pentadecenyl group, and an octadecenyl group.

Examples of the C6-C30, preferably C10-C20, aryl group for $R^{11}$ include a phenyl group, a tolyl group, a xylyl group, a naphthyl group, and a biphenyl group.

Examples of the C7-C30, preferably C10-C20, aralkyl group for $R^{11}$ include a benzyl group and a phenethyl group.

Specific examples of the group represented by $-O-(R^{10}-O)_z-R^{11}$ include $-O-(C_2H_4-O)_5-C_{11}H_{23}$, $-O-(C_2H_4-O)_5-C_{12}H_{25}$, $-O-(C_2H_4-O)_5-C_{13}H_{27}$, $-O-(C_2H_4-O)_5-C_{14}H_{29}$, $-O-(C_2H_4-O)_5-C_{15}H_{31}$, $-O-(C_2H_4-O)_3-C_{13}H_{27}$, $-O-(C_2H_4-O)_4-C_{13}H_{27}$, $-O-(C_2H_4-O)_6-C_{13}H_{27}$, and $-O-(C_2H_4-O)_7-C_{13}H_{27}$. Preferred among these are $-O-(C_2H_4-O)_5-C_{11}H_{23}$, $-O-(C_2H_4-O)_5-C_{13}H_{27}$, $-O-(C_2H_4-O)_5-C_{15}H_{31}$, and $-O-(C_2H_4-O)_6-C_{13}H_{27}$.

Examples of the branched or unbranched C1-C6, preferably C1-C5, alkylene group for $R^9$ include those described for the branched or unbranched C1-C30 alkylene groups for $R^{10}$.

Examples of the compounds of formula (2-4) include 3-mercaptopropyltrimethoxysilane, 3-mercaptopropyltriethoxysilane, 2-mercaptoethyltrimethoxysilane, 2-mercaptoethyltriethoxysilane, and a compound represented by the formula below (Si363 available from Evonik-Degussa). The compound of the formula below is suitable. These may be used alone or in combinations of two or more.

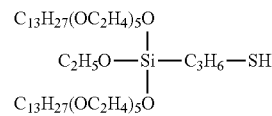

The amount of the silane coupling agent, if present, per 100 parts by mass of the silica in the rubber composition is preferably 1 part by mass or more, more preferably 2 parts by mass or more, but is preferably 20 parts by mass or less, more preferably 15 parts by mass or less. When the amount is not less than the lower limit, the silane coupling agent tends to sufficiently exhibit its effects such as improving dispersion. When the amount is not more than the upper limit, a sufficient coupling effect tends to be obtained, resulting in good reinforcing properties.

(Liquid Plasticizer)

The rubber composition may contain a liquid plasticizer (a plasticizer that is liquid at room temperature (25° C.)). Non-limiting examples of the liquid plasticizer include oils, liquid polymers (liquid diene polymers), and liquid resins. These may be used alone or in combinations of two or more. Preferred among these are oils, liquid polymers, and liquid resins, with oils being particularly preferred from the standpoint of properties such as processability.

From an environmental standpoint, the liquid plasticizer preferably has a polycyclic aromatic content (PCA) of lower than 3% by mass, more preferably lower than 1% by mass. The polycyclic aromatic content (PCA) is measured in accordance with the Institute of Petroleum (IP, UK) 346/92 method.

Non-limiting examples of the oils include conventionally known oils, including process oils such as paraffinic process oils, aromatic process oils, and naphthenic process oils; low PCA (polycyclic aromatic) process oils such as TDAE and MES; vegetable fats and oils; and mixtures thereof. From the standpoint of rubber physical properties, aromatic process oils are preferred among these. Specific examples of the aromatic process oils include Diana Process Oil AH series available from Idemitsu Kosan Co., Ltd.

Examples of the liquid polymers (liquid diene polymers) include diene polymers which are liquid at room temperature (25° C.)

The polystyrene-equivalent weight average molecular weight (Mw) of the liquid diene polymers is preferably $1.0 \times 10^3$ to $2.0 \times 10^5$, more preferably $3.0 \times 10^3$ to $1.5 \times 10^4$ as measured by gel permeation chromatography (GPC).

Examples of the liquid diene polymers include liquid styrene-butadiene copolymers (liquid SBR), liquid polybutadiene polymers (liquid BR), liquid polyisoprene polymers (liquid IR), and liquid styrene-isoprene copolymers (liquid SIR).

Non-limiting examples of the liquid resins include liquid aromatic vinyl polymers, coumarone-indene resins, indene resins, terpene resins, rosin resins, and hydrogenated products of the foregoing resins.

Examples of the liquid aromatic vinyl polymers include resins produced by polymerization of α-methylstyrene and/or styrene. Specific examples include liquid resins such as styrene homopolymers, α-methylstyrene homopolymers, and copolymers of α-methylstyrene and styrene.

Examples of the liquid coumarone-indene resins include resins that contain coumarone and indene as main monomer components forming the skeleton (backbone) of the resins. Examples of monomer components which may be contained in the skeleton other than coumarone and indene include styrene, α-methylstyrene, methylindene, and vinyltoluene.

Examples of the liquid indene resins include liquid resins that contain indene as a monomer component forming the skeleton (backbone) of the resins.

Examples of the liquid terpene resins include liquid terpene-based resins typified by resins produced by polymerization of terpene compounds such as α-pinene, 1-pinene, camphene, or dipentene, and terpenephenol resins made from terpene compounds and phenol compounds.

Examples of the liquid rosin resins include liquid rosin-based resins typified by natural rosins, polymerized rosins, modified rosins, and ester compounds thereof, and hydrogenated products thereof.

The amount of the liquid plasticizer per 100 parts by mass of the rubber component in the rubber composition is preferably 3 parts by mass or more, more preferably 5 parts by mass or more. When the amount is not less than the lower limit, good processability tends to be obtained. The amount is also preferably 50 parts by mass or less, more preferably 30 parts by mass or less, still more preferably 25 parts by mass or less. When the amount is not more than the upper limit, good properties such as abrasion resistance and wet grip performance tend to be obtained. The amount of the liquid plasticizer includes the amount of the oil (extender oil) contained in the rubber (oil extended rubber) used. A range as described above is also suitable for the amount of oil.

(Solid Resin)

The rubber composition may contain a solid resin (a polymer that is solid at room temperature (25° C.)). Non-limiting examples of the solid resin include solid styrene resins, coumarone-indene resins, terpene resins, p-t-butylphenol acetylene resins, acrylic resins, dicyclopentadiene (DCPD) resins, C5 petroleum resins, C9 petroleum resins, and C5/C9 petroleum resins. These may be used alone or in combinations of two or more.

Solid styrene resins refer to solid polymers made from styrenic monomers as structural monomers, and examples include polymers produced by polymerization of styrenic monomers as main components (50% by mass or more). Specific examples include homopolymers produced by polymerizing a single styrenic monomer (e.g., styrene, o-methylstyrene, m-methylstyrene, p-methylstyrene, α-methylstyrene, p-methoxystyrene, p-tert-butylstyrene, p-phenylstyrene, o-chlorostyrene, m-chlorostyrene, p-chlorostyrene) alone, copolymers produced by copolymerizing two or more styrenic monomers, and copolymers of styrenic monomers and additional monomers copolymerizable therewith.

Examples of the additional monomers include acrylonitriles such as acrylonitrile and methacrylonitrile; unsaturated carboxylic acids such as acrylic acid and methacrylic acid; unsaturated carboxylic acid esters such as methyl acrylate and methyl methacrylate; dienes such as chloroprene, butadiene, and isoprene; olefins such as 1-butene and 1-pentene; and α,β-unsaturated carboxylic acids and acid anhydrides thereof such as maleic anhydride.

In particular, solid α-methylstyrene resins (e.g., α-methylstyrene homopolymers, copolymers of α-methylstyrene and styrene) are preferred.

Examples of the solid coumarone-indene resins include solid resins having structural units as described for the liquid coumarone-indene resins.

Examples of the solid terpene resins include polyterpene, terpenephenol, and aromatic modified terpene resins.

Polyterpene resins refer to resins produced by polymerization of terpene compounds, or hydrogenated products of the resins. The term "terpene compound" refers to a hydrocarbon having a composition represented by $(C_5H_8)_n$, or an oxygen-containing derivative thereof, each of which has a terpene backbone and is classified as, for example, a monoterpene $(C_{10}H_{16})$, sesquiterpene $(C_{15}H_{24})$, or diterpene $(C_{20}H_{32})$. Examples of the terpene compounds include α-pinene, β-pinene, dipentene, limonene, myrcene, alloocimene, ocimene, α-phellandrene, α-terpinene, γ-terpinene, terpinolene, 1,8-cineole, 1,4-cineole, α-terpineol, β-terpineol, and γ-terpineol.

Examples of the solid polyterpene resins include solid terpene resins made from the above-mentioned terpene compounds, such as α-pinene resins, β-pinene resins, limonene resins, dipentene resins, and β-pinene-limonene resins, and solid hydrogenated terpene resins produced by hydrogenation of these terpene resins.

Examples of the solid terpenephenol resins include solid resins produced by copolymerization of the above-mentioned terpene compounds and phenolic compounds, and solid resins produced by hydrogenation of these resins. Specific examples include solid resins produced by condensation of the above-mentioned terpene compounds, phenolic compounds, and formaldehyde. Examples of the phenolic compounds include phenol, bisphenol A, cresol, and xylenol.

Examples of the solid aromatic modified terpene resins include solid resins obtained by modification of terpene resins with aromatic compounds, and solid resins produced by hydrogenation of these resins. The aromatic compounds may be any compound having an aromatic ring, including, for example: phenol compounds such as phenol, alkylphenols, alkoxyphenols, and unsaturated hydrocarbon group-containing phenols; naphthol compounds such as naphthol, alkylnaphthols, alkoxynaphthols, and unsaturated hydrocarbon group-containing naphthols; styrene and styrene derivatives, such as alkylstyrenes, alkoxystyrenes, and unsaturated hydrocarbon group-containing styrenes; coumarone; and indene.

Examples of the solid p-t-butylphenol acetylene resins include solid resins produced by condensation of p-t-butylphenol and acetylene.

The solid acrylic resins are not limited, but solvent-free solid acrylic resins are suitable because they contain little impurities and have a sharp molecular weight distribution.

Examples of the solvent-free solid acrylic resins include (meth)acrylic resins (polymers) synthesized by high temperature continuous polymerization (high temperature continuous bulk polymerization as described in, for example, U.S. Pat. No. 4,414,370, JP S59-6207 A, JP H5-58005 B, JP H1-313522 A, U.S. Pat. No. 5,010,166, and annual research report TREND 2000 issued by Toagosei Co., Ltd., vol. 3, pp. 42-45, all of which are hereby incorporated by reference) using no or minimal amounts of auxiliary raw materials such as polymerization initiators, chain transfer agents, and organic solvents. Herein, the term "(meth)acrylic" means methacrylic and acrylic.

Preferred are solid acrylic resins that are substantially free of auxiliary raw materials such as polymerization initiators, chain transfer agents, and organic solvents. Also preferred are such acrylic resins having a relatively narrow compositional distribution or molecular weight distribution, produced by continuous polymerization.

As described above, solid acrylic resins which are substantially free of auxiliary raw materials such as polymerization initiators, chain transfer agents, and organic solvents, namely which are of high purity, are preferred. The purity of the solid acrylic resins (the resin content of the resins) is preferably 95% by mass or more, more preferably 97% by mass or more.

Examples of the monomer components of the solid acrylic resins include (meth)acrylic acids and (meth)acrylic acid derivatives such as (meth)acrylic acid esters (e.g., alkyl esters, aryl esters, aralkyl esters), (meth)acrylamides, and (meth)acrylamide derivatives.

In addition to the (meth)acrylic acids or (meth)acrylic acid derivatives, aromatic vinyls, such as styrene, α-methylstyrene, vinyltoluene, vinylnaphthalene, divinylbenzene, trivinylbenzene, or divinylnaphthalene, may also be used as monomer components of the solid acrylic resins.

The solid acrylic resins may be formed only of the (meth)acrylic components or may further contain constituent components other than the (meth)acrylic components.

Moreover, the solid acrylic resins may contain a hydroxyl group, a carboxyl group, a silanol group, or other groups.

The amount of the solid resin per 100 parts by mass of the rubber component in the rubber composition is preferably 1 part by mass or more, more preferably 3 parts by mass or more, but is preferably 30 parts by mass or less, more preferably 20 parts by mass or less, still more preferably 10 parts by mass or less. When the amount is within the range indicated above, good overall performance in terms of fuel economy, abrasion resistance, and wet grip performance tends to be obtained.

The liquid plasticizer and the solid resin may each be a commercial product of, for example, Maruzen Petrochemical Co., Ltd., Sumitomo Bakelite Co., Ltd., Yasuhara Chemical Co., Ltd., Tosoh Corporation, Rutgers Chemicals, BASF, Arizona Chemical, Nitto Chemical Co., Ltd., Nippon Shokubai Co., Ltd., JXTG Nippon Oil & Energy Corporation, Arakawa Chemical Industries, Ltd., Taoka Chemical Co., Ltd, or Kraton.

(Farnesene Resin)

The rubber composition preferably contains a farnesene resin. The term "farnesene resin" refers to a polymer produced by polymerizing farnesene as a monomer component. Farnesene exists in isomeric forms, including α-farnesene ((3E,7E)-3,7,11-trimethyl-1,3,6,10-dodecatetraene) and β-farnesene (7,11-dimethyl-3-methylene-1,6,10-dodecatriene). Preferred is (E)-β-farnesene having the following structure:

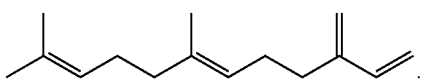

The farnesene resin may be a homopolymer of farnesene (farnesene homopolymer) or a copolymer of farnesene and a vinyl monomer (farnesene-vinyl monomer copolymer). Examples of the vinyl monomer include aromatic vinyl compounds such as styrene, 2-methylstyrene, 3-methylstyrene, 4-methylstyrene, α-methylstyrene, 2,4-dimethylstyrene, 2,4-diisopropylstyrene, 4-tert-butylstyrene, 5-t-butyl-2-methylstyrene, vinylethylbenzene, divinylbenzene, trivinylbenzene, divinylnaphthalene, tert-butoxystyrene, vinylbenzyldimethylamine, (4-vinylbenzyl)dimethylaminoethyl ether, N,N-dimethylaminoethylstyrene, N,N-dimethylaminomethylstyrene, 2-ethylstyrene, 3-ethylstyrene, 4-ethylstyrene, 2-t-butylstyrene, 3-t-butylstyrene, 4-t-butylstyrene, vinylxylene, vinylnaphthalene, vinyltoluene, vinylpyridine, diphenylethylene, and tertiary amino group-containing diphenylethylene; and conjugated diene compounds such as butadiene and isoprene. Styrene or butadiene is preferred among these. In other words, the farnesene-vinyl monomer copolymer is preferably a copolymer of farnesene and styrene (farnesene-styrene copolymer) or a copolymer of farnesene and butadiene (farnesene-butadiene copolymer). The addition of a farnesene-styrene copolymer can increase the effect of improving tensile strength, handling stability, wet grip performance, and abrasion resistance. The addition of a farnesene-butadiene copolymer can increase the effect of improving fuel economy and abrasion resistance.

The farnesene homopolymer preferably has a glass transition temperature (Tg) of −60° C. or lower, more preferably −70° C. or lower, but preferably −120° C. or higher, more preferably −110° C. or higher. Farnesene homopolymers having a Tg within the range indicated above can be suitably used as softeners for tires.

For the same reason, the farnesene-styrene copolymer preferably has a Tg of −15° C. or lower, more preferably −30° C. or lower, but preferably −80° C. or higher, more preferably −70° C. or higher.

For the same reason, the farnesene-butadiene copolymer preferably has a Tg of −60° C. or lower, more preferably −70° C. or lower, but preferably −120° C. or higher, more preferably −110° C. or higher.

Herein, the Tg of the farnesene resin is measured using a differential scanning calorimeter (Q200, TA Instruments Japan) at a temperature increase rate of 10° C./rain in accordance with JIS K 7121:1987.

The farnesene homopolymer preferably has a weight average molecular weight (Mw) of 3000 or more, more preferably 5000 or more, still more preferably 8000 or more.

A Mw of not less than 3000 tends to lead to improved handling stability and abrasion resistance. The Mw is also preferably 500000 or less, more preferably 300000 or less, still more preferably 150000 or less. A Mw of not more than 500000 tends to lead to improved processability and abrasion resistance.

The farnesene-vinyl monomer copolymer preferably has a Mw of 3000 or more, more preferably 5000 or more, still more preferably 8000 or more. A Mw of not less than 3000 tends to lead to improved handling stability. The Mw is also preferably 500000 or less, more preferably 300000 or less, still more preferably 150000 or less, particularly preferably 100000 or less. A Mw of not more than 500000 tends to lead to improved wet grip performance.

Farnesene homopolymers and farnesene-vinyl monomer copolymers having a Mw within the respective ranges indicated above are liquid at room temperature and can be suitably used as softeners for tires.

The farnesene homopolymer preferably has a melt viscosity of 1000 Pa·s or lower, more preferably 200 Pa·s or lower, but preferably 0.1 Pa·s or higher, more preferably 0.5 Pa·s or higher. Farnesene homopolymers having a melt viscosity within the range indicated above can be suitably used as softeners for tires and are also excellent in bloom resistance.

For the same reason, the farnesene-vinyl monomer copolymer preferably has a melt viscosity of 1000 Pa·s or lower, more preferably 650 Pa·s or lower, still more preferably 200 Pa·s or lower, but preferably 1 Pa·s or higher, more preferably 5 Pa·s or higher.

Herein, the melt viscosity of the farnesene resin is measured at 38° C. using a Brookfield-type viscometer (Brookfield Engineering Labs. Inc.).

The farnesene homopolymer preferably has a farnesene content of 80% by mass or higher, more preferably 90% by mass or higher based on 100% by mass of the total monomer components. The farnesene content may be 100% by mass.

The farnesene-vinyl monomer copolymer preferably has a combined content of farnesene and vinyl monomer of 80% by mass or higher, more preferably 90% by mass or higher based on 100% by mass of the total monomer components. The combined content may be 100% by mass. Moreover, the farnesene/vinyl monomer copolymerization ratio (farnesene:vinyl monomer) is preferably 99/1 to 25/75, more preferably 80/20 to 40/60 by mass.

The farnesene resin may be a commercial product, for example, a product available from Kuraray Co., Ltd.

The amount of the farnesene resin per 100 parts by mass of the rubber component in the rubber composition is preferably 1 part by mass or more, more preferably 3 parts by mass or more, still more preferably 5 parts by mass or more. When the amount is 1 part by mass or more, the performance-improving effect caused by the addition of the farnesene resin tends to be sufficiently achieved. The amount is also preferably 50 parts by mass or less, more preferably 40 parts by mass or less, still more preferably 30 parts by mass or less, particularly preferably 20 parts by mass or less. When the amount is 50 parts by mass or less, good properties such as fuel economy, abrasion resistance, and wet grip performance tend to be obtained.

(Tetrazine Compound)

The rubber composition may contain a tetrazine compound represented by the following formula (1):

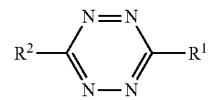

wherein $R^1$ and $R^2$ may be the same or different and each represent a hydrogen atom (—H), —COOR$^3$ in which $R^3$ represents either a hydrogen atom (—H) or an alkyl group, or a C1-C11 monovalent hydrocarbon group optionally containing a heteroatom, and $R^1$ and $R^2$ may each form a salt.

Examples of the heteroatom include nitrogen, oxygen, and sulfur atoms.

The hydrocarbon group as $R^1$ or $R^2$ has 1 to 11 carbon atoms, preferably 2 to 9 carbon atoms, more preferably 4 to 7 carbon atoms.

$R^1$ and $R^2$ are each preferably —COOR$^3$ or the hydrocarbon group containing a heteroatom because such a tetrazine compound is expected to interact easily with a reinforcing filler (especially carbon black or silica). More preferably, $R^1$ and $R^2$ are both the hydrocarbon groups containing a heteroatom.

The hydrocarbon group as $R^1$ or $R^2$ is not limited but is preferably a homocyclic or heterocyclic group because such a tetrazine compound is expected to interact easily with a reinforcing filler (especially carbon black or silica). More preferably, at least one of $R^1$ and $R^2$ is a heterocyclic group. Still more preferably, $R^1$ and $R^2$ are both heterocyclic groups.

Herein, the term "homocyclic group" refers to a group having a ring structure consisting only of carbon atoms. The term "heterocyclic group" refers to a group having a ring structure consisting of two or more types of elements including a carbon atom.

Examples of the homocyclic group include aryl and cycloalkyl groups. Among these, aryl groups are preferred.

Examples of the aryl groups include a phenyl group and a naphthyl group. Among these, a phenyl group is preferred.

Examples of the cycloalkyl groups include a cyclopentyl group and a cyclohexyl group.

The heterocyclic group is preferably a nitrogen-containing heterocyclic group which contains a nitrogen atom as a ring-forming heteroatom, more preferably a nitrogen-containing heterocyclic group which only contains a nitrogen atom as a ring-forming heteroatom.

Examples of the nitrogen-containing heterocyclic group include an aziridinyl group, an azetidinyl group, a pyrrolidinyl group, a piperidinyl group, a hexamethyleneimino group, an imidazolidyl group, a piperazinyl group, a pyrazolidyl group, a pyrrolyl group, an imidazolyl group, a pyrazolyl group, a pyridyl group, a pyridazyl group, a pyrimidyl group, a pyrazyl group, a quinolyl group, an isoquinolyl group, a cinnolinyl group, a quinazolinyl group, and a phthalazinyl group. Among these, a pyridyl group and a pyrimidyl group are preferred, with a pyridyl group being more preferred.

The hydrogen atom in the homocyclic or heterocyclic group may be replaced by a substituent. Preferably, it is replaced by a substituent because such a tetrazine compound is expected to interact easily with a reinforcing filler (especially carbon black or silica).

Examples of the substituent include an amino group, an amide group, a silyl group, an alkoxysilyl group, an isocyanate group, an imino group, an imidazole group, a urea group, an ether group, a carbonyl group, an oxycarbonyl group, a mercapto group, a sulfide group, a disulfide group, a sulfonyl group, a sulfinyl group, a thiocarbonyl group, an ammonium group, an imide group, a hydrazo group, an azo group, a diazo group, a carboxyl group, a nitrile group, a pyridyl group, an alkoxy group, a hydroxyl group, an oxy group, an epoxy group, a sulfonate group, and a trifluoromethyl group. These substituents may be further substituted by the above-listed substituents and may contain groups other than the above substituents, such as an alkylene group or an alkyl group. The substituent is preferably a carboxyl group, the above-described —COOR³, an amino group (preferably a group represented by the formula (A) or (B) below), an alkoxy group (preferably a C1-C6 alkoxy group), or an alkoxysilyl group (preferably a C1-C6 alkoxysilyl group), among others.

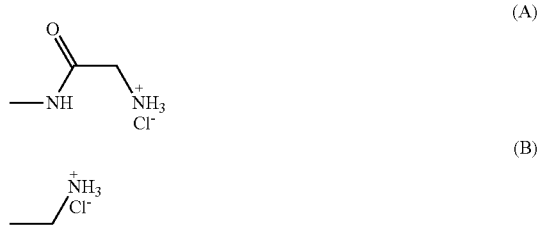

The substituent may form a salt, as in the case of the group of formula (A) or (B). Examples of salts that may be formed include salts of an amino group with a halogen atom, salts of a carboxyl group with a monovalent metal such as Na or K, and salts of a sulfonate group with the monovalent metal.

R³ in the group —COOR³ represents a hydrogen atom or an alkyl group. The alkyl group preferably has 1 to 8 carbon atoms, more preferably 1 to 3 carbon atoms.

Examples of the alkyl group include a methyl group, an ethyl group, a n-propyl group, an isopropyl group, a n-butyl group, a sec-butyl group, and a tert-butyl group.

R³ is preferably an alkyl group.

The tetrazine compound of formula (1) may be any tetrazine compound that can react with a diene rubber. The tetrazine compound may be a single type or a combination of two or more types. The tetrazine compound is preferably a compound represented by the formula (1-1), (1-2), (1-3), or (1-4) below (especially formula (1-1) or (1-4)), more preferably a compound represented by the formula (1-1-1), (1-1-2), (1-2-1), (1-3-1), (1-4-1), or (1-4-2) below (especially formula (1-1-1) or (1-4-1)), among others.

The tetrazine compound of formula (1) may be a commercial product or may be synthesized by known methods.

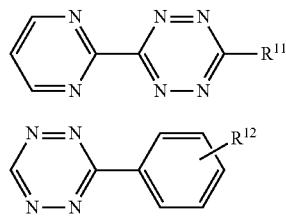

(1-1)

(1-2)

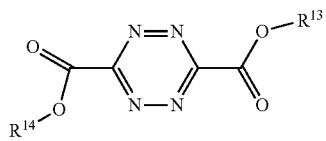

(1-3)

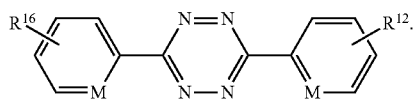

(1-4)

In formula (1-1), $R^{11}$ represents a hydrogen atom (—H), —COOR$^{17}$ in which $R^{17}$ represents either a hydrogen atom (—H) or an alkyl group, or a C1-C11 monovalent hydrocarbon group optionally containing a heteroatom, and $R^{11}$ may form a salt.

In formula (1-2), $R^{12}$ represents a functional group containing at least one atom selected from the group consisting of nitrogen, oxygen, sulfur, fluorine, and silicon atoms, and $R^{12}$ may form a salt.

In formula (1-3), $R^{13}$ and $R^{14}$ may be the same or different and each represent a hydrogen atom (—H) or an alkyl group, and $R^{13}$ and $R^{14}$ may each form a salt.

In formula (1-4), $R^{15}$ and $R^{16}$ may be the same or different and each represent a hydrogen atom (—H), —COOR$^{18}$ in which $R^{18}$ represents either a hydrogen atom (—H) or an alkyl group, or a functional group containing at least one atom selected from the group consisting of nitrogen, oxygen, sulfur, fluorine, and silicon atoms, and $R^{15}$ and $R^{16}$ may each form a salt.

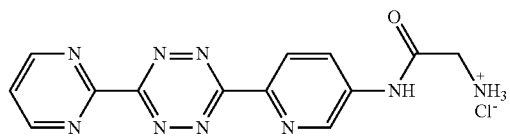

(1-1-1)

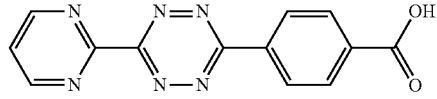

(1-1-2)

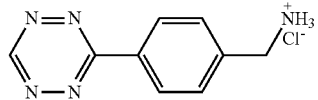

(1-2-1)

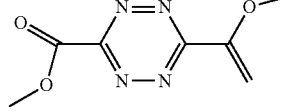

(1-3-1)

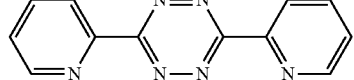

(1-4-1)

-continued (1-4-2)

Cl⁻ H₃N⁺—HN—[pyridine]—[triazine: N=N, N—N]—[pyridine]—NH—[C(=O)CH₂]—N⁺H₃ Cl⁻

Examples of the heteroatom in $R^{11}$ include those described for the heteroatom in $R^1$ or $R^2$.

The carbon number of the hydrocarbon group as $R^{11}$ and suitable embodiments thereof are as described for the hydrocarbon group as $R^1$ or $R^2$.

$R^{11}$ is preferably —COOR$^{17}$ or the hydrocarbon group containing a heteroatom because such a tetrazine compound is expected to interact easily with a reinforcing filler (especially carbon black or silica).

Examples of the hydrocarbon group as $R^{11}$ include those described for the hydrocarbon group as $R^1$ or $R^2$, and suitable embodiments thereof are also as described above.

$R^{17}$ in the group —COOR$^{17}$ represents a hydrogen atom or an alkyl group. Examples of the alkyl group include those described for the alkyl group as $R^3$, and suitable embodiments thereof are also as described above.

$R^{17}$ is preferably an alkyl group.

Examples of the functional group containing at least one atom selected from the group consisting of nitrogen, oxygen, sulfur, fluorine, and silicon atoms as $R^{12}$ include those described for the substituent, and suitable embodiments thereof are also as described above.

$R^{12}$ may be at any of the ortho, meta, and para positions. In order to more suitably achieve the advantageous effects, $R^{12}$ is preferably at the para position.

Examples of the alkyl group as $R^{13}$ or $R^{14}$ include those described for the alkyl group as $R^3$, and suitable embodiments thereof are also as described above. $R^{13}$ and $R^{14}$ are each preferably an alkyl group.

$R^{15}$ and $R^{16}$ are each preferably a hydrogen atom or a functional group containing at least one atom selected from the group consisting of nitrogen, oxygen, sulfur, fluorine, and silicon atoms.

$R^{18}$ in the group —COOR$^{18}$ represents a hydrogen atom or an alkyl group. Examples of the alkyl group include those described for the alkyl group as $R^3$, and suitable embodiments thereof are also as described above.

$R^{18}$ is preferably an alkyl group.

Examples of the functional group containing at least one atom selected from the group consisting of nitrogen, oxygen, sulfur, fluorine, and silicon atoms as $R^{15}$ or $R^{16}$ include those described for the substituent, and suitable embodiments thereof are also as described above.

$R^{15}$ and $R^{16}$ may each be at any of the ortho, meta, and para positions, preferably at the para position. More preferably, $R^{15}$ and $R^{16}$ are both at the para position.

The amount of the tetrazine compound (total amount of tetrazine compounds) per 100 parts by mass of the rubber component in the rubber composition is preferably 0.2 parts by mass or more, more preferably 1.0 part by mass or more, still more preferably 1.5 parts by mass or more, but is preferably 10.0 parts by mass or less, more preferably 5.0 parts by mass or less, still more preferably 3.0 parts by mass or less. When the amount is within the range indicated above, good overall performance in terms of fuel economy, abrasion resistance, and wet grip performance tends to be obtained.

(Particulate Zinc Carrier)

The rubber composition may contain a particulate zinc carrier that includes a silicate particle and finely divided zinc oxide or finely divided basic zinc carbonate supported on the surface of the silicate particle.

In the particulate zinc carrier, finely divided zinc oxide or finely divided basic zinc carbonate is supported on the surface of a silicate particle. Since the surface of a silicate particle has affinity for finely divided zinc oxide and finely divided basic zinc carbonate, it can uniformly support finely divided zinc oxide or finely divided basic zinc carbonate.

The amount of the supported finely divided zinc oxide or finely divided basic zinc carbonate, calculated as metallic zinc, is preferably within a range of 6 to 75% by mass. The lower limit of the amount is more preferably 15% by mass or more, still more preferably 25% by mass or more, particularly preferably 35% by mass or more. The upper limit is more preferably 65% by mass or less, still more preferably 55% by mass or less.

The supported amount calculated as metallic zinc may be calculated by converting the amount of the supported finely divided zinc oxide or finely divided basic zinc carbonate into metallic zinc to obtain a Zn equivalent mass, and using it in the following equation:

Supported amount calculated as metallic zinc (% by mass)=[(Zn equivalent mass)/(mass of particulate zinc carrier)]×100.

The finely divided zinc oxide-supporting silicate particle (particulate zinc carrier) preferably has a BET specific surface area within a range of 10 to 55 m²/g, more preferably 15 to 50 m²/g, still more preferably 20 to 45 m²/g.

The finely divided basic zinc carbonate-supporting silicate particle (particulate zinc carrier) preferably has a BET specific surface area within a range of 25 to 90 m²/g, more preferably 30 to 85 m²/g, still more preferably 35 to 80 m²/g.

The BET specific surface area may be determined by a nitrogen adsorption method using a BET specific surface area meter. The BET specific surface area of the finely divided zinc oxide or finely divided basic zinc carbonate supported on the silicate particle (BET$_{Zn}$) may be calculated using the following equation:

$$BET_{Zn}=[(BET_{Zn\text{-}Si} \times W_{Zn})+W_{Si}(BET_{Zn\text{-}Si}-BET_{Si})]/W_{Zn}$$

wherein BET$_{Zn\text{-}Si}$: the BET specific surface area of the particulate zinc carrier;
BET$_{Si}$: the BET specific surface area of the silicate particle;
W$_{Zn}$: the mass (%) of the zinc oxide or basic zinc carbonate in the particulate zinc carrier;
W$_{Si}$: the mass (%) of the silicate particle in the particulate zinc carrier.

The BET specific surface area of the finely divided zinc oxide or finely divided basic zinc carbonate supported on the surface of the silicate particle (BET$_{Zn}$) is preferably within a range of 15 to 100 m²/g, more preferably 40 to 80 m²/g, for finely divided zinc oxide; while it is preferably within a range of 15 to 100 m²/g, more preferably 40 to 80 m²/g, for finely divided basic zinc carbonate.

The silicate particle is preferably an aluminum silicate mineral particle. Examples of silicate particles other than aluminum silicate mineral particles include talc, mica, feldspar, bentonite, magnesium silicate, silica, calcium silicate (wollastonite), and diatomite.

The aluminum silicate mineral particle may be, for example, at least one selected from kaolinite, halloysite, pyrophyllite, or sericite.

The aluminum silicate mineral particle is preferably an anhydrous aluminum silicate mineral particle. The anhydrous aluminum silicate mineral particle may be, for example, one produced by firing at least one selected from kaolinite, halloysite, pyrophyllite, or sericite. For example, it may be produced by firing the foregoing clay mineral consisting of fine particles, at least 80% of which have a particle size of 2 µm or less, at a firing temperature of 500 to 900° C.

The particulate zinc carrier may be prepared, for example, as described in JP 2018-184497 A, which is incorporated herein by reference. Examples of usable commercial products of the particulate zinc carrier include products available from Shiraishi Calcium Kaisha Ltd. and other manufacturers.

The amount of the particulate zinc carrier per 100 parts by mass of the rubber component in the rubber composition is preferably 0.3 parts by mass or more, more preferably 0.5 parts by mass or more, still more preferably 0.6 parts by mass or more, but is preferably 2.0 parts by mass or less, more preferably 1.8 parts by mass or less, still more preferably 1.6 parts by mass or less. When the amount is within the range indicated above, good overall performance in terms of fuel economy, abrasion resistance, and wet grip performance tends to be obtained.

(Amide Compound)

The rubber composition preferably contains an amide compound.

Non-limiting examples of the amide compound include fatty acid amides and fatty acid amide esters. These amide compounds may be used alone or in combinations of two or more. Preferred among these are fatty acid amides. More preferred are mixtures of fatty acid amides and fatty acid amide esters.

The fatty acid amides may include saturated or unsaturated fatty acid amides. Examples of the saturated fatty acid amides include stearamide and behenamide. Examples of the unsaturated fatty acid amides include oleamide and erucamide. Preferred among these are unsaturated fatty acid amides, with oleamide being more preferred.

The fatty acid amide esters may include saturated or unsaturated fatty acid amide esters. Examples of the saturated fatty acid amide esters include stearic acid amide esters and behenic acid amide esters. Examples of the unsaturated fatty acid amide esters include oleic acid amide esters and erucic acid amide esters. These may be used alone or in combinations of two or more. Preferred among these are unsaturated fatty acid amide esters, with oleic acid amide esters being more preferred.

The amide compound may also suitably be in the form of a mixture of an amide compound and a fatty acid metal salt.

Examples of the metal of the fatty acid metal salt include potassium, sodium, magnesium, calcium, barium, zinc, nickel, and molybdenum. Preferred among these are alkaline earth metals such as calcium and zinc, with calcium being more preferred.

The fatty acid of the fatty acid metal salt may be a saturated or unsaturated fatty acid. Examples of the saturated fatty acid include decanoic acid, dodecanoic acid, and stearic acid. Examples of the unsaturated fatty acid include oleic acid and elaidic acid. Among these, the fatty acid is preferably a saturated fatty acid, more preferably stearic acid. The unsaturated fatty acid is preferably oleic acid.

The amide compound may be a commercial product available from, for example, NOF Corporation, Struktol, or Lanxess.

The amount of the amide compound per 100 parts by mass of the rubber component in the rubber composition is preferably 0.1 parts by mass or more, more preferably 0.5 parts by mass or more, but is preferably 5.0 parts by mass or less, more preferably 3.0 parts by mass or less, still more preferably 2.5 parts by mass or less. When the amount is within the range indicated above, good overall performance in terms of fuel economy, abrasion resistance, and wet grip performance tends to be obtained. Herein, when a mixture of an amide compound and a fatty acid metal salt is used as the amide compound, the amount of the amide compound refers to the amount including the amount of the fatty acid metal salt.

(Sulfur)

The rubber composition preferably contains sulfur.

Examples of the sulfur include those generally used in the rubber industry, such as powdered sulfur, precipitated sulfur, colloidal sulfur, insoluble sulfur, highly dispersible sulfur, and soluble sulfur. These may be used alone or in combinations of two or more.

The sulfur may be a commercial product of, for example, Tsurumi Chemical Industry Co., Ltd., Karuizawa sulfur Co., Ltd., Shikoku Chemicals Corporation, Flexsys, Nippon Kanryu Industry Co., Ltd., or Hosoi Chemical Industry Co., Ltd.

The amount of the sulfur per 100 parts by mass of the rubber component in the rubber composition is preferably 0.5 parts by mass or more, more preferably 0.8 parts by mass or more, still more preferably 1.0 part by mass or more. The upper limit of the amount is preferably 10.0 parts by mass or less, more preferably 5.0 parts by mass or less, still more preferably 3.0 parts by mass or less. When the amount is within the range indicated above, good overall performance in terms of fuel economy, abrasion resistance, and wet grip performance tends to be obtained.

(Vulcanization Accelerator)

The rubber composition preferably contains a vulcanization accelerator.

Examples of the vulcanization accelerator include thiazole vulcanization accelerators such as 2-mercaptobenzothiazole, di-2-benzothiazolyl disulfide, and N-cyclohexyl-2-benzothiazylsulfenamide; thiuram vulcanization accelerators such as tetramethylthiuram disulfide (TMTD), tetrabenzylthiuram disulfide (TBzTD), and tetrakis(2-ethylhexyl)thiuram disulfide (TOT-N); sulfenamide vulcanization accelerators such as N-cyclohexyl-2-benzothiazole sulfenamide, N-t-butyl-2-benzothiazolyl sulfenamide, N-oxyethylene-2-benzothiazole sulfenamide, and N,N'-diisopropyl-2-benzothiazole sulfenamide; and guanidine vulcanization accelerators such as diphenylguanidine, diorthotolylguanidine, and orthotolylbiguanidine. These may be used alone or in combinations of two or more. Among these, sulfenamide vulcanization accelerators or guanidine vulcanization accelerators are preferred.

The amount of the vulcanization accelerator per 100 parts by mass of the rubber component in the rubber composition is preferably 1.0 part by mass or more, more preferably 2.0 parts by mass or more, still more preferably 2.5 parts by mass or more. The upper limit of the amount is preferably 10.0 parts by mass or less, more preferably 7.0 parts by mass or less, still more preferably 5.0 parts by mass or less. When the amount is within the range indicated above, good overall performance in terms of fuel economy, abrasion resistance, and wet grip performance tends to be obtained.

(Other Components)

The rubber composition may contain a wax.

Non-limiting examples of the wax include petroleum waxes such as paraffin waxes and microcrystalline waxes; naturally-occurring waxes such as plant waxes and animal waxes; and synthetic waxes such as polymers of ethylene, propylene, or other similar monomers. These may be used alone or in combinations of two or more. Preferred among these are petroleum waxes, with paraffin waxes being more preferred.

The wax may be a commercial product of, for example, Ouchi Shinko Chemical Industrial Co., Ltd., Nippon Seiro Co., Ltd., or Seiko Chemical Co., Ltd.

The amount of the wax per 100 parts by mass of the rubber component is preferably 0.3 parts by mass or more, more preferably 0.5 parts by mass or more, but is preferably 20 parts by mass or less, more preferably 10 parts by mass or less.

The rubber composition may contain an antioxidant.

Examples of the antioxidant include: naphthylamine antioxidants such as phenyl-α-naphthylamine; diphenylamine antioxidants such as octylated diphenylamine and 4,4'-bis (α,α'-dimethylbenzyl)diphenylamine; p-phenylenediamine antioxidants such as N-isopropyl-N'-phenyl-p-phenylenediamine, N-(1,3-dimethylbutyl)-N'-phenyl-p-phenylenediamine, and N,N'-di-2-naphthyl-p-phenylenediamine; quinoline antioxidants such as 2,2,4-trimethyl-1,2-dihydroquinoline polymer; monophenolic antioxidants such as 2,6-di-t-butyl-4-methylphenol and styrenated phenol; and bis-, tris-, or polyphenolic antioxidants such as tetrakis-[methylene-3-(3',5'-di-t-butyl-4'-hydroxyphenyl) propionate]methane. Examples of commercial products include products available from Seiko Chemical Co., Ltd., Sumitomo Chemical Co., Ltd., Ouchi Shinko Chemical Industrial Co., Ltd., and Flexsys. These may be used alone or in combinations of two or more. Among these, p-phenylenediamine antioxidants or quinoline antioxidants are preferred.

The amount of the antioxidant per 100 parts by mass of the rubber component is preferably 0.5 parts by mass or more, more preferably 1 part by mass or more, but is preferably 10 parts by mass or less, more preferably 5 parts by mass or less.

The rubber composition may contain stearic acid.

The stearic acid may be conventionally known one, and examples include products available from NOF Corporation, Kao Corporation, Wako Pure Chemical Corporation, and Chiba Fatty Acid Co., Ltd.

The amount of the stearic acid per 100 parts by mass of the rubber component is preferably 0.5 parts by mass or more, more preferably 1 part by mass or more, but is preferably 10 parts by mass or less, more preferably 5 parts by mass or less.

The rubber composition may contain zinc oxide.

The zinc oxide may be conventionally known one, and examples include products available from Mitsui Mining & Smelting Co., Ltd., Toho Zinc Co., Ltd., HakusuiTech Co., Ltd., Seido Chemical Industry Co., Ltd., and Sakai Chemical Industry Co., Ltd.

The amount of the zinc oxide per 100 parts by mass of the rubber component is preferably 0.5 parts by mass or more, more preferably 1 part by mass or more, but is preferably 10 parts by mass or less, more preferably 5 parts by mass or less.

In addition to the above-mentioned components, the rubber composition may contain other compounding agents (e.g., an organic crosslinking agent) generally used in the tire industry. The amount of such compounding agents per 100 parts by mass of the rubber component is preferably 0.1 to 200 parts by mass.

The rubber composition may be prepared, for example, by kneading the components in a rubber kneading machine such as an open roll mill or a Banbury mixer, and then vulcanizing the kneaded mixture.

The kneading conditions are as follows. In a base kneading step of kneading additives other than vulcanizing agents and vulcanization accelerators, the kneading temperature is usually 100 to 180° C., preferably 120 to 170° C. In a final kneading step of kneading vulcanizing agents and vulcanization accelerators, the kneading temperature is usually 120° C. or lower, preferably from 85 to 110° C. Then, the composition obtained after kneading vulcanizing agents and vulcanization accelerators is usually vulcanized by, for example, press vulcanization. The vulcanization temperature is usually 140 to 190° C., preferably 150 to 185° C.

The first to third heavy duty tires can be produced using the corresponding rubber composition by usual methods.

Specifically, the unvulcanized rubber composition may be extruded into the shape of a tread and then assembled with other tire components on a tire building machine in a usual manner to build an unvulcanized tire. The unvulcanized tire may then be heated and pressurized in a vulcanizer to obtain a tire.

Examples of the heavy duty tires include pneumatic tires and airless (solid) tires. Pneumatic tires are preferred among these.

[All-Season Tires]

(Rubber Component)

The present invention relates to the all-season tires (tires for all seasons) (1) to (3) described below. These tires use a combination of a specific natural rubber derived from *Taraxacum kok-saghyz*, carbon black, and a silica having a predetermined nitrogen adsorption specific surface area at a predetermined ratio and thus provide significantly (synergistically) improved overall performance in terms of fuel economy, abrasion resistance, and wet grip performance.

(1) A first all-season tire, including a tread formed from a rubber composition which contains a natural rubber derived from *Taraxacum kok-saghyz* having a weight average molecular weight (Mw) of 5,000,000 or more and including polymers having a radius of gyration (Rz) of 130 nm or larger, wherein the Mw and Rz values are measured by FFF-MALS, carbon black, and a silica having a nitrogen adsorption specific surface area of 40 m$^2$/g or more at a predetermined ratio.

(2) A second all-season tire, including a tread formed from a rubber composition which contains a natural rubber derived from *Taraxacum kok-saghyz* having a weight average molecular weight (Mw) of 5,000,000 or more and including polymers having an average radius of gyration (Rz) of 130 nm or larger over a weight average molecular weight (Mw) range of 5,000,000 to 50,000,000, wherein the Mw and Rz values are measured by FFF-MALS, carbon black, and a silica having a nitrogen adsorption specific surface area of 40 m$^2$/g or more at a predetermined ratio.

(3) A third all-season tire, including a tread formed from a rubber composition which contains a natural rubber derived from *Taraxacum kok-saghyz* having a weight average molecular weight (Mw) of 5,000,000 or more and including polymers having a first regression line from a plot of logarithm of radius of gyration (Rz) (log Rz) versus logarithm of weight average molecular weight (Mw) (log Mw), the first regression line having a slope of 0.25 or greater over a weight average molecular weight (Mw) range of 5,000,000 to 50,000,000, wherein the Mw and Rz values are measured by FFF-MALS, carbon black, and a silica having a nitrogen adsorption specific surface area of 40 m$^2$/g or more at a predetermined ratio.

The reason (mechanism) for the significant (synergistic) improvement in overall performance in terms of excellent fuel economy, abrasion resistance, and wet grip performance is not exactly clear but is believed to be as follows.

Each natural rubber derived from *Taraxacum kok-saghyz* specified in the present application has a higher Mw than a natural rubber derived from *Hevea brasiliensis* and includes a large amount of high molecular weight components, thereby providing higher properties such as tensile strength. Moreover, the natural rubber derived from *Taraxacum kok-saghyz* has a lower degree of branching than a natural rubber derived from *Hevea brasiliensis* and includes a large amount of linear polymers, thereby having a large Rz of polymers. Therefore, the large Rz of polymers can cause an increase in entanglement between the polymers and an increase in probability of polymer/filler contact and thus in interaction with fillers, thereby resulting in enhanced reinforcing properties and improved properties such as fracture properties, abrasion resistance, and wet grip performance.

Furthermore, since each natural rubber derived from *Taraxacum kok-saghyz* specified in the present application has a lower degree of branching than a natural rubber derived from *Hevea brasiliensis* and includes a large amount of linear polymers, it has a smaller number of polymer molecular ends. Therefore, the smaller number of free molecular ends leads to a decrease in the amount of hysteresis loss-producing components, thereby resulting in excellent low heat build-up properties.

Thus, it is believed that the combined use of such a natural rubber derived from *Taraxacum kok-saghyz*, carbon black, and a silica having a predetermined nitrogen adsorption specific surface area provides significantly (synergistically) improved overall performance in terms of fuel economy, abrasion resistance, and wet grip performance.

The natural rubbers derived from *Taraxacum kok-saghyz* in the first to third all-season tires are similar to or the same as the natural rubbers derived from *Taraxacum kok-saghyz* described earlier.

The amount of the natural rubber derived from *Taraxacum kok-saghyz* based on 100% by mass of the rubber component in the rubber composition is 1% by mass or more, preferably 10% by mass or more, more preferably 15% by mass or more, still more preferably 20% by mass or more. The upper limit of the amount is not limited but is preferably 50% by mass or less, more preferably 40% by mass or less, still more preferably 35% by mass or less. When the amount is within the range indicated above, the overall performance in terms of fuel economy, abrasion resistance, and wet grip performance can be significantly improved.

In addition to the natural rubber derived from *Taraxacum kok-saghyz*, the rubber component of the rubber composition may contain additional rubbers. Examples of such additional rubbers include those described earlier. The rubber component may include either an unmodified rubber or a modified rubber. In particular, SBR or BR is preferred from the standpoint of overall performance in terms of fuel economy, abrasion resistance, and wet grip performance.

Non-limiting examples of the SBR include emulsion-polymerized styrene-butadiene rubber (E-SBR) and solution-polymerized styrene-butadiene rubber (S-SBR). These may be used alone or in combinations of two or more.

The SBR preferably has a styrene content of 5% by mass or higher, more preferably 10% by mass or higher, still more preferably 15% by mass or higher, but preferably 50% by mass or lower, more preferably 40% by mass or lower, still more preferably 35% by mass or lower. When the styrene content is within the range indicated above, good properties such as fuel economy, wet grip performance, and abrasion resistance tend to be obtained.

Herein, the styrene content of the SBR is determined by $^1$H-NMR analysis.

The SBR may be an SBR product manufactured or sold by, for example, Sumitomo Chemical Co., Ltd., JSR Corporation, Asahi Kasei Corporation, Zeon Corporation, or Trinseo.

The amount of the SBR based on 100% by mass of the rubber component in the rubber composition is preferably 10% by mass or more, more preferably 25% by mass or more, still more preferably 35% by mass or more. The upper limit of the amount is preferably 80% by mass or less, more preferably 65% by mass or less, still more preferably 55% by mass or less. When the amount is within the range indicated above, good properties such as fuel economy, wet grip performance, and abrasion resistance tend to be obtained.

Non-limiting examples of the BR include those described earlier for the BR.

The amount of the BR based on 100% by mass of the rubber component in the rubber composition is preferably 5% by mass or more, more preferably 20% by mass or more, still more preferably 25% by mass or more. The upper limit of the amount is preferably 60% by mass or less, more preferably 50% by mass or less, still more preferably 40% by mass or less. When the amount is within the range indicated above, the overall performance in terms of fuel economy, abrasion resistance, and wet grip performance can be significantly improved.

(Carbon Black)

The rubber composition contains carbon black.

The carbon black may be similar to or the same as the above-described carbon black.

The carbon black preferably has a nitrogen adsorption specific surface area ($N_2SA$) of 50 m$^2$/g or more, more preferably 70 m$^2$/g or more, still more preferably 85 m$^2$/g or more, but preferably 300 m$^2$/g or less, more preferably 250 m$^2$/g or less, still more preferably 200 m$^2$/g or less. When the $N_2SA$ of the carbon black is not less than the lower limit, excellent properties such as abrasion resistance and wet grip performance tend to be obtained. The carbon black having a $N_2SA$ of not more than the upper limit tends to disperse well, resulting in excellent fuel economy.

The carbon black preferably has a dibutyl phthalate oil absorption (DBP) of 50 mL/100 g or more, more preferably 100 mL/100 g or more, still more preferably 110 mL/100 g or more, but preferably 250 mL/100 g or less, more preferably 200 mL/100 g or less, still more preferably 180 mL/100 g or less. When the DBP is not less than the lower limit, excellent properties such as abrasion resistance and wet grip performance tend to be obtained. The carbon black having a DBP of not more than the upper limit tends to disperse well, resulting in excellent fuel economy.

The carbon black may suitably be the above-described high structure carbon black. The suitable ranges of the COAN, $N_2SA$, volatile matter content at 900° C., volatile matter content at 1500° C., and pH of the high structure carbon black are also as described above.

The amount of the carbon black per 100 parts by mass of the rubber component in the rubber composition is preferably 1 part by mass or more, more preferably 3 parts by mass or more, but is preferably 30 parts by mass or less, more preferably 20 parts by mass or less, still more preferably 10 parts by mass or less. When the amount is not less than the lower limit, good properties such as abrasion resistance and wet grip performance tend to be obtained. When the amount is not more than the upper limit, good fuel economy tends to be obtained.

(Silica)

The rubber composition contains a silica having a nitrogen adsorption specific surface area of 40 m$^2$/g or more.

The silica may be similar to or the same as the above-described silica.

The silica preferably has a nitrogen adsorption specific surface area ($N_2SA$) of 50 m$^2$/g or more, more preferably 80 m$^2$/g or more, still more preferably 100 m$^2$/g or more, but preferably 300 m$^2$/g or less, more preferably 250 m$^2$/g or less. When the $N_2SA$ is not less than the lower limit, excellent properties such as abrasion resistance and wet grip performance tend to be obtained. The silica having a $N_2SA$ of not more than the upper limit tends to disperse well, resulting in excellent fuel economy.

The silica may suitably be the above-described fine particle silica. The suitable range of the $N_2SA$ of the fine particle silica is also as described above.

The amount of the silica (total amount of all types of silica) per 100 parts by mass of the rubber component in the rubber composition is 10 parts by mass or more, preferably 40 parts by mass or more, more preferably 50 parts by mass or more, still more preferably 60 parts by mass or more. The rubber composition containing the silica even in an amount of 120 parts by mass or more can also provide good physical properties. The upper limit of the amount is preferably 250 parts by mass or less, more preferably 200 parts by mass or less, still more preferably 180 parts by mass or less. When the amount is not less than the lower limit, excellent properties such as abrasion resistance and wet grip performance tend to be obtained. When the amount is not more than the upper limit, the silica tends to disperse well, resulting in excellent fuel economy.

The combined amount of the carbon black and silica per 100 parts by mass of the rubber component in the rubber composition is preferably 50 parts by mass or more, more preferably 70 parts by mass or more, still more preferably 85 parts by mass or more, but is preferably 300 parts by mass or less, more preferably 250 parts by mass or less, still more preferably 200 parts by mass or less. When the combined amount is not less than the lower limit, excellent properties such as abrasion resistance and wet grip performance tend to be obtained. When the combined amount is not more than the upper limit, the silica tends to disperse well, resulting in excellent fuel economy.

(Silane Coupling Agent)

When the rubber composition contains silica, it preferably contains a silane coupling agent together with the silica. Examples of the silane coupling agent include those described earlier for the silane coupling agent. The above-mentioned mercapto silane coupling agents are also suitable.

The amount of the silane coupling agent, if present, per 100 parts by mass of the silica in the rubber composition is preferably 1 part by mass or more, more preferably 2 parts by mass or more, but is preferably 20 parts by mass or less, more preferably 15 parts by mass or less. When the amount is not less than the lower limit, the silane coupling agent tends to sufficiently exhibit its effects such as improving dispersion. When the amount is not more than the upper limit, a sufficient coupling effect tends to be obtained, resulting in good reinforcing properties.

(Liquid Plasticizer)

The rubber composition may contain a liquid plasticizer (a plasticizer that is liquid at room temperature (25° C.)). Examples of the liquid plasticizer include those described earlier for the liquid plasticizer.

The amount of the liquid plasticizer per 100 parts by mass of the rubber component in the rubber composition is preferably 3 parts by mass or more, more preferably 5 parts by mass or more. When the amount is not less than the lower limit, good processability tends to be obtained. The rubber composition containing the liquid plasticizer even in an amount of 50 parts by mass or more can also provide good physical properties. The upper limit of the amount is preferably 120 parts by mass or less, more preferably 100 parts by mass or less, still more preferably 90 parts by mass or less. When the amount is not more than the upper limit, good properties such as abrasion resistance and wet grip performance tend to be obtained. The amount of the liquid plasticizer includes the amount of the oil (extender oil) contained in the rubber (oil extended rubber) used. A range as described above is also suitable for the amount of oil.

(Solid Resin)

The rubber composition may contain a solid resin (a polymer that is solid at room temperature (25° C.)). Examples of the solid resin include those described earlier for the solid resin.

The amount of the solid resin per 100 parts by mass of the rubber component in the rubber composition is preferably 1 part by mass or more, more preferably 3 parts by mass or more, but is preferably 30 parts by mass or less, more preferably 20 parts by mass or less, still more preferably 10 parts by mass or less. When the amount is within the range indicated above, good overall performance in terms of fuel economy, abrasion resistance, and wet grip performance tends to be obtained.

(Farnesene Resin)

The rubber composition preferably contains a farnesene resin. Examples of the farnesene resin include those described earlier for the farnesene resin. The suitable ranges of the Tg, Mw, melt viscosity, farnesene content, and combined content of farnesene and vinyl monomer of the farnesene resin are also as described above.

The amount of the farnesene resin per 100 parts by mass of the rubber component in the rubber composition is preferably 1 part by mass or more, more preferably 3 parts by mass or more, still more preferably 5 parts by mass or more. When the amount is 1 part by mass or more, the performance-improving effect caused by the addition of the farnesene resin tends to be sufficiently achieved. The amount is also preferably 50 parts by mass or less, more preferably 40 parts by mass or less, still more preferably 30 parts by mass or less, particularly preferably 20 parts by mass or less. When the amount is 50 parts by mass or less, good properties such as fuel economy, abrasion resistance, and wet grip performance tend to be obtained.

(Tetrazine Compound)

The rubber composition may contain a tetrazine compound represented by the above formula (1). Examples of the tetrazine compound include those described earlier for tetrazine compound.

The amount of the tetrazine compound (total amount of tetrazine compounds) per 100 parts by mass of the rubber component in the rubber composition is preferably 0.2 parts by mass or more, more preferably 1.0 part by mass or more, still more preferably 1.5 parts by mass or more, but is preferably 10.0 parts by mass or less, more preferably 5.0 parts by mass or less, still more preferably 3.0 parts by mass or less. When the amount is within the range indicated above, good overall performance in terms of fuel economy, abrasion resistance, and wet grip performance tends to be obtained.

(Particulate Zinc Carrier)

The rubber composition may contain a particulate zinc carrier that includes a silicate particle and finely divided zinc oxide or finely divided basic zinc carbonate supported on the surface of the silicate particle. Examples of the particulate zinc carrier include those described earlier.

The amount of the particulate zinc carrier per 100 parts by mass of the rubber component in the rubber composition is preferably 0.3 parts by mass or more, more preferably 0.5 parts by mass or more, still more preferably 0.6 parts by mass or more, but is preferably 2.0 parts by mass or less, more preferably 1.8 parts by mass or less, still more preferably 1.6 parts by mass or less. When the amount is within the range indicated above, good overall performance in terms of fuel economy, abrasion resistance, and wet grip performance tends to be obtained.

(Amide Compound)

The rubber composition preferably contains an amide compound.

Examples of the amide compound include those described earlier for the amide compound.

The amount of the amide compound per 100 parts by mass of the rubber component in the rubber composition is preferably 0.1 parts by mass or more, more preferably 0.5 parts by mass or more, but is preferably 5.0 parts by mass or less, more preferably 3.0 parts by mass or less, still more preferably 2.5 parts by mass or less. When the amount is within the range indicated above, good overall performance in terms of fuel economy, abrasion resistance, and wet grip performance tends to be obtained.

(Sulfur)

The rubber composition preferably contains sulfur.

Examples of the sulfur include those described earlier for the sulfur.

The amount of the sulfur per 100 parts by mass of the rubber component in the rubber composition is preferably 0.5 parts by mass or more, more preferably 0.8 parts by mass or more, still more preferably 1.0 part by mass or more. The upper limit of the amount is preferably 10.0 parts by mass or less, more preferably 5.0 parts by mass or less, still more preferably 3.0 parts by mass or less. When the amount is within the range indicated above, good overall performance in terms of fuel economy, abrasion resistance, and wet grip performance tends to be obtained.

(Vulcanization Accelerator)

The rubber composition preferably contains a vulcanization accelerator.

Examples of the vulcanization accelerator include those described earlier for the vulcanization accelerator. In particular, sulfenamide vulcanization accelerators or guanidine vulcanization accelerators are preferred.

The amount of the vulcanization accelerator per 100 parts by mass of the rubber component in the rubber composition is preferably 1.0 part by mass or more, more preferably 2.0 parts by mass or more, still more preferably 2.5 parts by mass or more. The upper limit of the amount is preferably 10.0 parts by mass or less, more preferably 7.0 parts by mass or less, still more preferably 5.0 parts by mass or less. When the amount is within the range indicated above, good overall performance in terms of fuel economy, abrasion resistance, and wet grip performance tends to be obtained.

(Other Components)

The rubber composition may additionally contain a wax, an antioxidant, stearic acid, zinc oxide, and other compounding agents (e.g., an organic crosslinking agent) as described earlier.

The rubber composition can be prepared as described earlier for the rubber composition.

The first to third all-season tires can be produced as described earlier for the tires.

Examples of the all-season tires include pneumatic tires and airless (solid) tires. Pneumatic tires are preferred among these.

[Summer Tires]

(Rubber Component)

The present invention relates to the summer tires (tires for summer) (1) to (3) described below. These tires use a combination of a specific natural rubber derived from *Taraxacum kok-saghyz*, a styrene-butadiene rubber having a predetermined styrene content, carbon black, and a silica having a predetermined nitrogen adsorption specific surface area at a predetermined ratio and thus provide significantly (synergistically) improved overall performance in terms of fuel economy, abrasion resistance, and wet grip performance.

(1) A first summer tire, including a tread formed from a rubber composition which contains a natural rubber derived from *Taraxacum kok-saghyz* having a weight average molecular weight (Mw) of 5,000,000 or more and including polymers having a radius of gyration (Rz) of 130 nm or larger, wherein the Mw and Rz values are measured by FFF-MALS, a styrene-butadiene rubber having a styrene content of 10% by mass or higher, carbon black, and a silica having a nitrogen adsorption specific surface area of 40 m$^2$/g or more at a predetermined ratio.

(2) A second summer tire, including a tread formed from a rubber composition which contains a natural rubber derived from *Taraxacum kok-saghyz* having a weight average molecular weight (Mw) of 5,000,000 or more and including polymers having an average radius of gyration (Rz) of 130 nm or larger over a weight average molecular weight (Mw) range of 5,000,000 to 50,000,000, wherein the Mw and Rz values are measured by FFF-MALS, a styrene-butadiene rubber having a styrene content of 10% by mass or higher, carbon black, and a silica having a nitrogen adsorption specific surface area of 40 m$^2$/g or more at a predetermined ratio.

(3) A third summer tire, including a tread formed from a rubber composition which contains a natural rubber derived from *Taraxacum kok-saghyz* having a weight average molecular weight (Mw) of 5,000,000 or more and including polymers having a first regression line from a plot of logarithm of radius of gyration (Rz) (log Rz) versus logarithm of weight average molecular weight (Mw) (log Mw), the first regression line having a slope of 0.25 or greater over a weight average molecular weight (Mw) range of 5,000,000 to 50,000,000, wherein the Mw and Rz values are measured by FFF-MALS, a styrene-butadiene rubber having a styrene content of 10% by mass or higher, carbon black, and a silica having a nitrogen adsorption specific surface area of 40 m$^2$/g or more at a predetermined ratio.

The reason (mechanism) for the significant (synergistic) improvement in overall performance in terms of excellent fuel economy, abrasion resistance, and wet grip performance is not exactly clear but is believed to be as follows.

Each natural rubber derived from *Taraxacum kok-saghyz* specified in the present application has a higher Mw than a natural rubber derived from *Hevea brasiliensis* and includes a large amount of high molecular weight components, thereby providing higher properties such as tensile strength. Moreover, the natural rubber derived from *Taraxacum kok-saghyz* has a lower degree of branching than a natural rubber derived from *Hevea brasiliensis* and includes a large amount of linear polymers, thereby having a large Rz of polymers. Therefore, the large Rz of polymers can cause an increase in entanglement between the polymers and an increase in probability of polymer/filler contact and thus in interaction with fillers, thereby resulting in enhanced reinforcing properties and improved properties such as fracture properties, abrasion resistance, and wet grip performance.

Furthermore, since each natural rubber derived from *Taraxacum kok-saghyz* specified in the present application has a lower degree of branching than a natural rubber derived from *Hevea brasiliensis* and includes a large amount of linear polymers, it has a smaller number of polymer molecular ends. Therefore, the smaller number of free molecular ends leads to a decrease in the amount of hysteresis loss-producing components, thereby resulting in excellent low heat build-up properties.

Thus, it is believed that the combined use of such a natural rubber derived from *Taraxacum kok-saghyz*, a styrene-butadiene rubber having a predetermined styrene content, carbon black, and a silica having a predetermined nitrogen adsorption specific surface area provides significantly (synergistically) improved overall performance in terms of fuel economy, abrasion resistance, and wet grip performance.

The natural rubbers derived from *Taraxacum kok-saghyz* in the first to third summer tires are similar to or the same as the above-described natural rubbers derived from *Taraxacum kok-saghyz*.

The amount of the natural rubber derived from *Taraxacum kok-saghyz* based on 100% by mass of the rubber component in the rubber composition is 0.1% by mass or more, preferably 1.0% by mass or more, more preferably 3.0% by mass or more. The upper limit of the amount is 10.0% by mass or less, preferably 8.0% by mass or less, more preferably 7.0% by mass or less. When the amount is within the range indicated above, the overall performance in terms of fuel economy, abrasion resistance, and wet grip performance can be significantly improved.

The rubber component of the rubber composition contains a styrene-butadiene rubber having a predetermined styrene content (high-styrene SBR). The high-styrene SBR may be a single type or a combination of two or more types.

The high-styrene SBR has a styrene content of 10% by mass or higher, preferably 20% by mass or higher, more preferably 25% by mass or higher. When the styrene content is not lower than the lower limit, good properties such as wet grip performance tend to be obtained. The upper limit of the styrene content is preferably 60% by mass or lower, more preferably 55% by mass or lower, still more preferably 50% by mass or lower. When the styrene content is not higher than the upper limit, good fuel economy tends to be obtained.

Herein, the styrene content of the SBR is determined by $^1$H-NMR analysis.

The high-styrene SBR preferably has a vinyl content (vinyl content of the butadiene portion in the SBR) of 10% by mass or higher, more preferably 15% by mass or higher, still more preferably 20% by mass or higher, but preferably 65% by mass or lower, more preferably 60% by mass or lower. When the vinyl content is within the range indicated above, good overall performance in terms of fuel economy, abrasion resistance, and wet grip performance tends to be obtained.

The high-styrene SBR preferably has a weight average molecular weight (Mw) of 400,000 or more, more preferably 700,000 or more, still more preferably 800,000 or more. When the Mw is not less than the lower limit, good properties such as abrasion resistance tend to be obtained. The Mw is preferably 1,800,000 or less, more preferably 1,600,000 or less, still more preferably 1,400,000 or less. When the Mw is not more than the upper limit, good processability tends to be obtained.

Non-limiting examples of the high-styrene SBR include emulsion-polymerized styrene-butadiene rubber (E-SBR) and solution-polymerized styrene-butadiene rubber (S-SBR). The SBR may be either a non-oil extended SBR or an oil extended SBR. The SBR may be either an unmodified SBR or a modified SBR.

The term "oil extended SBR" refers to an SBR extended with an extender oil. Examples of the extender oil used to extend SBR include naphthenic, paraffinic, and aromatic extender oils. Oil extension may be carried out, for example, by adding an extender oil after polymerization, followed by desolventization and drying by conventionally known methods. The amount of the extender oil to be used is preferably 5 to 70 parts by mass, more preferably 10 to 50 parts by mass, still more preferably 15 to 45 parts by mass per 100 parts by mass of the SBR (rubber solids).

The modified SBR may be any SBR having a functional group interactive with a filler such as silica. For example, it may be a chain end-modified SBR obtained by modifying at least one chain end of SBR with a compound (modifier) having the functional group (i.e., a chain end-modified SBR terminated with the functional group); a backbone-modified SBR having the functional group in the backbone; a backbone- and chain end-modified SBR having the functional group in both the backbone and chain end (e.g., a backbone- and chain end-modified SBR in which the backbone has the functional group, and at least one chain end is modified with the modifier); or a chain end-modified SBR that has been modified (coupled) with a polyfunctional compound having two or more epoxy groups in the molecule so that a hydroxyl or epoxy group is introduced.

Examples of the functional group include an amino group, an amide group, a silyl group, an alkoxysilyl group, an isocyanate group, an imino group, an imidazole group, a urea group, an ether group, a carbonyl group, an oxycarbonyl group, a mercapto group, a sulfide group, a disulfide group, a sulfonyl group, a sulfinyl group, a thiocarbonyl group, an ammonium group, an imide group, a hydrazo group, an azo group, a diazo group, a carboxyl group, a nitrile group, a pyridyl group, an alkoxy group, a hydroxyl group, an oxy group, and an epoxy group. These functional groups may be substituted. Preferred among these are amino (preferably amino whose hydrogen atom is replaced with a C1-C6 alkyl group), alkoxy (preferably C1-C6 alkoxy), and alkoxysilyl (preferably C1-C6 alkoxysilyl) groups.

In particular, the modified SBR may suitably be an SBR modified with a compound (modifier) represented by the following formula:

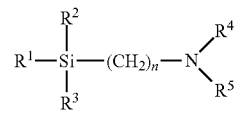

wherein $R^1$, $R^2$, and $R^3$ are the same or different and each represent an alkyl group, an alkoxy group, a silyloxy group, an acetal group, a carboxyl (—COOH) group, or a mercapto (—SH) group, or a derivative thereof; $R^4$ and $R^5$ are the same or different and each represent a hydrogen atom or an alkyl group, and $R^4$ and $R^5$ may be joined together to form a ring structure with the nitrogen atom; and n represents an integer.

In particular, the modified SBR modified with the compound (modifier) of the above formula may suitably be a solution-polymerized styrene-butadiene rubber (S-SBR) having a polymerizing end (active terminal) modified with the compound of the above formula (e.g., the modified SBR described in JP 2010-111753 A, which is incorporated herein by reference).

$R^1$, $R^2$, and $R^3$ may each suitably be an alkoxy group, preferably a C1-C8, more preferably C1-C4, alkoxy group. $R^4$ and $R^5$ may each suitably be an alkyl group, preferably a C1-C3 alkyl group. The symbol n is preferably 1 to 5, more preferably 2 to 4, still more preferably 3. When $R^4$ and $R^5$ are joined together to form a ring structure with the nitrogen atom, the ring structure is preferably a 4- to 8-membered ring. The term "alkoxy group" encompasses cycloalkoxy groups (e.g., a cyclohexyloxy group) and aryloxy groups (e.g., phenoxy and benzyloxy groups).

Specific examples of the modifier include 2-dimethylaminoethyltrimethoxysilane, 3-dimethylaminopropyltrimethoxysilane, 2-dimethylaminoethyltriethoxysilane, 3-dimethylaminopropyltriethoxysilane, 2-diethylaminoethyltrimethoxysilane, 3-diethylaminopropyltrimethoxysilane, 2-diethylaminoethyltriethoxysilane, and 3-diethylaminopropyltriethoxysilane. Preferred among these are 3-dimethylaminopropyltrimethoxysilane, 3-dimethylaminopropyltriethoxysilane, and 3-diethylaminopropyltrimethoxysilane. These may be used alone or in combinations of two or more.

The modified SBR may also suitably be a modified SBR modified with any of the following compounds (modifiers), including, for example: polyglycidyl ethers of polyhydric alcohols such as ethylene glycol diglycidyl ether, glycerol triglycidyl ether, trimethylolethane triglycidyl ether, and trimethylolpropane triglycidyl ether; polyglycidyl ethers of aromatic compounds having two or more phenol groups such as diglycidylated bisphenol A; polyepoxy compounds such as 1,4-diglycidylbenzene, 1,3,5-triglycidylbenzene, and polyepoxidized liquid polybutadiene; epoxy group-containing tertiary amines such as 4,4'-diglycidyl-diphenylmethylamine and 4,4'-diglycidyl-dibenzylmethylamine; diglycidylamino compounds such as diglycidylaniline, N,N'-diglycidyl-4-glycidyloxyaniline, diglycidylorthotoluidine, tetraglycidyl meta-xylenediamine, tetraglycidylaminodiphenylmethane, tetraglycidyl-p-phenylenediamine, diglycidylaminomethylcyclohexane, and tetraglycidyl-1,3-bisaminomethylcyclohexane;

amino group-containing acid chlorides such as bis(1-methylpropyl)carbamyl chloride, 4-morpholinecarbonyl chloride, 1-pyrrolidinecarbonyl chloride, N,N-dimethylcarbamic acid chloride, and N,N-diethylcarbamic acid chloride; epoxy group-containing silane compounds such as 1,3-bis(glycidyloxypropyl)-tetramethyldisiloxane and (3-glycidyloxypropyl)-pentamethyldisiloxane;

sulfide group-containing silane compounds such as (trimethylsilyl)[3-(trimethoxysilyl)propyl]sulfide, (trimethylsilyl)[3-(triethoxysilyl)propyl]sulfide, (trimethylsilyl)[3-(tripropoxysilyl)propyl]sulfide, (trimethylsilyl)[3-(tributoxysilyl)propyl]sulfide, (trimethylsilyl)[3-(methyldimethoxysilyl)propyl]sulfide, (trimethylsilyl)[3-(methyldiethoxysilyl)propyl]sulfide, (trimethylsilyl)[3-(methyldipropoxysilyl)propyl]sulfide, and (trimethylsilyl)[3-(methyldibutoxysilyl)propyl]sulfide;

N-substituted aziridine compounds such as ethyleneimine and propyleneimine; alkoxysilanes such as methyltriethoxysilane; (thio)benzophenone compounds containing amino and/or substituted amino groups such as 4-N, N-dimethylaminobenzophenone, 4-N,N-di-t-butylaminobenzophenone, 4-N,N-diphenylaminobenzophenone, 4,4'-bis(dimethylamino)benzophenone, 4,4'-bis(diethylamino)benzophenone, 4,4'-bis(diphenylamino)benzophenone, and N,N,N',N'-bis(tetraethylamino)benzophenone; benzaldehyde compounds containing amino and/or substituted amino groups such as 4-N, N-dimethylaminobenzaldehyde, 4-N,N-diphenylaminobenzaldehyde, and 4-N,N-divinylaminobenzaldehyde; N-substituted pyrrolidones such as N-methyl-2-pyrrolidone, N-vinyl-2-pyrrolidone, N-phenyl-2-pyrrolidone, N-t-butyl-2-pyrrolidone, and N-methyl-5-methyl-2-pyrrolidone; N-substituted piperidones such as N-methyl-2-piperidone, N-vinyl-2-piperidone, and N-phenyl-2-piperidone; N-substituted lactams such as N-methyl-ε-caprolactam, N-phenyl-ε-caprolactam, N-methyl-ω-laurilolactam, N-vinyl-ω-laurilolactam, N-methyl-β-propiolactam, and N-phenyl-β-propiolactam;

N,N-bis(2,3-epoxypropoxy)aniline, 4,4-methylene-bis(N, N-glycidylaniline), tris(2,3-epoxypropyl)-1,3,5-triazine-2,4, 6-triones, N,N-diethylacetamide, N-methylmaleimide, N,N-diethylurea, 1,3-dimethylethylene urea, 1,3-divinylethylene urea, 1,3-diethyl-2-imidazolidinone, 1-methyl-3-ethyl-2-imidazolidinone, 4-N,N-dimethylaminoacetophenone, 4-N, N-diethylaminoacetophenone, 1,3-bis(diphenylamino)-2-propanone, and 1,7-bis(methylethylamino)-4-heptanone. Preferred are modified SBRs modified with alkoxysilanes, among others.

The modification with these compounds (modifiers) can be carried out by known methods.

The high-styrene SBR may be an SBR product manufactured or sold by, for example, Sumitomo Chemical Co., Ltd., JSR Corporation, Asahi Kasei Corporation, Zeon Corporation, or Trinseo.

The amount of the high-styrene SBR based on 100% by mass of the rubber component in the rubber composition is preferably 30% by mass or more, more preferably 50% by mass or more, still more preferably 70% by mass or more. The upper limit of the amount is preferably 95% by mass or less, more preferably 90% by mass or less, still more preferably 85% by mass or less. When the amount is within the range indicated above, good properties such as fuel economy, wet grip performance, and abrasion resistance tend to be obtained.

In addition to the natural rubber derived from *Taraxacum kok-saghyz* and the high-styrene SBR, the rubber component of the rubber composition may contain additional rubbers. Examples of such additional rubbers include those described earlier. The rubber component may include either an unmodified rubber or a modified rubber. In particular, BR is preferred from the standpoint of overall performance in terms of fuel economy, abrasion resistance, and wet grip performance.

Non-limiting examples of the BR include those described earlier for the BR.

The amount of the BR based on 100% by mass of the rubber component in the rubber composition is preferably 1% by mass or more, more preferably 7% by mass or more, still more preferably 10% by mass or more. The upper limit of the amount is preferably 50% by mass or less, more preferably 30% by mass or less, still more preferably 20% by mass or less. When the amount is within the range indicated above, the overall performance in terms of fuel economy, abrasion resistance, and wet grip performance can be significantly improved.

(Carbon Black)

The rubber composition contains carbon black.

The carbon black may be similar to or the same as the above-described carbon black.

The carbon black preferably has a nitrogen adsorption specific surface area ($N_2SA$) of 50 $m^2$/g or more, more preferably 70 $m^2$/g or more, still more preferably 85 $m^2$/g or more, but preferably 300 $m^2$/g or less, more preferably 250 $m^2$/g or less, still more preferably 200 $m^2$/g or less. When the $N_2SA$ of the carbon black is not less than the lower limit, excellent properties such as abrasion resistance and wet grip performance tend to be obtained. The carbon black having a $N_2SA$ of not more than the upper limit tends to disperse well, resulting in excellent fuel economy.

The carbon black preferably has a dibutyl phthalate oil absorption (DBP) of 50 mL/100 g or more, more preferably 100 mL/100 g or more, still more preferably 110 mL/100 g or more, but preferably 250 mL/100 g or less, more preferably 200 mL/100 g or less, still more preferably 180 mL/100 g or less. When the DBP is not less than the lower limit, excellent properties such as abrasion resistance and wet grip performance tend to be obtained. The carbon black having a DBP of not more than the upper limit tends to disperse well, resulting in excellent fuel economy.

The carbon black may suitably be the above-described high structure carbon black. The suitable ranges of the COAN, $N_2SA$, volatile matter content at 900° C., volatile matter content at 1500° C., and pH of the high structure carbon black are also as described above.

The amount of the carbon black per 100 parts by mass of the rubber component in the rubber composition is preferably 1 part by mass or more, more preferably 3 parts by mass or more, but is preferably 30 parts by mass or less, more preferably 20 parts by mass or less, still more preferably 10 parts by mass or less. When the amount is not less than the lower limit, good properties such as abrasion resistance and wet grip performance tend to be obtained. When the amount is not more than the upper limit, good fuel economy tends to be obtained.

(Silica)

The rubber composition contains a silica having a nitrogen adsorption specific surface area of 40 $m^2$/g or more.

The silica may be similar to or the same as the above-described silica.

The silica preferably has a nitrogen adsorption specific surface area ($N_2SA$) of 50 $m^2$/g or more, more preferably 80 $m^2$/g or more, still more preferably 100 $m^2$/g or more, but preferably 300 $m^2$/g or less, more preferably 250 $m^2$/g or less. When the $N_2SA$ is not less than the lower limit, excellent properties such as abrasion resistance and wet grip performance tend to be obtained. The silica having a $N_2SA$ of not more than the upper limit tends to disperse well, resulting in excellent fuel economy.

The silica may suitably be the above-described fine particle silica. The suitable range of the $N_2SA$ of the fine particle silica is also as described above.

The amount of the silica (total amount of all types of silica) per 100 parts by mass of the rubber component in the rubber composition is 10 parts by mass or more, preferably 40 parts by mass or more, more preferably 50 parts by mass or more, still more preferably 60 parts by mass or more. The rubber composition containing the silica even in an amount of 120 parts by mass or more can also provide good physical properties. The upper limit of the amount is preferably 250 parts by mass or less, more preferably 200 parts by mass or less, still more preferably 180 parts by mass or less. When the amount is not less than the lower limit, excellent properties such as abrasion resistance and wet grip performance tend to be obtained. When the amount is not more than the upper limit, the silica tends to disperse well, resulting in excellent fuel economy.

The combined amount of the carbon black and silica per 100 parts by mass of the rubber component in the rubber composition is preferably 40 parts by mass or more, more preferably 60 parts by mass or more, still more preferably 70 parts by mass or more, but is preferably 300 parts by mass or less, more preferably 250 parts by mass or less, still more preferably 200 parts by mass or less. When the combined amount is not less than the lower limit, excellent properties such as abrasion resistance and wet grip performance tend to be obtained. When the combined amount is not more than the upper limit, the silica tends to disperse well, resulting in excellent fuel economy.

(Silane Coupling Agent)

When the rubber composition contains silica, it preferably contains a silane coupling agent together with the silica. Examples of the silane coupling agent include those described earlier for the silane coupling agent. The above-mentioned mercapto silane coupling agents are also suitable.

The amount of the silane coupling agent, if present, per 100 parts by mass of the silica in the rubber composition is preferably 1 part by mass or more, more preferably 2 parts by mass or more, but is preferably 20 parts by mass or less, more preferably 15 parts by mass or less. When the amount is not less than the lower limit, the silane coupling agent tends to sufficiently exhibit its effects such as improving dispersion. When the amount is not more than the upper limit, a sufficient coupling effect tends to be obtained, resulting in good reinforcing properties.

(Liquid Plasticizer)

The rubber composition may contain a liquid plasticizer (a plasticizer that is liquid at room temperature (25° C.)). Examples of the liquid plasticizer include those described earlier for the liquid plasticizer.

The amount of the liquid plasticizer per 100 parts by mass of the rubber component in the rubber composition is preferably 5 parts by mass or more, more preferably 10 parts by mass or more, still more preferably 20 parts by mass or more. When the amount is not less than the lower limit, good processability tends to be obtained. The rubber composition containing the liquid plasticizer even in an amount of 50 parts by mass or more can also provide good physical properties. The upper limit of the amount is preferably 150 parts by mass or less, more preferably 130 parts by mass or less, still more preferably 110 parts by mass or less. When the amount is not more than the upper limit, good properties such as abrasion resistance and wet grip performance tend to be obtained. The amount of the liquid plasticizer includes the amount of the oil (extender oil) contained in the rubber (oil extended rubber) used. A range as described above is also suitable for the amount of oil.

(Solid Resin)

The rubber composition may contain a solid resin (a polymer that is solid at room temperature (25° C.)). Examples of the solid resin include those described earlier for the solid resin.

The amount of the solid resin per 100 parts by mass of the rubber component in the rubber composition is preferably 1 part by mass or more, more preferably 3 parts by mass or more, but is preferably 30 parts by mass or less, more preferably 20 parts by mass or less, still more preferably 10 parts by mass or less. When the amount is within the range indicated above, good overall performance in terms of fuel economy, abrasion resistance, and wet grip performance tends to be obtained.

(Farnesene Resin)

The rubber composition preferably contains a farnesene resin. Examples of the farnesene resin include those described earlier for the farnesene resin. The suitable ranges of the Tg, Mw, melt viscosity, farnesene content, and combined content of farnesene and vinyl monomer of the farnesene resin are also as described above.

The amount of the farnesene resin per 100 parts by mass of the rubber component in the rubber composition is preferably 1 part by mass or more, more preferably 3 parts by mass or more, still more preferably 5 parts by mass or more. When the amount is 1 part by mass or more, the performance-improving effect caused by the addition of the farnesene resin tends to be sufficiently achieved. The amount is also preferably 50 parts by mass or less, more preferably 40 parts by mass or less, still more preferably 30 parts by mass or less, particularly preferably 20 parts by mass or less. When the amount is 50 parts by mass or less, good properties such as fuel economy, abrasion resistance, and wet grip performance tend to be obtained.

(Tetrazine Compound)

The rubber composition may contain a tetrazine compound represented by the above formula (1). Examples of the tetrazine compound include those described earlier for the tetrazine compound.

The amount of the tetrazine compound (total amount of tetrazine compounds) per 100 parts by mass of the rubber component in the rubber composition is preferably 0.2 parts by mass or more, more preferably 1.0 part by mass or more, still more preferably 1.5 parts by mass or more, but is preferably 10.0 parts by mass or less, more preferably 5.0 parts by mass or less, still more preferably 3.0 parts by mass or less. When the amount is within the range indicated above, good overall performance in terms of fuel economy, abrasion resistance, and wet grip performance tends to be obtained.

(Particulate Zinc Carrier)

The rubber composition may contain a particulate zinc carrier that includes a silicate particle and finely divided zinc oxide or finely divided basic zinc carbonate supported on the surface of the silicate particle. Examples of the particulate zinc carrier include those described earlier.

The amount of the particulate zinc carrier per 100 parts by mass of the rubber component in the rubber composition is preferably 0.3 parts by mass or more, more preferably 0.5 parts by mass or more, still more preferably 0.6 parts by mass or more, but is preferably 2.0 parts by mass or less, more preferably 1.8 parts by mass or less, still more preferably 1.6 parts by mass or less. When the amount is within the range indicated above, good overall performance in terms of fuel economy, abrasion resistance, and wet grip performance tends to be obtained.

(Amide Compound)

The rubber composition preferably contains an amide compound.

Examples of the amide compound include those described earlier for the amide compound.

The amount of the amide compound per 100 parts by mass of the rubber component in the rubber composition is preferably 0.1 parts by mass or more, more preferably 0.5 parts by mass or more, but is preferably 5.0 parts by mass or less, more preferably 3.0 parts by mass or less, still more preferably 2.5 parts by mass or less. When the amount is within the range indicated above, good overall performance in terms of fuel economy, abrasion resistance, and wet grip performance tends to be obtained.

(Sulfur)

The rubber composition preferably contains sulfur.

Examples of the sulfur include those described earlier for the sulfur.

The amount of the sulfur per 100 parts by mass of the rubber component in the rubber composition is preferably 0.5 parts by mass or more, more preferably 0.8 parts by mass or more, still more preferably 1.0 part by mass or more. The upper limit of the amount is preferably 10.0 parts by mass or less, more preferably 5.0 parts by mass or less, still more preferably 3.0 parts by mass or less. When the amount is within the range indicated above, good overall performance in terms of fuel economy, abrasion resistance, and wet grip performance tends to be obtained.

(Vulcanization Accelerator)

The rubber composition preferably contains a vulcanization accelerator.

Examples of the vulcanization accelerator include those described earlier for the vulcanization accelerator. In particular, sulfenamide vulcanization accelerators or guanidine vulcanization accelerators are preferred.

The amount of the vulcanization accelerator per 100 parts by mass of the rubber component in the rubber composition is preferably 1.0 part by mass or more, more preferably 2.0 parts by mass or more, still more preferably 2.5 parts by mass or more. The upper limit of the amount is preferably 10.0 parts by mass or less, more preferably 7.0 parts by mass or less, still more preferably 5.0 parts by mass or less. When the amount is within the range indicated above, good overall performance in terms of fuel economy, abrasion resistance, and wet grip performance tends to be obtained.

(Other Components)

The rubber composition may additionally contain a wax, an antioxidant, stearic acid, zinc oxide, and other compounding agents (e.g., an organic crosslinking agent) as described earlier.

The rubber composition can be prepared as described earlier for the rubber composition.

The first to third summer tires can be produced as described earlier for the tires.

Examples of the summer tires include pneumatic tires and airless (solid) tires. Pneumatic tires are preferred among these.

[Cold Weather Tires]

(Rubber Component)

The present invention relates to the cold weather tires (tires for winter) (1) to (3) described below. These tires use a combination of a specific natural rubber derived from *Taraxacum kok-saghyz*, a polybutadiene rubber having a predetermined cis-1,4-bond content, carbon black, and a silica having a predetermined nitrogen adsorption specific surface area at a predetermined ratio and thus provide significantly (synergistically) improved overall performance in terms of fuel economy, abrasion resistance, and snow and ice performance.

(1) A first cold weather tire, including a tread formed from a rubber composition which contains a natural rubber derived from *Taraxacum kok-saghyz* having a weight average molecular weight (Mw) of 5,000,000 or more and including polymers having a radius of gyration (Rz) of 130 nm or larger, wherein the Mw and Rz values are measured by FFF-MALS, a polybutadiene rubber having a cis-1,4-bond content of 94.0% by mass or higher, carbon black, and a silica having a nitrogen adsorption specific surface area of 40 m²/g or more at a predetermined ratio.

(2) A second cold weather tire, including a tread formed from a rubber composition which contains a natural rubber derived from *Taraxacum kok-saghyz* having a weight average molecular weight (Mw) of 5,000,000 or more and including polymers having an average radius of gyration (Rz) of 130 nm or larger over a weight average molecular weight (Mw) range of 5,000,000 to 50,000,000, wherein the Mw and Rz values are measured by FFF-MALS, a polybutadiene rubber having a cis-1,4-bond content of 94.0% by mass or higher, carbon black, and a silica having a nitrogen adsorption specific surface area of 40 m²/g or more at a predetermined ratio.

(3) A third cold weather tire, including a tread formed from a rubber composition which contains a natural rubber derived from *Taraxacum kok-saghyz* having a weight average molecular weight (Mw) of 5,000,000 or more and including polymers having a first regression line from a plot of logarithm of radius of gyration (Rz) (log Rz) versus logarithm of weight average molecular weight (Mw) (log Mw), the first regression line having a slope of 0.25 or greater over a weight average molecular weight (Mw) range of 5,000,000 to 50,000,000, wherein the Mw and Rz values are measured by FFF-MALS, a polybutadiene rubber having a cis-1,4-bond content of 94.0% by mass or higher, carbon black, and a silica having a nitrogen adsorption specific surface area of 40 m²/g or more at a predetermined ratio.

The reason (mechanism) for the significant (synergistic) improvement in overall performance in terms of excellent fuel economy, abrasion resistance, and snow and ice performance is not exactly clear but is believed to be as follows.

Each natural rubber derived from *Taraxacum kok-saghyz* specified in the present application has a higher Mw than a natural rubber derived from *Hevea brasiliensis* and includes a large amount of high molecular weight components, thereby providing higher properties such as tensile strength. Moreover, the natural rubber derived from *Taraxacum kok-saghyz* has a lower degree of branching than a natural rubber derived from *Hevea brasiliensis* and includes a large amount of linear polymers, thereby having a large Rz of polymers. Therefore, the large Rz of polymers can cause an increase in entanglement between the polymers and an increase in probability of polymer/filler contact and thus in interaction with fillers, thereby resulting in enhanced reinforcing properties and improved properties such as fracture properties, abrasion resistance, and snow and ice performance.

Furthermore, since each natural rubber derived from *Taraxacum kok-saghyz* specified in the present application has a lower degree of branching than a natural rubber derived from *Hevea brasiliensis* and includes a large amount of linear polymers, it has a smaller number of polymer molecular ends. Therefore, the smaller number of free molecular ends leads to a decrease in the amount of hysteresis loss-producing components, thereby resulting in excellent low heat build-up properties.

Thus, it is believed that the combined use of such a natural rubber derived from *Taraxacum kok-saghyz*, a polybutadiene rubber having a predetermined cis-1,4-bond content, carbon black, and a silica having a predetermined nitrogen adsorption specific surface area provides significantly (synergistically) improved overall performance in terms of fuel economy, abrasion resistance, and snow and ice performance.

The natural rubbers derived from *Taraxacum kok-saghyz* in the first to third cold weather tires are similar to or the same as the above-described natural rubbers derived from *Taraxacum kok-saghyz*.

The amount of the natural rubber derived from *Taraxacum kok-saghyz* based on 100% by mass of the rubber component in the rubber composition is 1% by mass or more, preferably 30% by mass or more, more preferably 40% by mass or more, still more preferably 50% by mass or more. The upper limit of the amount is preferably 90% by mass or less, more preferably 80% by mass or less, still more preferably 70% by mass or less. When the amount is within the range indicated above, the overall performance in terms of fuel economy, abrasion resistance, and snow and ice performance can be significantly improved.

The rubber component of the rubber composition contains a polybutadiene rubber having a predetermined cis-1,4-bond content (high-cis BR). The high-cis BR may be a single type or a combination of two or more types.

The high-cis BR has a cis-1,4-bond content of 94.0% by mass or higher, preferably 95.0% by mass or higher, more preferably 97.0% by mass or higher, still more preferably 98.0% by mass or higher. When the cis-1,4-bond content is within the range indicated above, properties such as abrasion resistance tend to be improved.

Examples of the high-cis BR include generally used high-cis BR having high cis content and BR synthesized using rare earth catalysts (rare earth-catalyzed BR). The high-cis BR may suitably be the above-described modified BR (modified conjugated diene polymer). The high-cis BR may be either an unmodified BR or a modified BR.

The amount of the high-cis BR based on 100% by mass of the rubber component in the rubber composition is 20% by mass or more, preferably 25% by mass or more, more preferably 30% by mass or more. The upper limit of the amount is 64% by mass or less, preferably 55% by mass or less, more preferably 50% by mass or less. When the amount is within the range indicated above, the overall performance in terms of fuel economy, abrasion resistance, and snow and ice performance can be significantly improved.

(Carbon Black)

The rubber composition contains carbon black.

The carbon black may be similar to or the same as the above-described carbon black.

The carbon black preferably has a nitrogen adsorption specific surface area ($N_2SA$) of 50 m²/g or more, more preferably 70 m²/g or more, still more preferably 85 m²/g or more, but preferably 300 m²/g or less, more preferably 250 m²/g or less, still more preferably 200 m²/g or less. When the $N_2SA$ of the carbon black is not less than the lower limit, excellent properties such as abrasion resistance and snow and ice performance tend to be obtained. The carbon black having a $N_2SA$ of not more than the upper limit tends to disperse well, resulting in excellent fuel economy.

The carbon black preferably has a dibutyl phthalate oil absorption (DBP) of 50 mL/100 g or more, more preferably 100 mL/100 g or more, still more preferably 110 mL/100 g or more, but preferably 250 mL/100 g or less, more preferably 200 mL/100 g or less, still more preferably 180 mL/100 g or less. When the DBP is not less than the lower limit, excellent properties such as abrasion resistance and snow and ice performance tend to be obtained. The carbon black having a DBP of not more than the upper limit tends to disperse well, resulting in excellent fuel economy.

The carbon black may suitably be the above-described high structure carbon black. The suitable ranges of the COAN, $N_2SA$, volatile matter content at 900° C., volatile matter content at 1500° C., and pH of the high structure carbon black are also as described above.

The amount of the carbon black per 100 parts by mass of the rubber component in the rubber composition is preferably 1 part by mass or more, more preferably 3 parts by mass or more, but is preferably 30 parts by mass or less, more preferably 20 parts by mass or less, still more preferably 10 parts by mass or less. When the amount is not less than the lower limit, good properties such as abrasion resistance and snow and ice performance tend to be obtained. When the amount is not more than the upper limit, good fuel economy tends to be obtained.

(Silica)

The rubber composition contains a silica having a nitrogen adsorption specific surface area of 40 m²/g or more.

The silica may be similar to or the same as the above-described silica.

The silica preferably has a nitrogen adsorption specific surface area ($N_2SA$) of 50 m²/g or more, more preferably 80 m²/g or more, still more preferably 100 m²/g or more, but preferably 300 m²/g or less, more preferably 250 m²/g or less. When the $N_2SA$ is not less than the lower limit, excellent properties such as abrasion resistance and wet grip performance tend to be obtained. The silica having a $N_2SA$ of not more than the upper limit tends to disperse well, resulting in excellent fuel economy.

The silica may suitably be the above-described fine particle silica. The suitable range of the $N_2SA$ of the fine particle silica is also as described above.

The amount of the silica (total amount of all types of silica) per 100 parts by mass of the rubber component in the rubber composition is 5 parts by mass or more, preferably 40 parts by mass or more, more preferably 50 parts by mass or more, still more preferably 60 parts by mass or more. The rubber composition containing the silica even in an amount of 120 parts by mass or more can also provide good physical properties. The upper limit of the amount is preferably 250 parts by mass or less, more preferably 200 parts by mass or less, still more preferably 180 parts by mass or less. When the amount is not less than the lower limit, excellent properties such as abrasion resistance and snow and ice performance tend to be obtained. When the amount is not more than the upper limit, the silica tends to disperse well, resulting in excellent fuel economy.

The combined amount of the carbon black and silica per 100 parts by mass of the rubber component in the rubber composition is preferably 40 parts by mass or more, more preferably 60 parts by mass or more, still more preferably 70 parts by mass or more, but is preferably 300 parts by mass or less, more preferably 250 parts by mass or less, still more preferably 200 parts by mass or less. When the combined amount is not less than the lower limit, excellent properties such as abrasion resistance and snow and ice performance tend to be obtained. When the combined amount is not more than the upper limit, the silica tends to disperse well, resulting in excellent fuel economy.

(Silane Coupling Agent)

When the rubber composition contains silica, it preferably contains a silane coupling agent together with the silica. Examples of the silane coupling agent include those described earlier for the silane coupling agent. The above-mentioned mercapto silane coupling agents are also suitable.

The amount of the silane coupling agent, if present, per 100 parts by mass of the silica in the rubber composition is preferably 1 part by mass or more, more preferably 2 parts by mass or more, but is preferably 20 parts by mass or less, more preferably 15 parts by mass or less. When the amount is not less than the lower limit, the silane coupling agent tends to sufficiently exhibit its effects such as improving dispersion. When the amount is not more than the upper limit, a sufficient coupling effect tends to be obtained, resulting in good reinforcing properties.

(Liquid Plasticizer)

The rubber composition may contain a liquid plasticizer (a plasticizer that is liquid at room temperature (25° C.)). Examples of the liquid plasticizer include those described earlier for the liquid plasticizer.

The amount of the liquid plasticizer per 100 parts by mass of the rubber component in the rubber composition is preferably 5 parts by mass or more, more preferably 10 parts by mass or more, still more preferably 20 parts by mass or more. When the amount is not less than the lower limit, good processability tends to be obtained. The rubber composition containing the liquid plasticizer even in an amount of 50 parts by mass or more can also provide good physical properties. The upper limit of the amount is preferably 150 parts by mass or less, more preferably 120 parts by mass or less, still more preferably 100 parts by mass or less. When the amount is not more than the upper limit, good properties such as abrasion resistance and snow and ice performance tend to be obtained. The amount of the liquid plasticizer includes the amount of the oil (extender oil) contained in the rubber (oil extended rubber) used. A range as described above is also suitable for the amount of oil.

(Solid Resin)

The rubber composition may contain a solid resin (a polymer that is solid at room temperature (25° C.)). Examples of the solid resin include those described earlier for the solid resin.

The amount of the solid resin per 100 parts by mass of the rubber component in the rubber composition is preferably 1 part by mass or more, more preferably 3 parts by mass or more, but is preferably 30 parts by mass or less, more preferably 20 parts by mass or less, still more preferably 10 parts by mass or less. When the amount is within the range indicated above, good overall performance in terms of fuel economy, abrasion resistance, and snow and ice performance tends to be obtained.

(Farnesene Resin)

The rubber composition preferably contains a farnesene resin. Examples of the farnesene resin include those described earlier for the farnesene resin. The suitable ranges of the Tg, Mw, melt viscosity, farnesene content, and combined content of farnesene and vinyl monomer of the farnesene resin are also as described above.

The amount of the farnesene resin per 100 parts by mass of the rubber component in the rubber composition is preferably 1 part by mass or more, more preferably 3 parts by mass or more, still more preferably 5 parts by mass or more. When the amount is 1 part by mass or more, the performance-improving effect caused by the addition of the farnesene resin tends to be sufficiently achieved. The amount is also preferably 50 parts by mass or less, more preferably 40 parts by mass or less, still more preferably 30 parts by mass or less, particularly preferably 20 parts by mass or less. When the amount is 50 parts by mass or less, good properties such as fuel economy, abrasion resistance, and snow and ice performance tend to be obtained.

(Tetrazine Compound)

The rubber composition may contain a tetrazine compound represented by the above formula (1). Examples of the tetrazine compound include those described earlier for the tetrazine compound.

The amount of the tetrazine compound (total amount of tetrazine compounds) per 100 parts by mass of the rubber component in the rubber composition is preferably 0.2 parts by mass or more, more preferably 1.0 part by mass or more, still more preferably 1.5 parts by mass or more, but is preferably 10.0 parts by mass or less, more preferably 5.0 parts by mass or less, still more preferably 3.0 parts by mass or less. When the amount is within the range indicated above, good overall performance in terms of fuel economy, abrasion resistance, and snow and ice performance tends to be obtained.

(Particulate Zinc Carrier)

The rubber composition may contain a particulate zinc carrier that includes a silicate particle and finely divided zinc oxide or finely divided basic zinc carbonate supported on the surface of the silicate particle. Examples of the particulate zinc carrier include those described earlier.

The amount of the particulate zinc carrier per 100 parts by mass of the rubber component in the rubber composition is preferably 0.3 parts by mass or more, more preferably 0.5 parts by mass or more, still more preferably 0.6 parts by mass or more, but is preferably 2.0 parts by mass or less, more preferably 1.8 parts by mass or less, still more preferably 1.6 parts by mass or less. When the amount is within the range indicated above, good overall performance in terms of fuel economy, abrasion resistance, and snow and ice performance tends to be obtained.

(Amide Compound)

The rubber composition preferably contains an amide compound.

Examples of the amide compound include those described earlier for the amide compound.

The amount of the amide compound per 100 parts by mass of the rubber component in the rubber composition is preferably 0.1 parts by mass or more, more preferably 0.5 parts by mass or more, but is preferably 5.0 parts by mass or less, more preferably 3.0 parts by mass or less, still more preferably 2.5 parts by mass or less. When the amount is within the range indicated above, good overall performance in terms of fuel economy, abrasion resistance, and snow and ice performance tends to be obtained.

(Sulfur)

The rubber composition preferably contains sulfur.

Examples of the sulfur include those described earlier for the sulfur.

The amount of the sulfur per 100 parts by mass of the rubber component in the rubber composition is preferably 0.5 parts by mass or more, more preferably 0.8 parts by mass or more, still more preferably 1.0 part by mass or more. The upper limit of the amount is preferably 10.0 parts by mass or less, more preferably 5.0 parts by mass or less, still more preferably 3.0 parts by mass or less. When the amount is within the range indicated above, good overall performance in terms of fuel economy, abrasion resistance, and snow and ice performance tends to be obtained.

(Vulcanization Accelerator)

The rubber composition preferably contains a vulcanization accelerator.

Examples of the vulcanization accelerator include those described earlier for the vulcanization accelerator. In particular, sulfenamide vulcanization accelerators or guanidine vulcanization accelerators are preferred.

The amount of the vulcanization accelerator per 100 parts by mass of the rubber component in the rubber composition is preferably 1.0 part by mass or more, more preferably 2.0 parts by mass or more, still more preferably 2.5 parts by mass or more. The upper limit of the amount is preferably 10.0 parts by mass or less, more preferably 7.0 parts by mass or less, still more preferably 5.0 parts by mass or less. When the amount is within the range indicated above, good overall performance in terms of fuel economy, abrasion resistance, and snow and ice performance tends to be obtained.

(Other Components)

The rubber composition may additionally contain a wax, an antioxidant, stearic acid, zinc oxide, and other compounding agents (e.g., an organic crosslinking agent) as described earlier.

The rubber composition can be prepared as described earlier for the rubber composition.

The first to third cold weather tires can be produced as described earlier for the tires.

Examples of the cold weather tires include pneumatic tires and airless (solid) tires. Pneumatic tires are preferred among these.

[Base Treads]

(Rubber Component)

The present invention relates to the tires including the base treads (1) to (3) described below. These tires use a combination of a specific natural rubber derived from *Taraxacum kok-saghyz*, carbon black, and silica at a predetermined ratio and thus provide significantly (synergistically) improved overall performance in terms of fuel economy and fracture resistance.

(1) A first tire, including a base tread formed from a rubber composition which contains a natural rubber derived from *Taraxacum kok-saghyz* having a weight average molecular weight (Mw) of 5,000,000 or more and including polymers having a radius of gyration (Rz) of 130 nm or larger, wherein the Mw and Rz values are measured by FFF-MALS, carbon black, and silica at a predetermined ratio.

(2) A second tire, including a base tread formed from a rubber composition which contains a natural rubber derived from *Taraxacum kok-saghyz* having a weight average molecular weight (Mw) of 5,000,000 or more and including polymers having an average radius of gyration (Rz) of 130 nm or larger over a weight average molecular weight (Mw) range of 5,000,000 to 50,000,000, wherein the Mw and Rz values are measured by FFF-MALS, carbon black, and silica at a predetermined ratio.

(3) A third tire, including a base tread formed from a rubber composition which contains a natural rubber derived from *Taraxacum kok-saghyz* having a weight average molecular weight (Mw) of 5,000,000 or more and including polymers having a first regression line from a plot of logarithm of radius of gyration (Rz) (log Rz) versus logarithm of weight average molecular weight (Mw) (log Mw), the first regression line having a slope of 0.25 or greater over a weight average molecular weight (Mw) range of 5,000,000 to 50,000,000, wherein the Mw and Rz values are measured by FFF-MALS, carbon black, and silica at a predetermined ratio.

The reason (mechanism) for the significant (synergistic) improvement in overall performance in terms of excellent fuel economy and fracture resistance is not exactly clear but is believed to be as follows.

Each natural rubber derived from *Taraxacum kok-saghyz* specified in the present application has a higher Mw than a natural rubber derived from *Hevea brasiliensis* and includes a large amount of high molecular weight components, thereby providing higher properties such as tensile strength. Moreover, the natural rubber derived from *Taraxacum kok-saghyz* has a lower degree of branching than a natural rubber derived from *Hevea brasiliensis* and includes a large amount of linear polymers, thereby having a large Rz of polymers.

Therefore, the large Rz of polymers can cause an increase in entanglement between the polymers and an increase in probability of polymer/filler contact and thus in interaction with fillers, thereby resulting in enhanced reinforcing properties and improved properties such as fracture resistance.

Furthermore, since each natural rubber derived from *Taraxacum kok-saghyz* specified in the present application has a lower degree of branching than a natural rubber derived from *Hevea brasiliensis* and includes a large amount of linear polymers, it has a smaller number of polymer molecular ends. Therefore, the smaller number of free molecular ends leads to a decrease in the amount of hysteresis loss-producing components, thereby resulting in excellent low heat build-up properties.

Thus, it is believed that the combined use of such a natural rubber derived from *Taraxacum kok-saghyz*, carbon black, and silica at a predetermined ratio provides significantly (synergistically) improved overall performance in terms of fuel economy and fracture resistance.

The natural rubbers derived from *Taraxacum kok-saghyz* in the first to third tires are similar to or the same as the above-described natural rubbers derived from *Taraxacum kok-saghyz*.

The amount of the natural rubber derived from *Taraxacum kok-saghyz* based on 100% by mass of the rubber component in the rubber composition is 1% by mass or more, preferably 50% by mass or more, more preferably 60% by mass or more. The upper limit of the amount is not limited but is preferably 95% by mass or less, more preferably 90% by mass or less, still more preferably 85% by mass or less. When the amount is within the range indicated above, the overall performance in terms of fuel economy and fracture resistance can be significantly improved.

In addition to the natural rubber derived from *Taraxacum kok-saghyz*, the rubber component of the rubber composition may contain additional rubbers. Examples of such additional rubbers include those described earlier. The rubber component may include either an unmodified rubber or a modified rubber. In particular, BR is preferred from the standpoint of overall performance in terms of fuel economy and fracture resistance.

Non-limiting examples of the BR include those described earlier for the BR.

The amount of the BR based on 100% by mass of the rubber component in the rubber composition is preferably 5% by mass or more, more preferably 10% by mass or more, still more preferably 15% by mass or more. The upper limit of the amount is preferably 60% by mass or less, more preferably 50% by mass or less, still more preferably 40% by mass or less. When the amount is within the range indicated above, the overall performance in terms of fuel economy and fracture resistance can be significantly improved.

(Carbon Black)

The rubber composition contains carbon black.

The carbon black may be similar to or the same as the above-described carbon black.

The carbon black preferably has a nitrogen adsorption specific surface area ($N_2SA$) of 50 $m^2/g$ or more, more preferably 70 $m^2/g$ or more, still more preferably 85 $m^2/g$ or more, but preferably 300 $m^2/g$ or less, more preferably 250 $m^2/g$ or less, still more preferably 200 $m^2/g$ or less. When the $N_2SA$ of the carbon black is not less than the lower limit, excellent properties such as fracture resistance tend to be obtained. The carbon black having a $N_2SA$ of not more than the upper limit tends to disperse well, resulting in excellent fuel economy.

The carbon black preferably has a dibutyl phthalate oil absorption (DBP) of 50 mL/100 g or more, more preferably 100 mL/100 g or more, still more preferably 110 mL/100 g or more, but preferably 250 mL/100 g or less, more preferably 200 mL/100 g or less, still more preferably 180 mL/100 g or less. When the DBP is not less than the lower limit, excellent properties such as fracture resistance tend to be obtained. The carbon black having a DBP of not more than the upper limit tends to disperse well, resulting in excellent fuel economy.

The carbon black may suitably be the above-described high structure carbon black. The suitable ranges of the COAN, $N_2SA$, volatile matter content at 900° C., volatile matter content at 1500° C., and pH of the high structure carbon black are also as described above.

The amount of the carbon black per 100 parts by mass of the rubber component in the rubber composition is preferably 5 parts by mass or more, more preferably 25 parts by mass or more, still more preferably 35 parts by mass or more, but is preferably 100 parts by mass or less, more preferably 70 parts by mass or less, still more preferably 55 parts by mass or less. When the amount is not less than the lower limit, good properties such as fracture resistance tend to be obtained. When the amount is not more than the upper limit, good fuel economy tends to be obtained.

(Silica)

The rubber composition contains silica.

The silica may be similar to or the same as the above-described silica.

The silica preferably has a nitrogen adsorption specific surface area ($N_2SA$) of 20 $m^2/g$ or more, more preferably 30 $m^2/g$ or more, still more preferably 40 $m^2/g$ or more, but preferably 300 $m^2/g$ or less, more preferably 250 $m^2/g$ or less. When the $N_2SA$ is not less than the lower limit, excellent properties such as fracture resistance tend to be obtained. The silica having a $N_2SA$ of not more than the upper limit tends to disperse well, resulting in excellent fuel economy.

The silica may suitably be the above-described fine particle silica. The suitable range of the $N_2SA$ of the fine particle silica is also as described above.

The amount of the silica (total amount of all types of silica) per 100 parts by mass of the rubber component in the rubber composition is 10 parts by mass or more, preferably 13 parts by mass or more, more preferably 15 parts by mass or more. The rubber composition containing the silica even in an amount of 120 parts by mass or more can also provide good physical properties. The upper limit of the amount is preferably 250 parts by mass or less, more preferably 200 parts by mass or less, still more preferably 180 parts by mass or less. When the amount is not less than the lower limit, excellent properties such as fracture resistance tend to be obtained. When the amount is not more than the upper limit, the silica tends to disperse well, resulting in excellent fuel economy.

The combined amount of the carbon black and silica per 100 parts by mass of the rubber component in the rubber composition is preferably 40 parts by mass or more, more preferably 50 parts by mass or more, still more preferably 55 parts by mass or more, but is preferably 300 parts by mass or less, more preferably 250 parts by mass or less, still more preferably 220 parts by mass or less. When the combined amount is not less than the lower limit, excellent properties such as fracture resistance tend to be obtained. When the combined amount is not more than the upper limit, the silica tends to disperse well, resulting in excellent fuel economy.

(Silane Coupling Agent)

When the rubber composition contains silica, it preferably contains a silane coupling agent together with the silica. Examples of the silane coupling agent include those described earlier for the silane coupling agent. The above-mentioned mercapto silane coupling agents are also suitable.

The amount of the silane coupling agent, if present, per 100 parts by mass of the silica in the rubber composition is preferably 1 part by mass or more, more preferably 2 parts by mass or more, but is preferably 20 parts by mass or less, more preferably 15 parts by mass or less. When the amount is not less than the lower limit, the silane coupling agent tends to sufficiently exhibit its effects such as improving dispersion. When the amount is not more than the upper limit, a sufficient coupling effect tends to be obtained, resulting in good reinforcing properties.

(Liquid Plasticizer)

The rubber composition may contain a liquid plasticizer (a plasticizer that is liquid at room temperature (25° C.)). Examples of the liquid plasticizer include those described earlier for the liquid plasticizer.

The amount of the liquid plasticizer per 100 parts by mass of the rubber component in the rubber composition is preferably 2 parts by mass or more, more preferably 5 parts by mass or more. When the amount is not less than the lower limit, good processability tends to be obtained. The rubber composition containing the liquid plasticizer even in an amount of 50 parts by mass or more can also provide good physical properties. The upper limit of the amount is preferably 120 parts by mass or less, more preferably 100 parts by mass or less, still more preferably 90 parts by mass or less. When the amount is not more than the upper limit, good properties such as fracture resistance tend to be obtained. The amount of the liquid plasticizer includes the amount of the oil (extender oil) contained in the rubber (oil extended rubber) used. A range as described above is also suitable for the amount of oil.

(Solid Resin)

The rubber composition may contain a solid resin (a polymer that is solid at room temperature (25° C.)). Examples of the solid resin include those described earlier for the solid resin.

The amount of the solid resin per 100 parts by mass of the rubber component in the rubber composition is preferably 1 part by mass or more, more preferably 3 parts by mass or more, but is preferably 30 parts by mass or less, more preferably 20 parts by mass or less, still more preferably 10 parts by mass or less. When the amount is within the range indicated above, good overall performance in terms of fuel economy and fracture resistance tends to be obtained.

(Farnesene Resin)

The rubber composition preferably contains a farnesene resin. Examples of the farnesene resin include those described earlier for the farnesene resin. The suitable ranges of the Tg, Mw, melt viscosity, farnesene content, and combined content of farnesene and vinyl monomer of the farnesene resin are also as described above.

The amount of the farnesene resin per 100 parts by mass of the rubber component in the rubber composition is preferably 1 part by mass or more, more preferably 3 parts by mass or more, still more preferably 5 parts by mass or more. When the amount is 1 part by mass or more, the performance-improving effect caused by the addition of the farnesene resin tends to be sufficiently achieved. The amount is also preferably 50 parts by mass or less, more preferably 40 parts by mass or less, still more preferably 30 parts by mass or less, particularly preferably 20 parts by mass or less. When the amount is 50 parts by mass or less, good properties such as fuel economy and fracture resistance tend to be obtained.

(Tetrazine Compound)

The rubber composition may contain a tetrazine compound represented by the above formula (1). Examples of the tetrazine compound include those described earlier for the tetrazine compound.

The amount of the tetrazine compound (total amount of tetrazine compounds) per 100 parts by mass of the rubber component in the rubber composition is preferably 0.2 parts by mass or more, more preferably 1.0 part by mass or more, still more preferably 1.5 parts by mass or more, but is preferably 10.0 parts by mass or less, more preferably 5.0 parts by mass or less, still more preferably 3.0 parts by mass or less. When the amount is within the range indicated above, good overall performance in terms of fuel economy and fracture resistance tends to be obtained.

(Particulate Zinc Carrier)

The rubber composition may contain a particulate zinc carrier that includes a silicate particle and finely divided zinc oxide or finely divided basic zinc carbonate supported on the surface of the silicate particle. Examples of the particulate zinc carrier include those described earlier.

The amount of the particulate zinc carrier per 100 parts by mass of the rubber component in the rubber composition is preferably 0.3 parts by mass or more, more preferably 0.5 parts by mass or more, still more preferably 0.6 parts by mass or more, but is preferably 2.0 parts by mass or less, more preferably 1.8 parts by mass or less, still more preferably 1.6 parts by mass or less. When the amount is within the range indicated above, good overall performance in terms of fuel economy and fracture resistance tends to be obtained.

(Amide Compound)

The rubber composition preferably contains an amide compound.

Examples of the amide compound include those described earlier for the amide compound.

The amount of the amide compound per 100 parts by mass of the rubber component in the rubber composition is preferably 0.1 parts by mass or more, more preferably 0.5 parts by mass or more, but is preferably 5.0 parts by mass or less, more preferably 3.0 parts by mass or less, still more preferably 2.5 parts by mass or less. When the amount is within the range indicated above, good overall performance in terms of fuel economy and fracture resistance tends to be obtained.

(Sulfur)

The rubber composition preferably contains sulfur.

Examples of the sulfur include those described earlier for the sulfur.

The amount of the sulfur per 100 parts by mass of the rubber component in the rubber composition is preferably 0.5 parts by mass or more, more preferably 0.8 parts by mass or more, still more preferably 1.0 part by mass or more. The upper limit of the amount is preferably 10.0 parts by mass or less, more preferably 5.0 parts by mass or less, still more preferably 4.0 parts by mass or less. When the amount is within the range indicated above, good overall performance in terms of fuel economy and fracture resistance tends to be obtained.

(Vulcanization Accelerator)

The rubber composition preferably contains a vulcanization accelerator.

Examples of the vulcanization accelerator include those described earlier for the vulcanization accelerator. In particular, sulfenamide vulcanization accelerators and guanidine vulcanization accelerators are preferred, with guanidine vulcanization accelerators being more preferred.

The amount of the vulcanization accelerator per 100 parts by mass of the rubber component in the rubber composition is preferably 0.5 parts by mass or more, more preferably 1.0 part by mass or more, still more preferably 1.2 parts by mass or more. The upper limit of the amount is preferably 10.0 parts by mass or less, more preferably 5.0 parts by mass or less, still more preferably 3.0 parts by mass or less. When the amount is within the range indicated above, good overall performance in terms of fuel economy and fracture resistance tends to be obtained.

(Other Components)

The rubber composition may additionally contain a wax, an antioxidant, stearic acid, zinc oxide, and other compounding agents (e.g., an organic crosslinking agent) as described earlier.

The rubber composition can be prepared as described earlier for the rubber composition.

The first to third tires including the base treads can be produced as described earlier for the tires.

Examples of the tires including the base treads include pneumatic tires and airless (solid) tires. Pneumatic tires are preferred among these.

[Breakers]

(Rubber Component)

The present invention relates to the tires including the breakers (1) to (3) described below. These tires use a combination of a specific natural rubber derived from *Taraxacum kok-saghyz* and carbon black and/or silica and thus provide significantly (synergistically) improved overall performance in terms of fuel economy and fracture resistance.

(1) A first tire, including a breaker formed from a rubber composition which contains a natural rubber derived from *Taraxacum kok-saghyz* having a weight average molecular weight (Mw) of 5,000,000 or more and including polymers having a radius of gyration (Rz) of 130 nm or larger, wherein the Mw and Rz values are measured by FFF-MALS, and carbon black and/or silica.

(2) A second tire, including a breaker formed from a rubber composition which contains a natural rubber derived from *Taraxacum kok-saghyz* having a weight average molecular weight (Mw) of 5,000,000 or more and including polymers having an average radius of gyration (Rz) of 130 nm or larger over a weight average molecular weight (Mw) range of 5,000,000 to 50,000,000, wherein the Mw and Rz values are measured by FFF-MALS, and carbon black and/or silica.

(3) A third tire, including a breaker formed from a rubber composition which contains a natural rubber derived from *Taraxacum kok-saghyz* having a weight average molecular weight (Mw) of 5,000,000 or more and including polymers having a first regression line from a plot of logarithm of radius of gyration (Rz) (log Rz) versus logarithm of weight average molecular weight (Mw) (log Mw), the first regression line having a slope of 0.25 or greater over a weight average molecular weight (Mw) range of 5,000,000 to 50,000,000, wherein the Mw and Rz values are measured by FFF-MALS, and carbon black and/or silica.

The reason (mechanism) for the significant (synergistic) improvement in overall performance in terms of excellent fuel economy and fracture resistance is not exactly clear but is believed to be as follows.

Each natural rubber derived from *Taraxacum kok-saghyz* specified in the present application has a higher Mw than a natural rubber derived from *Hevea brasiliensis* and includes a large amount of high molecular weight components, thereby providing higher properties such as tensile strength. Moreover, the natural rubber derived from *Taraxacum kok-saghyz* has a lower degree of branching than a natural rubber derived from *Hevea brasiliensis* and includes a large amount of linear polymers, thereby having a large Rz of polymers. Therefore, the large Rz of polymers can cause an increase in entanglement between the polymers and an increase in probability of polymer/filler contact and thus in interaction with fillers, thereby resulting in enhanced reinforcing properties and improved properties such as fracture resistance.

Furthermore, since each natural rubber derived from *Taraxacum kok-saghyz* specified in the present application has a lower degree of branching than a natural rubber derived from *Hevea brasiliensis* and includes a large amount of linear polymers, it has a smaller number of polymer molecular ends. Therefore, the smaller number of free molecular ends leads to a decrease in the amount of hysteresis loss-producing components, thereby resulting in excellent low heat build-up properties.

Thus, it is believed that the combined use of such a natural rubber derived from *Taraxacum kok-saghyz* and carbon black and/or silica provides significantly (synergistically) improved overall performance in terms of fuel economy and fracture resistance.

The natural rubbers derived from *Taraxacum kok-saghyz* in the first to third tires are similar to or the same as the above-described natural rubbers derived from *Taraxacum kok-saghyz*.

The amount of the natural rubber derived from *Taraxacum kok-saghyz* based on 100% by mass of the rubber component in the rubber composition is preferably 30% by mass or more, more preferably 60% by mass or more, still more preferably 80% by mass or more, particularly preferably 90% by mass or more, and may be 100% by mass. When the amount is within the range indicated above, the overall performance in terms of fuel economy and fracture resistance can be significantly improved.

In addition to the natural rubber derived from *Taraxacum kok-saghyz*, the rubber component of the rubber composition may contain additional rubbers. Examples of such additional rubbers include those described earlier.

(Carbon Black)

The rubber composition contains carbon black.

The carbon black may be similar to or the same as the above-described carbon black.

The carbon black preferably has a nitrogen adsorption specific surface area ($N_2SA$) of 30 $m^2/g$ or more, more preferably 50 $m^2/g$ or more, still more preferably 65 $m^2/g$ or more, but preferably 150 $m^2/g$ or less, more preferably 120 $m^2/g$ or less, still more preferably 100 $m^2/g$ or less. When the $N_2SA$ of the carbon black is not less than the lower limit, excellent properties such as fracture resistance tend to be obtained. The carbon black having a $N_2SA$ of not more than the upper limit tends to disperse well, resulting in excellent fuel economy.

The carbon black preferably has a dibutyl phthalate oil absorption (DBP) of 30 mL/100 g or more, more preferably 50 mL/100 g or more, still more preferably 60 mL/100 g or more, but preferably 150 mL/100 g or less, more preferably 110 mL/100 g or less, still more preferably 90 mL/100 g or less. When the DBP is not less than the lower limit, excellent properties such as fracture resistance tend to be obtained. The carbon black having a DBP of not more than the upper limit tends to disperse well, resulting in excellent fuel economy.

The amount of the carbon black per 100 parts by mass of the rubber component in the rubber composition is preferably 3 parts by mass or more, more preferably 5 parts by mass or more, still more preferably 10 parts by mass or more, but is preferably 120 parts by mass or less, more preferably 100 parts by mass or less, still more preferably 80 parts by mass or less. When the amount is not less than the lower limit, good properties such as fracture resistance tend to be obtained. When the amount is not more than the upper limit, good fuel economy tends to be obtained.

(Silica)

The rubber composition contains silica.

The silica may be similar to or the same as the above-described silica.

The silica preferably has a nitrogen adsorption specific surface area ($N_2SA$) of 20 $m^2/g$ or more, more preferably 30 $m^2/g$ or more, still more preferably 40 $m^2/g$ or more, but preferably 200 $m^2/g$ or less, more preferably 150 $m^2/g$ or less, still more preferably 120 $m^2/g$ or less. When the $N_2SA$ is not less than the lower limit, excellent properties such as fracture resistance tend to be obtained. The silica having a $N_2SA$ of not more than the upper limit tends to disperse well, resulting in excellent fuel economy.

The amount of the silica (total amount of all types of silica) per 100 parts by mass of the rubber component in the rubber composition is preferably 20 parts by mass or more, more preferably 30 parts by mass or more, still more preferably 40 parts by mass or more. The upper limit of the amount is preferably 150 parts by mass or less, more preferably 120 parts by mass or less, still more preferably 100 parts by mass or less. When the amount is not less than the lower limit, excellent properties such as fracture resistance tend to be obtained. When the amount is not more than the upper limit, the silica tends to disperse well, resulting in excellent fuel economy.

The combined amount of the carbon black and silica per 100 parts by mass of the rubber component in the rubber composition is preferably 30 parts by mass or more, more preferably 40 parts by mass or more, still more preferably 50 parts by mass or more, but is preferably 150 parts by mass or less, more preferably 100 parts by mass or less, still more preferably 80 parts by mass or less. When the combined amount is not less than the lower limit, excellent properties such as fracture resistance tend to be obtained. When the combined amount is not more than the upper limit, the silica tends to disperse well, resulting in excellent fuel economy.

(Silane Coupling Agent)

When the rubber composition contains silica, it preferably contains a silane coupling agent together with the silica. Examples of the silane coupling agent include those described earlier for the silane coupling agent. The above-mentioned mercapto silane coupling agents are also suitable.

The amount of the silane coupling agent, if present, per 100 parts by mass of the silica in the rubber composition is preferably 1 part by mass or more, more preferably 2 parts by mass or more, but is preferably 20 parts by mass or less, more preferably 15 parts by mass or less. When the amount is not less than the lower limit, the silane coupling agent tends to sufficiently exhibit its effects such as improving dispersion. When the amount is not more than the upper limit, a sufficient coupling effect tends to be obtained, resulting in good reinforcing properties.

(Liquid Plasticizer)

The rubber composition may contain a liquid plasticizer (a plasticizer that is liquid at room temperature (25° C.)). Examples of the liquid plasticizer include those described earlier for the liquid plasticizer.

The amount of the liquid plasticizer per 100 parts by mass of the rubber component in the rubber composition is preferably 2 parts by mass or more, more preferably 4 parts by mass or more. When the amount is not less than the lower limit, good processability tends to be obtained. The upper limit of the amount is preferably 40 parts by mass or less, more preferably 20 parts by mass or less, still more preferably 15 parts by mass or less. When the amount is not more than the upper limit, good properties such as fracture resistance tend to be obtained. The amount of the liquid plasticizer includes the amount of the oil (extender oil) contained in the rubber (oil extended rubber) used. A range as described above is also suitable for the amount of oil.

(Organic Acid Cobalt Salt)

The rubber composition preferably contains an organic acid cobalt salt. The organic acid cobalt salt serves to cross-link the rubber to a steel breaker. Therefore, the presence of the organic acid cobalt salt provides enhanced adhesion between the steel breaker and rubber.

Examples of the organic acid cobalt salt include cobalt stearate, cobalt naphthenate, cobalt neodecanoate, cobalt boron 3 neodecanoate, and cobalt abietate. Preferred among these is cobalt stearate because it is excellent in processability (viscosity) and can also promote the vulcanization reaction.

The amount of the organic acid cobalt salt, calculated as metallic cobalt, per 100 parts by mass of the rubber component in the rubber composition is preferably 0.05 parts by mass or more, more preferably 0.08 parts by mass or more, but is preferably 0.50 parts by mass or less, more preferably 0.30 parts by mass or less, still more preferably 0.20 parts by mass or less. When the amount is within the range indicated above, the adhesion between the steel breaker and rubber tends to become sufficient, resulting in good properties such as crack growth resistance.

(Zinc Oxide)

The rubber composition preferably contains zinc oxide.

The zinc oxide may be conventionally known one, and examples include commercial products available from Mitsui Mining & Smelting Co., Ltd., Toho Zinc Co., Ltd., HakusuiTech Co., Ltd., Seido Chemical Industry Co., Ltd., and Sakai Chemical Industry Co., Ltd.

The amount of the zinc oxide per 100 parts by mass of the rubber component in the rubber composition is preferably 3.0 parts by mass or more, more preferably 5.0 parts by mass or more, still more preferably 6.5 parts by mass or more. The upper limit of the amount is preferably 15.0 parts by mass or less, more preferably 12.0 parts by mass or less, still more preferably 10.0 parts by mass or less. When the amount is within the range indicated above, the overall performance in terms of fuel economy and fracture resistance can be significantly improved.

(Sulfur)

The rubber composition preferably contains sulfur.

Examples of the sulfur include those described earlier for the sulfur.

The amount of the sulfur per 100 parts by mass of the rubber component in the rubber composition is preferably 1.0 part by mass or more, more preferably 2.0 parts by mass or more, still more preferably 3.0 parts by mass or more. The upper limit of the amount is preferably 10.0 parts by mass or less, more preferably 8.0 parts by mass or less, still more preferably 6.0 parts by mass or less. When the amount is within the range indicated above, good overall performance in terms of fuel economy and fracture resistance tends to be obtained.

(Vulcanization Accelerator)

The rubber composition preferably contains a vulcanization accelerator.

Examples of the vulcanization accelerator include those described earlier for the vulcanization accelerator. In particular, sulfenamide vulcanization accelerators and guanidine vulcanization accelerators are preferred, with sulfenamide vulcanization accelerators being more preferred.

The amount of the vulcanization accelerator per 100 parts by mass of the rubber component in the rubber composition is preferably 0.2 parts by mass or more, more preferably 0.5 parts by mass or more. The upper limit of the amount is preferably 5.0 parts by mass or less, more preferably 3.0 parts by mass or less, still more preferably 2.0 parts by mass or less. When the amount is within the range indicated above, good overall performance in terms of fuel economy and fracture resistance tends to be obtained.

(Other Components)

The rubber composition may additionally contain a solid resin, a farnesene resin, a tetrazine compound, a particulate zinc carrier, an amide compound, a wax, an antioxidant, stearic acid, and other compounding agents (e.g., an organic crosslinking agent) as described earlier.

The rubber composition can be prepared as described earlier for the rubber composition.

The first to third tires including the breakers can be produced as described earlier for the tires.

Examples of the tires including the breakers include pneumatic tires and airless (solid) tires. Pneumatic tires are preferred among these.

[Sidewalls]

(Rubber Component)

The present invention relates to the tires including the sidewalls (1) to (3) described below. These tires use a combination of a specific natural rubber derived from *Taraxacum kok-saghyz* and carbon black and/or silica and thus provide significantly (synergistically) improved overall performance in terms of fuel economy and flex crack growth resistance.

(1) A first tire, including a sidewall formed from a rubber composition which contains a natural rubber derived from *Taraxacum kok-saghyz* having a weight average molecular weight (Mw) of 5,000,000 or more and including polymers having a radius of gyration (Rz) of 130 nm or larger, wherein the Mw and Rz values are measured by FFF-MALS, and carbon black and/or silica.

(2) A second tire, including a sidewall formed from a rubber composition which contains a natural rubber derived from *Taraxacum kok-saghyz* having a weight average molecular weight (Mw) of 5,000,000 or more and including polymers having an average radius of gyration (Rz) of 130 nm or larger over a weight average molecular weight (Mw) range of 5,000,000 to 50,000,000, wherein the Mw and Rz values are measured by FFF-MALS, and carbon black and/or silica.

(3) A third tire, including a sidewall formed from a rubber composition which contains a natural rubber derived from *Taraxacum kok-saghyz* having a weight average molecular weight (Mw) of 5,000,000 or more and including polymers having a first regression line from a plot of logarithm of radius of gyration (Rz) (log Rz) versus logarithm of weight average molecular weight (Mw) (log Mw), the first regression line having a slope of 0.25 or greater over a weight average molecular weight (Mw) range of 5,000,000 to 50,000,000, wherein the Mw and Rz values are measured by FFF-MALS, and carbon black and/or silica.

The reason (mechanism) for the significant (synergistic) improvement in overall performance in terms of excellent fuel economy and flex crack growth resistance is not exactly clear but is believed to be as follows.

Each natural rubber derived from *Taraxacum kok-saghyz* specified in the present application has a higher Mw than a natural rubber derived from *Hevea brasiliensis* and includes a large amount of high molecular weight components, thereby providing higher properties such as tensile strength. Moreover, the natural rubber derived from *Taraxacum kok-saghyz* has a lower degree of branching than a natural rubber derived from *Hevea brasiliensis* and includes a large amount of linear polymers, thereby having a large Rz of polymers. Therefore, the large Rz of polymers can cause an increase in entanglement between the polymers and an increase in probability of polymer/filler contact and thus in interaction with fillers, thereby resulting in enhanced reinforcing properties and improved properties such as flex crack growth resistance.

Furthermore, since each natural rubber derived from *Taraxacum kok-saghyz* specified in the present application has a lower degree of branching than a natural rubber derived from *Hevea brasiliensis* and includes a large amount of linear polymers, it has a smaller number of polymer molecular ends. Therefore, the smaller number of free molecular ends leads to a decrease in the amount of hysteresis loss-producing components, thereby resulting in excellent low heat build-up properties.

Thus, it is believed that the combined use of such a natural rubber derived from *Taraxacum kok-saghyz* and carbon black and/or silica provides significantly (synergistically) improved overall performance in terms of fuel economy and flex crack growth resistance.

The natural rubbers derived from *Taraxacum kok-saghyz* in the first to third tires are similar to or the same as the above-described natural rubbers derived from *Taraxacum kok-saghyz*.

The amount of the natural rubber derived from *Taraxacum kok-saghyz* based on 100% by mass of the rubber component in the rubber composition is preferably 10% by mass or more, more preferably 20% by mass or more, still more preferably 30% by mass or more. The upper limit of the amount is preferably 80% by mass or less, more preferably 60% by mass or less, still more preferably 50% by mass or less. When the amount is within the range indicated above, the overall performance in terms of fuel economy and flex crack growth resistance can be significantly improved.

In addition to the natural rubber derived from *Taraxacum kok-saghyz*, the rubber component of the rubber composition may contain additional rubbers. Examples of such additional rubbers include those described earlier.

The rubber component may include either an unmodified rubber or a modified rubber. In particular, BR is preferred from the standpoint of overall performance in terms of fuel economy and flex crack growth resistance.

Non-limiting examples of the BR include those described earlier for the BR.

The amount of the BR based on 100% by mass of the rubber component in the rubber composition is preferably 10% by mass or more, more preferably 35% by mass or more, still more preferably 50% by mass or more. The upper limit of the amount is preferably 90% by mass or less, more preferably 80% by mass or less, still more preferably 70% by mass or less. When the amount is within the range indicated above, the overall performance in terms of fuel economy and flex crack growth resistance can be significantly improved.

(Carbon Black)

The rubber composition contains carbon black.

The carbon black may be similar to or the same as the above-described carbon black.

The carbon black preferably has a nitrogen adsorption specific surface area ($N_2SA$) of 20 $m^2$/g or more, more preferably 30 $m^2$/g or more, still more preferably 35 $m^2$/g or more, but preferably 80 $m^2$/g or less, more preferably 65 $m^2$/g or less, still more preferably 55 $m^2$/g or less. When the $N_2SA$ of the carbon black is not less than the lower limit, excellent properties such as flex crack growth resistance tend to be obtained. The carbon black having a $N_2SA$ of not more than the upper limit tends to disperse well, resulting in excellent fuel economy.

The carbon black preferably has a dibutyl phthalate oil absorption (DBP) of 50 mL/100 g or more, more preferably 80 mL/100 g or more, still more preferably 100 mL/100 g or more, but preferably 150 mL/100 g or less, more preferably 130 mL/100 g or less, still more preferably 120 mL/100 g or less. When the DBP is not less than the lower limit, excellent properties such as flex crack growth resistance tend to be obtained. The carbon black having a DBP of not more than the upper limit tends to disperse well, resulting in excellent fuel economy.

The amount of the carbon black per 100 parts by mass of the rubber component in the rubber composition is preferably 1 part by mass or more, more preferably 3 parts by mass or more, still more preferably 5 parts by mass or more, but is preferably 100 parts by mass or less, more preferably 80 parts by mass or less, still more preferably 60 parts by mass or less. When the amount is not less than the lower limit, good properties such as flex crack growth resistance tend to be obtained. When the amount is not more than the upper limit, good fuel economy tends to be obtained.

(Silica)

The rubber composition contains silica.

The silica may be similar to or the same as the above-described silica.

The silica preferably has a nitrogen adsorption specific surface area ($N_2SA$) of 20 $m^2$/g or more, more preferably 30 $m^2$/g or more, still more preferably 40 $m^2$/g or more, but preferably 200 $m^2$/g or less, more preferably 150 $m^2$/g or less, still more preferably 120 $m^2$/g or less. When the $N_2SA$ is not less than the lower limit, excellent properties such as crack growth resistance tend to be obtained. The silica having a $N_2SA$ of not more than the upper limit tends to disperse well, resulting in excellent fuel economy.

The amount of the silica (total amount of all types of silica) per 100 parts by mass of the rubber component in the rubber composition is preferably 20 parts by mass or more, more preferably 30 parts by mass or more, still more preferably 40 parts by mass or more. The upper limit of the amount is preferably 150 parts by mass or less, more preferably 120 parts by mass or less, still more preferably 100 parts by mass or less. When the amount is not less than the lower limit, excellent properties such as flex crack growth resistance tend to be obtained. When the amount is not more than the upper limit, the silica tends to disperse well, resulting in excellent fuel economy.

The combined amount of the carbon black and silica per 100 parts by mass of the rubber component in the rubber composition is preferably 30 parts by mass or more, more preferably 40 parts by mass or more, still more preferably 45 parts by mass or more, but is preferably 150 parts by mass or less, more preferably 100 parts by mass or less, still more preferably 80 parts by mass or less. When the combined amount is not less than the lower limit, excellent properties such as flex crack growth resistance tend to be obtained. When the combined amount is not more than the upper limit, the silica tends to disperse well, resulting in excellent fuel economy.

(Silane Coupling Agent)

When the rubber composition contains silica, it preferably contains a silane coupling agent together with the silica. Examples of the silane coupling agent include those described earlier for the silane coupling agent. The above-mentioned mercapto silane coupling agents are also suitable.

The amount of the silane coupling agent, if present, per 100 parts by mass of the silica in the rubber composition is preferably 1 part by mass or more, more preferably 2 parts by mass or more, but is preferably 20 parts by mass or less, more preferably 15 parts by mass or less. When the amount is not less than the lower limit, the silane coupling agent tends to sufficiently exhibit its effects such as improving dispersion. When the amount is not more than the upper limit, a sufficient coupling effect tends to be obtained, resulting in good reinforcing properties.

(Liquid Plasticizer)

The rubber composition may contain a liquid plasticizer (a plasticizer that is liquid at room temperature (25° C.)). Examples of the liquid plasticizer include those described earlier for the liquid plasticizer.

The amount of the liquid plasticizer per 100 parts by mass of the rubber component in the rubber composition is preferably 2 parts by mass or more, more preferably 4 parts by mass or more. When the amount is not less than the lower limit, good processability tends to be obtained. The upper limit of the amount is preferably 40 parts by mass or less, more preferably 20 parts by mass or less, still more preferably 15 parts by mass or less. When the amount is not more than the upper limit, good properties such as flex crack growth resistance tend to be obtained. The amount of the liquid plasticizer includes the amount of the oil (extender oil) contained in the rubber (oil extended rubber) used. A range as described above is also suitable for the amount of oil.

(Solid Resin)

The rubber composition may contain a solid resin (a polymer that is solid at room temperature (25° C.)). Examples of the solid resin include those described earlier for the solid resin.

The amount of the solid resin per 100 parts by mass of the rubber component in the rubber composition is preferably 1 part by mass or more, more preferably 2 parts by mass or more, but is preferably 30 parts by mass or less, more preferably 20 parts by mass or less, still more preferably 10 parts by mass or less. When the amount is within the range indicated above, good overall performance in terms of fuel economy and flex crack growth resistance tends to be obtained.

(Sulfur)

The rubber composition preferably contains sulfur.

Examples of the sulfur include those described earlier for the sulfur.

The amount of the sulfur per 100 parts by mass of the rubber component in the rubber composition is preferably 0.5 parts by mass or more, more preferably 1.0 part by mass or more, still more preferably 1.2 parts by mass or more. The upper limit of the amount is preferably 5.0 parts by mass or less, more preferably 4.0 parts by mass or less, still more preferably 3.0 parts by mass or less. When the amount is within the range indicated above, good overall performance in terms of fuel economy and flex crack growth resistance tends to be obtained.

(Vulcanization Accelerator)

The rubber composition preferably contains a vulcanization accelerator.

Examples of the vulcanization accelerator include those described earlier for the vulcanization accelerator. In particular, sulfenamide vulcanization accelerators or guanidine vulcanization accelerators are preferred.

The amount of the vulcanization accelerator per 100 parts by mass of the rubber component in the rubber composition is preferably 0.2 parts by mass or more, more preferably 0.5 parts by mass or more. The upper limit of the amount is preferably 5.0 parts by mass or less, more preferably 3.0 parts by mass or less, still more preferably 2.0 parts by mass or less. When the amount is within the range indicated above, good overall performance in terms of fuel economy and flex crack growth resistance tends to be obtained.

(Other Components)

The rubber composition may additionally contain a farnesene resin, a tetrazine compound, a particulate zinc carrier, an amide compound, a wax, an antioxidant, stearic acid, zinc oxide, and other compounding agents (e.g., an organic crosslinking agent) as described earlier.

The rubber composition can be prepared as described earlier for the rubber composition.

The first to third tires including the sidewalls can be produced as described earlier for the tires.

Examples of the tires including the sidewalls include pneumatic tires and airless (solid) tires. Pneumatic tires are preferred among these.

EXAMPLES

The present invention is concretely described below with reference to, but not limited to, examples.

Production Example 1: Preparation of *Taraxacum kok-saghyz*-Derived Natural Rubbers A, B, and C

*Taraxacum kok-saghyz*-derived natural rubbers A, B, and C were prepared by the extraction method described in U.S. Patent Publication No. 2019/0048101 A1 or 2019/0046895 A1.

*brasiliensis* (TSR20), and a synthetic polyisoprene rubber (synthetic IR: IR2200 available from JSR Corporation), which were measured as described below.

(Measurement of Mw, Mn, and Rz of Polymers by FFF-MALS)

Each rubber sample was added to THF at a rubber concentration of 0.2% by mass of the solution. The solution was shaken for one week and then filtered through a PTFE filter (pore size: 1.0 or 5.0 µm). The filtrate was measured and analyzed by FFF-MALS.

The specifications of the FFF system, MALS detector, and RI detector used are as follows.

FFF system: TF2000 available from Postnova (measurement conditions: THF as a mobile phase, a flow rate of 0.3 mL/min)

MALS detector: PN3150 available from Postnova (measurement conditions: full 21 detection angles ranging from 7° to) 168°

RI detector: PN3621 available from Postnova (measurement conditions: a detector temperature of 37° C.)

System piping connection method: connected in the following order: FFF system-MALS detector-RI detector (Measurement of Average Rz of Polymers Over Mw Range of 5,000,000 to 50,000,000)

An average Rz of polymers over a Mw range of 5,000,000 to 50,000,000 was calculated based on the Mw and Rz values measured by FFF-MALS. (Mw, Rz) data were obtained every two seconds in FFF-MALS, and a total of 300 to 400 data points were acquired.

(Measurement of Slope of First Regression Line from Plot of Log Rz Versus Log Mw Over Mw Range of 5,000,000 to 50,000,000)

A plot of log Rz versus log Mw was constructed from the Mw and Rz values measured by FFF-MALS. The data over a Mw range of 5,000,000 to 50,000,000 in the plot were fitted to a first regression line by the least squares method, and the slope of the line was determined.

TABLE 1

| FFF-MALS measurement | Polymer properties | | | | |
| --- | --- | --- | --- | --- | --- |
| | *Taraxacum kok-saghyz*-derived natural rubber A | *Taraxacum kok-saghyz*-derived natural rubber B | *Taraxacum kok-saghyz*-derived natural rubber C | *Hevea brasiliensis*-derived natural rubber | Synthetic IR |
| Mw | 5,110,000 | 5,860,000 | 5,730,000 | 3,200,000 | 2,800,000 |
| Mw/Mn | 1.76 | 2.38 | 2.07 | 2.77 | 1.85 |
| Rz (nm) of polymers | 137 | 187 | 181 | 98 | 93 |
| Average Rz (nm) of polymers over Mw range of 5,000,000 to 50,000,000 | 160 | 206 | 206 | 129 | 122 |
| Slope of first regression line from plot of log Rz versus log Mw (over Mw range of 5,000,000-50,000,000) | 0.279 | 0.343 | 0.364 | 0.242 | 0.232 |

Table 1 shows the Mw and Mw/Mn and Rz of polymers measured by FFF-MALS, average Rz of polymers over a Mw range of 5,000,000 to 50,000,000, and slope of a first regression line from a plot of log Rz versus log Mw (over a Mw range of 5,000,000 to 50,000,000) of the *Taraxacum kok-saghyz*-derived natural rubbers A to C prepared in the production example, a natural rubber derived from *Hevea*

Production Example 2: Synthesis of Particulate Zinc Carrier

An amount of 91.5 g of zinc oxide was added to 847 mL of a 5.5% by mass aqueous suspension of calcined clay, and they were sufficiently stirred. To the mixture were added 330 g of a 10% by mass aqueous solution of sodium carbonate and 340 g of a 10% by mass aqueous solution of zinc chloride, followed by stirring. Subsequently, 30% by mass carbon dioxide gas was injected into the resulting mixture until the pH reached 7 or lower so that basic zinc carbonate was precipitated on the surface of the calcined clay, thereby synthesizing a particulate zinc carrier. The product was subjected to dehydration, drying, and pulverization steps to obtain the particulate zinc carrier as a powder.

The particulate zinc carrier had a BET specific surface area of 50 $m^2/g$. In the particulate zinc carrier, 45% by mass, calculated as metallic zinc, of basic zinc carbonate was supported on calcined clay. The supported basic zinc carbonate thus had a BET specific surface area of 60 $m^2/g$.

Production Examples 3-1 and 3-2: Production of Carbon Blacks B and C

Carbon blacks were produced under the conditions shown in Table 2 using D type heavy oil as a fuel oil and creosote oil as a feedstock hydrocarbon (feedstock oil) in a carbon black reaction furnace in which a combustion zone, a feedstock introduction zone, and a rear reaction zone were joined in sequence. The combustion zone had an inner diameter of 1100 mm and a length of 1700 mm and was provided with an air inlet duct and a combustion burner. The feedstock introduction zone was connected to the combustion zone and included a narrow portion having an inner diameter of 175 mm and a length of 1050 mm and provided with a feedstock nozzle penetrating into the portion from the periphery. The rear reaction zone had an inner diameter of 400 mm and a length of 3000 mm and was provided with a quenching device.

The produced carbon blacks were then subjected to heat treatment under the conditions shown in Table 2 with no oxygen flow (in a nitrogen gas atmosphere).

Table 3 shows the properties of the carbon blacks B and C obtained in Production Examples 3-1 and 3-2.

TABLE 2

|  | Production Example | |
|---|---|---|
|  | 3-1 | 3-2 |
| Combustion air ($Nm^3/H$) | 5800 | 5800 |
| Fuel oil (kg/h) | 330 | 330 |
| Combustion gas temperature (° C.) | 1700 | 1700 |
| Air for fuel atomization ($Nm^3/H$) | 120 | 120 |
| Feedstock oil (Kg/h) | 1300 | 1200 |
| Heat treatment temperature (° C.) | 1200 | 1200 |
| Heat treatment time (h) | 4 | 3 |

TABLE 3

|  | Production Example | |
|---|---|---|
|  | 3-1 | 3-2 |
| $N_2SA$ ($m^2/g$) | 103 | 177 |
| DBP (mL/100 g) | 143 | 170 |
| Volatile matter content (900° C.) (% by mass) | 0.38 | 0.45 |

TABLE 3-continued

|  | Production Example | |
|---|---|---|
|  | 3-1 | 3-2 |
| Volatile matter content (1500° C.) (% by mass) | 0.48 | 0.67 |
| pH | 10.4 | 9.7 |
| Oil absorption number of compressed sample (mL/100 g) | 113 | 126 |
| CTAB ($m^2/g$) | 87 | 157 |

Production Example 4-1 (Synthesis of Conjugated Diene Polymer)

A catalyst composition (molar ratio of iodine atom to lanthanoid-containing compound: 2.0) was previously prepared by reacting and aging 0.90 mmol of 1,3-butadiene with a cyclohexane solution containing 0.18 mmol of neodymium versatate, a toluene solution containing 3.6 mmol of methylalumoxane, a toluene solution containing 6.7 mmol of diisobutylaluminum hydride, and a toluene solution containing 0.36 mmol of trimethylsilyl iodide for 60 minutes at 30° C. Next, 2.4 kg of cyclohexane and 300 g of 1,3-butadiene were introduced into a 5 L autoclave purged with nitrogen. Then, the catalyst composition was introduced into the autoclave, and a polymerization reaction was performed for two hours at 30° C. to give a polymer solution. The conversion rate of the introduced 1,3-butadiene was almost 100%.

In order to measure the physical properties of the conjugated diene polymer (hereinafter, also referred to as "polymer"), i.e., the unmodified polymer, a 200 g portion of the polymer solution was taken, to which was then added a methanol solution containing 1.5 g of 2,4-di-tert-butyl-p-cresol to stop the polymerization reaction. Thereafter, the solvent was removed by steam stripping, and the product was dried on a roll at 110° C. to obtain a dry product, which was used as a polymer.

The polymer had the following physical properties: a Mooney viscosity ($ML_{1+4}$, 100° C.) of 12; a molecular weight distribution (Mw/Mn) of 1.6; a cis-1,4-bond content of 99.2% by mass; and a 1,2-vinyl bond content of 0.21% by mass.

Production Example 4-2 (Synthesis of Modified Conjugated Diene Polymer)

A modified conjugated diene polymer (hereinafter, also referred to as "modified polymer") was prepared by treating the polymer solution of the conjugated diene polymer prepared in Production Example 4-1 as follows. To the polymer solution maintained at 30° C. was added a toluene solution containing 1.71 mmol of 3-glycidoxypropyltrimethoxysilane, and they were reacted for 30 minutes to give a reaction solution. To the reaction solution was added a toluene solution containing 1.71 mmol of 3-aminopropyltriethoxysilane, and they were stirred for 30 minutes. Subsequently, to the reaction solution was added a toluene solution containing 1.28 mmol of tetraisopropyl titanate, followed by stirring for 30 minutes. Then, the polymerization reaction was stopped by adding a methanol solution containing 1.5 g of 2,4-di-tert-butyl-p-cresol. The resulting solution was used as a modified polymer solution. The yield was 2.5 kg. Then to the modified polymer solution was added 20 L of an aqueous solution with a pH of 10 adjusted with sodium hydroxide, followed by performing a condensation reaction at 110° C. for two hours while removing the solvent. Thereafter, the reaction product was dried on a roll at 110° C. to obtain a dry product, which was used as a modified polymer.

The modified polymer had the following physical properties: a Mooney viscosity ($ML_{1+4}$, 125° C.) of 46; a molecular weight distribution (Mw/Mn) of 2.4; a cold flow value of 0.3 mg/min; a temporal stability of 2; and a glass transition temperature of −106° C.

Production Example 5: Production of Oil Extended Modified Diene Polymer (SBR 3)

Two autoclave reactors each having an inner volume of 10 liters, an inlet at the bottom, an outlet at the head, a stirrer, and a jacket were connected in series. Butadiene, styrene, and cyclohexane were mixed at a predetermined ratio. The mixed solution was allowed to pass through a dehydration column packed with activated alumina, and then mixed with n-butyllithium in a static mixer to remove impurities. Then, the mixture was continuously fed from the bottom of the first reactor, and 2,2-bis(2-oxolanyl)propane as a polar substance and n-butyllithium as a polymerization initiator were each continuously fed from the bottom of the first reactor at a predetermined rate. The temperature inside the reactor was maintained at 95° C. The polymer solution was continuously taken out from the head of the reactor and fed to the second reactor. While the temperature of the second reactor was maintained at 95° C., a mixture of tetraglycidyl-1,3-bisaminomethylcyclohexane (monomer) as a modifier and an oligomer component thereof was continuously added as a 1000-fold dilution in cyclohexane at a predetermined rate to perform a modification reaction. The resulting polymer solution was continuously taken out from the reactor and continuously mixed with an antioxidant in a static mixer. The resulting polymer solution was further mixed with 25 parts by mass of an extender oil NC140 (JXTG Nippon Oil & Energy Corporation) per 100 parts by mass of the polymer, followed by removing the solvent, thereby obtaining a target oil extended modified diene polymer (SBR 3).

The chemicals used in examples and comparative examples are listed below.
(Rubber Component)
*Taraxacum kok-saghyz*-derived natural rubbers A to C: prepared in Production Example 1
*Hevea brasiliensis*-derived natural rubber: TSR20
Synthetic polyisoprene rubber (synthetic IR): IR2200 available from JSR Corporation
Modified conjugated diene polymer: prepared in Production Example 4-2
SBR 1: SBR 1502 available from JSR Corporation (styrene content: 23.5% by mass, vinyl content: 16% by mass, non-oil extended)
SBR 2: SLR6430 available from Trinseo (styrene content: 40% by mass, vinyl content: 24% by mass, Mw: 1,360,000, oil content: 37.5 parts by mass per 100 parts by mass of rubber solids)
SBR 3: modified SBR synthesized in Production Example 5 (styrene content: 38% by mass, vinyl content: 39% by mass, Mw: 800,000, Tg: −25° C., oil extended rubber having an oil content of 25 parts by mass per 100 parts by mass of rubber solids)
BR: BR150B available from Ube Industries, Ltd. (cis content: 98% by mass)

(Silica)
Silica A: 115 GR available from Solvay Japan ($N_2SA$: 115 $m^2/g$)
Silica B: VN3 available from Evonik ($N_2SA$: 175 $m^2/g$)
Silica C: 9100GR available from Evonik ($N_2SA$: 235 $m^2/g$)
Silica D: Ultrasil 360 available from Evonik Degussa ($N_2SA$: 50 $m^2/g$)
(Silane Coupling Agent)
Silane coupling agent A: Si69 (bis(3-triethoxysilyl-propyl)tetrasulfide) available from Evonik Degussa
Silane coupling agent B: NXT (3-octanoylthiopropyltriethoxysilane) available from Momentive
Silane coupling agent C: NXT-Z45 available from Momentive (a copolymer of linking units A and B, linking unit A: 55 mol %, linking unit B: 45 mol %)
(Carbon Black)
Carbon black A: DIABLACK N339 available from Mitsubishi Chemical Corporation ($N_2SA$: 96 $m^2/g$, DBP absorption: 124 mL/100 g)
Carbon black B: prepared in Production Example 3-1
Carbon black C: prepared in Production Example 3-2
Carbon black D: DIABLACK N326 available from Mitsubishi Chemical Corporation ($N_2SA$: 84 $m^2/g$, DBP absorption: 74 mL/100 g)
Carbon black E: DIABLACK N550 available from Mitsubishi Chemical Corporation ($N_2SA$: 41 $m^2/g$, DBP absorption: 115 mL/100 g)
(Solid Resin (Resin))
Resin A: YS resin PX1150N available from Yasuhara Chemical Co., Ltd. (polyterpene (β-pinene resin), softening point: 115° C.)
Resin B: YS POLYSTER T160 available from Yasuhara Chemical Co., Ltd. (terpenephenol resin, softening point: 160° C.)
Resin C: Marukarez M-890A available from Maruzen Petrochemical Co., Ltd. (dicyclopentadiene resin, softening point: 105° C.)
Resin D: PINECRYSTAL KR-85 available from Arakawa Chemical Industries, Ltd. (rosin resin, softening point: 80 to 87° C.)
Resin E: SYLVARES SA85 available from Kraton (a copolymer of α-methylstyrene and styrene, softening point: 85° C.)
(Liquid Plasticizer)
Oil: X-140 available from JXTG Nippon Oil & Energy Corporation (aromatic process oil)
(Farnesene Resin)
Farnesene resin A: KB-101 available from Kuraray Co., Ltd. (farnesene homopolymer, Mw: 10000, melt viscosity: 0.7 Pa·s, Tg: −72° C.)
Farnesene resin B: FSR-221 available from Kuraray Co., Ltd. (farnesene-styrene copolymer, Mw: 10000, copolymerization ratio (by mass): farnesene/styrene=77/23, melt viscosity: 5.7 Pa·s, Tg: −54° C.)
Farnesene resin C: FBR-746 available from Kuraray Co., Ltd. (farnesene-butadiene copolymer, Mw: 100000, copolymerization ratio (by mass): farnesene/butadiene=60/40, melt viscosity: 603 Pa·s, Tg: −78° C.)
(Antioxidant)
Antioxidant 1: Antigene 3C (N-phenyl-N'-isopropyl-p-phenylenediamine) available from Sumitomo Chemical Co., Ltd
Antioxidant 2: Nocrac 6C (N-(1,3-dimethylbutyl)-N'-phenyl-p-phenylenediamine, 6PPD) available from Ouchi Shinko Chemical Industrial Co., Ltd.

(Stearic Acid)
Stearic acid: "TSUBAKI" available from NOF Corporation
(Organic Acid Cobalt Salt)
Cobalt stearate: cost-F available from DIC Corporation (cobalt content: 9.5% by mass)
(Zinc Oxide)
Zinc oxide: Zinc oxide #1 available from Mitsui Mining & Smelting Co., Ltd.
(Particulate Zinc Carrier)
Particulate zinc carrier: prepared in Production Example 2
(Wax)
Wax: Sunnoc N (paraffin wax) available from Ouchi Shinko Chemical Industrial Co., Ltd.
(Amide Compound)
Amide compound: WB16 available from STRUKTOL (mixture of fatty acid calcium salt, fatty acid amide, and fatty acid amide ester, ash content: 4.5%)
(Sulfur)
Sulfur: Sulfur powder available from Tsurumi Chemical Industry Co., Ltd.
(Vulcanization Accelerator)
Vulcanization accelerator 1: NOCCELER CZ (N-cyclohexyl-2-benzothiazolylsulfenamide (CBS)) available from Ouchi Shinko Chemical Industrial Co., Ltd.
Vulcanization accelerator 2: NOCCELER D (1,3-diphenylguanidine (DPG)) available from Ouchi Shinko Chemical Industrial Co., Ltd.
Vulcanization accelerator 3: NOCCELER DZ (N,N'-dicyclohexyl-2-benzothiazolylsulfenamide (DZ)) available from Ouchi Shinko Chemical Industrial Co., Ltd.
(Tetrazine Compound)
Tetrazine compound A: a compound of formula (1-1-1)
Tetrazine compound B: a compound of formula (1-2-1)

Examples and Comparative Examples

[Heavy Duty Tires]
According to each of the formulations shown in Tables 4-1 to 4-8, the materials other than the sulfur and vulcanization accelerators were kneaded for five minutes at 150° C. using a 1.7 L Banbury mixer (Kobe Steel, Ltd.) to give a kneaded mixture. Next, the sulfur and vulcanization accelerators were added to the kneaded mixture, followed by kneading for five minutes at 80° C. using an open roll mill to give a sheet of an unvulcanized rubber composition. The unvulcanized rubber composition was press-vulcanized for 30 minutes at 150° C. in a 0.5 mm-thick die to obtain a sheet of a vulcanized rubber composition.

Separately, the unvulcanized rubber composition prepared as above was formed into the shape of a cap tread and assembled with other tire components on a tire building machine to build an unvulcanized tire. The unvulcanized tire was vulcanized at 150° C. for 30 minutes to prepare a test tire (size: 11R22.5).

The vulcanized rubber compositions (vulcanized rubber sheets) and test tires prepared as above were evaluated as follows. The results are shown in Table 4-1 to Table 4-8, where Comparative Example 1-1a to Comparative Example 1-8a, respectively, are used as standards of comparison (index=100).

<Abrasion Resistance>
Each set of test tires was mounted on a 2-D car made in Japan. After running 50,000 km, the groove depth in the tire tread portion was measured. The distance at which the tire groove depth decreased by 1 mm was calculated and expressed as an index using the equation below. A higher index indicates better abrasion resistance.

(Abrasion resistance index)=(Distance of each formulation example)/(Distance of standard comparative example)×100

<Wet Grip Performance>
The wet grip performance of the test tires was evaluated by the following test.
(Wet Cornering Performance Index)
Site: Test track of Sumitomo Rubber Industries, Ltd. in Okayama
Method: The lap time required for making one lap around a wet track with a radius of 30 m is expressed as a reciprocal of a ratio to the lap time of the standard comparative example, where the standard comparative example is taken as 100. A higher value indicates better wet grip performance.

<Fuel Economy>
Strip specimens having a size of 1 mm or 2 mm in width and 40 mm in length were punched out of the sheets of the vulcanized rubber compositions and then tested. The loss tangent at 50° C. (tan δ (50° C.)) of the specimens was measured at a strain of 1% and a frequency of 10 Hz with a viscoelasticity measuring device (Ueshima Seisakusho Co., Ltd.). The reciprocals of the tan δ values are expressed as an index relative to the standard comparative example taken as 100. A higher index indicates better fuel economy.

TABLE 4-1

| | | Heavy duty tread (Particulate zinc carrier) | | | | | | | | | |
|---|---|---|---|---|---|---|---|---|---|---|---|
| | | Example | | | | | | Comparative Example | | | |
| | | 1-1a | 1-1b | 1-1c | 1-1d | 1-1e | 1-1f | 1-1a | 1-1b | 1-1c | 1-1d |
| Formulation (parts by mass) | *Taraxacum kok-saghyz*-derived natural rubber A | 80 | 80 | — | — | — | — | — | — | — | — |
| | *Taraxacum kok-saghyz*-derived natural rubber B | — | — | 80 | 80 | — | — | — | — | — | — |
| | *Taraxacum kok-saghyz*-derived natural rubber C | — | — | — | — | 80 | 80 | — | — | — | — |
| | *Hevea brasiliensis*-derived natural rubber | — | — | — | — | — | — | 80 | 80 | — | — |
| | Synthetic polyisoprene rubber | — | — | — | — | — | — | — | — | 80 | 80 |
| | BR | 20 | 20 | 20 | 20 | 20 | 20 | 20 | 20 | 20 | 20 |
| | Silica A (115GR) | 25 | 25 | 25 | 25 | 25 | 25 | 25 | 25 | 25 | 25 |
| | Silane coupling agent A (Si69) | 2 | 2 | 2 | 2 | 2 | 2 | 2 | 2 | 2 | 2 |
| | Carbon black A (N339) | 30 | 30 | 30 | 30 | 30 | 30 | 30 | 30 | 30 | 30 |
| | Oil | 10 | 10 | 10 | 10 | 10 | 10 | 10 | 10 | 10 | 10 |
| | Antioxidant 1 (3C) | 1.5 | 1.5 | 1.5 | 1.5 | 1.5 | 1.5 | 1.5 | 1.5 | 1.5 | 1.5 |
| | Stearic acid | 2 | 2 | 2 | 2 | 2 | 2 | 2 | 2 | 2 | 2 |
| | Zinc oxide | — | — | — | — | — | — | — | — | — | — |
| | Particulate zinc carrier | 1.6 | 0.8 | 1.6 | 0.8 | 1.6 | 0.8 | 1.6 | 0.8 | 1.6 | 0.8 |

TABLE 4-1-continued

Heavy duty tread (Particulate zinc carrier)

|  |  | Example | | | | | | Comparative Example | | | |
|---|---|---|---|---|---|---|---|---|---|---|---|
|  |  | 1-1a | 1-1b | 1-1c | 1-1d | 1-1e | 1-1f | 1-1a | 1-1b | 1-1c | 1-1d |
|  | Wax | 1 | 1 | 1 | 1 | 1 | 1 | 1 | 1 | 1 | 1 |
|  | Amide compound (WB16) | 1 | 1 | 1 | 1 | 1 | 1 | 1 | 1 | 1 | 1 |
|  | Sulfur | 1.5 | 1.5 | 1.5 | 1.5 | 1.5 | 1.5 | 1.5 | 1.5 | 1.5 | 1.5 |
|  | Vulcanization accelerator 1 (CBS) | 2 | 2 | 2 | 2 | 2 | 2 | 2 | 2 | 2 | 2 |
|  | Vulcanization accelerator 2 (DPG) | 1 | 1 | 1 | 1 | 1 | 1 | 1 | 1 | 1 | 1 |
| Evaluation | Abrasion resistance index | 111 | 111 | 114 | 115 | 118 | 117 | 100 | 99 | 95 | 96 |
|  | Wet grip performance index | 106 | 106 | 104 | 103 | 102 | 102 | 100 | 100 | 100 | 100 |
|  | Fuel economy index | 110 | 109 | 116 | 117 | 120 | 118 | 100 | 98 | 103 | 102 |

TABLE 4-2

Heavy duty tread (High structure carbon)

|  |  | Example | | | | | | Comparative Example | | | |
|---|---|---|---|---|---|---|---|---|---|---|---|
|  |  | 1-2a | 1-2b | 1-2c | 1-2d | 1-2e | 1-2f | 1-2a | 1-2b | 1-2c | 1-2d |
| Formulation (parts by mass) | Taraxacum kok-saghyz-derived natural rubber A | 80 | 80 | — | — | — | — | — | — | — | — |
|  | Taraxacum kok-saghyz-derived natural rubber B | — | — | 80 | 80 | — | — | — | — | — | — |
|  | Taraxacum kok-saghyz-derived natural rubber C | — | — | — | — | 80 | 80 | — | — | — | — |
|  | Hevea brasiliensis-derived natural rubber | — | — | — | — | — | — | 80 | 80 | — | — |
|  | Synthetic polyisoprene rubber | — | — | — | — | — | — | — | — | 80 | 80 |
|  | BR | 20 | 20 | 20 | 20 | 20 | 20 | 20 | 20 | 20 | 20 |
|  | Silica A (115GR) | 25 | 25 | 25 | 25 | 25 | 25 | 25 | 25 | 25 | 25 |
|  | Silane coupling agent A (Si69) | 2 | 2 | 2 | 2 | 2 | 2 | 2 | 2 | 2 | 2 |
|  | Carbon black A (N339) | — | — | — | — | — | — | — | — | — | — |
|  | Carbon black B (High structure) | 30 | — | 30 | — | 30 | — | 30 | — | 30 | — |
|  | Carbon black C (High structure) | — | 30 | — | 30 | — | 30 | — | 30 | — | 30 |
|  | Oil | 10 | 10 | 10 | 10 | 10 | 10 | 10 | 10 | 10 | 10 |
|  | Antioxidant 1 (3C) | 1.5 | 1.5 | 1.5 | 1.5 | 1.5 | 1.5 | 1.5 | 1.5 | 1.5 | 1.5 |
|  | Stearic acid | 2 | 2 | 2 | 2 | 2 | 2 | 2 | 2 | 2 | 2 |
|  | Zinc oxide | 2.5 | 2.5 | 2.5 | 2.5 | 2.5 | 2.5 | 2.5 | 2.5 | 2.5 | 2.5 |
|  | Wax | 1 | 1 | 1 | 1 | 1 | 1 | 1 | 1 | 1 | 1 |
|  | Amide compound (WB16) | 1 | 1 | 1 | 1 | 1 | 1 | 1 | 1 | 1 | 1 |
|  | Sulfur | 1.5 | 1.5 | 1.5 | 1.5 | 1.5 | 1.5 | 1.5 | 1.5 | 1.5 | 1.5 |
|  | Vulcanization accelerator 1 (CBS) | 2 | 2 | 2 | 2 | 2 | 2 | 2 | 2 | 2 | 2 |
|  | Vulcanization accelerator 2 (DPG) | 1 | 1 | 1 | 1 | 1 | 1 | 1 | 1 | 1 | 1 |
| Evaluation | Abrasion resistance index | 109 | 110 | 113 | 115 | 116 | 117 | 100 | 100 | 96 | 96 |
|  | Wet grip performance index | 105 | 105 | 103 | 104 | 102 | 103 | 100 | 100 | 100 | 100 |
|  | Fuel economy index | 112 | 110 | 116 | 118 | 120 | 119 | 100 | 99 | 102 | 101 |

TABLE 4-3

Heavy duty tread (Fine particle silica)

|  |  | Example | | | | | | Comparative Example | | | |
|---|---|---|---|---|---|---|---|---|---|---|---|
|  |  | 1-3a | 1-3b | 1-3c | 1-3d | 1-3e | 1-3f | 1-3a | 1-3b | 1-3c | 1-3d |
| Formulation (parts by mass) | Taraxacum kok-saghyz-derived natural rubber A | 80 | 80 | — | — | — | — | — | — | — | — |
|  | Taraxacum kok-saghyz-derived natural rubber B | — | — | 80 | 80 | — | — | — | — | — | — |
|  | Taraxacum kok-saghyz-derived natural rubber C | — | — | — | — | 80 | 80 | — | — | — | — |
|  | Hevea brasiliensis-derived natural rubber | — | — | — | — | — | — | 80 | 80 | — | — |
|  | Synthetic polyisoprene rubber | — | — | — | — | — | — | — | — | 80 | 80 |
|  | BR | 20 | 20 | 20 | 20 | 20 | 20 | 20 | 20 | 20 | 20 |
|  | Silica A (115GR) | — | — | — | — | — | — | — | — | — | — |
|  | Silica B (VN3) | 25 | — | 25 | — | 25 | — | 25 | — | 25 | — |
|  | Silica C (9100GR) | — | 25 | — | 25 | — | 25 | — | 25 | — | 25 |
|  | Silane coupling agent A (Si69) | 2 | 2 | 2 | 2 | 2 | 2 | 2 | 2 | 2 | 2 |
|  | Carbon black A (N339) | 30 | 30 | 30 | 30 | 30 | 30 | 30 | 30 | 30 | 30 |
|  | Oil | 10 | 10 | 10 | 10 | 10 | 10 | 10 | 10 | 10 | 10 |
|  | Antioxidant 1 (3C) | 1.5 | 1.5 | 1.5 | 1.5 | 1.5 | 1.5 | 1.5 | 1.5 | 1.5 | 1.5 |
|  | Stearic acid | 2 | 2 | 2 | 2 | 2 | 2 | 2 | 2 | 2 | 2 |
|  | Zinc oxide | 2.5 | 2.5 | 2.5 | 2.5 | 2.5 | 2.5 | 2.5 | 2.5 | 2.5 | 2.5 |
|  | Wax | 1 | 1 | 1 | 1 | 1 | 1 | 1 | 1 | 1 | 1 |
|  | Amide compound (WB16) | 1 | 1 | 1 | 1 | 1 | 1 | 1 | 1 | 1 | 1 |
|  | Sulfur | 1.5 | 1.5 | 1.5 | 1.5 | 1.5 | 1.5 | 1.5 | 1.5 | 1.5 | 1.5 |
|  | Vulcanization accelerator 1 (CBS) | 2 | 2 | 2 | 2 | 2 | 2 | 2 | 2 | 2 | 2 |
|  | Vulcanization accelerator 2 (DPG) | 1 | 1 | 1 | 1 | 1 | 1 | 1 | 1 | 1 | 1 |

TABLE 4-3-continued

Heavy duty tread (Fine particle silica)

|  |  | Example | | | | | | Comparative Example | | | |
|---|---|---|---|---|---|---|---|---|---|---|---|
|  |  | 1-3a | 1-3b | 1-3c | 1-3d | 1-3e | 1-3f | 1-3a | 1-3b | 1-3c | 1-3d |
| Evaluation | Abrasion resistance index | 108 | 109 | 109 | 109 | 112 | 111 | 100 | 100 | 96 | 97 |
|  | Wet grip performance index | 106 | 107 | 104 | 106 | 105 | 106 | 100 | 100 | 100 | 100 |
|  | Fuel economy index | 108 | 110 | 115 | 116 | 118 | 118 | 100 | 98 | 100 | 100 |

TABLE 4-4

Heavy duty tread (Resin)

|  |  | Example | | | | | | | Comparative Example | | | | | |
|---|---|---|---|---|---|---|---|---|---|---|---|---|---|---|
|  |  | 1-4a | 1-4b | 1-4c | 1-4d | 1-4e | 1-4f | 1-4g | 1-4a | 1-4b | 1-4c | 1-4d | 1-4e | 1-4f |
| Formulation (parts by mass) | *Taraxacum kok-saghyz*-derived natural rubber A | 80 | 80 | 80 | 80 | 80 | — | — | — | — | — | — | — | — |
|  | *Taraxacum kok-saghyz*-derived natural rubber B | — | — | — | — | — | 80 | — | — | — | — | — | — | — |
|  | *Taraxacum kok-saghyz*-derived natural rubber C | — | — | — | — | — | — | 80 | — | — | — | — | — | — |
|  | *Hevea brasiliensis*-derived natural rubber | — | — | — | — | — | — | — | 80 | 80 | 80 | 80 | 80 | — |
|  | Synthetic polyisoprene rubber | — | — | — | — | — | — | — | — | — | — | — | — | 80 |
|  | BR | 20 | 20 | 20 | 20 | 20 | 20 | 20 | 20 | 20 | 20 | 20 | 20 | 20 |
|  | Silica A (115GR) | 25 | 25 | 25 | 25 | 25 | 25 | 25 | 25 | 25 | 25 | 25 | 25 | 25 |
|  | Silane coupling agent A (Si69) | 2 | 2 | 2 | 2 | 2 | 2 | 2 | 2 | 2 | 2 | 2 | 2 | 2 |
|  | Carbon black A (N339) | 30 | 30 | 30 | 30 | 30 | 30 | 30 | 30 | 30 | 30 | 30 | 30 | 30 |
|  | Resin A (Terpene) | 5 | — | — | — | — | 5 | 5 | 5 | — | — | — | — | 5 |
|  | Resin B (Terpenephenol) | — | 5 | — | — | — | — | — | — | 5 | — | — | — | — |
|  | Resin C (DCPD) | — | — | 5 | — | — | — | — | — | — | 5 | — | — | — |
|  | Resin D (Rosin) | — | — | — | 5 | — | — | — | — | — | — | 5 | — | — |
|  | Resin E (α-methylstyrene) | — | — | — | — | 5 | — | — | — | — | — | — | 5 | — |
|  | Oil | 10 | 10 | 10 | 10 | 10 | 10 | 10 | 10 | 10 | 10 | 10 | 10 | 10 |
|  | Antioxidant 1 (3C) | 1.5 | 1.5 | 1.5 | 1.5 | 1.5 | 1.5 | 1.5 | 1.5 | 1.5 | 1.5 | 1.5 | 1.5 | 1.5 |
|  | Stearic acid | 2 | 2 | 2 | 2 | 2 | 2 | 2 | 2 | 2 | 2 | 2 | 2 | 2 |
|  | Zinc oxide | 2.5 | 2.5 | 2.5 | 2.5 | 2.5 | 2.5 | 2.5 | 2.5 | 2.5 | 2.5 | 2.5 | 2.5 | 2.5 |
|  | Wax | 1 | 1 | 1 | 1 | 1 | 1 | 1 | 1 | 1 | 1 | 1 | 1 | 1 |
|  | Amide compound (WB16) | 1 | 1 | 1 | 1 | 1 | 1 | 1 | 1 | 1 | 1 | 1 | 1 | 1 |
|  | Sulfur | 1.5 | 1.5 | 1.5 | 1.5 | 1.5 | 1.5 | 1.5 | 1.5 | 1.5 | 1.5 | 1.5 | 1.5 | 1.5 |
|  | Vulcanization accelerator 1 (CBS) | 2 | 2 | 2 | 2 | 2 | 2 | 2 | 2 | 2 | 2 | 2 | 2 | 2 |
|  | Vulcanization accelerator 2 (DPG) | 1 | 1 | 1 | 1 | 1 | 1 | 1 | 1 | 1 | 1 | 1 | 1 | 1 |
| Evaluation | Abrasion resistance index | 109 | 107 | 106 | 106 | 106 | 110 | 111 | 100 | 100 | 99 | 98 | 98 | 96 |
|  | Wet grip performance index | 107 | 107 | 106 | 106 | 105 | 110 | 110 | 100 | 101 | 101 | 99 | 99 | 99 |
|  | Fuel economy index | 112 | 111 | 110 | 108 | 108 | 115 | 118 | 100 | 98 | 97 | 96 | 97 | 96 |

TABLE 4-5

Heavy duty tread (Modified conjugated diene polymer)

|  |  | Example | | | Comparative Example | |
|---|---|---|---|---|---|---|
|  |  | 1-5a | 1-5b | 1-5c | 1-5a | 1-5b |
| Formulation (parts by mass) | *Taraxacum kok-saghyz*-derived natural rubber A | 80 | — | — | — | — |
|  | *Taraxacum kok-saghyz*-derived natural rubber B | — | 80 | — | — | — |
|  | *Taraxacum kok-saghyz*-derived natural rubber C | — | — | 80 | — | — |
|  | *Hevea brasiliensis*-derived natural rubber | — | — | — | 80 | — |
|  | Synthetic polyisoprene rubber | — | — | — | — | 80 |
|  | Modified conjugated diene polymer | 20 | 20 | 20 | 20 | 20 |
|  | BR | — | — | — | — | — |
|  | Silica A (115GR) | 25 | 25 | 25 | 25 | 25 |
|  | Silane coupling agent A (Si69) | 2 | 2 | 2 | 2 | 2 |
|  | Carbon black A (N339) | 30 | 30 | 30 | 30 | 30 |
|  | Oil | 10 | 10 | 10 | 10 | 10 |
|  | Antioxidant 1 (3C) | 1.5 | 1.5 | 1.5 | 1.5 | 1.5 |
|  | Stearic acid | 2 | 2 | 2 | 2 | 2 |
|  | Zinc oxide | 2.5 | 2.5 | 2.5 | 2.5 | 2.5 |
|  | Wax | 1 | 1 | 1 | 1 | 1 |
|  | Amide compound (WB16) | 1 | 1 | 1 | 1 | 1 |
|  | Sulfur | 1.5 | 1.5 | 1.5 | 1.5 | 1.5 |
|  | Vulcanization accelerator 1 (CBS) | 2 | 2 | 2 | 2 | 2 |
|  | Vulcanization accelerator 2 (DPG) | 1 | 1 | 1 | 1 | 1 |
| Evaluation | Abrasion resistance index | 111 | 118 | 120 | 100 | 98 |
|  | Wet grip performance index | 112 | 117 | 119 | 100 | 101 |
|  | Fuel economy index | 109 | 118 | 116 | 100 | 100 |

TABLE 4-6

Heavy duty tread (Tetrazine compound)

|  |  | Example | | | | | | Comparative Example | | | |
|---|---|---|---|---|---|---|---|---|---|---|---|
|  |  | 1-6a | 1-6b | 1-6c | 1-6d | 1-6e | 1-6f | 1-6a | 1-6b | 1-6c | 1-6d |
| Formulation (parts by mass) | *Taraxacum kok-saghyz*-derived natural rubber A | 80 | 80 | — | — | — | — | — | — | — | — |
|  | *Taraxacum kok-saghyz*-derived natural rubber B | — | — | 80 | 80 | — | — | — | — | — | — |
|  | *Taraxacum kok-saghyz*-derived natural rubber C | — | — | — | — | 80 | 80 | — | — | — | — |
|  | *Hevea brasiliensis*-derived natural rubber | — | — | — | — | — | — | 80 | 80 | — | — |
|  | Synthetic polyisoprene rubber | — | — | — | — | — | — | — | — | 80 | 80 |
|  | BR | 20 | 20 | 20 | 20 | 20 | 20 | 20 | 20 | 20 | 20 |
|  | Silica A (115GR) | 25 | 25 | 25 | 25 | 25 | 25 | 25 | 25 | 25 | 25 |
|  | Silane coupling agent A (Si69) | 2 | 2 | 2 | 2 | 2 | 2 | 2 | 2 | 2 | 2 |
|  | Carbon black A (N339) | 30 | 30 | 30 | 30 | 30 | 30 | 30 | 30 | 30 | 30 |
|  | Oil | 10 | 10 | 10 | 10 | 10 | 10 | 10 | 10 | 10 | 10 |
|  | Antioxidant 1 (3C) | 1.5 | 1.5 | 1.5 | 1.5 | 1.5 | 1.5 | 1.5 | 1.5 | 1.5 | 1.5 |
|  | Stearic acid | 2 | 2 | 2 | 2 | 2 | 2 | 2 | 2 | 2 | 2 |
|  | Zinc oxide | 2.5 | 2.5 | 2.5 | 2.5 | 2.5 | 2.5 | 2.5 | 2.5 | 2.5 | 2.5 |
|  | Wax | 1 | 1 | 1 | 1 | 1 | 1 | 1 | 1 | 1 | 1 |
|  | Amide compound (WB16) | 1 | 1 | 1 | 1 | 1 | 1 | 1 | 1 | 1 | 1 |
|  | Sulfur | 1.5 | 1.5 | 1.5 | 1.5 | 1.5 | 1.5 | 1.5 | 1.5 | 1.5 | 1.5 |
|  | Vulcanization accelerator 1 (CBS) | 2 | 2 | 2 | 2 | 2 | 2 | 2 | 2 | 2 | 2 |
|  | Vulcanization accelerator 2 (DPG) | 1 | 1 | 1 | 1 | 1 | 1 | 1 | 1 | 1 | 1 |
|  | Tetrazine compound A | 2 | — | 2 | — | 2 | — | 2 | — | 2 | — |
|  | Tetrazine compound B | — | 2 | — | 2 | — | 2 | — | 2 | — | 2 |
| Evaluation | Abrasion resistance index | 110 | 111 | 113 | 114 | 116 | 117 | 100 | 100 | 96 | 97 |
|  | Wet grip performance index | 104 | 105 | 104 | 104 | 102 | 103 | 100 | 100 | 100 | 100 |
|  | Fuel economy index | 109 | 109 | 112 | 114 | 115 | 115 | 100 | 100 | 102 | 102 |

TABLE 4-7

Heavy duty tread (Mercapto silane coupling agent)

|  |  | Example | | | | | | Comparative Example | | | |
|---|---|---|---|---|---|---|---|---|---|---|---|
|  |  | 1-7a | 1-7b | 1-7c | 1-7d | 1-7e | 1-7f | 1-7a | 1-7b | 1-7c | 1-7d |
| Formulation (parts by mass) | *Taraxacum kok-saghyz*-derived natural rubber A | 80 | 80 | — | — | — | — | — | — | — | — |
|  | *Taraxacum kok-saghyz*-derived natural rubber B | — | — | 80 | 80 | — | — | — | — | — | — |
|  | *Taraxacum kok-saghyz*-derived natural rubber C | — | — | — | — | 80 | 80 | — | — | — | — |
|  | *Hevea brasiliensis*-derived natural rubber | — | — | — | — | — | — | 80 | 80 | — | — |
|  | Synthetic polyisoprene rubber | — | — | — | — | — | — | — | — | 80 | 80 |
|  | BR | 20 | 20 | 20 | 20 | 20 | 20 | 20 | 20 | 20 | 20 |
|  | Silica A (115GR) | 25 | 25 | 25 | 25 | 25 | 25 | 25 | 25 | 25 | 25 |
|  | Silane coupling agent A (Si69) | — | — | — | — | — | — | — | — | — | — |
|  | Silane coupling agent B (NXT) | 2 | — | 2 | — | 2 | — | 2 | — | 2 | — |
|  | Silane coupling agent C (NXT-Z45) | — | 1 | — | 1 | — | 1 | — | 1 | — | 1 |
|  | Carbon black A (N339) | 30 | 30 | 30 | 30 | 30 | 30 | 30 | 30 | 30 | 30 |
|  | Oil | 10 | 10 | 10 | 10 | 10 | 10 | 10 | 10 | 10 | 10 |
|  | Antioxidant 1 (3C) | 1.5 | 1.5 | 1.5 | 1.5 | 1.5 | 1.5 | 1.5 | 1.5 | 1.5 | 1.5 |
|  | Stearic acid | 2 | 2 | 2 | 2 | 2 | 2 | 2 | 2 | 2 | 2 |
|  | Zinc oxide | 2.5 | 2.5 | 2.5 | 2.5 | 2.5 | 2.5 | 2.5 | 2.5 | 2.5 | 2.5 |
|  | Wax | 1 | 1 | 1 | 1 | 1 | 1 | 1 | 1 | 1 | 1 |
|  | Amide compound (WB16) | 1 | 1 | 1 | 1 | 1 | 1 | 1 | 1 | 1 | 1 |
|  | Sulfur | 1.5 | 1.5 | 1.5 | 1.5 | 1.5 | 1.5 | 1.5 | 1.5 | 1.5 | 1.5 |
|  | Vulcanization accelerator 1 (CBS) | 2 | 2 | 2 | 2 | 2 | 2 | 2 | 2 | 2 | 2 |
|  | Vulcanization accelerator 2 (DPG) | 1 | 1 | 1 | 1 | 1 | 1 | 1 | 1 | 1 | 1 |
| Evaluation | Abrasion resistance index | 111 | 111 | 114 | 115 | 116 | 116 | 100 | 99 | 95 | 96 |
|  | Wet grip performance index | 105 | 106 | 103 | 103 | 101 | 102 | 100 | 100 | 100 | 100 |
|  | Fuel economy index | 108 | 109 | 112 | 114 | 118 | 119 | 100 | 100 | 101 | 101 |

TABLE 4-8

Heavy duty tread (Farnesene resin)

|  |  | Example | | | | | | | | | Comparative Example | | | | | |
|---|---|---|---|---|---|---|---|---|---|---|---|---|---|---|---|---|
|  |  | 1-8a | 1-8b | 1-8c | 1-8d | 1-8e | 1-8f | 1-8g | 1-8h | 1-8i | 1-8a | 1-8b | 1-8c | 1-8d | 1-8e | 1-8f |
| Formulation (parts by mass) | *Taraxacum kok-saghyz*-derived natural rubber A | 80 | 80 | 80 | — | — | — | — | — | — | — | — | — | — | — | — |
|  | *Taraxacum kok-saghyz*-derived natural rubber B | — | — | — | 80 | 80 | 80 | — | — | — | — | — | — | — | — | — |
|  | *Taraxacum kok-saghyz*-derived natural rubber C | — | — | — | — | — | — | 80 | 80 | 80 | — | — | — | — | — | — |

TABLE 4-8-continued

Heavy duty tread (Farnesene resin)

|  | Example |  |  |  |  |  |  |  |  | Comparative Example |  |  |  |  |  |
|---|---|---|---|---|---|---|---|---|---|---|---|---|---|---|---|
|  | 1-8a | 1-8b | 1-8c | 1-8d | 1-8e | 1-8f | 1-8g | 1-8h | 1-8i | 1-8a | 1-8b | 1-8c | 1-8d | 1-8e | 1-8f |
| *Hevea brasiliensis*-derived natural rubber | — | — | — | — | — | — | — | — | — | 80 | 80 | 80 | — | — | — |
| Synthetic polyisoprene rubber | — | — | — | — | — | — | — | — | — | — | — | — | 80 | 80 | 80 |
| BR | 20 | 20 | 20 | 20 | 20 | 20 | 20 | 20 | 20 | 20 | 20 | 20 | 20 | 20 | 20 |
| Silica A (115GR) | 25 | 25 | 25 | 25 | 25 | 25 | 25 | 25 | 25 | 25 | 25 | 25 | 25 | 25 | 25 |
| Silane coupling agent A (Si69) | 2 | 2 | 2 | 2 | 2 | 2 | 2 | 2 | 2 | 2 | 2 | 2 | 2 | 2 | 2 |
| Carbon black A (N339) | 30 | 30 | 30 | 30 | 30 | 30 | 30 | 30 | 30 | 30 | 30 | 30 | 30 | 30 | 30 |
| Oil | — | — | — | — | — | — | — | — | — | — | — | — | — | — | — |
| Farnesene resin A (KB-101) | 10 | — | — | 10 | — | — | 10 | — | — | 10 | — | — | 10 | — | — |
| Farnesene resin B (FSR-221) | — | 10 | — | — | 10 | — | — | 10 | — | — | 10 | — | — | 10 | — |
| Farnesene resin C (FBR-746) | — | — | 10 | — | — | 10 | — | — | 10 | — | — | 10 | — | — | 10 |
| Antioxidant 1 (3C) | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| Stearic acid | 2 | 2 | 2 | 2 | 2 | 2 | 2 | 2 | 2 | 2 | 2 | 2 | 2 | 2 | 2 |
| Zinc oxide | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 |
| Wax | 1 | 1 | 1 | 1 | 1 | 1 | 1 | 1 | 1 | 1 | 1 | 1 | 1 | 1 | 1 |
| Amide compound (WB16) | 1 | 1 | 1 | 1 | 1 | 1 | 1 | 1 | 1 | 1 | 1 | 1 | 1 | 1 | 1 |
| Sulfur | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| Vulcanization accelerator 1 (CBS) | 2 | 2 | 2 | 2 | 2 | 2 | 2 | 2 | 2 | 2 | 2 | 2 | 2 | 2 | 2 |
| Vulcanization accelerator 2 (DPG) | 1 | 1 | 1 | 1 | 1 | 1 | 1 | 1 | 1 | 1 | 1 | 1 | 1 | 1 | 1 |
| Evaluation Abrasion resistance index | 107 | 107 | 106 | 108 | 108 | 109 | 115 | 116 | 116 | 100 | 101 | 100 | 96 | 97 | 96 |
| Wet grip performance index | 106 | 106 | 107 | 106 | 106 | 108 | 105 | 105 | 105 | 100 | 100 | 99 | 101 | 102 | 100 |
| Fuel economy index | 106 | 107 | 106 | 112 | 112 | 114 | 110 | 109 | 110 | 100 | 90 | 91 | 96 | 92 | 95 |

The above tables demonstrate that the overall performance in terms of fuel economy, abrasion resistance, and wet grip performance was significantly improved in the examples using a combination of a natural rubber derived from *Taraxacum kok-saghyz* specified in the present application and carbon black at a predetermined ratio.

Examples and Comparative Examples

[All-Season Tires]

According to each of the formulations shown in Tables 5-1 to 5-10, the chemicals other than the sulfur and vulcanization accelerators were kneaded using a 1.7 L Banbury mixer. Then, to the kneaded mixture were added the sulfur and vulcanization accelerators, followed by kneading using a roll mill to give an unvulcanized rubber composition.

The unvulcanized rubber composition was formed into a 2.1 mm-thick sheet and vulcanized for 30 minutes at 150° C. to obtain a 2 mm-thick vulcanized rubber composition.

Separately, the unvulcanized rubber composition prepared as above was formed into the shape of a cap tread and assembled with other tire components on a tire building machine to build an unvulcanized tire. The unvulcanized tire was vulcanized at 150° C. for 30 minutes to prepare a test tire (all-season tire).

The vulcanized rubber compositions (vulcanized rubber sheets) and test tires prepared as above were evaluated as follows. The results are shown in Table 5-1 to Table 5-10, where Comparative Example 2-1a to Comparative Example 2-10a, respectively, are used as standards of comparison (index=100).

<Abrasion Resistance>

Each set of test tires was mounted on a front-engine, front-wheel-drive car made in Japan. After running 8000 km, the groove depth in the tire tread portion was measured. The distance at which the tire groove depth decreased by 1 mm was calculated and expressed as an index using the equation below. A higher index indicates better abrasion resistance.

(Abrasion resistance index)=(Distance at which tire groove depth of each formulation example decreased by 1 mm)/(Distance at which tire groove depth of standard comparative example decreased by 1 mm)×100

<Wet Grip Performance>

The test tires of each formulation example were mounted on each wheel of a vehicle (front-engine, front-wheel-drive car of 2000 cc displacement made in Japan), and the braking distance from an initial speed of 100 km/h on a wet asphalt road was determined. The results are expressed as an index. A higher index indicates better wet grip performance. The index was calculated using the following equation.

(Wet grip performance index)=(Braking distance of standard comparative example)/(Braking distance of each formulation example)×100

<Fuel Economy>

The rolling resistance of each test tire was measured using a rolling resistance tester by running the test tire mounted on a 15×6JJ rim at an internal pressure of 230 kPa, a load of 3.43 kN, and a speed of 80 km/h and expressed as an index relative to the standard comparative example taken as 100. A higher index indicates better performance (fuel economy).

TABLE 5-1

All season tread (Particulate zinc carrier)

| | | Example | | | | | | Comparative Example | | | |
|---|---|---|---|---|---|---|---|---|---|---|---|
| | | 2-1a | 2-1b | 2-1c | 2-1d | 2-1e | 2-1f | 2-1a | 2-1b | 2-1c | 2-1d |
| Formulation (parts by mass) | Taraxacum kok-saghyz-derived natural rubber A | 25 | 25 | — | — | — | — | — | — | — | — |
| | Taraxacum kok-saghyz-derived natural rubber B | — | — | 25 | 25 | — | — | — | — | — | — |
| | Taraxacum kok-saghyz-derived natural rubber C | — | — | — | — | 25 | 25 | — | — | — | — |
| | Hevea brasiliensis-derived natural rubber | — | — | — | — | — | — | 25 | 25 | — | — |
| | Synthetic polyisoprene rubber | — | — | — | — | — | — | — | — | 25 | 25 |
| | SBR1 (SBR1502) | 45 | 45 | 45 | 45 | 45 | 45 | 45 | 45 | 45 | 45 |
| | BR | 30 | 30 | 30 | 30 | 30 | 30 | 30 | 30 | 30 | 30 |
| | Silica A (115GR) | 75 | 75 | 75 | 75 | 75 | 75 | 75 | 75 | 75 | 75 |
| | Silane coupling agent A (Si69) | 6 | 6 | 6 | 6 | 6 | 6 | 6 | 6 | 6 | 6 |
| | Carbon black A (N339) | 5 | 5 | 5 | 5 | 5 | 5 | 5 | 5 | 5 | 5 |
| | Oil | 20 | 20 | 20 | 20 | 20 | 20 | 20 | 20 | 20 | 20 |
| | Antioxidant 1 (3C) | 1.5 | 1.5 | 1.5 | 1.5 | 1.5 | 1.5 | 1.5 | 1.5 | 1.5 | 1.5 |
| | Stearic acid | 2 | 2 | 2 | 2 | 2 | 2 | 2 | 2 | 2 | 2 |
| | Zinc oxide | — | — | — | — | — | — | — | — | — | — |
| | Particulate zinc carrier | 1.6 | 0.8 | 1.6 | 0.8 | 1.6 | 0.8 | 1.6 | 0.8 | 1.6 | 0.8 |
| | Wax | 1 | 1 | 1 | 1 | 1 | 1 | 1 | 1 | 1 | 1 |
| | Amide compound (WB16) | 1 | 1 | 1 | 1 | 1 | 1 | 1 | 1 | 1 | 1 |
| | Sulfur | 2 | 2 | 2 | 2 | 2 | 2 | 2 | 2 | 2 | 2 |
| | Vulcanization accelerator 1 (CBS) | 1.8 | 1.8 | 1.8 | 1.8 | 1.8 | 1.8 | 1.8 | 1.8 | 1.8 | 1.8 |
| | Vulcanization accelerator 2 (DPG) | 1.2 | 1.2 | 1.2 | 1.2 | 1.2 | 1.2 | 1.2 | 1.2 | 1.2 | 1.2 |
| Evaluation | Abrasion resistance index | 111 | 112 | 114 | 116 | 117 | 117 | 100 | 99 | 90 | 94 |
| | Wet grip performance index | 107 | 107 | 104 | 103 | 102 | 102 | 100 | 100 | 100 | 100 |
| | Fuel economy index | 110 | 109 | 114 | 115 | 115 | 116 | 100 | 98 | 102 | 103 |

TABLE 5-2

All season tread (High structure carbon)

| | | Example | | | | | | Comparative Example | | | |
|---|---|---|---|---|---|---|---|---|---|---|---|
| | | 2-2a | 2-2b | 2-2c | 2-2d | 2-2e | 2-2f | 2-2a | 2-2b | 2-2c | 2-2d |
| Formulation (parts by mass) | Taraxacum kok-saghyz-derived natural rubber A | 25 | 25 | — | — | — | — | — | — | — | — |
| | Taraxacum kok-saghyz-derived natural rubber B | — | — | 25 | 25 | — | — | — | — | — | — |
| | Taraxacum kok-saghyz-derived natural rubber C | — | — | — | — | 25 | 25 | — | — | — | — |
| | Hevea brasiliensis-derived natural rubber | — | — | — | — | — | — | 25 | 25 | — | — |
| | Synthetic polyisoprene rubber | — | — | — | — | — | — | — | — | 25 | 25 |
| | SBR1 (SBR1502) | 45 | 45 | 45 | 45 | 45 | 45 | 45 | 45 | 45 | 45 |
| | BR | 30 | 30 | 30 | 30 | 30 | 30 | 30 | 30 | 30 | 30 |
| | Silica A (115GR) | 75 | 75 | 75 | 75 | 75 | 75 | 75 | 75 | 75 | 75 |
| | Silane coupling agent A (Si69) | 6 | 6 | 6 | 6 | 6 | 6 | 6 | 6 | 6 | 6 |
| | Carbon black A (N339) | — | — | — | — | — | — | — | — | — | — |
| | Carbon black B (High structure) | 30 | — | 30 | — | 30 | — | 30 | — | 30 | — |
| | Carbon black C (High structure) | — | 30 | — | 30 | — | 30 | — | 30 | — | 30 |
| | Oil | 20 | 20 | 20 | 20 | 20 | 20 | 20 | 20 | 20 | 20 |
| | Antioxidant 1 (3C) | 1.5 | 1.5 | 1.5 | 1.5 | 1.5 | 1.5 | 1.5 | 1.5 | 1.5 | 1.5 |
| | Stearic acid | 2 | 2 | 2 | 2 | 2 | 2 | 2 | 2 | 2 | 2 |
| | Zinc oxide | 2.5 | 2.5 | 2.5 | 2.5 | 2.5 | 2.5 | 2.5 | 2.5 | 2.5 | 2.5 |
| | Wax | 1 | 1 | 1 | 1 | 1 | 1 | 1 | 1 | 1 | 1 |
| | Amide compound (WB16) | 1 | 1 | 1 | 1 | 1 | 1 | 1 | 1 | 1 | 1 |
| | Sulfur | 2 | 2 | 2 | 2 | 2 | 2 | 2 | 2 | 2 | 2 |
| | Vulcanization accelerator 1 (CBS) | 1.8 | 1.8 | 1.8 | 1.8 | 1.8 | 1.8 | 1.8 | 1.8 | 1.8 | 1.8 |
| | Vulcanization accelerator 2 (DPG) | 1.2 | 1.2 | 1.2 | 1.2 | 1.2 | 1.2 | 1.2 | 1.2 | 1.2 | 1.2 |
| Evaluation | Abrasion resistance index | 109 | 110 | 113 | 115 | 116 | 117 | 100 | 99 | 95 | 94 |
| | Wet grip performance index | 105 | 106 | 103 | 104 | 102 | 103 | 100 | 100 | 100 | 100 |
| | Fuel economy index | 111 | 109 | 115 | 117 | 118 | 117 | 100 | 99 | 96 | 98 |

TABLE 5-3

All season tread (Fine particle silica)

| | | Example | | | | | | Comparative Example | | | |
|---|---|---|---|---|---|---|---|---|---|---|---|
| | | 2-3a | 2-3b | 2-3c | 2-3d | 2-3e | 2-3f | 2-3a | 2-3b | 2-3c | 2-3d |
| Formulation (parts by mass) | *Taraxacum kok-saghyz*-derived natural rubber A | 25 | 25 | — | — | — | — | — | — | — | — |
| | *Taraxacum kok-saghyz*-derived natural rubber B | — | — | 25 | 25 | — | — | — | — | — | — |
| | *Taraxacum kok-saghyz*-derived natural rubber C | — | — | — | — | 25 | 25 | — | — | — | — |
| | *Hevea brasiliensis*-derived natural rubber | — | — | — | — | — | — | 25 | 25 | — | — |
| | Synthetic polyisoprene rubber | — | — | — | — | — | — | — | — | 25 | 25 |
| | SBR1 (SBR1502) | 45 | 45 | 45 | 45 | 45 | 45 | 45 | 45 | 45 | 45 |
| | BR | 30 | 30 | 30 | 30 | 30 | 30 | 30 | 30 | 30 | 30 |
| | Silica A (115GR) | — | — | — | — | — | — | — | — | — | — |
| | Silica B (VN3) | 75 | — | 75 | — | 75 | — | 75 | — | 75 | — |
| | Silica C (9100GR) | — | 75 | — | 75 | — | 75 | — | 75 | — | 75 |
| | Silane coupling agent A (Si69) | 6 | 6 | 6 | 6 | 6 | 6 | 6 | 6 | 6 | 6 |
| | Carbon black A (N339) | 5 | 5 | 5 | 5 | 5 | 5 | 5 | 5 | 5 | 5 |
| | Oil | 20 | 20 | 20 | 20 | 20 | 20 | 20 | 20 | 20 | 20 |
| | Antioxidant 1 (3C) | 1.5 | 1.5 | 1.5 | 1.5 | 1.5 | 1.5 | 1.5 | 1.5 | 1.5 | 1.5 |
| | Stearic acid | 2 | 2 | 2 | 2 | 2 | 2 | 2 | 2 | 2 | 2 |
| | Zinc oxide | 2.5 | 2.5 | 2.5 | 2.5 | 2.5 | 2.5 | 2.5 | 2.5 | 2.5 | 2.5 |
| | Wax | 1 | 1 | 1 | 1 | 1 | 1 | 1 | 1 | 1 | 1 |
| | Amide compound (WB16) | 1 | 1 | 1 | 1 | 1 | 1 | 1 | 1 | 1 | 1 |
| | Sulfur | 2 | 2 | 2 | 2 | 2 | 2 | 2 | 2 | 2 | 2 |
| | Vulcanization accelerator 1 (CBS) | 1.8 | 1.8 | 1.8 | 1.8 | 1.8 | 1.8 | 1.8 | 1.8 | 1.8 | 1.8 |
| | Vulcanization accelerator 2 (DPG) | 1.2 | 1.2 | 1.2 | 1.2 | 1.2 | 1.2 | 1.2 | 1.2 | 1.2 | 1.2 |
| Evaluation | Abrasion resistance index | 108 | 110 | 109 | 110 | 112 | 113 | 100 | 98 | 92 | 95 |
| | Wet grip performance index | 106 | 107 | 104 | 106 | 104 | 106 | 100 | 100 | 101 | 101 |
| | Fuel economy index | 109 | 110 | 113 | 114 | 115 | 114 | 100 | 98 | 100 | 99 |

TABLE 5-4

All season tread (High silica)

| | | Example | | | | | | Comparative Example | | | |
|---|---|---|---|---|---|---|---|---|---|---|---|
| | | 2-4a | 2-4b | 2-4c | 2-4d | 2-4e | 2-4f | 2-4a | 2-4b | 2-4c | 2-4d |
| Formulation (parts by mass) | *Taraxacum kok-saghyz*-derived natural rubber A | 25 | 25 | — | — | — | — | — | — | — | — |
| | *Taraxacum kok-saghyz*-derived natural rubber B | — | — | 25 | 25 | — | — | — | — | — | — |
| | *Taraxacum kok-saghyz*-derived natural rubber C | — | — | — | — | 25 | 25 | — | — | — | — |
| | *Hevea brasiliensis*-derived natural rubber | — | — | — | — | — | — | 25 | 25 | — | — |
| | Synthetic polyisoprene rubber | — | — | — | — | — | — | — | — | 25 | 25 |
| | SBR1 (SBR1502) | 45 | 45 | 45 | 45 | 45 | 45 | 45 | 45 | 45 | 45 |
| | BR | 30 | 30 | 30 | 30 | 30 | 30 | 30 | 30 | 30 | 30 |
| | Silica A (115GR) | 160 | 130 | 160 | 130 | 160 | 130 | 160 | 130 | 160 | 130 |
| | Silane coupling agent A (Si69) | 12.8 | 10.4 | 12.8 | 10.4 | 12.8 | 10.4 | 12.8 | 10.4 | 12.8 | 10.4 |
| | Carbon black A (N339) | 5 | 5 | 5 | 5 | 5 | 5 | 5 | 5 | 5 | 5 |
| | Oil | 20 | 20 | 20 | 20 | 20 | 20 | 20 | 20 | 20 | 20 |
| | Antioxidant 1 (3C) | 1.5 | 1.5 | 1.5 | 1.5 | 1.5 | 1.5 | 1.5 | 1.5 | 1.5 | 1.5 |
| | Stearic acid | 2 | 2 | 2 | 2 | 2 | 2 | 2 | 2 | 2 | 2 |
| | Zinc oxide | 2.5 | 2.5 | 2.5 | 2.5 | 2.5 | 2.5 | 2.5 | 2.5 | 2.5 | 2.5 |
| | Wax | 1 | 1 | 1 | 1 | 1 | 1 | 1 | 1 | 1 | 1 |
| | Amide compound (WB16) | 1 | 1 | 1 | 1 | 1 | 1 | 1 | 1 | 1 | 1 |
| | Sulfur | 2 | 2 | 2 | 2 | 2 | 2 | 2 | 2 | 2 | 2 |
| | Vulcanization accelerator 1 (CBS) | 1.8 | 1.8 | 1.8 | 1.8 | 1.8 | 1.8 | 1.8 | 1.8 | 1.8 | 1.8 |
| | Vulcanization accelerator 2 (DPG) | 1.2 | 1.2 | 1.2 | 1.2 | 1.2 | 1.2 | 1.2 | 1.2 | 1.2 | 1.2 |
| Evaluation | Abrasion resistance index | 109 | 110 | 109 | 108 | 111 | 110 | 100 | 99 | 92 | 91 |
| | Wet grip performance index | 110 | 109 | 109 | 109 | 109 | 108 | 100 | 101 | 105 | 105 |
| | Fuel economy index | 110 | 109 | 110 | 109 | 112 | 111 | 100 | 98 | 94 | 95 |

TABLE 5-5

| | | All season tread (High oil) | | | | | | | | | |
|---|---|---|---|---|---|---|---|---|---|---|---|
| | | Example | | | | | | Comparative Example | | | |
| | | 2-5a | 2-5b | 2-5c | 2-5d | 2-5e | 2-5f | 2-5a | 2-5b | 2-5c | 2-5d |
| Formulation (parts by mass) | *Taraxacum kok-saghyz*-derived natural rubber A | 25 | 25 | — | — | — | — | — | — | — | — |
| | *Taraxacum kok-saghyz*-derived natural rubber B | — | — | 25 | 25 | — | — | — | — | — | — |
| | *Taraxacum kok-saghyz*-derived natural rubber C | — | — | — | — | 25 | 25 | — | — | — | — |
| | *Hevea brasiliensis*-derived natural rubber | — | — | — | — | — | — | 25 | 25 | — | — |
| | Synthetic polyisoprene rubber | — | — | — | — | — | — | — | — | 25 | 25 |
| | SBR1 (SBR1502) | 45 | 45 | 45 | 45 | 45 | 45 | 45 | 45 | 45 | 45 |
| | BR | 30 | 30 | 30 | 30 | 30 | 30 | 30 | 30 | 30 | 30 |
| | Silica A (115GR) | 75 | 75 | 75 | 75 | 75 | 75 | 75 | 75 | 75 | 75 |
| | Silane coupling agent A (Si69) | 6 | 6 | 6 | 6 | 6 | 6 | 6 | 6 | 6 | 6 |
| | Carbon black A (N339) | 5 | 5 | 5 | 5 | 5 | 5 | 5 | 5 | 5 | 5 |
| | Oil | 60 | 80 | 60 | 80 | 60 | 80 | 60 | 80 | 60 | 80 |
| | Antioxidant 1 (3C) | 1.5 | 1.5 | 1.5 | 1.5 | 1.5 | 1.5 | 1.5 | 1.5 | 1.5 | 1.5 |
| | Stearic acid | 2 | 2 | 2 | 2 | 2 | 2 | 2 | 2 | 2 | 2 |
| | Zinc oxide | 2.5 | 2.5 | 2.5 | 2.5 | 2.5 | 2.5 | 2.5 | 2.5 | 2.5 | 2.5 |
| | Wax | 1 | 1 | 1 | 1 | 1 | 1 | 1 | 1 | 1 | 1 |
| | Amide compound (WB16) | 1 | 1 | 1 | 1 | 1 | 1 | 1 | 1 | 1 | 1 |
| | Sulfur | 2 | 2 | 2 | 2 | 2 | 2 | 2 | 2 | 2 | 2 |
| | Vulcanization accelerator 1 (CBS) | 1.8 | 1.8 | 1.8 | 1.8 | 1.8 | 1.8 | 1.8 | 1.8 | 1.8 | 1.8 |
| | Vulcanization accelerator 2 (DPG) | 1.2 | 1.2 | 1.2 | 1.2 | 1.2 | 1.2 | 1.2 | 1.2 | 1.2 | 1.2 |
| Evaluation | Abrasion resistance index | 107 | 108 | 107 | 107 | 108 | 108 | 100 | 98 | 92 | 95 |
| | Wet grip performance index | 109 | 108 | 110 | 109 | 108 | 107 | 100 | 101 | 102 | 101 |
| | Fuel economy index | 108 | 107 | 108 | 107 | 110 | 109 | 100 | 99 | 94 | 93 |

TABLE 5-6

| | | All season tread (Resin) | | | | | | | | | | | | |
|---|---|---|---|---|---|---|---|---|---|---|---|---|---|---|
| | | Example | | | | | | | Comparative Example | | | | | |
| | | 2-6a | 2-6b | 2-6c | 2-6d | 2-6e | 2-6f | 2-6g | 2-6a | 2-6b | 2-6c | 2-6d | 2-6e | 2-6f |
| Formulation (parts by mass) | *Taraxacum kok-saghyz*-derived natural rubber A | 25 | 25 | 25 | 25 | 25 | — | — | — | — | — | — | — | — |
| | *Taraxacum kok-saghyz*-derived natural rubber B | — | — | — | — | — | 25 | — | — | — | — | — | — | — |
| | *Taraxacum kok-saghyz*-derived natural rubber C | — | — | — | — | — | — | 25 | — | — | — | — | — | — |
| | *Hevea brasiliensis*-derived natural rubber | — | — | — | — | — | — | — | 25 | 25 | 25 | 25 | 25 | — |
| | Synthetic polyisoprene rubber | — | — | — | — | — | — | — | — | — | — | — | — | 25 |
| | SBR1 (SBR1502) | 45 | 45 | 45 | 45 | 45 | 45 | 45 | 45 | 45 | 45 | 45 | 45 | 45 |
| | BR | 30 | 30 | 30 | 30 | 30 | 30 | 30 | 30 | 30 | 30 | 30 | 30 | 30 |
| | Silica A (115GR) | 75 | 75 | 75 | 75 | 75 | 75 | 75 | 75 | 75 | 75 | 75 | 75 | 75 |
| | Silane coupling agent A (Si69) | 6 | 6 | 6 | 6 | 6 | 6 | 6 | 6 | 6 | 6 | 6 | 6 | 6 |
| | Carbon black A (N339) | 5 | 5 | 5 | 5 | 5 | 5 | 5 | 5 | 5 | 5 | 5 | 5 | 5 |
| | Resin A (Terpene) | 5 | — | — | — | — | 5 | 5 | 5 | — | — | — | — | 5 |
| | Resin B (Terpenephenol) | — | 5 | — | — | — | — | — | — | 5 | — | — | — | — |
| | Resin C (DCPD) | — | — | 5 | — | — | — | — | — | — | 5 | — | — | — |
| | Resin D (Rosin) | — | — | — | 5 | — | — | — | — | — | — | 5 | — | — |
| | Resin E (α-methylstyrene) | — | — | — | — | 5 | — | — | — | — | — | — | 5 | — |
| | Oil | 20 | 20 | 20 | 20 | 20 | 20 | 20 | 20 | 20 | 20 | 20 | 20 | 20 |
| | Antioxidant 1 (3C) | 1.5 | 1.5 | 1.5 | 1.5 | 1.5 | 1.5 | 1.5 | 1.5 | 1.5 | 1.5 | 1.5 | 1.5 | 1.5 |
| | Stearic acid | 2 | 2 | 2 | 2 | 2 | 2 | 2 | 2 | 2 | 2 | 2 | 2 | 2 |
| | Zinc oxide | 2.5 | 2.5 | 2.5 | 2.5 | 2.5 | 2.5 | 2.5 | 2.5 | 2.5 | 2.5 | 2.5 | 2.5 | 2.5 |
| | Wax | 1 | 1 | 1 | 1 | 1 | 1 | 1 | 1 | 1 | 1 | 1 | 1 | 1 |
| | Amide compound (WB16) | 1 | 1 | 1 | 1 | 1 | 1 | 1 | 1 | 1 | 1 | 1 | 1 | 1 |
| | Sulfur | 2 | 2 | 2 | 2 | 2 | 2 | 2 | 2 | 2 | 2 | 2 | 2 | 2 |
| | Vulcanization accelerator 1 (CBS) | 1.8 | 1.8 | 1.8 | 1.8 | 1.8 | 1.8 | 1.8 | 1.8 | 1.8 | 1.8 | 1.8 | 1.8 | 1.8 |
| | Vulcanization accelerator 2 (DPG) | 1.2 | 1.2 | 1.2 | 1.2 | 1.2 | 1.2 | 1.2 | 1.2 | 1.2 | 1.2 | 1.2 | 1.2 | 1.2 |
| Evaluation | Abrasion resistance index | 109 | 107 | 105 | 106 | 105 | 110 | 110 | 100 | 99 | 99 | 98 | 98 | 96 |
| | Wet grip performance index | 112 | 111 | 106 | 106 | 105 | 108 | 108 | 100 | 101 | 99 | 100 | 99 | 98 |
| | Fuel economy index | 112 | 111 | 109 | 108 | 108 | 116 | 118 | 100 | 97 | 97 | 96 | 97 | 99 |

TABLE 5-7

All season tread (Modified conjugated diene polymer)

|  |  | Example | | | Comparative Example | |
|---|---|---|---|---|---|---|
|  |  | 2-7a | 2-7b | 2-7c | 2-7a | 2-7b |
| Formulation (parts by mass) | Taraxacum kok-saghyz-derived natural rubber A | 25 | — | — | — | — |
| | Taraxacum kok-saghyz-derived natural rubber B | — | 25 | — | — | — |
| | Taraxacum kok-saghyz-derived natural rubber C | — | — | 25 | — | — |
| | Hevea brasiliensis-derived natural rubber | — | — | — | 25 | — |
| | Synthetic polyisoprene rubber | — | — | — | — | 25 |
| | Modified conjugated diene polymer | 30 | 30 | 30 | 30 | 30 |
| | SBR1 (SBR1502) | 45 | 45 | 45 | 45 | 45 |
| | BR | | | | | |
| | Silica A (115GR) | 75 | 75 | 75 | 75 | 75 |
| | Silane coupling agent A (Si69) | 6 | 6 | 6 | 6 | 6 |
| | Carbon black A (N339) | 5 | 5 | 5 | 5 | 5 |
| | Oil | 20 | 20 | 20 | 20 | 20 |
| | Antioxidant 1 (3C) | 1.5 | 1.5 | 1.5 | 1.5 | 1.5 |
| | Stearic acid | 2 | 2 | 2 | 2 | 2 |
| | Zinc oxide | 2.5 | 2.5 | 2.5 | 2.5 | 2.5 |
| | Wax | 1 | 1 | 1 | 1 | 1 |
| | Amide compound (WB16) | 1 | 1 | 1 | 1 | 1 |
| | Sulfur | 2 | 2 | 2 | 2 | 2 |
| | Vulcanization accelerator 1 (CBS) | 1.8 | 1.8 | 1.8 | 1.8 | 1.8 |
| | Vulcanization accelerator 2 (DPG) | 1.2 | 1.2 | 1.2 | 1.2 | 1.2 |
| Evaluation | Abrasion resistance index | 111 | 116 | 118 | 100 | 98 |
| | Wet grip performance index | 112 | 115 | 114 | 100 | 100 |
| | Fuel economy index | 110 | 116 | 114 | 100 | 100 |

TABLE 5-8

All season tread (Tetrazine compound)

|  |  | Example | | | | | | Comparative Example | | | |
|---|---|---|---|---|---|---|---|---|---|---|---|
|  |  | 2-8a | 2-8b | 2-8c | 2-8d | 2-8e | 2-8f | 2-8a | 2-8b | 2-8c | 2-8d |
| Formulation (parts by mass) | Taraxacum kok-saghyz-derived natural rubber A | 25 | 25 | — | — | — | — | — | — | — | — |
| | Taraxacum kok-saghyz-derived natural rubber B | — | — | 25 | 25 | — | — | — | — | — | — |
| | Taraxacum kok-saghyz-derived natural rubber C | — | — | — | — | 25 | 25 | — | — | — | — |
| | Hevea brasiliensis-derived natural rubber | — | — | — | — | — | — | 25 | 25 | — | — |
| | Synthetic polyisoprene rubber | — | — | — | — | — | — | — | — | 25 | 25 |
| | SBR1 (SBR1502) | 45 | 45 | 45 | 45 | 45 | 45 | 45 | 45 | 45 | 45 |
| | BR | 30 | 30 | 30 | 30 | 30 | 30 | 30 | 30 | 30 | 30 |
| | Silica A (115GR) | 75 | 75 | 75 | 75 | 75 | 75 | 75 | 75 | 75 | 75 |
| | Silane coupling agent A (Si69) | 6 | 6 | 6 | 6 | 6 | 6 | 6 | 6 | 6 | 6 |
| | Carbon black A (N339) | 5 | 5 | 5 | 5 | 5 | 5 | 5 | 5 | 5 | 5 |
| | Oil | 20 | 20 | 20 | 20 | 20 | 20 | 20 | 20 | 20 | 20 |
| | Antioxidant 1 (3C) | 1.5 | 1.5 | 1.5 | 1.5 | 1.5 | 1.5 | 1.5 | 1.5 | 1.5 | 1.5 |
| | Stearic acid | 2 | 2 | 2 | 2 | 2 | 2 | 2 | 2 | 2 | 2 |
| | Zinc oxide | 2.5 | 2.5 | 2.5 | 2.5 | 2.5 | 2.5 | 2.5 | 2.5 | 2.5 | 2.5 |
| | Wax | 1 | 1 | 1 | 1 | 1 | 1 | 1 | 1 | 1 | 1 |
| | Amide compound (WB16) | 1 | 1 | 1 | 1 | 1 | 1 | 1 | 1 | 1 | 1 |
| | Sulfur | 2 | 2 | 2 | 2 | 2 | 2 | 2 | 2 | 2 | 2 |
| | Vulcanization accelerator 1 (CBS) | 1.8 | 1.8 | 1.8 | 1.8 | 1.8 | 1.8 | 1.8 | 1.8 | 1.8 | 1.8 |
| | Vulcanization accelerator 2 (DPG) | 1.2 | 1.2 | 1.2 | 1.2 | 1.2 | 1.2 | 1.2 | 1.2 | 1.2 | 1.2 |
| | Tetrazine compound A | 2 | — | 2 | — | 2 | — | 2 | — | 2 | — |
| | Tetrazine compound B | — | 2 | — | 2 | — | 2 | — | 2 | — | 2 |
| Evaluation | Abrasion resistance index | 108 | 106 | 110 | 108 | 114 | 113 | 100 | 99 | 95 | 94 |
| | Wet grip performance index | 104 | 103 | 103 | 103 | 102 | 103 | 100 | 100 | 99 | 99 |
| | Fuel economy index | 108 | 109 | 112 | 114 | 114 | 114 | 100 | 99 | 101 | 99 |

TABLE 5-9

All season tread (Mercapto silane coupling agent)

|  |  | Example | | | | | | Comparative Example | | | |
| --- | --- | --- | --- | --- | --- | --- | --- | --- | --- | --- | --- |
|  |  | 2-9a | 2-9b | 2-9c | 2-9d | 2-9e | 2-9f | 2-9a | 2-9b | 2-9c | 2-9d |
| Formulation (parts by mass) | *Taraxacum kok-saghyz*-derived natural rubber A | 25 | 25 | — | — | — | — | — | — | — | — |
|  | *Taraxacum kok-saghyz*-derived natural rubber B | — | — | 25 | 25 | — | — | — | — | — | — |
|  | *Taraxacum kok-saghyz*-derived natural rubber C | — | — | — | — | 25 | 25 | — | — | — | — |
|  | *Hevea brasiliensis*-derived natural rubber | — | — | — | — | — | — | 25 | 25 | — | — |
|  | Synthetic polyisoprene rubber | — | — | — | — | — | — | — | — | 25 | 25 |
|  | SBR1 (SBR1502) | 45 | 45 | 45 | 45 | 45 | 45 | 45 | 45 | 45 | 45 |
|  | BR | 30 | 30 | 30 | 30 | 30 | 30 | 30 | 30 | 30 | 30 |
|  | Silica A (1150R) | 75 | 75 | 75 | 75 | 75 | 75 | 75 | 75 | 75 | 75 |
|  | Silane coupling agent A (Si69) | — | — | — | — | — | — | — | — | — | — |
|  | Silane coupling agent B (NXT) | 6 | — | 6 | — | 6 | — | 6 | — | 6 | — |
|  | Silane coupling agent C (NXT-Z45) | — | 3.75 | — | 3.75 | — | 3.75 | — | 3.75 | — | 3.75 |
|  | Carbon black A (N339) | 5 | 5 | 5 | 5 | 5 | 5 | 5 | 5 | 5 | 5 |
|  | Oil | 20 | 20 | 20 | 20 | 20 | 20 | 20 | 20 | 20 | 20 |
|  | Antioxidant 1 (3C) | 1.5 | 1.5 | 1.5 | 1.5 | 1.5 | 1.5 | 1.5 | 1.5 | 1.5 | 1.5 |
|  | Stearic acid | 2 | 2 | 2 | 2 | 2 | 2 | 2 | 2 | 2 | 2 |
|  | Zinc oxide | 2.5 | 2.5 | 2.5 | 2.5 | 2.5 | 2.5 | 2.5 | 2.5 | 2.5 | 2.5 |
|  | Wax | 1 | 1 | 1 | 1 | 1 | 1 | 1 | 1 | 1 | 1 |
|  | Amide compound (WB16) | 1 | 1 | 1 | 1 | 1 | 1 | 1 | 1 | 1 | 1 |
|  | Sulfur | 2 | 2 | 2 | 2 | 2 | 2 | 2 | 2 | 2 | 2 |
|  | Vulcanization accelerator 1 (CBS) | 1.8 | 1.8 | 1.8 | 1.8 | 1.8 | 1.8 | 1.8 | 1.8 | 1.8 | 1.8 |
|  | Vulcanization accelerator 2 (DPG) | 1.2 | 1.2 | 1.2 | 1.2 | 1.2 | 1.2 | 1.2 | 1.2 | 1.2 | 1.2 |
| Evaluation | Abrasion resistance index | 112 | 110 | 115 | 113 | 116 | 114 | 100 | 100 | 95 | 96 |
|  | Wet grip performance index | 104 | 105 | 103 | 102 | 101 | 102 | 100 | 100 | 98 | 98 |
|  | Fuel economy index | 108 | 110 | 112 | 114 | 116 | 118 | 100 | 101 | 102 | 102 |

TABLE 5-10

All season tread (Farnesene resin)

|  |  | Example | | | | | | | | | Comparative Example | | | | | |
| --- | --- | --- | --- | --- | --- | --- | --- | --- | --- | --- | --- | --- | --- | --- | --- | --- |
|  |  | 2-10a | 2-10b | 2-10c | 2-10d | 2-10e | 2-10f | 2-10g | 2-10h | 2-10i | 2-10a | 2-10b | 2-10c | 2-10d | 2-10e | 2-10f |
| Formulation (parts by mass) | *Taraxacum kok-saghyz*-derived natural rubber A | 25 | 25 | 25 | — | — | — | — | — | — | — | — | — | — | — | — |
|  | *Taraxacum kok-saghyz*-derived natural rubber B | — | — | — | 25 | 25 | 25 | — | — | — | — | — | — | — | — | — |
|  | *Taraxacum kok-saghyz*-derived natural rubber C | — | — | — | — | — | — | 25 | 25 | 25 | — | — | — | — | — | — |
|  | *Hevea brasiliensis*-derived natural rubber | — | — | — | — | — | — | — | — | — | 25 | 25 | 25 | — | — | — |
|  | Synthetic polyisoprene rubber | — | — | — | — | — | — | — | — | — | — | — | — | 25 | 25 | 25 |
|  | SBR1 (SBR1502) | 45 | 45 | 45 | 45 | 45 | 45 | 45 | 45 | 45 | 45 | 45 | 45 | 45 | 45 | 45 |
|  | BR | 30 | 30 | 30 | 30 | 30 | 30 | 30 | 30 | 30 | 30 | 30 | 30 | 30 | 30 | 30 |
|  | Silica A (115GR) | 75 | 75 | 75 | 75 | 75 | 75 | 75 | 75 | 75 | 75 | 75 | 75 | 75 | 75 | 75 |
|  | Silane coupling agent A (Si69) | 6 | 6 | 6 | 6 | 6 | 6 | 6 | 6 | 6 | 6 | 6 | 6 | 6 | 6 | 6 |
|  | Carbon black A (N339) | 5 | 5 | 5 | 5 | 5 | 5 | 5 | 5 | 5 | 5 | 5 | 5 | 5 | 5 | 5 |
|  | Oil | 10 | 10 | 10 | 10 | 10 | 10 | 10 | 10 | 10 | 10 | 10 | 10 | 10 | 10 | 10 |
|  | Farnesene resin A (KB-101) | 10 | — | — | 10 | — | — | 10 | — | — | 10 | — | — | 10 | — | — |
|  | Farnesene resin B (FSR-221) | — | 10 | — | — | 10 | — | — | 10 | — | — | 10 | — | — | 10 | — |
|  | Farnesene resin C (FBR-746) | — | — | 10 | — | — | 10 | — | — | 10 | — | — | 10 | — | — | 10 |
|  | Antioxidant 1(30) | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
|  | Stearic acid | 2 | 2 | 2 | 2 | 2 | 2 | 2 | 2 | 2 | 2 | 2 | 2 | 2 | 2 | 2 |
|  | Zinc oxide | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 |
|  | Wax | 1 | 1 | 1 | 1 | 1 | 1 | 1 | 1 | 1 | 1 | 1 | 1 | 1 | 1 | 1 |
|  | Amide compound (WB16) | 1 | 1 | 1 | 1 | 1 | 1 | 1 | 1 | 1 | 1 | 1 | 1 | 1 | 1 | 1 |
|  | Sulfur | 2 | 2 | 2 | 2 | 2 | 2 | 2 | 2 | 2 | 2 | 2 | 2 | 2 | 2 | 2 |
|  | Vulcanization accelerator 1 (CBS) | 1.8 | 1.8 | 1.8 | 1.8 | 1.8 | 1.8 | 1.8 | 1.8 | 1.8 | 1.8 | 1.8 | 1.8 | 1.8 | 1.8 | 1.8 |
|  | Vulcanization accelerator 2 (DPG) | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 |

TABLE 5-10-continued

| | | All season tread (Farnesene resin) | | | | | | | | | | | | | |
|---|---|---|---|---|---|---|---|---|---|---|---|---|---|---|---|
| | | Example | | | | | | | | Comparative Example | | | | | |
| | | 2-10a | 2-10b | 2-10c | 2-10d | 2-10e | 2-10f | 2-10g | 2-10h | 2-10i | 2-10a | 2-10b | 2-10c | 2-10d | 2-10e | 2-10f |
| Eval-uation | Abrasion resistance index | 108 | 110 | 107 | 108 | 108 | 107 | 114 | 112 | 113 | 100 | 99 | 98 | 96 | 96 | 96 |
| | Wet grip performance index | 105 | 105 | 106 | 108 | 108 | 109 | 106 | 106 | 105 | 100 | 100 | 99 | 99 | 99 | 98 |
| | Fuel economy index | 108 | 108 | 107 | 112 | 112 | 114 | 110 | 110 | 110 | 100 | 99 | 99 | 99 | 99 | 99 |

The above tables demonstrate that the overall performance in terms of fuel economy, abrasion resistance, and wet grip performance was significantly improved in the examples using a combination of a natural rubber derived from *Taraxacum kok-saghyz* specified in the present application, carbon black, and a silica having a predetermined nitrogen adsorption specific surface area at a predetermined ratio.

Examples and Comparative Examples

[Summer Tires]

According to each of the formulations shown in Tables 6-1 to 6-10, the chemicals other than the sulfur and vulcanization accelerators were kneaded using a 1.7 L Banbury mixer. Then, to the kneaded mixture were added the sulfur and vulcanization accelerators, followed by kneading using a roll mill to give an unvulcanized rubber composition.

The unvulcanized rubber composition was formed into a 2.1 mm-thick sheet and vulcanized for 30 minutes at 150° C. to obtain a 2 mm-thick vulcanized rubber composition.

Separately, the unvulcanized rubber composition prepared as above was formed into the shape of a cap tread and assembled with other tire components on a tire building machine to build an unvulcanized tire. The unvulcanized tire was vulcanized at 150° C. for 30 minutes to prepare a test tire (summer tire for passenger vehicles).

The vulcanized rubber compositions (vulcanized rubber sheets) and test tires prepared as above were evaluated as follows. The results are shown in Table 6-1 to Table 6-10, where Comparative Example 3-1a to Comparative Example 3-10a, respectively, are used as standards of comparison (index=100).

<Abrasion Resistance>

Each set of test tires was mounted on a front-engine, front-wheel-drive car made in Japan. After running 8000 km, the groove depth in the tire tread portion was measured. The distance at which the tire groove depth decreased by 1 mm was calculated and expressed as an index using the equation below. A higher index indicates better abrasion resistance.

(Abrasion resistance index)=(Distance at which tire groove depth of each formulation example decreased by 1 mm)/(Distance at which tire groove depth of standard comparative example decreased by 1 mm)×100

<Wet Grip Performance>

The test tires of each formulation example were mounted on each wheel of a vehicle (front-engine, front-wheel-drive car of 2000 cc displacement made in Japan), and the braking distance from an initial speed of 100 km/h on a wet asphalt road was determined. The results are expressed as an index. A higher index indicates better wet grip performance. The index was calculated using the following equation.

(Wet grip performance index)=(Braking distance of standard comparative example)/(Braking distance of each formulation example)×100

<Fuel Economy>

The rolling resistance of each test tire was measured using a rolling resistance tester by running the test tire mounted on a 15×6JJ rim at an internal pressure of 230 kPa, a load of 3.43 kN, and a speed of 80 km/h and expressed as an index relative to the standard comparative example taken as 100. A higher index indicates better performance (fuel economy).

TABLE 6-1

| | | Summer tread (Particulate zinc carrier) | | | | | | | | | |
|---|---|---|---|---|---|---|---|---|---|---|---|
| | | Example | | | | | | Comparative Example | | | |
| | | 3-1a | 3-1b | 3-1c | 3-1d | 3-1e | 3-1f | 3-1a | 3-1b | 3-1c | 3-1d |
| For-mulation (parts by mass) | *Taraxacum kok-saghyz*-derived natural rubber A | 5 | 5 | — | — | — | — | — | — | — | — |
| | *Taraxacum kok-saghyz*-derived natural rubber B | — | — | 5 | 5 | — | — | — | — | — | — |
| | *Taraxacum kok-saghyz*-derived natural rubber C | — | — | — | — | 5 | 5 | — | — | — | — |
| | *Hevea brasiliensis*-derived natural rubber | — | — | — | — | — | — | 5 | 5 | — | — |
| | Synthetic polyisoprene rubber | — | — | — | — | — | — | — | — | 5 | 5 |
| | SBR2 (SLR6430) | 50 | 50 | 50 | 50 | 50 | 50 | 50 | 50 | 50 | 50 |
| | Rubber content (Oil content) | (18.75) | (18.75) | (18.75) | (18.75) | (18.75) | (18.75) | (18.75) | (18.75) | (18.75) | (18.75) |
| | SBR3 (Production Example 5) | 30 | 30 | 30 | 30 | 30 | 30 | 30 | 30 | 30 | 30 |
| | Rubber content (Oil content) | (7.5) | (7.5) | (7.5) | (7.5) | (7.5) | (7.5) | (7.5) | (7.5) | (7.5) | (7.5) |
| | BR | 15 | 15 | 15 | 15 | 15 | 15 | 15 | 15 | 15 | 15 |
| | Silica A (115GR) | 75 | 75 | 75 | 75 | 75 | 75 | 75 | 75 | 75 | 75 |
| | Silane coupling agent A (Si69) | 6 | 6 | 6 | 6 | 6 | 6 | 6 | 6 | 6 | 6 |
| | Carbon black A (N339) | 5 | 5 | 5 | 5 | 5 | 5 | 5 | 5 | 5 | 5 |

TABLE 6-1-continued

Summer tread (Particulate zinc carrier)

|  |  | Example | | | | | | Comparative Example | | | |
|---|---|---|---|---|---|---|---|---|---|---|---|
|  |  | 3-1a | 3-1b | 3-1c | 3-1d | 3-1e | 3-1f | 3-1a | 3-1b | 3-1c | 3-1d |
|  | Oil | 20 | 20 | 20 | 20 | 20 | 20 | 20 | 20 | 20 | 20 |
|  | Antioxidant 1 (3C) | 1.5 | 1.5 | 1.5 | 1.5 | 1.5 | 1.5 | 1.5 | 1.5 | 1.5 | 1.5 |
|  | Stearic acid | 2 | 2 | 2 | 2 | 2 | 2 | 2 | 2 | 2 | 2 |
|  | Zinc oxide | — | — | — | — | — | — | — | — | — | — |
|  | Particulate zinc carrier | 1.6 | 0.8 | 1.6 | 0.8 | 1.6 | 0.8 | 1.6 | 0.8 | 1.6 | 0.8 |
|  | Wax | 1 | 1 | 1 | 1 | 1 | 1 | 1 | 1 | 1 | 1 |
|  | Amide compound (WB16) | 1 | 1 | 1 | 1 | 1 | 1 | 1 | 1 | 1 | 1 |
|  | Sulfur | 2 | 2 | 2 | 2 | 2 | 2 | 2 | 2 | 2 | 2 |
|  | Vulcanization accelerator 1 (CBS) | 1.8 | 1.8 | 1.8 | 1.8 | 1.8 | 1.8 | 1.8 | 1.8 | 1.8 | 1.8 |
|  | Vulcanization accelerator 2 (DPG) | 1.2 | 1.2 | 1.2 | 1.2 | 1.2 | 1.2 | 1.2 | 1.2 | 1.2 | 1.2 |
| Evaluation | Abrasion resistance index | 112 | 108 | 111 | 107 | 113 | 108 | 100 | 96 | 99 | 96 |
|  | Wet grip performance index | 115 | 118 | 113 | 117 | 120 | 119 | 100 | 106 | 96 | 98 |
|  | Fuel economy index | 104 | 108 | 105 | 109 | 107 | 108 | 100 | 102 | 92 | 103 |

TABLE 6-2

Summer tread (Fine particle silica)

|  |  | Example | | | | | | Comparative Example | | | |
|---|---|---|---|---|---|---|---|---|---|---|---|
|  |  | 3-2a | 3-2b | 3-2c | 3-2d | 3-2e | 3-2f | 3-2a | 3-2b | 3-2c | 3-2d |
| Formulation (parts by mass) | *Taraxacum kok-saghyz*-derived natural rubber A | 5 | 5 | — | — | — | — | — | — | — | — |
|  | *Taraxacum kok-saghyz*-derived natural rubber B | — | — | 5 | 5 | — | — | — | — | — | — |
|  | *Taraxacum kok-saghyz*-derived natural rubber C | — | — | — | — | 5 | 5 | — | — | — | — |
|  | *Hevea brasiliensis*-derived natural rubber | — | — | — | — | — | — | 5 | 5 | — | — |
|  | Synthetic polyisoprene rubber | — | — | — | — | — | — | — | — | 5 | 5 |
|  | SBR2 (SLR6430) | 50 | 50 | 50 | 50 | 50 | 50 | 50 | 50 | 50 | 50 |
|  | Rubber content (Oil content) | (18.75) | (18.75) | (18.75) | (18.75) | (18.75) | (18.75) | (18.75) | (18.75) | (18.75) | (18.75) |
|  | SBR3 (Production Example 5) | 30 | 30 | 30 | 30 | 30 | 30 | 30 | 30 | 30 | 30 |
|  | Rubber content (Oil content) | (7.5) | (7.5) | (7.5) | (7.5) | (7.5) | (7.5) | (7.5) | (7.5) | (7.5) | (7.5) |
|  | BR | 15 | 15 | 15 | 15 | 15 | 15 | 15 | 15 | 15 | 15 |
|  | Silica A (115GR) | — | — | — | — | — | — | — | — | — | — |
|  | Silica B (VN3) | 75 | — | 75 | — | 75 | — | 75 | — | 75 | — |
|  | Silica C (9100GR) | — | 75 | — | 75 | — | 75 | — | 75 | — | 75 |
|  | Silane coupling agent A (Si69) | 6 | 6 | 6 | 6 | 6 | 6 | 6 | 6 | 6 | 6 |
|  | Carbon black A (N339) | 5 | 5 | 5 | 5 | 5 | 5 | 5 | 5 | 5 | 5 |
|  | Oil | 20 | 20 | 20 | 20 | 20 | 20 | 20 | 20 | 20 | 20 |
|  | Antioxidant 1 (3C) | 1.5 | 1.5 | 1.5 | 1.5 | 1.5 | 1.5 | 1.5 | 1.5 | 1.5 | 1.5 |
|  | Stearic acid | 2 | 2 | 2 | 2 | 2 | 2 | 2 | 2 | 2 | 2 |
|  | Zinc oxide | 2.5 | 2.5 | 2.5 | 2.5 | 2.5 | 2.5 | 2.5 | 2.5 | 2.5 | 2.5 |
|  | Wax | 1 | 1 | 1 | 1 | 1 | 1 | 1 | 1 | 1 | 1 |
|  | Amide compound (WB16) | 1 | 1 | 1 | 1 | 1 | 1 | 1 | 1 | 1 | 1 |
|  | Sulfur | 2 | 2 | 2 | 2 | 2 | 2 | 2 | 2 | 2 | 2 |
|  | Vulcanization accelerator 1 (CBS) | 1.8 | 1.8 | 1.8 | 1.8 | 1.8 | 1.8 | 1.8 | 1.8 | 1.8 | 1.8 |
|  | Vulcanization accelerator 2 (DPG) | 1.2 | 1.2 | 1.2 | 1.2 | 1.2 | 1.2 | 1.2 | 1.2 | 1.2 | 1.2 |
| Evaluation | Abrasion resistance index | 116 | 114 | 117 | 115 | 114 | 116 | 100 | 102 | 99 | 101 |
|  | Wet grip performance index | 108 | 120 | 107 | 119 | 107 | 119 | 100 | 112 | 98 | 109 |
|  | Fuel economy index | 115 | 111 | 115 | 104 | 116 | 106 | 100 | 96 | 101 | 94 |

TABLE 6-3

Summer tread (High structure carbon)

|  |  | Example | | | | | | Comparative Example | | | |
|---|---|---|---|---|---|---|---|---|---|---|---|
|  |  | 3-3a | 3-3b | 3-3c | 3-3d | 3-3e | 3-3f | 3-3a | 3-3b | 3-3c | 3-3d |
| Formulation (parts by mass) | *Taraxacum kok-saghyz*-derived natural rubber A | 5 | 5 | — | — | — | — | — | — | — | — |
|  | *Taraxacum kok-saghyz*-derived natural rubber B | — | — | 5 | 5 | — | — | — | — | — | — |
|  | *Taraxacum kok-saghyz*-derived natural rubber C | — | — | — | — | 5 | 5 | — | — | — | — |

TABLE 6-3-continued

| | | Summer tread (High structure carbon) | | | | | | | | | |
|---|---|---|---|---|---|---|---|---|---|---|---|
| | | Example | | | | | | Comparative Example | | | |
| | | 3-3a | 3-3b | 3-3c | 3-3d | 3-3e | 3-3f | 3-3a | 3-3b | 3-3c | 3-3d |
| | *Hevea brasiliensis*-derived natural rubber | — | — | — | — | — | — | 5 | 5 | — | — |
| | Synthetic polyisoprene rubber | — | — | — | — | — | — | — | — | 5 | 5 |
| | SBR2 (SLR6430) | 50 | 50 | 50 | 50 | 50 | 50 | 50 | 50 | 50 | 50 |
| | Rubber content (Oil content) | (18.75) | (1835) | (18.75) | (18.75) | (18.75) | (18.75) | (18.75) | (18.75) | (18.75) | (18.75) |
| | SBR3 (Production Example 5) | 30 | 30 | 30 | 30 | 30 | 30 | 30 | 30 | 30 | 30 |
| | Rubber content (Oil content) | (7.5) | (7.5) | (7.5) | (7.5) | (7.5) | (7.5) | (7.5) | (7.5) | (7.5) | (7.5) |
| | BR | 15 | 15 | 15 | 15 | 15 | 15 | 15 | 15 | 15 | 15 |
| | Silica A (115GR) | 75 | 75 | 75 | 75 | 75 | 75 | 75 | 75 | 75 | 75 |
| | Silane coupling agent A (Si69) | 6 | 6 | 6 | 6 | 6 | 6 | 6 | 6 | 6 | 6 |
| | Carbon black A (N339) | — | — | — | — | — | — | — | — | — | — |
| | Carbon black B (High structure) | 5 | — | 5 | — | 5 | — | 5 | — | 5 | — |
| | Carbon black C (High structure) | — | 5 | — | 5 | — | 5 | — | 5 | — | 5 |
| | Oil | 20 | 20 | 20 | 20 | 20 | 20 | 20 | 20 | 20 | 20 |
| | Antioxidant 1 (3C) | 1.5 | 1.5 | 1.5 | 1.5 | 1.5 | 1.5 | 1.5 | 1.5 | 1.5 | 1.5 |
| | Stearic acid | 2 | 2 | 2 | 2 | 2 | 2 | 2 | 2 | 2 | 2 |
| | Zinc oxide | 2.5 | 2.5 | 2.5 | 2.5 | 2.5 | 2.5 | 2.5 | 2.5 | 2.5 | 2.5 |
| | Wax | 1 | 1 | 1 | 1 | 1 | 1 | 1 | 1 | 1 | 1 |
| | Amide compound (WB16) | 1 | 1 | 1 | 1 | 1 | 1 | 1 | 1 | 1 | 1 |
| | Sulfur | 2 | 2 | 2 | 2 | 2 | 2 | 2 | 2 | 2 | 2 |
| | Vulcanization accelerator 1 (CBS) | 1.8 | 1.8 | 1.8 | 1.8 | 1.8 | 1.8 | 1.8 | 1.8 | 1.8 | 1.8 |
| | Vulcanization accelerator 2 (DPG) | 1.2 | 1.2 | 1.2 | 1.2 | 1.2 | 1.2 | 1.2 | 1.2 | 1.2 | 1.2 |
| Evaluation | Abrasion resistance index | 102 | 104 | 106 | 101 | 103 | 105 | 100 | 101 | 99 | 100 |
| | Wet grip performance index | 112 | 118 | 115 | 122 | 111 | 119 | 100 | 106 | 94 | 105 |
| | Fuel economy index | 117 | 112 | 119 | 109 | 116 | 110 | 100 | 95 | 103 | 92 |

TABLE 6-4

| | | Summer tread (High silica) | | | | | | | | | |
|---|---|---|---|---|---|---|---|---|---|---|---|
| | | Example | | | | | | Comparative Example | | | |
| | | 3-4a | 3-4b | 3-4c | 3-4d | 3-4e | 3-4f | 3-4a | 3-4b | 3-4c | 3-4d |
| Formulation (parts by mass) | *Taraxacum kok-saghyz*-derived natural rubber A | 5 | 5 | — | — | — | — | — | — | — | — |
| | *Taraxacum kok-saghyz*-derived natural rubber B | — | — | 5 | 5 | — | — | — | — | — | — |
| | *Taraxacum kok-saghyz*-derived natural rubber C | — | — | — | — | 5 | 5 | — | — | — | — |
| | *Hevea brasiliensis*-derived natural rubber | — | — | — | — | — | — | 5 | 5 | — | — |
| | Synthetic polyisoprene rubber | — | — | — | — | — | — | — | — | 5 | 5 |
| | SBR2 (SLR6430) | 50 | 50 | 50 | 50 | 50 | 50 | 50 | 50 | 50 | 50 |
| | Rubber content (Oil content) | (18.75) | (18.75) | (18.75) | (18.75) | (18.75) | (18.75) | (18.75) | (18.75) | (18.75) | (18.75) |
| | SBR3 (Production Example 5) | 30 | 30 | 30 | 30 | 30 | 30 | 30 | 30 | 30 | 30 |
| | Rubber content (Oil content) | (7.5) | (7.5) | (7.5) | (7.5) | (7.5) | (7.5) | (7.5) | (7.5) | (7.5) | (7.5) |
| | BR | 15 | 15 | 15 | 15 | 15 | 15 | 15 | 15 | 15 | 15 |
| | Silica A (115GR) | 160 | 130 | 160 | 130 | 160 | 130 | 160 | 130 | 160 | 130 |
| | Silane coupling agent A(Si69) | 12.8 | 10.4 | 12.8 | 10.4 | 12.8 | 10.4 | 12.8 | 10.4 | 12.8 | 10.4 |
| | Carbon black A (N339) | 5 | 5 | 5 | 5 | 5 | 5 | 5 | 5 | 5 | 5 |
| | Oil | 20 | 20 | 20 | 20 | 20 | 20 | 20 | 20 | 20 | 20 |
| | Antioxidant 1 (3C) | 1.5 | 1.5 | 1.5 | 1.5 | 1.5 | 1.5 | 1.5 | 1.5 | 1.5 | 1.5 |
| | Stearic acid | 2 | 2 | 2 | 2 | 2 | 2 | 2 | 2 | 2 | 2 |
| | Zinc oxide | 2.5 | 2.5 | 2.5 | 2.5 | 2.5 | 2.5 | 2.5 | 2.5 | 2.5 | 2.5 |
| | Wax | 1 | 1 | 1 | 1 | 1 | 1 | 1 | 1 | 1 | 1 |
| | Amide compound (WB16) | 1 | 1 | 1 | 1 | 1 | 1 | 1 | 1 | 1 | 1 |
| | Sulfur | 2 | 2 | 2 | 2 | 2 | 2 | 2 | 2 | 2 | 2 |
| | Vulcanization accelerator 1 (CBS) | 1.8 | 1.8 | 1.8 | 1.8 | 1.8 | 1.8 | 1.8 | 1.8 | 1.8 | 1.8 |
| | Vulcanization accelerator 2 (DPG) | 1.2 | 1.2 | 1.2 | 1.2 | 1.2 | 1.2 | 1.2 | 1.2 | 1.2 | 1.2 |
| Evaluation | Abrasion resistance index | 118 | 107 | 120 | 106 | 118 | 121 | 100 | 91 | 102 | 89 |
| | Wet grip performance index | 112 | 121 | 108 | 120 | 110 | 109 | 100 | 104 | 94 | 102 |
| | Fuel economy index | 106 | 112 | 104 | 110 | 105 | 113 | 100 | 106 | 99 | 105 |

TABLE 6-5

Summer tread (High oil)

|  |  | Example | | | | | | Comparative Example | | | |
|---|---|---|---|---|---|---|---|---|---|---|---|
|  |  | 3-5a | 3-5b | 3-5c | 3-5d | 3-5e | 3-5f | 3-5a | 3-5b | 3-5c | 3-5d |
| Formulation (parts by mass) | Taraxacum kok-saghyz-derived natural rubber A | 5 | 5 | — | — | — | — | — | — | — | — |
|  | Taraxacum kok-saghyz-derived natural rubber B | — | — | 5 | 5 | — | — | — | — | — | — |
|  | Taraxacum kok-saghyz-derived natural rubber C | — | — | — | — | 5 | 5 | — | — | — | — |
|  | Hevea brasiliensis-derived natural rubber | — | — | — | — | — | — | 5 | 5 | — | — |
|  | Synthetic polyisoprene rubber | — | — | — | — | — | — | — | — | 5 | 5 |
|  | SBR2 (SLR6430) | 50 | 50 | 50 | 50 | 50 | 50 | 50 | 50 | 50 | 50 |
|  | Rubber content (Oil content) | (18.75) | (18.75) | (18.75) | (18.75) | (18.75) | (18.75) | (18.75) | (18.75) | (18.75) | (18.75) |
|  | SBR3 (Production Example 5) | 30 | 30 | 30 | 30 | 30 | 30 | 30 | 30 | 30 | 30 |
|  | Rubber content (Oil content) | (7.5) | (7.5) | (7.5) | (7.5) | (7.5) | (7.5) | (7.5) | (7.5) | (7.5) | (7.5) |
|  | BR | 15 | 15 | 15 | 15 | 15 | 15 | 15 | 15 | 15 | 15 |
|  | Silica A (115GR) | 75 | 75 | 75 | 75 | 75 | 75 | 75 | 75 | 75 | 75 |
|  | Silane coupling agent A (Si69) | 6 | 6 | 6 | 6 | 6 | 6 | 6 | 6 | 6 | 6 |
|  | Carbon black A (N339) | 5 | 5 | 5 | 5 | 5 | 5 | 5 | 5 | 5 | 5 |
|  | Oil | 60 | 80 | 60 | 80 | 60 | 80 | 60 | 80 | 60 | 80 |
|  | Antioxidant 1 (3C) | 1.5 | 1.5 | 1.5 | 1.5 | 1.5 | 1.5 | 1.5 | 1.5 | 1.5 | 1.5 |
|  | Stearic acid | 2 | 2 | 2 | 2 | 2 | 2 | 2 | 2 | 2 | 2 |
|  | Zinc oxide | 2.5 | 2.5 | 2.5 | 2.5 | 2.5 | 2.5 | 2.5 | 2.5 | 2.5 | 2.5 |
|  | Wax | 1 | 1 | 1 | 1 | 1 | 1 | 1 | 1 | 1 | 1 |
|  | Amide compound (WB16) | 1 | 1 | 1 | 1 | 1 | 1 | 1 | 1 | 1 | 1 |
|  | Sulfur | 2 | 2 | 2 | 2 | 2 | 2 | 2 | 2 | 2 | 2 |
|  | Vulcanization accelerator 1 (CBS) | 1.8 | 1.8 | 1.8 | 1.8 | 1.8 | 1.8 | 1.8 | 1.8 | 1.8 | 1.8 |
|  | Vulcanization accelerator 2 (DPG) | 1.2 | 1.2 | 1.2 | 1.2 | 1.2 | 1.2 | 1.2 | 1.2 | 1.2 | 1.2 |
| Evaluation | Abrasion resistance index | 118 | 125 | 116 | 126 | 114 | 128 | 100 | 106 | 96 | 103 |
|  | Wet grip performance index | 119 | 110 | 117 | 112 | 121 | 114 | 100 | 92 | 99 | 94 |
|  | Fuel economy index | 104 | 102 | 106 | 101 | 103 | 100 | 100 | 99 | 101 | 98 |

TABLE 6-6

Summer tread (Resin)

|  |  | Example | | | | | | | | |
|---|---|---|---|---|---|---|---|---|---|---|
|  |  | 3-6a | 3-6b | 3-6c | 3-6d | 3-6e | 3-6f | 3-6g | 3-6h | 3-6i |
| Formulation (parts by mass) | Taraxacum kok-saghyz-derived natural rubber A | 5 | 5 | 5 | 5 | 5 | — | — | — | — |
|  | Taraxacum kok-saghyz-derived natural rubber B | — | — | — | — | — | 5 | 5 | 5 | 5 |
|  | Taraxacum kok-saghyz-derived natural rubber C | — | — | — | — | — | — | — | — | — |
|  | Hevea brasiliensis-derived natural rubber | — | — | — | — | — | — | — | — | — |
|  | Synthetic polyisoprene rubber | — | — | — | — | — | — | — | — | — |
|  | SBR2 (SLR6430) | 50 | 50 | 50 | 50 | 50 | 50 | 50 | 50 | 50 |
|  | Rubber content (Oil content) | (18.75) | (18.75) | (18.75) | (18.75) | (18.75) | (18.75) | (18.75) | (18.75) | (18.75) |
|  | SBR3 (Production Example 5) | 30 | 30 | 30 | 30 | 30 | 30 | 30 | 30 | 30 |
|  | Rubber content (Oil content) | (7.5) | (7.5) | (7.5) | (7.5) | (7.5) | (7.5) | (7.5) | (7.5) | (7.5) |
|  | BR | 15 | 15 | 15 | 15 | 15 | 15 | 15 | 15 | 15 |
|  | Silica A (115GR) | 75 | 75 | 75 | 75 | 75 | 75 | 75 | 75 | 75 |
|  | Silane coupling agent A (Si69) | 6 | 6 | 6 | 6 | 6 | 6 | 6 | 6 | 6 |
|  | Carbon black A (N339) | 5 | 5 | 5 | 5 | 5 | 5 | 5 | 5 | 5 |
|  | Resin A (Terpene) | 5 |  |  |  |  | 5 |  |  |  |
|  | Resin B (Terpenephenol) |  | 5 |  |  |  |  | 5 |  |  |
|  | Resin C (DCPD) |  |  | 5 |  |  |  |  | 5 |  |
|  | Resin D (Rosin) |  |  |  | 5 |  |  |  |  | 5 |
|  | Resin E (α-methylstyrene) |  |  |  |  | 5 |  |  |  |  |
|  | Oil | 20 | 20 | 20 | 20 | 20 | 20 | 20 | 20 | 20 |
|  | Antioxidant 1 (3C) | 1.5 | 1.5 | 1.5 | 1.5 | 1.5 | 1.5 | 1.5 | 1.5 | 1.5 |
|  | Stearic acid | 2 | 2 | 2 | 2 | 2 | 2 | 2 | 2 | 2 |
|  | Zinc oxide | 2.5 | 2.5 | 2.5 | 2.5 | 2.5 | 2.5 | 2.5 | 2.5 | 2.5 |

TABLE 6-6-continued

| | | | | | | | | | | |
|---|---|---|---|---|---|---|---|---|---|---|
| | Summer tread (Resin) | | | | | | | | | |
| | Wax | 1 | 1 | 1 | 1 | 1 | 1 | 1 | 1 | 1 |
| | Amide compound (WB16) | 1 | 1 | 1 | 1 | 1 | 1 | 1 | 1 | 1 |
| | Sulfur | 2 | 2 | 2 | 2 | 2 | 2 | 2 | 2 | 2 |
| | Vulcanization accelerator 1 (CBS) | 1.8 | 1.8 | 1.8 | 1.8 | 1.8 | 1.8 | 1.8 | 1.8 | 1.8 |
| | Vulcanization accelerator 2 (DPG) | 1.2 | 1.2 | 1.2 | 1.2 | 1.2 | 1.2 | 1.2 | 1.2 | 1.2 |
| Evaluation | Abrasion resistance index | 123 | 121 | 119 | 118 | 118 | 120 | 120 | 118 | 117 |
| | Wet grip performance index | 112 | 114 | 116 | 117 | 117 | 109 | 112 | 113 | 113 |
| | Fuel economy index | 101 | 103 | 103 | 104 | 104 | 100 | 101 | 101 | 103 |

| | | Example | | | | | | Comparative Example | | |
|---|---|---|---|---|---|---|---|---|---|---|
| | | 3-6j | 3-6k | 3-6l | 3-6m | 3-6n | 3-6o | 3-6a | 3-6b | 3-6c |
| Formulation (parts by mass) | *Taraxacum kok-saghyz*-derived natural rubber A | — | — | — | — | — | — | — | — | — |
| | *Taraxacum kok-saghyz*-derived natural rubber B | 5 | — | — | — | — | — | — | — | — |
| | *Taraxacum kok-saghyz*-derived natural rubber C | — | 5 | 5 | 5 | 5 | 5 | — | — | — |
| | *Hevea brasiliensis*-derived natural rubber | — | — | — | — | — | — | 5 | 5 | 5 |
| | Synthetic polyisoprene rubber | — | — | — | — | — | — | — | — | — |
| | SBR2 (SLR6430) Rubber content (Oil content) | 50 (18.75) | 50 (18.75) | 50 (18.75) | 50 (18.75) | 50 (18.75) | 50 (18.75) | 50 (18.75) | 50 (18.75) | 50 (18.75) |
| | SBR3 (Production Example 5) Rubber content (Oil content) | 30 (7.5) | 30 (7.5) | 30 (7.5) | 30 (7.5) | 30 (7.5) | 30 (7.5) | 30 (7.5) | 30 (7.5) | 30 (7.5) |
| | BR | 15 | 15 | 15 | 15 | 15 | 15 | 15 | 15 | 15 |
| | Silica A (115GR) | 75 | 75 | 75 | 75 | 75 | 75 | 75 | 75 | 75 |
| | Silane coupling agent A (Si69) | 6 | 6 | 6 | 6 | 6 | 6 | 6 | 6 | 6 |
| | Carbon black A (N339) | 5 | 5 | 5 | 5 | 5 | 5 | 5 | 5 | 5 |
| | Resin A (Terpene) | | 5 | | | | | 5 | | |
| | Resin B (Terpenephenol) | | | 5 | | | | | 5 | |
| | Resin C (DCPD) | | | | 5 | | | | | 5 |
| | Resin D (Rosin) | | | | | 5 | | | | |
| | Resin E (α-methylstyrene) | 5 | | | | | 5 | | | |
| | Oil | 20 | 20 | 20 | 20 | 20 | 20 | 20 | 20 | 20 |
| | Antioxidant 1 (3C) | 1.5 | 1.5 | 1.5 | 1.5 | 1.5 | 1.5 | 1.5 | 1.5 | 1.5 |
| | Stearic acid | 2 | 2 | 2 | 2 | 2 | 2 | 2 | 2 | 2 |
| | Zinc oxide | 2.5 | 2.5 | 2.5 | 2.5 | 2.5 | 2.5 | 2.5 | 2.5 | 2.5 |
| | Wax | 1 | 1 | 1 | 1 | 1 | 1 | 1 | 1 | 1 |
| | Amide compound (WB16) | 1 | 1 | 1 | 1 | 1 | 1 | 1 | 1 | 1 |
| | Sulfur | 2 | 2 | 2 | 2 | 2 | 2 | 2 | 2 | 2 |
| | Vulcanization accelerator 1 (CBS) | 1.8 | 1.8 | 1.8 | 1.8 | 1.8 | 1.8 | 1.8 | 1.8 | 1.8 |
| | Vulcanization accelerator 2 (DPG) | 1.2 | 1.2 | 1.2 | 1.2 | 1.2 | 1.2 | 1.2 | 1.2 | 1.2 |
| Evaluation | Abrasion resistance index | 117 | 121 | 119 | 119 | 117 | 1117 | 100 | 98 | 96 |
| | Wet grip performance index | 114 | 110 | 111 | 111 | 113 | 114 | 100 | 102 | 103 |
| | Fuel economy index | 103 | 102 | 102 | 102 | 104 | 104 | 100 | 100 | 101 |

| | | | Comparative Example | | |
|---|---|---|---|---|---|
| | | | 3-6d | 3-6e | 3-6f |
| Formulation (parts by mass) | *Taraxacum kok-saghyz*-derived natural rubber A | | — | — | — |
| | *Taraxacum kok-saghyz*-derived natural rubber B | | — | — | — |
| | *Taraxacum kok-saghyz*-derived natural rubber C | | — | — | — |
| | *Hevea brasiliensis*-derived natural rubber | | 5 | 5 | — |
| | Synthetic polyisoprene rubber | | — | — | 5 |
| | SBR2 (SLR6430) Rubber content (Oil content) | | 50 (18.75) | 50 (18.75) | 50 (18.75) |

TABLE 6-6-continued

| | | Summer tread (Resin) | | | |
|---|---|---|---|---|---|
| | | SBR3 (Production Example 5) Rubber content (Oil content) | 30 (7.5) | 30 (7.5) | 30 (7.5) |
| | | BR | 15 | 15 | 15 |
| | | Silica A (115GR) | 75 | 75 | 75 |
| | | Silane coupling agent A (Si69) | 6 | 6 | 6 |
| | | Carbon black A (N339) | 5 | 5 | 5 |
| | | Resin A (Terpene) | | | 5 |
| | | Resin B (Terpenephenol) | | | |
| | | Resin C (DCPD) | | | |
| | | Resin D (Rosin) | 5 | | |
| | | Resin E (α-methylstyrene) | | 5 | |
| | | Oil | 20 | 20 | 20 |
| | | Antioxidant 1 (3C) | 1.5 | 1.5 | 1.5 |
| | | Stearic acid | 2 | 2 | 2 |
| | | Zinc oxide | 2.5 | 2.5 | 2.5 |
| | | Wax | 1 | 1 | 1 |
| | | Amide compound (WB16) | 1 | 1 | 1 |
| | | Sulfur | 2 | 2 | 2 |
| | | Vulcanization accelerator 1 (CBS) | 1.8 | 1.8 | 1.8 |
| | | Vulcanization accelerator 2 (DPG) | 1.2 | 1.2 | 1.2 |
| | Evaluation | Abrasion resistance index | 96 | 95 | 96 |
| | | Wet grip performance index | 103 | 104 | 103 |
| | | Fuel economy index | 101 | 102 | 96 |

TABLE 6-7

| | Summer tread (Modified conjugated diene polymer) | | | | | |
|---|---|---|---|---|---|---|
| | | Example | | | Comparative Example | |
| | | 3-7a | 3-7b | 3-7c | 3-7a | 3-7b |
| Formulation (parts by mass) | *Taraxacum kok-saghyz*-derived natural rubber A | 5 | — | — | — | — |
| | *Taraxacum kok-saghyz*-derived natural rubber B | — | 5 | — | — | — |
| | *Taraxacum kok-saghyz*-derived natural rubber C | — | — | 5 | — | — |
| | *Hevea brasiliensis*-derived natural rubber | — | — | — | 5 | — |
| | Synthetic polyisoprene rubber | — | — | — | — | 5 |
| | Modified conjugated diene polymer | 15 | 15 | 15 | 15 | 15 |
| | SBR2 (SLR6430) Rubber content (Oil content) | 50 (18.75) | 50 (18.75) | 50 (18.75) | 50 (18.75) | 50 (18.75) |
| | SBR3 (Production Example 5) Rubber content (Oil content) | 30 (7.5) | 30 (7.5) | 30 (7.5) | 30 (7.5) | 30 (7.5) |
| | BR | — | — | — | — | — |
| | Silica A (115GR) | 75 | 75 | 75 | 75 | 75 |
| | Silane coupling agent A (Si69) | 6 | 6 | 6 | 6 | 6 |
| | Carbon black A (N339) | 5 | 5 | 5 | 5 | 5 |
| | Oil | 20 | 20 | 20 | 20 | 20 |
| | Antioxidant 1 (3C) | 1.5 | 1.5 | 1.5 | 1.5 | 1.5 |
| | Stearic acid | 2 | 2 | 2 | 2 | 2 |
| | Zinc oxide | 2.5 | 2.5 | 2.5 | 2.5 | 2.5 |
| | Wax | 1 | 1 | 1 | 1 | 1 |
| | Amide compound (WB16) | 1 | 1 | 1 | 1 | 1 |
| | Sulfur | 2 | 2 | 2 | 2 | 2 |

TABLE 6-7-continued

Summer tread (Modified conjugated diene polymer)

|  |  | Example | | | Comparative Example | |
|---|---|---|---|---|---|---|
|  |  | 3-7a | 3-7b | 3-7c | 3-7a | 3-7b |
|  | Vulcanization accelerator 1 (CBS) | 1.8 | 1.8 | 1.8 | 1.8 | 1.8 |
|  | Vulcanization accelerator 2 (DPG) | 1.2 | 1.2 | 1.2 | 1.2 | 1.2 |
| Evaluation | Abrasion resistance index | 103 | 104 | 101 | 100 | 98 |
|  | Wet grip performance index | 114 | 116 | 105 | 100 | 103 |
|  | Fuel economy index | 102 | 101 | 103 | 100 | 97 |

TABLE 6-8

Summer tread (Tetrazine compound)

|  |  | Example | | | | | | Comparative Example | | | |
|---|---|---|---|---|---|---|---|---|---|---|---|
|  |  | 3-8a | 3-8b | 3-8c | 3-8d | 3-8e | 3-8f | 3-8a | 3-8b | 3-8c | 3-8d |
| Formulation (parts by mass) | *Taraxacum kok-saghyz*-derived natural rubber A | 5 | 5 | — | — | — | — | — | — | — | — |
|  | *Taraxacum kok-saghyz*-derived natural rubber B | — | — | 5 | 5 | — | — | — | — | — | — |
|  | *Taraxacum kok-saghyz*-derived natural rubber C | — | — | — | — | 5 | 5 | — | — | — | — |
|  | *Hevea brasiliensis*-derived natural rubber | — | — | — | — | — | — | 5 | 5 | — | — |
|  | Synthetic polyisoprene rubber | — | — | — | — | — | — | — | — | 5 | 5 |
|  | SBR2 (SLR6430) | 50 | 50 | 50 | 50 | 50 | 50 | 50 | 50 | 50 | 50 |
|  | Rubber content (Oil content) | (18.75) | (18.75) | (18.75) | (18.75) | (18.75) | (18.75) | (18.75) | (18.75) | (18.75) | (18.75) |
|  | SBR3 (Production Example 5) | 30 | 30 | 30 | 30 | 30 | 30 | 30 | 30 | 30 | 30 |
|  | Rubber content (Oil content) | (7.5) | (7.5) | (7.5) | (7.5) | (7.5) | (7.5) | (7.5) | (7.5) | (7.5) | (7.5) |
|  | BR | 15 | 15 | 15 | 15 | 15 | 15 | 15 | 15 | 15 | 15 |
|  | Silica A (115GR) | 75 | 75 | 75 | 75 | 75 | 75 | 75 | 75 | 75 | 75 |
|  | Silane coupling agent A (Si69) | 6 | 6 | 6 | 6 | 6 | 6 | 6 | 6 | 6 | 6 |
|  | Carbon black A (N339) | 5 | 5 | 5 | 5 | 5 | 5 | 5 | 5 | 5 | 5 |
|  | Oil | 20 | 20 | 20 | 20 | 20 | 20 | 20 | 20 | 20 | 20 |
|  | Antioxidant 1 (3C) | 1.5 | 1.5 | 1.5 | 1.5 | 1.5 | 1.5 | 1.5 | 1.5 | 1.5 | 1.5 |
|  | Stearic acid | 2 | 2 | 2 | 2 | 2 | 2 | 2 | 2 | 2 | 2 |
|  | Zinc oxide | 2.5 | 2.5 | 2.5 | 2.5 | 2.5 | 2.5 | 2.5 | 2.5 | 2.5 | 2.5 |
|  | Wax | 1 | 1 | 1 | 1 | 1 | 1 | 1 | 1 | 1 | 1 |
|  | Amide compound (WB16) | 1 | 1 | 1 | 1 | 1 | 1 | 1 | 1 | 1 | 1 |
|  | Sulfur | 2 | 2 | 2 | 2 | 2 | 2 | 2 | 2 | 2 | 2 |
|  | Vulcanization accelerator 1 (CBS) | 1.8 | 1.8 | 1.8 | 1.8 | 1.8 | 1.8 | 1.8 | 1.8 | 1.8 | 1.8 |
|  | Vulcanization accelerator 2 (DPG) | 1.2 | 1.2 | 1.2 | 1.2 | 1.2 | 1.2 | 1.2 | 1.2 | 1.2 | 1.2 |
|  | Tetrazine compound A | 2 | — | 2 | — | 2 | — | 2 | — | 2 | — |
|  | Tetrazine compound B | — | 2 | — | 2 | — | 2 | — | 2 | — | 2 |
| Evaluation | Abrasion resistance index | 110 | 118 | 112 | 119 | 115 | 121 | 100 | 106 | 96 | 105 |
|  | Wet grip performance index | 119 | 116 | 121 | 114 | 122 | 112 | 100 | 96 | 102 | 104 |
|  | Fuel economy index | 108 | 104 | 102 | 106 | 107 | 105 | 100 | 97 | 97 | 96 |

TABLE 6-9

Summer tread (Mercapto silane coupling agent)

|  |  | Example | | | | | | Comparative Example | | | |
|---|---|---|---|---|---|---|---|---|---|---|---|
|  |  | 3-9a | 3-9b | 3-9c | 3-9d | 3-9e | 3-9f | 3-9a | 3-9b | 3-9c | 3-9d |
| Formulation (parts by mass) | *Taraxacum kok-saghyz*-derived natural rubber A | 5 | 5 | — | — | — | — | — | — | — | — |
|  | *Taraxacum kok-saghyz*-derived natural rubber B | — | — | 5 | 5 | — | — | — | — | — | — |
|  | *Taraxacum kok-saghyz*-derived natural rubber C | — | — | — | — | 5 | 5 | — | — | — | — |
|  | *Hevea brasiliensis*-derived natural rubber | — | — | — | — | — | — | 5 | 5 | — | — |

TABLE 6-9-continued

Summer tread (Mercapto silane coupling agent)

|  |  | Example | | | | | | Comparative Example | | | |
|---|---|---|---|---|---|---|---|---|---|---|---|
|  |  | 3-9a | 3-9b | 3-9c | 3-9d | 3-9e | 3-9f | 3-9a | 3-9b | 3-9c | 3-9d |
|  | Synthetic polyisoprene rubber | — | — | — | — | — | — | — | — | 5 | 5 |
|  | SBR2 (SLR6430) | 50 | 50 | 50 | 50 | 50 | 50 | 50 | 50 | 50 | 50 |
|  | Rubber content (Oil content) | (18.75) | (18.75) | (18.75) | (18.75) | (18.75) | (18.75) | (18.75) | (18.75) | (18.75) | (18.75) |
|  | SBR3 (Production Example 5) | 30 | 30 | 30 | 30 | 30 | 30 | 30 | 30 | 30 | 30 |
|  | Rubber content (Oil content) | (7.5) | (7.5) | (7.5) | (7.5) | (7.5) | (7.5) | (7.5) | (7.5) | (7.5) | (7.5) |
|  | BR | 15 | 15 | 15 | 15 | 15 | 15 | 15 | 15 | 15 | 15 |
|  | Silica A (115GR) | 75 | 75 | 75 | 75 | 75 | 75 | 75 | 75 | 75 | 75 |
|  | Silane coupling agent A (Si69) | — | — | — | — | — | — | — | — | — | — |
|  | Silane coupling agent B (NXT) | 6 | — | 6 | — | 6 | — | 6 | — | 6 | — |
|  | Silane coupling agent C (NXT-Z45) | — | 3.75 | — | 3.75 | — | 3.75 | — | 3.75 | — | 3.75 |
|  | Carbon black A (N339) | 5 | 5 | 5 | 5 | 5 | 5 | 5 | 5 | 5 | 5 |
|  | Oil | 20 | 20 | 20 | 20 | 20 | 20 | 20 | 20 | 20 | 20 |
|  | Antioxidant 1 (3C) | 1.5 | 1.5 | 1.5 | 1.5 | 1.5 | 1.5 | 1.5 | 1.5 | 1.5 | 1.5 |
|  | Stearic acid | 2 | 2 | 2 | 2 | 2 | 2 | 2 | 2 | 2 | 2 |
|  | Zinc oxide | 2.5 | 2.5 | 2.5 | 2.5 | 2.5 | 2.5 | 2.5 | 2.5 | 2.5 | 2.5 |
|  | Wax | 1 | 1 | 1 | 1 | 1 | 1 | 1 | 1 | 1 | 1 |
|  | Amide compound (WB16) | 1 | 1 | 1 | 1 | 1 | 1 | 1 | 1 | 1 | 1 |
|  | Sulfur | 2 | 2 | 2 | 2 | 2 | 2 | 2 | 2 | 2 | 2 |
|  | Vulcanization accelerator 1 (CBS) | 1.8 | 1.8 | 1.8 | 1.8 | 1.8 | 1.8 | 1.8 | 1.8 | 1.8 | 1.8 |
|  | Vulcanization accelerator 2 (DPG) | 1.2 | 1.2 | 1.2 | 1.2 | 1.2 | 1.2 | 1.2 | 1.2 | 1.2 | 1.2 |
| Evaluation | Abrasion resistance index | 108 | 107 | 107 | 106 | 107 | 104 | 100 | 101 | 98 | 99 |
|  | Wet grip performance index | 118 | 128 | 119 | 126 | 116 | 124 | 100 | 108 | 102 | 107 |
|  | Fuel economy index | 106 | 115 | 108 | 116 | 108 | 116 | 100 | 105 | 101 | 106 |

TABLE 6-10

Summer tread (Farnesene resin)

| | | Example | | | | | | | | | | Comparative Example | | | | | |
|---|---|---|---|---|---|---|---|---|---|---|---|---|---|---|---|---|---|
| | | 3-10a | 3-10b | 3-10c | 3-10d | 3-10e | 3-10f | 3-10g | 3-10h | 3-10i | 3-10a | 3-10b | 3-10c | 3-10d | 3-10e | 3-10f |
| Formulation (parts by mass) | Taraxacum kok-saghyz-derived natural rubber A | 5 | — | — | — | — | 5 | — | — | — | — | — | — | — | — | — |
| | Taraxacum kok-saghyz-derived natural rubber B | — | 5 | — | — | — | — | — | — | — | — | — | — | — | — | — |
| | Taraxacum kok-saghyz-derived natural rubber C | — | — | 5 | — | — | — | — | — | — | — | — | — | — | — | — |
| | Hevea brasiliensis-derived natural rubber | — | — | — | 5 | — | — | — | — | — | — | — | — | — | — | — |
| | Synthetic polyisoprene rubber | — | — | — | — | 5 | 5 | — | — | — | — | 5 | 5 | 5 | 5 | 5 |
| | SBR2 (SLR6430) Rubber content | 50 | 50 | 50 | 50 | 50 | 50 | 50 | 50 | 50 | 50 | 50 | 50 | 50 | 50 | 50 |
| | (Oil content) | (18.75) | (18.75) | (18.75) | (18.75) | (18.75) | (18.75) | (18.75) | (18.75) | (18.75) | (18.75) | (18.75) | (18.75) | (18.75) | (18.75) | (18.75) |
| | SBR3 (Production Example 5) Rubber content | 30 | 30 | 30 | 30 | 30 | 30 | 30 | 30 | 30 | 30 | 30 | 30 | 30 | 30 | 30 |
| | (Oil content) | (7.5) | (7.5) | (7.5) | (7.5) | (7.5) | (7.5) | (7.5) | (7.5) | (7.5) | (7.5) | (7.5) | (7.5) | (7.5) | (7.5) | (7.5) |
| | BR | 15 | 15 | 15 | 15 | 15 | 15 | 15 | 15 | 15 | 15 | 15 | 15 | 15 | 15 | 15 |
| | Silica A (115GR) | 75 | 75 | 75 | 75 | 75 | 75 | 75 | 75 | 75 | 75 | 75 | 75 | 75 | 75 | 75 |
| | Silane coupling agent A (Si69) | 6 | 6 | 6 | 6 | 6 | 6 | 6 | 6 | 6 | 6 | 6 | 6 | 6 | 6 | 6 |
| | Carbon black A (N339) | 5 | 5 | 5 | 5 | 5 | 5 | 5 | 5 | 5 | 5 | 5 | 5 | 5 | 5 | 5 |
| | Oil | 10 | 10 | 10 | 10 | 10 | 10 | 10 | 10 | 10 | 10 | 10 | 10 | 10 | 10 | 10 |
| | Farnesene resin A (KB-101) | 10 | 10 | — | 10 | 10 | 10 | 10 | 10 | — | — | 10 | — | 10 | — | — |
| | Farnesene resin B (FSR-221) | — | — | 10 | — | — | — | — | — | — | — | — | 10 | — | 10 | — |
| | Farnesene resin B (FSR-746) | — | — | — | — | — | — | — | — | 10 | — | — | — | — | — | 10 |
| | Antioxidant 1 (3C) | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| | Stearic acid | 2 | 2 | 2 | 2 | 2 | 2 | 2 | 2 | 2 | 2 | 2 | 2 | 2 | 2 | 2 |
| | Zinc oxide | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 |
| | Wax | 1 | 1 | 1 | 1 | 1 | 1 | 1 | 1 | 1 | 1 | 1 | 1 | 1 | 1 | 1 |
| | Amide compound (WB16) | 1 | 1 | 1 | 1 | 1 | 1 | 1 | 1 | 1 | 1 | 1 | 1 | 1 | 1 | 1 |
| | Sulfur | 2 | 2 | 2 | 2 | 2 | 2 | 2 | 2 | 2 | 2 | 2 | 2 | 2 | 2 | 2 |
| | Vulcanization accelerator 1 (CBS) | 1.8 | 1.8 | 1.8 | 1.8 | 1.8 | 1.8 | 1.8 | 1.8 | 1.8 | 1.8 | 1.8 | 1.8 | 1.8 | 1.8 | 1.8 |
| | Vulcanization accelerator 2 (DPG) | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 |
| Evaluation | Abrasion resistance index | 120 | 118 | 117 | 121 | 119 | 117 | 120 | 118 | 117 | 100 | 99 | 96 | 98 | 96 | 94 |
| | Wet grip performance index | 121 | 123 | 123 | 124 | 124 | 125 | 118 | 119 | 119 | 100 | 102 | 105 | 104 | 105 | 107 |
| | Fuel economy index | 108 | 107 | 108 | 106 | 108 | 108 | 107 | 108 | 109 | 100 | 99 | 97 | 97 | 95 | 94 |

The above tables demonstrate that the overall performance in terms of fuel economy, abrasion resistance, and wet grip performance was significantly improved in the examples using a combination of a natural rubber derived from *Taraxacum kok-saghyz* specified in the present application, a styrene-butadiene rubber having a predetermined styrene content, carbon black, and a silica having a predetermined nitrogen adsorption specific surface area at a predetermined ratio.

Examples and Comparative Examples

[Cold Weather Tires]

According to each of the formulations shown in Tables 7-1 to 7-10, the chemicals other than the sulfur and vulcanization accelerators were kneaded for five minutes at 150° C. using a 1.7 L Banbury mixer (Kobe Steel, Ltd.) to give a kneaded mixture. Next, the sulfur and vulcanization accelerators were added to the kneaded mixture, followed by kneading for five minutes at 80° C. using an open roll mill to give an unvulcanized rubber composition.

The unvulcanized rubber composition was press-vulcanized for 10 minutes at 170° C. to obtain a vulcanized rubber composition.

Separately, the unvulcanized rubber composition prepared as above was formed into the shape of a cap tread and assembled with other tire components to build an unvulcanized tire. The unvulcanized tire was press-vulcanized at 170° C. for 10 minutes to prepare a test tire (size: 195/65R15).

The vulcanized rubber compositions (vulcanized rubber sheets) and test tires prepared as above were evaluated as follows. The results are shown in Table 7-1 to Table 7-10, where Comparative Example 4-1a to Comparative Example 4-10a, respectively, are used as standards of comparison (index=100).

<Abrasion Resistance>

The abrasion loss of the vulcanized rubber compositions was measured using a Lambourn abrasion tester (Iwamoto Seisakusho Co., Ltd.) at a surface rotational speed of 50 m/min, an applied load of 3.0 kg, a sand feed rate of 15 g/min, and a slip ratio of 20%. A reciprocal of the abrasion loss was calculated. The reciprocals of the abrasion losses of the formulation examples other than the standard comparative example are expressed as an index relative to the standard comparative example taken as 100. A higher index indicates better abrasion resistance.

<Snow and Ice Performance>

The vehicle performance on ice of the test cold weather tires was evaluated under the following conditions. The test site was the Nayoro test track of Sumitomo Rubber Industries, Ltd. in Hokkaido, Japan. The air temperature was −5° C. to 0° C. The test tires were mounted on a front-engine, rear-wheel-drive car of 2000 cc displacement made in Japan. The stopping distance on ice was measured which was the distance required for the car to stop after the brakes that lock up were applied at 30 km/h. The stopping distances are expressed as an index using the equation below, where the standard comparative example is taken as a reference. A higher index indicates better snow and ice performance.

(Snow and ice performance)=(Brake stopping distance of standard comparative example)/(Stopping distance of each formulation example)× 100

<Fuel Economy>

The rolling resistance of each test cold weather tire was measured using a rolling resistance tester by running the test tire mounted on a 15×6JJ rim at an internal pressure of 230 kPa, a load of 3.43 kN, and a speed of 80 km/h and expressed as an index relative to the standard comparative example taken as 100. A higher index indicates a lower rolling resistance and thus better fuel economy.

TABLE 7-1

Cold weather tread (Particulate zinc carrier)

| | | Example | | | | | | Comparative Example | | | |
|---|---|---|---|---|---|---|---|---|---|---|---|
| | | 4-1a | 4-1b | 4-1c | 4-1d | 4-1e | 4-1f | 4-1a | 4-1b | 4-1c | 4-1d |
| Formulation (parts by mass) | *Taraxacum kok-saghyz*-derived natural rubber A | 60 | 60 | — | — | — | — | — | — | — | — |
| | *Taraxacum kok-saghyz*-derived natural rubber B | — | — | 60 | 60 | — | — | — | — | — | — |
| | *Taraxacum kok-saghyz*-derived natural rubber C | — | — | — | — | 60 | 60 | — | — | — | — |
| | *Hevea brasiliensis*-derived natural rubber | — | — | — | — | — | — | 60 | 60 | — | — |
| | Synthetic polyisoprene rubber | — | — | — | — | — | — | — | — | 60 | 60 |
| | BR | 40 | 40 | 40 | 40 | 40 | 40 | 40 | 40 | 40 | 40 |
| | Silica B (VN3) | 75 | 75 | 75 | 75 | 75 | 75 | 75 | 75 | 75 | 75 |
| | Silane coupling agent A (Si69) | 6 | 6 | 6 | 6 | 6 | 6 | 6 | 6 | 6 | 6 |
| | Carbon black A (N339) | 5 | 5 | 5 | 5 | 5 | 5 | 5 | 5 | 5 | 5 |
| | Oil | 40 | 40 | 40 | 40 | 40 | 40 | 40 | 40 | 40 | 40 |
| | Antioxidant 1 (3C) | 1.5 | 1.5 | 1.5 | 1.5 | 1.5 | 1.5 | 1.5 | 1.5 | 1.5 | 1.5 |
| | Stearic acid | 2 | 2 | 2 | 2 | 2 | 2 | 2 | 2 | 2 | 2 |
| | Zinc oxide | — | — | — | — | — | — | — | — | — | — |
| | Particulate zinc carrier | 1.6 | 0.8 | 1.6 | 0.8 | 1.6 | 0.8 | 1.6 | 0.8 | 1.6 | 0.8 |
| | Wax | 1 | 1 | 1 | 1 | 1 | 1 | 1 | 1 | 1 | 1 |
| | Amide compound (WB16) | 1 | 1 | 1 | 1 | 1 | 1 | 1 | 1 | 1 | 1 |
| | Sulfur | 2 | 2 | 2 | 2 | 2 | 2 | 2 | 2 | 2 | 2 |
| | Vulcanization accelerator 1 (CBS) | 1.8 | 1.8 | 1.8 | 1.8 | 1.8 | 1.8 | 1.8 | 1.8 | 1.8 | 1.8 |
| | Vulcanization accelerator 2 (DPG) | 1.2 | 1.2 | 1.2 | 1.2 | 1.2 | 1.2 | 1.2 | 1.2 | 1.2 | 1.2 |
| Evaluation | Abrasion resistance index | 111 | 113 | 115 | 116 | 117 | 117 | 100 | 99 | 91 | 92 |
| | Snow and ice performance index | 108 | 108 | 104 | 104 | 103 | 103 | 100 | 100 | 100 | 100 |
| | Fuel economy index | 110 | 110 | 115 | 115 | 116 | 116 | 100 | 98 | 101 | 102 |

TABLE 7-2

| | | Cold weather tread (Fine particle silica) | | | | | | | | | |
|---|---|---|---|---|---|---|---|---|---|---|---|
| | | Example | | | | | | Comparative Example | | | |
| | | 4-2a | 4-2b | 4-2c | 4-2d | 4-2e | 4-2f | 4-2a | 4-2b | 4-2c | 4-2d |
| Formulation (parts by mass) | *Taraxacum kok-saghyz*-derived natural rubber A | 60 | 60 | — | — | — | — | — | — | — | — |
| | *Taraxacum kok-saghyz*-derived natural rubber B | — | — | 60 | 60 | — | — | — | — | — | — |
| | *Taraxacum kok-saghyz*-derived natural rubber C | — | — | — | — | 60 | 60 | — | — | — | — |
| | *Hevea brasiliensis*-derived natural rubber | — | — | — | — | — | — | 60 | 60 | — | — |
| | Synthetic polyisoprene rubber | — | — | — | — | — | — | — | — | 60 | 60 |
| | BR | 40 | 40 | 40 | 40 | 40 | 40 | 40 | 40 | 40 | 40 |
| | Silica B (VN3) | 75 | — | 75 | — | 75 | — | 75 | — | 75 | — |
| | Silica C (9100GR) | — | 75 | — | 75 | — | 75 | — | 75 | — | 75 |
| | Silane coupling agent A (Si69) | 6 | 6 | 6 | 6 | 6 | 6 | 6 | 6 | 6 | 6 |
| | Carbon black A (N339) | 5 | 5 | 5 | 5 | 5 | 5 | 5 | 5 | 5 | 5 |
| | Oil | 40 | 40 | 40 | 40 | 40 | 40 | 40 | 40 | 40 | 40 |
| | Antioxidant 1 (3C) | 1.5 | 1.5 | 1.5 | 1.5 | 1.5 | 1.5 | 1.5 | 1.5 | 1.5 | 1.5 |
| | Stearic acid | 2 | 2 | 2 | 2 | 2 | 2 | 2 | 2 | 2 | 2 |
| | Zinc oxide | 2.5 | 2.5 | 2.5 | 2.5 | 2.5 | 2.5 | 2.5 | 2.5 | 2.5 | 2.5 |
| | Wax | 1 | 1 | 1 | 1 | 1 | 1 | 1 | 1 | 1 | 1 |
| | Amide compound (WB16) | 1 | 1 | 1 | 1 | 1 | 1 | 1 | 1 | 1 | 1 |
| | Sulfur | 2 | 2 | 2 | 2 | 2 | 2 | 2 | 2 | 2 | 2 |
| | Vulcanization accelerator 1 (CBS) | 1.8 | 1.8 | 1.8 | 1.8 | 1.8 | 1.8 | 1.8 | 1.8 | 1.8 | 1.8 |
| | Vulcanization accelerator 2 (DPG) | 1.2 | 1.2 | 1.2 | 1.2 | 1.2 | 1.2 | 1.2 | 1.2 | 1.2 | 1.2 |
| Evaluation | Abrasion resistance index | 113 | 114 | 117 | 118 | 118 | 120 | 100 | 100 | 91 | 94 |
| | Snow and ice performance index | 110 | 109 | 108 | 106 | 105 | 104 | 100 | 99 | 98 | 96 |
| | Fuel economy index | 110 | 111 | 114 | 114 | 116 | 116 | 100 | 98 | 102 | 101 |

TABLE 7-3

| | | Cold weather tread (High structure carbon) | | | | | | | | | |
|---|---|---|---|---|---|---|---|---|---|---|---|
| | | Example | | | | | | Comparative Example | | | |
| | | 4-3a | 4-3b | 4-3c | 4-3d | 4-3e | 4-3f | 4-3a | 4-3b | 4-3c | 4-3d |
| Formulation (parts by mass) | *Taraxacum kok-saghyz*-derived natural rubber A | 60 | 60 | — | — | — | — | — | — | — | — |
| | *Taraxacum kok-saghyz*-derived natural rubber B | — | — | 60 | 60 | — | — | — | — | — | — |
| | *Taraxacum kok-saghyz*-derived natural rubber C | — | — | — | — | 60 | 60 | — | — | — | — |
| | *Hevea brasiliensis*-derived natural rubber | — | — | — | — | — | — | 60 | 60 | — | — |
| | Synthetic polyisoprene rubber | — | — | — | — | — | — | — | — | 60 | 60 |
| | BR | 40 | 40 | 40 | 40 | 40 | 40 | 40 | 40 | 40 | 40 |
| | Silica B (VN3) | 75 | 75 | 75 | 75 | 75 | 75 | 75 | 75 | 75 | 75 |
| | Silane coupling agent A (Si69) | 6 | 6 | 6 | 6 | 6 | 6 | 6 | 6 | 6 | 6 |
| | Carbon black A (N339) | — | — | — | — | — | — | — | — | — | — |
| | Carbon black B (High structure) | 5 | — | 5 | — | 5 | — | 5 | — | 5 | — |
| | Carbon black C (High structure) | — | 5 | — | 5 | — | 5 | — | 5 | — | 5 |
| | Oil | 40 | 40 | 40 | 40 | 40 | 40 | 40 | 40 | 40 | 40 |
| | Antioxidant 1 (3C) | 1.5 | 1.5 | 1.5 | 1.5 | 1.5 | 1.5 | 1.5 | 1.5 | 1.5 | 1.5 |
| | Stearic acid | 2 | 2 | 2 | 2 | 2 | 2 | 2 | 2 | 2 | 2 |
| | Zinc oxide | 2.5 | 2.5 | 2.5 | 2.5 | 2.5 | 2.5 | 2.5 | 2.5 | 2.5 | 2.5 |
| | Wax | 1 | 1 | 1 | 1 | 1 | 1 | 1 | 1 | 1 | 1 |
| | Amide compound (WB16) | 1 | 1 | 1 | 1 | 1 | 1 | 1 | 1 | 1 | 1 |
| | Sulfur | 2 | 2 | 2 | 2 | 2 | 2 | 2 | 2 | 2 | 2 |
| | Vulcanization accelerator 1 (CBS) | 1.8 | 1.8 | 1.8 | 1.8 | 1.8 | 1.8 | 1.8 | 1.8 | 1.8 | 1.8 |
| | Vulcanization accelerator 2 (DPG) | 1.2 | 1.2 | 1.2 | 1.2 | 1.2 | 1.2 | 1.2 | 1.2 | 1.2 | 1.2 |
| Evaluation | Abrasion resistance index | 109 | 111 | 113 | 116 | 118 | 120 | 100 | 101 | 97 | 99 |
| | Snow and ice performance index | 106 | 105 | 104 | 104 | 103 | 101 | 100 | 99 | 98 | 97 |
| | Fuel economy index | 110 | 111 | 114 | 114 | 116 | 115 | 100 | 98 | 99 | 96 |

TABLE 7-4

Cold weather tread (High silica)

|  |  | Example | | | | | | Comparative Example | | | |
| --- | --- | --- | --- | --- | --- | --- | --- | --- | --- | --- | --- |
|  |  | 4-4a | 4-4b | 4-4c | 4-4d | 4-4e | 4-4f | 4-4a | 4-4b | 4-4c | 4-4d |
| Formulation (parts by mass) | *Taraxacum kok-saghyz*-derived natural rubber A | 60 | 60 | — | — | — | — | — | — | — | — |
|  | *Taraxacum kok-saghyz*-derived natural rubber B | — | — | 60 | 60 | — | — | — | — | — | — |
|  | *Taraxacum kok-saghyz*-derived natural rubber C | — | — | — | — | 60 | 60 | — | — | — | — |
|  | *Hevea brasiliensis*-derived natural rubber | — | — | — | — | — | — | 60 | 60 | — | — |
|  | Synthetic polyisoprene rubber | — | — | — | — | — | — | — | — | 60 | 60 |
|  | BR | 40 | 40 | 40 | 40 | 40 | 40 | 40 | 40 | 40 | 40 |
|  | Silica B (VN3) | 160 | 130 | 160 | 130 | 160 | 130 | 160 | 130 | 160 | 130 |
|  | Silane coupling agent A (Si69) | 6 | 6 | 6 | 6 | 6 | 6 | 6 | 6 | 6 | 6 |
|  | Carbon black A (N339) | 5 | 5 | 5 | 5 | 5 | 5 | 5 | 5 | 5 | 5 |
|  | Oil | 40 | 40 | 40 | 40 | 40 | 40 | 40 | 40 | 40 | 40 |
|  | Antioxidant 1 (3C) | 1.5 | 1.5 | 1.5 | 1.5 | 1.5 | 1.5 | 1.5 | 1.5 | 1.5 | 1.5 |
|  | Stearic acid | 2 | 2 | 2 | 2 | 2 | 2 | 2 | 2 | 2 | 2 |
|  | Zinc oxide | 2.5 | 2.5 | 2.5 | 2.5 | 2.5 | 2.5 | 2.5 | 2.5 | 2.5 | 2.5 |
|  | Wax | 1 | 1 | 1 | 1 | 1 | 1 | 1 | 1 | 1 | 1 |
|  | Amide compound (WB16) | 1 | 1 | 1 | 1 | 1 | 1 | 1 | 1 | 1 | 1 |
|  | Sulfur | 2 | 2 | 2 | 2 | 2 | 2 | 2 | 2 | 2 | 2 |
|  | Vulcanization accelerator 1 (CBS) | 1.8 | 1.8 | 1.8 | 1.8 | 1.8 | 1.8 | 1.8 | 1.8 | 1.8 | 1.8 |
|  | Vulcanization accelerator 2 (DPG) | 1.2 | 1.2 | 1.2 | 1.2 | 1.2 | 1.2 | 1.2 | 1.2 | 1.2 | 1.2 |
| Evaluation | Abrasion resistance index | 108 | 107 | 109 | 107 | 112 | 110 | 100 | 98 | 97 | 94 |
|  | Snow and ice performance index | 110 | 108 | 108 | 107 | 107 | 105 | 100 | 99 | 95 | 96 |
|  | Fuel economy index | 108 | 109 | 107 | 108 | 109 | 111 | 100 | 101 | 101 | 102 |

TABLE 7-5

Cold weather tread (High oil)

|  |  | Example | | | | | | Comparative Example | | | |
| --- | --- | --- | --- | --- | --- | --- | --- | --- | --- | --- | --- |
|  |  | 4-5a | 4-5b | 4-5c | 4-5d | 4-5e | 4-5f | 4-5a | 4-5b | 4-5c | 4-5d |
| Formulation (parts by mass) | *Taraxacum kok-saghyz*-derived natural rubber A | 60 | 60 | — | — | — | — | — | — | — | — |
|  | *Taraxacum kok-saghyz*-derived natural rubber B | — | — | 60 | 60 | — | — | — | — | — | — |
|  | *Taraxacum kok-saghyz*-derived natural rubber C | — | — | — | — | 60 | 60 | — | — | — | — |
|  | *Hevea brasiliensis*-derived natural rubber | — | — | — | — | — | — | 60 | 60 | — | — |
|  | Synthetic polyisoprene rubber | — | — | — | — | — | — | — | — | 60 | 60 |
|  | BR | 40 | 40 | 40 | 40 | 40 | 40 | 40 | 40 | 40 | 40 |
|  | Silica B (VN3) | 75 | 75 | 75 | 75 | 75 | 75 | 75 | 75 | 75 | 75 |
|  | Silane coupling agent A (Si69) | 6 | 6 | 6 | 6 | 6 | 6 | 6 | 6 | 6 | 6 |
|  | Carbon black A (N339) | 5 | 5 | 5 | 5 | 5 | 5 | 5 | 5 | 5 | 5 |
|  | Oil | 60 | 80 | 60 | 80 | 60 | 80 | 60 | 80 | 60 | 80 |
|  | Antioxidant 1 (3C) | 1.5 | 1.5 | 1.5 | 1.5 | 1.5 | 1.5 | 1.5 | 1.5 | 1.5 | 1.5 |
|  | Stearic acid | 2 | 2 | 2 | 2 | 2 | 2 | 2 | 2 | 2 | 2 |
|  | Zinc oxide | 2.5 | 2.5 | 2.5 | 2.5 | 2.5 | 2.5 | 2.5 | 2.5 | 2.5 | 2.5 |
|  | Wax | 1 | 1 | 1 | 1 | 1 | 1 | 1 | 1 | 1 | 1 |
|  | Amide compound (WB16) | 1 | 1 | 1 | 1 | 1 | 1 | 1 | 1 | 1 | 1 |
|  | Sulfur | 2 | 2 | 2 | 2 | 2 | 2 | 2 | 2 | 2 | 2 |
|  | Vulcanization accelerator 1 (CBS) | 1.8 | 1.8 | 1.8 | 1.8 | 1.8 | 1.8 | 1.8 | 1.8 | 1.8 | 1.8 |
|  | Vulcanization accelerator 2 (DPG) | 1.2 | 1.2 | 1.2 | 1.2 | 1.2 | 1.2 | 1.2 | 1.2 | 1.2 | 1.2 |
| Evaluation | Abrasion resistance index | 108 | 106 | 110 | 109 | 112 | 110 | 100 | 95 | 92 | 90 |
|  | Snow and ice performance index | 110 | 111 | 107 | 109 | 106 | 108 | 100 | 101 | 97 | 98 |
|  | Fuel economy index | 106 | 105 | 108 | 106 | 112 | 110 | 100 | 96 | 99 | 94 |

TABLE 7-6

Cold weather tread (Resin)

| | | Example | | | | | | | Comparative Example | | | | | |
|---|---|---|---|---|---|---|---|---|---|---|---|---|---|---|
| | | 4-6a | 4-6b | 4-6c | 4-6d | 4-6e | 4-6f | 4-6g | 4-6a | 4-6b | 4-6c | 4-6d | 4-6e | 4-6f |
| Formulation (parts by mass) | *Taraxacum kok-saghyz*-derived natural rubber A | 60 | 60 | 60 | 60 | 60 | — | — | — | — | — | — | — | — |
| | *Taraxacum kok-saghyz*-derived natural rubber B | — | — | — | — | — | 60 | — | — | — | — | — | — | — |
| | *Taraxacum kok-saghyz*-derived natural rubber C | — | — | — | — | — | — | 60 | — | — | — | — | — | — |
| | *Hevea brasiliensis*-derived natural rubber | — | — | — | — | — | — | — | 60 | 60 | 60 | 60 | 60 | — |
| | Synthetic polyisoprene rubber | — | — | — | — | — | — | — | — | — | — | — | — | 60 |
| | BR | 40 | 40 | 40 | 40 | 40 | 40 | 40 | 40 | 40 | 40 | 40 | 40 | 40 |
| | Silica B (VN3) | 75 | 75 | 75 | 75 | 75 | 75 | 75 | 75 | 75 | 75 | 75 | 75 | 75 |
| | Silane coupling agent A (Si69) | 6 | 6 | 6 | 6 | 6 | 6 | 6 | 6 | 6 | 6 | 6 | 6 | 6 |
| | Carbon black A (N339) | 5 | 5 | 5 | 5 | 5 | 5 | 5 | 5 | 5 | 5 | 5 | 5 | 5 |
| | Resin A (Terpene) | 5 | | | | | 5 | 5 | 5 | | | | | 5 |
| | Resin B (Terpenephenol) | | 5 | | | | | | | 5 | | | | |
| | Resin C (DCPD) | | | 5 | | | | | | | 5 | | | |
| | Resin D (Rosin) | | | | 5 | | | | | | | 5 | | |
| | Resin E (α-methylstyrene) | | | | | 5 | | | | | | | 5 | |
| | Oil | 40 | 40 | 40 | 40 | 40 | 40 | 40 | 40 | 40 | 40 | 40 | 40 | 40 |
| | Antioxidant 1 (3C) | 1.5 | 1.5 | 1.5 | 1.5 | 1.5 | 1.5 | 1.5 | 1.5 | 1.5 | 1.5 | 1.5 | 1.5 | 1.5 |
| | Stearic acid | 2 | 2 | 2 | 2 | 2 | 2 | 2 | 2 | 2 | 2 | 2 | 2 | 2 |
| | Zinc oxide | 2.5 | 2.5 | 2.5 | 2.5 | 2.5 | 2.5 | 2.5 | 2.5 | 2.5 | 2.5 | 2.5 | 2.5 | 2.5 |
| | Wax | 1 | 1 | 1 | 1 | 1 | 1 | 1 | 1 | 1 | 1 | 1 | 1 | 1 |
| | Amide compound (WB16) | 1 | 1 | 1 | 1 | 1 | 1 | 1 | 1 | 1 | 1 | 1 | 1 | 1 |
| | Sulfur | 2 | 2 | 2 | 2 | 2 | 2 | 2 | 2 | 2 | 2 | 2 | 2 | 2 |
| | Vulcanization accelerator 1 (CBS) | 1.8 | 1.8 | 1.8 | 1.8 | 1.8 | 1.8 | 1.8 | 1.8 | 1.8 | 1.8 | 1.8 | 1.8 | 1.8 |
| | Vulcanization accelerator 2 (DPG) | 1.2 | 1.2 | 1.2 | 1.2 | 1.2 | 1.2 | 1.2 | 1.2 | 1.2 | 1.2 | 1.2 | 1.2 | 1.2 |
| Evaluation | Abrasion resistance index | 110 | 109 | 106 | 105 | 105 | 111 | 112 | 100 | 99 | 97 | 95 | 94 | 95 |
| | Snow and ice performance index | 112 | 112 | 110 | 110 | 108 | 110 | 109 | 100 | 99 | 98 | 97 | 95 | 96 |
| | Fuel economy index | 115 | 114 | 113 | 112 | 112 | 117 | 119 | 100 | 98 | 97 | 95 | 94 | 99 |

TABLE 7-7

Cold weather tread (Modified conjugated diene polymer)

| | | Example | | | Comparative Example | |
|---|---|---|---|---|---|---|
| | | 4-7a | 4-7b | 4-7c | 4-7a | 4-7b |
| Formulation (parts by mass) | *Taraxacum kok-saghyz*-derived natural rubber A | 60 | — | — | — | — |
| | *Taraxacum kok-saghyz*-derived natural rubber B | — | 60 | — | — | — |
| | *Taraxacum kok-saghyz*-derived natural rubber C | — | — | 60 | — | — |
| | *Hevea brasiliensis*-derived natural rubber | — | — | — | 60 | — |
| | Synthetic polyisoprene rubber | — | — | — | — | 60 |
| | Modified conjugated diene polymer | 40 | 40 | 40 | 40 | 40 |
| | BR | — | — | — | — | — |
| | Silica B (VN3) | 75 | 75 | 75 | 75 | 75 |
| | Silane coupling agent A (Si69) | 6 | 6 | 6 | 6 | 6 |
| | Carbon black A (N339) | 5 | 5 | 5 | 5 | 5 |
| | Oil | 40 | 40 | 40 | 40 | 40 |
| | Antioxidant 1 (3C) | 1.5 | 1.5 | 1.5 | 1.5 | 1.5 |
| | Stearic acid | 2 | 2 | 2 | 2 | 2 |
| | Zinc oxide | 2.5 | 2.5 | 2.5 | 2.5 | 2.5 |
| | Wax | 1 | 1 | 1 | 1 | 1 |
| | Amide compound (WB16) | 1 | 1 | 1 | 1 | 1 |
| | Sulfur | 2 | 2 | 2 | 2 | 2 |
| | Vulcanization accelerator 1 (CBS) | 1.8 | 1.8 | 1.8 | 1.8 | 1.8 |
| | Vulcanization accelerator 2 (DPG) | 1.2 | 1.2 | 1.2 | 1.2 | 1.2 |
| Evaluation | Abrasion resistance index | 112 | 118 | 120 | 100 | 98 |
| | Snow and ice performance index | 108 | 106 | 106 | 100 | 99 |
| | Fuel economy index | 111 | 114 | 115 | 100 | 101 |

TABLE 7-8

Cold weather tread (Tetrazine compound)

|  |  | Example | | | | | | Comparative Example | | | |
| --- | --- | --- | --- | --- | --- | --- | --- | --- | --- | --- | --- |
|  |  | 4-8a | 4-8b | 4-8c | 4-8d | 4-8e | 4-8f | 4-8a | 4-8b | 4-8c | 4-8d |
| Formulation (parts by mass) | *Taraxacum kok-saghyz*-derived natural rubber A | 60 | 60 | — | — | — | — | — | — | — | — |
|  | *Taraxacum kok-saghyz*-derived natural rubber B | — | — | 60 | 60 | — | — | — | — | — | — |
|  | *Taraxacum kok-saghyz*-derived natural rubber C | — | — | — | — | 60 | 60 | — | — | — | — |
|  | *Hevea brasiliensis*-derived natural rubber | — | — | — | — | — | — | 60 | 60 | — | — |
|  | Synthetic polyisoprene rubber | — | — | — | — | — | — | — | — | 60 | 60 |
|  | BR | 40 | 40 | 40 | 40 | 40 | 40 | 40 | 40 | 40 | 40 |
|  | Silica B (VN3) | 75 | 75 | 75 | 75 | 75 | 75 | 75 | 75 | 75 | 75 |
|  | Silane coupling agent A (Si69) | 6 | 6 | 6 | 6 | 6 | 6 | 6 | 6 | 6 | 6 |
|  | Carbon black A (N339) | 5 | 5 | 5 | 5 | 5 | 5 | 5 | 5 | 5 | 5 |
|  | Oil | 40 | 40 | 40 | 40 | 40 | 40 | 40 | 40 | 40 | 40 |
|  | Antioxidant 1 (3C) | 1.5 | 1.5 | 1.5 | 1.5 | 1.5 | 1.5 | 1.5 | 1.5 | 1.5 | 1.5 |
|  | Stearic acid | 2 | 2 | 2 | 2 | 2 | 2 | 2 | 2 | 2 | 2 |
|  | Zinc oxide | 2.5 | 2.5 | 2.5 | 2.5 | 2.5 | 2.5 | 2.5 | 2.5 | 2.5 | 2.5 |
|  | Wax | 1 | 1 | 1 | 1 | 1 | 1 | 1 | 1 | 1 | 1 |
|  | Amide compound (WB16) | 1 | 1 | 1 | 1 | 1 | 1 | 1 | 1 | 1 | 1 |
|  | Sulfur | 2 | 2 | 2 | 2 | 2 | 2 | 2 | 2 | 2 | 2 |
|  | Vulcanization accelerator 1 (CBS) | 1.8 | 1.8 | 1.8 | 1.8 | 1.8 | 1.8 | 1.8 | 1.8 | 1.8 | 1.8 |
|  | Vulcanization accelerator 2 (DPG) | 1.2 | 1.2 | 1.2 | 1.2 | 1.2 | 1.2 | 1.2 | 1.2 | 1.2 | 1.2 |
|  | Tetrazine compound A | 2 | — | 2 | — | 2 | — | 2 | — | 2 | — |
|  | Tetrazine compound B | — | 2 | — | 2 | — | 2 | — | 2 | — | 2 |
| Evaluation | Abrasion resistance index | 110 | 108 | 114 | 112 | 115 | 116 | 100 | 98 | 96 | 95 |
|  | Snow and ice performance index | 105 | 104 | 104 | 104 | 103 | 104 | 100 | 99 | 98 | 98 |
|  | Fuel economy index | 112 | 113 | 115 | 117 | 119 | 120 | 100 | 98 | 99 | 99 |

TABLE 7-9

Cold weather tread (Mercapto silane coupling agent)

|  |  | Example | | | | | | Comparative Example | | | |
| --- | --- | --- | --- | --- | --- | --- | --- | --- | --- | --- | --- |
|  |  | 4-9a | 4-9b | 4-9c | 4-9d | 4-9e | 4-9f | 4-9a | 4-9b | 4-9c | 4-9d |
| Formulation (parts by mass) | *Taraxacum kok-saghyz*-derived natural rubber A | 60 | 60 | — | — | — | — | — | — | — | — |
|  | *Taraxacum kok-saghyz*-derived natural rubber B | — | — | 60 | 60 | — | — | — | — | — | — |
|  | *Taraxacum kok-saghyz*-derived natural rubber C | — | — | — | — | 60 | 60 | — | — | — | — |
|  | *Hevea brasiliensis*-derived natural rubber | — | — | — | — | — | — | 60 | 60 | — | — |
|  | Synthetic polyisoprene rubber | — | — | — | — | — | — | — | — | 60 | 60 |
|  | BR | 40 | 40 | 40 | 40 | 40 | 40 | 40 | 40 | 40 | 40 |
|  | Silica B (VN3) | 75 | 75 | 75 | 75 | 75 | 75 | 75 | 75 | 75 | 75 |
|  | Silane coupling agent A (Si69) | — | — | — | — | — | — | — | — | — | — |
|  | Silane coupling agent B (NXT) | 6 | — | 6 | — | 6 | — | 6 | — | 6 | — |
|  | Silane coupling agent C (NXT-Z45) | — | 3.75 | — | 3.75 | — | 3.75 | — | 3.75 | — | 3.75 |
|  | Carbon black A (N339) | 5 | 5 | 5 | 5 | 5 | 5 | 5 | 5 | 5 | 5 |
|  | Oil | 40 | 40 | 40 | 40 | 40 | 40 | 40 | 40 | 40 | 40 |
|  | Antioxidant 1 (3C) | 1.5 | 1.5 | 1.5 | 1.5 | 1.5 | 1.5 | 1.5 | 1.5 | 1.5 | 1.5 |
|  | Stearic acid | 2 | 2 | 2 | 2 | 2 | 2 | 2 | 2 | 2 | 2 |
|  | Zinc oxide | 2.5 | 2.5 | 2.5 | 2.5 | 2.5 | 2.5 | 2.5 | 2.5 | 2.5 | 2.5 |
|  | Wax | 1 | 1 | 1 | 1 | 1 | 1 | 1 | 1 | 1 | 1 |
|  | Amide compound (WB16) | 1 | 1 | 1 | 1 | 1 | 1 | 1 | 1 | 1 | 1 |
|  | Sulfur | 2 | 2 | 2 | 2 | 2 | 2 | 2 | 2 | 2 | 2 |
|  | Vulcanization accelerator 1 (CBS) | 1.8 | 1.8 | 1.8 | 1.8 | 1.8 | 1.8 | 1.8 | 1.8 | 1.8 | 1.8 |
|  | Vulcanization accelerator 2 (DPG) | 1.2 | 1.2 | 1.2 | 1.2 | 1.2 | 1.2 | 1.2 | 1.2 | 1.2 | 1.2 |
| Evaluation | Abrasion resistance index | 112 | 111 | 115 | 114 | 117 | 116 | 100 | 100 | 96 | 97 |
|  | Wet grip performance index | 108 | 107 | 106 | 105 | 104 | 104 | 100 | 99 | 96 | 96 |
|  | Fuel economy index | 114 | 117 | 118 | 121 | 120 | 123 | 100 | 101 | 102 | 102 |

TABLE 7-10

| | Cold weather tread (Farnesene resin) | | | | | | | | | | | | | | |
|---|---|---|---|---|---|---|---|---|---|---|---|---|---|---|---|
| | Example | | | | | | | | | Comparative Example | | | | | |
| | 4-10a | 4-10b | 4-10c | 4-10d | 4-10e | 4-10f | 4-10g | 4-10h | 4-10i | 4-10a | 4-10b | 4-10c | 4-10d | 4-10e | 4-10f |
| Formulation (parts by mass) | | | | | | | | | | | | | | | |
| *Taraxacum kok-saghyz*-derived natural rubber A | 60 | 60 | 60 | — | — | — | — | — | — | — | — | — | — | — | — |
| *Taraxacum kok-saghyz*-derived natural rubber B | — | — | — | 60 | 60 | 60 | — | — | — | — | — | — | — | — | — |
| *Taraxacum kok-saghyz*-derived natural rubber C | — | — | — | — | — | — | 60 | 60 | 60 | — | — | — | — | — | — |
| *Hevea brasiliensis*-derived natural rubber | — | — | — | — | — | — | — | — | — | 60 | 60 | 60 | — | — | — |
| Synthetic polyisoprene rubber | — | — | — | — | — | — | — | — | — | — | — | — | 60 | 60 | 60 |
| BR | 40 | 40 | 40 | 40 | 40 | 40 | 40 | 40 | 40 | 40 | 40 | 40 | 40 | 40 | 40 |
| Silica B (VN3) | 75 | 75 | 75 | 75 | 75 | 75 | 75 | 75 | 75 | 75 | 75 | 75 | 75 | 75 | 75 |
| Silane coupling agent A (5i69) | 6 | 6 | 6 | 6 | 6 | 6 | 6 | 6 | 6 | 6 | 6 | 6 | 6 | 6 | 6 |
| Carbon black A (N339) | 5 | 5 | 5 | 5 | 5 | 5 | 5 | 5 | 5 | 5 | 5 | 5 | 5 | 5 | 5 |
| Oil | 30 | 30 | 30 | 30 | 30 | 30 | 30 | 30 | 30 | 30 | 30 | 30 | 30 | 30 | 30 |
| Farnesene resin A (KB-101) | 10 | — | — | 10 | — | — | 10 | — | — | 10 | — | — | 10 | — | — |
| Farnesene resin B (FSR-221) | — | 10 | — | — | 10 | — | — | 10 | — | — | 10 | — | — | 10 | — |
| Farnesene resin C (FBR-746) | — | — | 10 | — | — | 10 | — | — | 10 | — | — | 10 | — | — | 10 |
| Antioxidant 1 (3C) | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| Stearic acid | 2 | 2 | 2 | 2 | 2 | 2 | 2 | 2 | 2 | 2 | 2 | 2 | 2 | 2 | 2 |
| Zinc oxide | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 |
| Wax | 1 | 1 | 1 | 1 | 1 | 1 | 1 | 1 | 1 | 1 | 1 | 1 | 1 | 1 | 1 |
| Amide compound (WB16) | 1 | 1 | 1 | 1 | 1 | — | 1 | 1 | 1 | 1 | 1 | 1 | 1 | 1 | 1 |
| Sulfur | 2 | 2 | 2 | 2 | 2 | 2 | 2 | 2 | 2 | 2 | 2 | 2 | 2 | 2 | 2 |
| Vulcanization accelerator 1 (CBS) | 1.8 | 1.8 | 1.8 | 1.8 | 1.8 | 1.8 | 1.8 | 1.8 | 1.8 | 1.8 | 1.8 | 1.8 | 1.8 | 1.8 | 1.8 |
| Vulcanization accelerator 2 (DPG) | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 |
| Evaluation | | | | | | | | | | | | | | | |
| Abrasion resistance index | 113 | 112 | 110 | 114 | 112 | 110 | 115 | 113 | 111 | 100 | 98 | 98 | 95 | 95 | 94 |
| Snow and ice performance index | 111 | 110 | 112 | 108 | 107 | 109 | 107 | 105 | 107 | 100 | 99 | 98 | 98 | 98 | 101 |
| Fuel economy index | 112 | 111 | 113 | 115 | 114 | 116 | 117 | 115 | 119 | 100 | 99 | 100 | 99 | 99 | 100 |

The above tables demonstrate that the overall performance in terms of fuel economy, abrasion resistance, and snow and ice performance was significantly improved in the examples using a combination of a natural rubber derived from *Taraxacum kok-saghyz* specified in the present application, a polybutadiene rubber having a predetermined cis-1,4-bond content, carbon black, and a silica having a predetermined nitrogen adsorption specific surface area at a predetermined ratio.

Examples and Comparative Examples

[Base Treads]

According to each of the formulations shown in Tables 8-1 to 8-10, the materials other than the sulfur and vulcanization accelerator were kneaded for five minutes at 150° C. using a 1.7 L Banbury mixer (Kobe Steel, Ltd.) to give a kneaded mixture. Next, the sulfur and vulcanization accelerator were added to the kneaded mixture, followed by kneading for five minutes at 80° C. using an open roll mill to give an unvulcanized rubber composition.

The unvulcanized rubber composition was press-vulcanized for 20 minutes at 170° C. in a 0.5 mm-thick die to obtain a vulcanized rubber composition.

Separately, the unvulcanized rubber composition prepared as above was formed into the shape of a base tread and assembled with other tire components on a tire building machine to build an unvulcanized tire. The unvulcanized tire was vulcanized at 170° C. for 12 minutes to prepare a test tire (size: 195/65R15).

The vulcanized rubber compositions (vulcanized rubber sheets) and test tires prepared as above were evaluated as follows. The results are shown in Table 8-1 to Table 8-10, where Comparative Example 5-1a to Comparative Example 5-10a, respectively, are used as standards of comparison (index=100).

<Fracture Resistance Strength>

No. 3 dumbbell specimens of the vulcanized rubber sheets (vulcanized rubber compositions) were subjected to a tensile test in accordance with JIS K 6251 to measure the tensile strength at break (TB) and elongation at break (EB, %). The value TB×EB/2 was defined as the fracture resistance strength. The fracture resistance strength of each formulation example is expressed as an index relative to the standard comparative example taken as 100. A higher index indicates better fracture resistance strength.

<Fuel Economy>

The rolling resistance of each test tire was measured using a rolling resistance tester by running the test tire mounted on a 15×6JJ rim at an internal pressure of 230 kPa, a load of 3.43 kN, and a speed of 80 km/h and expressed as an index relative to the standard comparative example taken as 100. A higher index indicates a lower rolling resistance and thus better fuel economy.

TABLE 8-1

| | Base tread (Particulate zinc carrier) | | | | | | | | | |
|---|---|---|---|---|---|---|---|---|---|---|
| | Example | | | | | | Comparative Example | | | |
| | 5-1a | 5-1b | 5-1c | 5-1d | 5-1e | 5-1f | 5-1a | 5-1b | 5-1c | 5-1d |
| Formulation (parts by mass) | | | | | | | | | | |
| *Taraxacum kok-saghyz*-derived natural rubber A | 80 | 80 | — | — | — | — | — | — | — | — |
| *Taraxacum kok-saghyz*-derived natural rubber B | — | — | 80 | 80 | — | — | — | — | — | — |
| *Taraxacum kok-saghyz*-derived natural rubber C | — | — | — | — | 80 | 80 | — | — | — | — |
| *Hevea brasiliensis*-derived natural rubber | — | — | — | — | — | — | 80 | 80 | — | — |
| Synthetic polyisoprene rubber | — | — | — | — | — | — | — | — | 80 | 80 |
| BR | 20 | 20 | 20 | 20 | 20 | 20 | 20 | 20 | 20 | 20 |
| Silica D (Ultrasil 360) | 20 | 20 | 20 | 20 | 20 | 20 | 20 | 20 | 20 | 20 |
| Silane coupling agent A (Si69) | 1.6 | 1.6 | 1.6 | 1.6 | 1.6 | 1.6 | 1.6 | 1.6 | 1.6 | 1.6 |
| Carbon black A (N339) | 45 | 45 | 45 | 45 | 45 | 45 | 45 | 45 | 45 | 45 |
| Oil | 6.5 | 6.5 | 6.5 | 6.5 | 6.5 | 6.5 | 6.5 | 6.5 | 6.5 | 6.5 |
| Antioxidant 2 (6C) | 2.5 | 2.5 | 2.5 | 2.5 | 2.5 | 2.5 | 2.5 | 2.5 | 2.5 | 2.5 |
| Stearic acid | 1 | 1 | 1 | 1 | 1 | 1 | 1 | 1 | 1 | 1 |
| Zinc oxide | — | — | — | — | — | — | — | — | — | — |
| Particulate zinc carrier | 1.6 | 0.8 | 1.6 | 0.8 | 1.6 | 0.8 | 1.6 | 0.8 | 1.6 | 0.8 |
| Wax | 1.5 | 1.5 | 1.5 | 1.5 | 1.5 | 1.5 | 1.5 | 1.5 | 1.5 | 1.5 |
| Amide compound (WB16) | 1 | 1 | 1 | 1 | 1 | 1 | 1 | 1 | 1 | 1 |
| Sulfur | 3 | 3 | 3 | 3 | 3 | 3 | 3 | 3 | 3 | 3 |
| Vulcanization accelerator 2 (DPG) | 1.5 | 1.5 | 1.5 | 1.5 | 1.5 | 1.5 | 1.5 | 1.5 | 1.5 | 1.5 |
| Evaluation | | | | | | | | | | |
| Fracture resistance strength index | 114 | 115 | 116 | 117 | 116 | 118 | 100 | 100 | 95 | 94 |
| Fuel economy index | 111 | 112 | 112 | 114 | 112 | 115 | 100 | 100 | 101 | 102 |

TABLE 8-2

| | Base tread (Fine particle silica) | | | | | | | | | |
|---|---|---|---|---|---|---|---|---|---|---|
| | Example | | | | | | Comparative Example | | | |
| | 5-2a | 5-2b | 5-2c | 5-2d | 5-2e | 5-2f | 5-2a | 5-2b | 5-2c | 5-2d |
| Formulation (parts by mass) | | | | | | | | | | |
| *Taraxacum kok-saghyz*-derived natural rubber A | 80 | 80 | — | — | — | — | — | — | — | — |
| *Taraxacum kok-saghyz*-derived natural rubber B | — | — | 80 | 80 | — | — | — | — | — | — |
| *Taraxacum kok-saghyz*-derived natural rubber C | — | — | — | — | 80 | 80 | — | — | — | — |
| *Hevea brasiliensis*-derived natural rubber | — | — | — | — | — | — | 80 | 80 | — | — |
| Synthetic polyisoprene rubber | — | — | — | — | — | — | — | — | 80 | 80 |
| BR | 20 | 20 | 20 | 20 | 20 | 20 | 20 | 20 | 20 | 20 |
| Silica D (Ultrasil 360) | — | — | — | — | — | — | — | — | — | — |
| Silica B (VN3) | 20 | — | 20 | — | 20 | — | 20 | — | 20 | — |
| Silica C (91000R) | — | 20 | — | 20 | — | 20 | — | 20 | — | 20 |
| Silane coupling agent A (Si69) | 1.6 | 1.6 | 1.6 | 1.6 | 1.6 | 1.6 | 1.6 | 1.6 | 1.6 | 1.6 |
| Carbon black A (N339) | 45 | 45 | 45 | 45 | 45 | 45 | 45 | 45 | 45 | 45 |
| Oil | 6.5 | 6.5 | 6.5 | 6.5 | 6.5 | 6.5 | 6.5 | 6.5 | 6.5 | 6.5 |
| Antioxidant 2 (6C) | 2.5 | 2.5 | 2.5 | 2.5 | 2.5 | 2.5 | 2.5 | 2.5 | 2.5 | 2.5 |
| Stearic acid | 1 | 1 | 1 | 1 | 1 | 1 | 1 | 1 | 1 | 1 |
| Zinc oxide | 2.5 | 2.5 | 2.5 | 2.5 | 2.5 | 2.5 | 2.5 | 2.5 | 2.5 | 2.5 |
| Wax | 1.5 | 1.5 | 1.5 | 1.5 | 1.5 | 1.5 | 1.5 | 1.5 | 1.5 | 1.5 |
| Amide compound (WB16) | 1 | 1 | 1 | 1 | 1 | 1 | 1 | 1 | 1 | 1 |
| Sulfur | 3 | 3 | 3 | 3 | 3 | 3 | 3 | 3 | 3 | 3 |
| Vulcanization accelerator 2 (DPG) | 1.5 | 1.5 | 1.5 | 1.5 | 1.5 | 1.5 | 1.5 | 1.5 | 1.5 | 1.5 |
| Evaluation | | | | | | | | | | |
| Fracture resistance strength index | 112 | 113 | 114 | 116 | 115 | 119 | 100 | 101 | 92 | 98 |
| Fuel economy index | 111 | 115 | 114 | 116 | 115 | 118 | 100 | 99 | 100 | 99 |

TABLE 8-3

| | Base tread (High structure carbon) | | | | | | | | | |
|---|---|---|---|---|---|---|---|---|---|---|
| | Example | | | | | | Comparative Example | | | |
| | 5-3a | 5-3b | 5-3c | 5-3d | 5-3e | 5-3f | 5-3a | 5-3b | 5-3c | 5-3d |
| Formulation (parts by mass) | | | | | | | | | | |
| *Taraxacum kok-saghyz*-derived natural rubber A | 80 | 80 | — | — | — | — | — | — | — | — |
| *Taraxacum kok-saghyz*-derived natural rubber B | — | — | 80 | 80 | — | — | — | — | — | — |
| *Taraxacum kok-saghyz*-derived natural rubber C | — | — | — | — | 80 | 80 | — | — | — | — |
| *Hevea brasibensis*-derived natural rubber | — | — | — | — | — | — | 80 | 80 | — | — |
| Synthetic polyisoprene rubber | — | — | — | — | — | — | — | — | 80 | 80 |
| BR | 20 | 20 | 20 | 20 | 20 | 20 | 20 | 20 | 20 | 20 |
| Silica D (Ultrasil 360) | 20 | 20 | 20 | 20 | 20 | 20 | 20 | 20 | 20 | 20 |
| Silane coupling agent A (S169) | 1.6 | 1.6 | 1.6 | 1.6 | 1.6 | 1.6 | 1.6 | 1.6 | 1.6 | 1.6 |
| Carbon black A (N339) | — | — | — | — | — | — | — | — | — | — |
| Carbon black B (High structure) | 45 | — | 45 | — | 45 | — | 45 | — | 45 | — |
| Carbon black C (High structure) | — | 45 | — | 45 | — | 45 | — | 45 | — | 45 |
| Oil | 6.5 | 6.5 | 6.5 | 6.5 | 6.5 | 6.5 | 6.5 | 6.5 | 6.5 | 6.5 |
| Antioxidant 2 (6C) | 2.5 | 2.5 | 2.5 | 2.5 | 2.5 | 2.5 | 2.5 | 2.5 | 2.5 | 2.5 |
| Stearic acid | 1 | 1 | 1 | 1 | 1 | 1 | 1 | 1 | 1 | 1 |
| Zinc oxide | 2.5 | 2.5 | 2.5 | 2.5 | 2.5 | 2.5 | 2.5 | 2.5 | 2.5 | 2.5 |
| Wax | 1.5 | 1.5 | 1.5 | 1.5 | 1.5 | 1.5 | 1.5 | 1.5 | 1.5 | 1.5 |
| Amide compound (WB16) | 1 | 1 | 1 | 1 | 1 | 1 | 1 | 1 | 1 | 1 |
| Sulfur | 3 | 3 | 3 | 3 | 3 | 3 | 3 | 3 | 3 | 3 |
| Vulcanization accelerator 2 (DPG) | 1.5 | 1.5 | 1.5 | 1.5 | 1.5 | 1.5 | 1.5 | 1.5 | 1.5 | 1.5 |
| Evaluation | | | | | | | | | | |
| Fracture resistance strength index | 115 | 116 | 117 | 118 | 117 | 120 | 100 | 101 | 95 | 98 |
| Fuel economy index | 111 | 112 | 112 | 114 | 114 | 115 | 100 | 100 | 100 | 101 |

TABLE 8-4

| | Base tread (High silica) | | | | | | | | | |
|---|---|---|---|---|---|---|---|---|---|---|
| | Example | | | | | | Comparative Example | | | |
| | 5-4a | 5-4b | 5-4c | 5-4d | 5-4e | 5-4f | 5-4a | 5-4b | 5-4c | 5-4d |
| Formulation (parts by mass) | | | | | | | | | | |
| *Taraxacum kok-saghyz*-derived natural rubber A | 80 | 80 | — | — | — | — | — | — | — | — |
| *Taraxacum kok-saghyz*-derived natural rubber B | — | — | 80 | 80 | — | — | — | — | — | — |
| *Taraxacum kok-saghyz*-derived natural rubber C | — | — | — | — | 80 | 80 | — | — | — | — |
| *Hevea brasiliensis*-derived natural rubber | — | — | — | — | — | — | 80 | 80 | — | — |
| Synthetic polyisoprene rubber | — | — | — | — | — | — | — | — | 80 | 80 |
| BR | 20 | 20 | 20 | 20 | 20 | 20 | 20 | 20 | 20 | 20 |
| Silica D (Ultrasil 360) | 160 | 130 | 160 | 130 | 160 | 130 | 160 | 130 | 160 | 130 |
| Silane coupling agent A (Si69) | 12.8 | 10.4 | 12.8 | 10.4 | 12.8 | 10.4 | 12.8 | 10.4 | 12.8 | 10.4 |
| Carbon black A (N339) | 45 | 45 | 45 | 45 | 45 | 45 | 45 | 45 | 45 | 45 |
| Oil | 6.5 | 6.5 | 6.5 | 6.5 | 6.5 | 6.5 | 6.5 | 6.5 | 6.5 | 6.5 |
| Antioxidant 2 (6C) | 2.5 | 2.5 | 2.5 | 2.5 | 2.5 | 2.5 | 2.5 | 2.5 | 2.5 | 2.5 |
| Stearic acid | 1 | 1 | 1 | 1 | 1 | 1 | 1 | 1 | 1 | 1 |
| Zinc oxide | 2.5 | 2.5 | 2.5 | 2.5 | 2.5 | 2.5 | 2.5 | 2.5 | 2.5 | 2.5 |
| Wax | 1.5 | 1.5 | 1.5 | 1.5 | 1.5 | 1.5 | 1.5 | 1.5 | 1.5 | 1.5 |
| Amide compound (WB16) | 1 | 1 | 1 | 1 | 1 | 1 | 1 | 1 | 1 | 1 |
| Sulfur | 3 | 3 | 3 | 3 | 3 | 3 | 3 | 3 | 3 | 3 |
| Vulcanization accelerator 2 (DPG) | 1.5 | 1.5 | 1.5 | 1.5 | 1.5 | 1.5 | 1.5 | 1.5 | 1.5 | 1.5 |
| Evaluation | | | | | | | | | | |
| Fracture resistance strength index | 112 | 111 | 114 | 113 | 116 | 114 | 100 | 98 | 95 | 92 |
| Fuel economy index | 108 | 108 | 110 | 110 | 112 | 111 | 100 | 98 | 95 | 96 |

TABLE 8-5

| | Base tread (High oil) | | | | | | | | | |
|---|---|---|---|---|---|---|---|---|---|---|
| | Example | | | | | | Comparative Example | | | |
| | 5-5a | 5-5b | 5-5c | 5-5d | 5-5e | 5-5f | 5-5a | 5-5b | 5-5c | 5-5d |
| Formulation (parts by mass) | | | | | | | | | | |
| *Taraxacum kok-saghyz*-derived natural rubber A | 80 | 80 | — | — | — | — | — | — | — | — |
| *Taraxacum kok-saghyz*-derived natural rubber B | — | — | 80 | 80 | — | — | — | — | — | — |
| *Taraxacum kok-saghyz*-derived natural rubber C | — | — | — | — | 80 | 80 | — | — | — | — |
| *Hevea brasiliensis*-derived natural rubber | — | — | — | — | — | — | 80 | 80 | — | — |
| Synthetic polyisoprene rubber | — | — | — | — | — | — | — | — | 80 | 80 |
| BR | 20 | 20 | 20 | 20 | 20 | 20 | 20 | 20 | 20 | 20 |
| Silica D (Ultrasil 360) | 20 | 20 | 20 | 20 | 20 | 20 | 20 | 20 | 20 | 20 |
| Silane coupling agent A (Si69) | 1.6 | 1.6 | 1.6 | 1.6 | 1.6 | 1.6 | 1.6 | 1.6 | 1.6 | 1.6 |
| Carbon black A (N339) | 45 | 45 | 45 | 45 | 45 | 45 | 45 | 45 | 45 | 45 |
| Oil | 60 | 80 | 60 | 80 | 60 | 80 | 60 | 80 | 60 | 80 |
| Antioxidant 2 (6C) | 2.5 | 2.5 | 2.5 | 2.5 | 2.5 | 2.5 | 2.5 | 2.5 | 2.5 | 2.5 |
| Stearic acid | 1 | 1 | 1 | 1 | 1 | 1 | 1 | 1 | 1 | 1 |
| Zinc oxide | 2.5 | 2.5 | 2.5 | 2.5 | 2.5 | 2.5 | 2.5 | 2.5 | 2.5 | 2.5 |
| Wax | 1.5 | 1.5 | 1.5 | 1.5 | 1.5 | 1.5 | 1.5 | 1.5 | 1.5 | 1.5 |
| Amide compound (WB16) | 1 | 1 | 1 | 1 | 1 | 1 | 1 | 1 | 1 | 1 |
| Sulfur | 3 | 3 | 3 | 3 | 3 | 3 | 3 | 3 | 3 | 3 |
| Vulcanization accelerator 2 (DPG) | 1.5 | 1.5 | 1.5 | 1.5 | 1.5 | 1.5 | 1.5 | 1.5 | 1.5 | 1.5 |
| Evaluation | | | | | | | | | | |
| Fracture resistance strength index | 109 | 108 | 112 | 110 | 114 | 112 | 100 | 98 | 95 | 92 |
| Fuel economy index | 110 | 109 | 112 | 111 | 116 | 114 | 100 | 98 | 101 | 100 |

TABLE 8-6

| | Base tread (Resin) | | | | | | | | | | | | |
|---|---|---|---|---|---|---|---|---|---|---|---|---|---|
| | Example | | | | | | | Comparative Example | | | | | |
| | 5-6a | 5-6b | 5-6c | 5-6d | 5-6e | 5-6f | 5-6g | 5-6a | 5-6b | 5-6c | 5-6d | 5-6e | 5-6f |
| Formulation (parts by mass) | | | | | | | | | | | | | |
| *Taraxacum kok-saghyz*-derived natural rubber A | 80 | 80 | 80 | 80 | 80 | — | — | — | — | — | — | — | — |
| *Taraxacum kok-saghyz*-derived natural rubber B | — | — | — | — | — | 80 | — | — | — | — | — | — | — |
| *Taraxacum kok-saghyz*-derived natural rubber C | — | — | — | — | — | — | 80 | — | — | — | — | — | — |
| *Hevea brasiliensis*-derived natural rubber | — | — | — | — | — | — | — | 80 | 80 | 80 | 80 | 80 | — |
| Synthetic polyisoprene rubber | — | — | — | — | — | — | — | — | — | — | — | — | 80 |
| BR | 20 | 20 | 20 | 20 | 20 | 20 | 20 | 20 | 20 | 20 | 20 | 20 | 20 |
| Silica D (Ultrasil 360) | 20 | 20 | 20 | 20 | 20 | 20 | 20 | 20 | 20 | 20 | 20 | 20 | 20 |
| Silane coupling agent A (S169) | 1.6 | 1.6 | 1.6 | 1.6 | 1.6 | 1.6 | 1.6 | 1.6 | 1.6 | 1.6 | 1.6 | 1.6 | 1.6 |
| Carbon black A (N339) | 45 | 45 | 45 | 45 | 45 | 45 | 45 | 45 | 45 | 45 | 45 | 45 | 45 |
| Resin A (Terpene) | 5 | | | | | 5 | 5 | 5 | | | | | 5 |
| Resin B (Terpene phenol) | | 5 | | | | | | | 5 | | | | |
| Resin C (DCPD) | | | 5 | | | | | | | 5 | | | |
| Resin D (Rosin) | | | | 5 | | | | | | | 5 | | |
| Resin E (ci-methylstyrene) | | | | | 5 | | | | | | | 5 | |
| Oil | 6.5 | 6.5 | 6.5 | 6.5 | 6.5 | 6.5 | 6.5 | 6.5 | 6,5 | 6.5 | 6.5 | 6.5 | 6.5 |
| Antioxidant 2 (6C) | 2.5 | 2.5 | 2.5 | 2.5 | 2.5 | 2.5 | 2.5 | 2.5 | 2.5 | 2.5 | 2.5 | 2.5 | 2.5 |
| Stearic acid | 1 | 1 | 1 | 1 | 1 | 1 | 1 | 1 | 1 | 1 | 1 | 1 | 1 |
| Zinc oxide | 2.5 | 2.5 | 2.5 | 2.5 | 2.5 | 2.5 | 2.5 | 2.5 | 2.5 | 2.5 | 2.5 | 2.5 | 2.5 |
| Wax | 1.5 | 1.5 | 1.5 | 1.5 | 1.5 | 1.5 | 1.5 | 1.5 | 1.5 | 1.5 | 1.5 | 1.5 | 1.5 |
| Amide compound (WB16) | 1 | 1 | 1 | 1 | 1 | 1 | 1 | 1 | 1 | 1 | 1 | 1 | 1 |
| Sulfur | 3 | 3 | 3 | 3 | 3 | 3 | 3 | 3 | 3 | 3 | 3 | 3 | 3 |
| Vulcanization accelerator 2 (DPG) | 1.5 | 1.5 | 1.5 | 1.5 | 1.5 | 1.5 | 1.5 | 1.5 | 1.5 | 1.5 | 1.5 | 1.5 | 1.5 |
| Evaluation | | | | | | | | | | | | | |
| Fracture resistance strength index | 113 | 112 | 110 | 110 | 109 | 114 | 116 | 100 | 99 | 97 | 96 | 94 | 93 |
| Fuel economy index | 112 | 111 | 110 | 108 | 108 | 113 | 115 | 100 | 99 | 99 | 98 | 100 | 99 |

TABLE 8-7

Base tread (Modified conjugated diene polymer)

| | Example | | | Comparative Example | |
|---|---|---|---|---|---|
| | 5-7a | 5-7b | 5-7c | 5-7a | 5-7b |
| Formulation (parts by mass) | | | | | |
| Taraxacum kok-saghyz-derived natural rubber A | 65 | — | — | — | — |
| Taraxacum kok-saghyz-derived natural rubber B | — | 65 | — | — | — |
| Taraxacum kok-saghyz-derived natural rubber C | — | — | 65 | — | — |
| Hevea brasiliensis-derived natural rubber | — | — | — | 65 | — |
| Synthetic polyisoprene rubber | — | — | — | — | 65 |
| Modified conjugated diene polymer | 15 | 15 | 15 | 15 | 15 |
| BR | 20 | 20 | 20 | 20 | 20 |
| Silica D (Ultrasil 360) | 20 | 20 | 20 | 20 | 20 |
| Silane coupling agent A (Si69) | 1.6 | 1.6 | 1.6 | 1.6 | 1.6 |
| Carbon black A (N339) | 45 | 45 | 45 | 45 | 45 |
| Oil | 6.5 | 6.5 | 6.5 | 6.5 | 6.5 |
| Antioxidant 2 (6C) | 2.5 | 2.5 | 2.5 | 2.5 | 2.5 |
| Stearic acid | 1 | 1 | 1 | 1 | 1 |
| Zinc oxide | 2.5 | 2.5 | 2.5 | 2.5 | 2.5 |
| Wax | 1.5 | 1.5 | 1.5 | 1.5 | 1.5 |
| Amide compound (WB16) | 1 | 1 | 1 | 1 | 1 |
| Sulfur | 3 | 3 | 3 | 3 | 3 |
| Vulcanization accelerator 2 (DPG) | 1.5 | 1.5 | 1.5 | 1.5 | 1.5 |
| Evaluation | | | | | |
| Fracture resistance strength index | 114 | 115 | 117 | 100 | 97 |
| Fuel economy index | 111 | 112 | 114 | 100 | 101 |

TABLE 8-8

Base tread (Tetrazine compound)

| | Example | | | | | | Comparative Example | | | |
|---|---|---|---|---|---|---|---|---|---|---|
| | 5-8a | 5-8b | 5-8c | 5-8d | 5-8e | 5-8f | 5-8a | 5-8b | 5-8c | 5-8d |
| Formulation (parts by mass) | | | | | | | | | | |
| Taraxacum kok-saghyz-derived natural rubber A | 80 | 80 | — | — | — | — | — | — | — | — |
| Taraxacum kok-saghyz-derived natural rubber B | — | — | 80 | 80 | — | — | — | — | — | — |
| Taraxacum kok-saghyz-derived natural rubber C | — | — | — | — | 80 | 80 | — | — | — | — |
| Hevea brasiliensis-derived natural rubber | — | — | — | — | — | — | 80 | 80 | — | — |
| Synthetic polyisoprene rubber | — | — | — | — | — | — | — | — | 80 | 80 |
| BR | 20 | 20 | 20 | 20 | 20 | 20 | 20 | 20 | 20 | 20 |
| Silica D (Ultrasil 360) | 20 | 20 | 20 | 20 | 20 | 20 | 20 | 20 | 20 | 20 |
| Silane coupling agent A (Si69) | 1.6 | 1.6 | 1.6 | 1.6 | 1.6 | 1.6 | 1.6 | 1.6 | 1.6 | 1.6 |
| Carbon black A (N339) | 45 | 45 | 45 | 45 | 45 | 45 | 45 | 45 | 45 | 45 |
| Oil | 6.5 | 6.5 | 6.5 | 6.5 | 6.5 | 6.5 | 6.5 | 6.5 | 6.5 | 6.5 |
| Antioxidant 2 (6C) | 2.5 | 2.5 | 2.5 | 2.5 | 2.5 | 2.5 | 2.5 | 2.5 | 2.5 | 2.5 |
| Stearic acid | 1 | 1 | 1 | 1 | 1 | 1 | 1 | 1 | 1 | 1 |
| Zinc oxide | 2.5 | 2.5 | 2.5 | 2.5 | 2.5 | 2.5 | 2.5 | 2.5 | 2.5 | 2.5 |
| Wax | 1.5 | 1.5 | 1.5 | 1.5 | 1.5 | 1.5 | 1.5 | 1.5 | 1.5 | 1.5 |
| Amide compound (WB16) | 1 | 1 | 1 | 1 | 1 | 1 | 1 | 1 | 1 | 1 |
| Sulfur | 3 | 3 | 3 | 3 | 3 | 3 | 3 | 3 | 3 | 3 |
| Vulcanization accelerator 2 (DPG) | 1.5 | 1.5 | 1.5 | 1.5 | 1.5 | 1.5 | 1.5 | 1.5 | 1.5 | 1.5 |
| Tetrazine compound A | 2 | — | 2 | — | 2 | — | 2 | — | 2 | — |
| Tetrazine compound B | — | 2 | — | 2 | — | 2 | — | 2 | — | 2 |
| Evaluation | | | | | | | | | | |
| Fracture resistance strength index | 112 | 112 | 115 | 114 | 116 | 117 | 100 | 99 | 95 | 95 |
| Fuel economy index | 112 | 112 | 114 | 115 | 115 | 116 | 100 | 100 | 101 | 101 |

TABLE 8-9

Base tread (Mercapto silane coupling agent)

| | Example | | | | | | Comparative Example | | | |
|---|---|---|---|---|---|---|---|---|---|---|
| | 5-9a | 5-9b | 5-9c | 5-9d | 5-9e | 5-9f | 5-9a | 5-9b | 5-9c | 5-9d |
| Formulation (parts by mass) | | | | | | | | | | |
| Taraxacum kok-saghyz-derived natural rubber A | 80 | 80 | — | — | | | | | | |
| Taraxacum kok-saghyz-derived natural rubber B | — | — | 80 | 80 | | | | | | |

TABLE 8-9-continued

| | Base tread (Mercapto silane coupling agent) | | | | | | | | | |
|---|---|---|---|---|---|---|---|---|---|---|
| | Example | | | | | | Comparative Example | | | |
| | 5-9a | 5-9b | 5-9c | 5-9d | 5-9e | 5-9f | 5-9a | 5-9b | 5-9c | 5-9d |
| *Taraxacum kok-saghyz*-derived natural rubber C | — | — | — | — | 80 | 80 | — | — | — | — |
| *Hevea brasiliensis*-derived natural rubber | — | — | — | — | — | — | 80 | 80 | — | — |
| Synthetic polyisoprene rubber | — | — | — | — | — | — | — | — | 80 | 80 |
| BR | 20 | 20 | 20 | 20 | 20 | 20 | 20 | 20 | 20 | 20 |
| Silica D (Ultrasil 360) | 20 | 20 | 20 | 20 | 20 | 20 | 20 | 20 | 20 | 20 |
| Silane coupling agent A (Si69) | — | — | — | — | — | — | — | — | — | — |
| Silane coupling agent B (NXT) | 1.6 | — | 1.6 | — | 1.6 | — | 1.6 | — | 1.6 | — |
| Silane coupling agent C (NXT-Z45) | — | 0.8 | — | 0.8 | — | 0.8 | — | 0.8 | — | 0.8 |
| Carbon black A (N339) | 45 | 45 | 45 | 45 | 45 | 45 | 45 | 45 | 45 | 45 |
| Oil | 6.5 | 6.5 | 6.5 | 6.5 | 6.5 | 6.5 | 6.5 | 6.5 | 6.5 | 6.5 |
| Antioxidant 2 (6C) | 2.5 | 2.5 | 2.5 | 2.5 | 2.5 | 2.5 | 2.5 | 2.5 | 2.5 | 2.5 |
| Stearic acid | 1 | 1 | 1 | 1 | 1 | 1 | 1 | 1 | 1 | 1 |
| Zinc oxide | 2.5 | 2.5 | 2.5 | 2.5 | 2.5 | 2.5 | 2.5 | 2.5 | 2.5 | 2.5 |
| Wax | 1.5 | 1.5 | 1.5 | 1.5 | 1.5 | 1.5 | 1.5 | 1.5 | 1.5 | 1.5 |
| Amide compound (WB16) | 1 | 1 | 1 | 1 | 1 | 1 | 1 | 1 | 1 | 1 |
| Sulfur | 3 | 3 | 3 | 3 | 3 | 3 | 3 | 3 | 3 | 3 |
| Vulcanization accelerator 2 (DPG) | 1.5 | 1.5 | 1.5 | 1.5 | 1.5 | 1.5 | 1.5 | 1.5 | 1.5 | 1.5 |
| Evaluation | | | | | | | | | | |
| Fracture resistance strength index | 114 | 113 | 114 | 114 | 115 | 116 | 100 | 99 | 94 | 92 |
| Fuel economy index | 112 | 114 | 114 | 115 | 116 | 118 | 100 | 101 | 101 | 102 |

TABLE 8-10

| | Base tread (Farnesene resin) | | | | | | | | | | | | | | |
|---|---|---|---|---|---|---|---|---|---|---|---|---|---|---|---|
| | Example | | | | | | | | | Comparative Example | | | | | |
| | 5-10a | 5-10b | 5-10c | 5-10d | 5-10e | 5-10f | 5-10g | 5-10h | 5-10i | 5-10a | 5-10b | 5-10c | 5-10d | 5-10e | 5-10f |
| Formulation (parts by mass) | | | | | | | | | | | | | | | |
| *Taraxacum kok-saghyz*-derived natural rubber A | 80 | 80 | 80 | — | — | — | — | — | — | — | — | — | — | — | — |
| *Taraxacum kok-saghyz*-derived natural rubber B | — | — | — | 80 | 80 | 80 | — | — | — | — | — | — | — | — | — |
| *Taraxacum kok-saghyz*-derived natural rubber C | — | — | — | — | — | — | 80 | 80 | 80 | — | — | — | — | — | — |
| *Hevea brasiliensis*-derived natural rubber | — | — | — | — | — | — | — | — | — | 80 | 80 | 80 | — | — | — |
| Synthetic polyisoprene rubber | — | — | — | — | — | — | — | — | — | — | — | — | 80 | 80 | 80 |
| BR | 20 | 20 | 20 | 20 | 20 | 20 | 20 | 20 | 20 | 20 | 20 | 20 | 20 | 20 | 20 |
| Silica D (Ultrasil 360) | 20 | 20 | 20 | 20 | 20 | 20 | 20 | 20 | 20 | 20 | 20 | 20 | 20 | 20 | 20 |
| Silane coupling agent A (Si69) | 1.6 | 1.6 | 1.6 | 1.6 | 1.6 | 1.6 | 1.6 | 1.6 | 1.6 | 1.6 | 1.6 | 1.6 | 1.6 | 1.6 | 1.6 |
| Carbon black A (N339) | 45 | 45 | 45 | 45 | 45 | 45 | 45 | 45 | 45 | 45 | 45 | 45 | 45 | 45 | 45 |
| oil | — | — | — | — | — | — | — | — | — | — | — | — | — | — | — |
| Farnesene resin A (KB-101) | 10 | — | — | 10 | — | — | 10 | — | — | 10 | — | — | 10 | — | — |
| Farnesene resin B (FSR-221) | — | 10 | — | — | 10 | — | — | 10 | — | — | 10 | — | — | 10 | — |
| Farnesene resin C (FBR-746) | — | — | 10 | — | — | 10 | — | — | 10 | — | — | 10 | — | — | 10 |
| Antioxidant 2 (6C) | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 |
| Stearic acid | 1 | 1 | 1 | 1 | 1 | 1 | 1 | 1 | 1 | 1 | 1 | 1 | 1 | 1 | 1 |
| Zinc oxide | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 |
| Wax | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| Amide compound (WB16) | 1 | 1 | 1 | 1 | 1 | 1 | 1 | 1 | 1 | 1 | 1 | 1 | 1 | 1 | 1 |
| Sulfur | 3 | 3 | 3 | 3 | 3 | 3 | 3 | 3 | 3 | 3 | 3 | 3 | 3 | 3 | 3 |
| Vulcanization accelerator 2 (DPG) | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| Evaluation | | | | | | | | | | | | | | | |
| Fracture resistance strength index | 116 | 115 | 116 | 115 | 115 | 116 | 114 | 115 | 118 | 100 | 101 | 99 | 96 | 95 | 95 |
| Fuel economy index | 110 | 111 | 109 | 115 | 114 | 114 | 115 | 114 | 114 | 100 | 99 | 101 | 102 | 102 | 101 |

The above tables demonstrate that the overall performance in terms of fuel economy and fracture resistance was significantly improved in the examples using a combination of a natural rubber derived from *Taraxacum kok-saghyz* specified in the present application, carbon black, and silica at a predetermined ratio.

Examples and Comparative Examples

[Breakers]

According to each of the formulations shown in Table 9, the materials other than the sulfur and vulcanization accelerator were kneaded for five minutes at 150° C. using a 1.7 L Banbury mixer (Kobe Steel, Ltd.) to give a kneaded mixture. Next, the sulfur and vulcanization accelerator were added to the kneaded mixture, followed by kneading for five minutes at 80° C. using an open roll mill to give an unvulcanized rubber composition.

The unvulcanized rubber composition was press-vulcanized for 20 minutes at 170° C. in a 0.5 mm-thick die to obtain a vulcanized rubber composition.

Separately, steel cords were coated with the unvulcanized rubber composition prepared as above and formed into the shape of a breaker, followed by assembling with other tire components and then vulcanization at 150° C. for 30 minutes to prepare a test tire.

The vulcanized rubber compositions (vulcanized rubber sheets) and test tires prepared as above were evaluated as follows. The results are shown in Table 9, where Comparative Example 6-1 is used as a standard of comparison (index=100).

<Fuel Economy>

The rolling resistance of each test tire was measured using a rolling resistance tester by running the test tire mounted on a 15×6JJ rim at an internal pressure of 230 kPa, a load of 3.43 kN, and a speed of 80 km/h and expressed as an index relative to the standard comparative example taken as 100. A higher index indicates a lower rolling resistance and thus better fuel economy.

<Fracture Resistance Strength>

No. 3 dumbbell specimens of the vulcanized rubber sheets were subjected to a tensile test in accordance with JIS K 6251 to measure the tensile strength at break (TB) and elongation at break (EB, %). The value TB×EB/2 was defined as the fracture resistance strength. The fracture resistance strength of each formulation example is expressed as an index relative to the standard comparative example taken as 100. A higher index indicates better fracture resistance strength.

TABLE 9

| | Breaker | | | | | | | |
|---|---|---|---|---|---|---|---|---|
| | Example | | | | Comparative Example | | | |
| | 6-1 | 6-2 | 6-3 | 6-4 | 6-1 | 6-2 | 6-3 | 6-4 |
| Formulation (parts by mass) | | | | | | | | |
| *Taraxacum kok-saghyz*-derived natural rubber A | 100 | — | — | — | — | — | — | — |
| *Taraxacum kok-saghyz*-derived natural rubber B | — | 100 | — | — | — | — | — | — |
| *Taraxacum kok-saghyz*-derived natural rubber C | — | — | 100 | 100 | — | — | — | — |
| *Hevea brasiliensis*-derived natural rubber | — | — | — | — | 100 | 100 | — | — |
| Synthetic polyisoprene rubber | — | — | — | — | — | — | 100 | 100 |
| Carbon black D (N326) | 60 | 60 | 60 | 10 | 60 | 10 | 60 | 10 |
| Silica A (115GR) | — | — | — | 50 | — | 50 | — | 50 |
| Silane coupling agent A (Si69) | — | — | — | 4 | — | 4 | — | 4 |
| oil | 5 | 5 | 5 | 5 | 5 | 5 | 5 | 5 |
| Antioxidant 2 (6C) | 1.5 | 1.5 | 1.5 | 1.5 | 1.5 | 1.5 | 1.5 | 1.5 |
| Stearic acid | 1 | 1 | 1 | 1 | 1 | 1 | 1 | 1 |
| Organic acid cobalt salt | 1 | 1 | 1 | 1 | 1 | 1 | 1 | 1 |
| Zinc oxide | 8 | 8 | 8 | 8 | 8 | 8 | 8 | 8 |
| Wax | 1 | 1 | 1 | 1 | 1 | 1 | 1 | 1 |
| Sulfur | 5 | 5 | 5 | 5 | 5 | 5 | 5 | 5 |
| Vulcanization accelerator 3 (DZ) | 1 | 1 | 1 | 1 | 1 | 1 | 1 | 1 |
| Evaluation | | | | | | | | |
| Fuel economy index | 115 | 117 | 118 | 122 | 100 | 104 | 104 | 106 |
| Fracture resistance strength index | 117 | 119 | 120 | 118 | 100 | 95 | 94 | 91 |

The above table demonstrates that the overall performance in terms of fuel economy and fracture resistance was significantly improved in the examples using a combination of a natural rubber derived from *Taraxacum kok-saghyz* specified in the present application and carbon black and/or silica.

Examples and Comparative Examples

[Sidewalls]

According to each of the formulations shown in Table 10, the materials other than the sulfur and vulcanization accelerators were kneaded using a 1.7 L Banbury mixer to give a kneaded mixture. Next, the sulfur and vulcanization accelerator(s) were added to the kneaded mixture, followed by kneading using an open roll mill to give an unvulcanized rubber composition.

The unvulcanized rubber composition was pressed for 30 minutes at 150° C. in a 1 mm-thick die to obtain a vulcanized rubber composition.

Separately, the unvulcanized rubber composition prepared as above was formed into the shape of a sidewall and assembled with other tire components on a tire building machine to build an unvulcanized tire. The unvulcanized tire was vulcanized at 170° C. for 12 minutes to prepare a test tire (size: 195/65R15).

The vulcanized rubber compositions (vulcanized rubber sheets) and test tires prepared as above were evaluated as follows. The results are shown in Table 10, where Comparative Example 7-1 is used as a standard of comparison (index=100).

<Fuel Economy>

The rolling resistance of each test tire was measured using a rolling resistance tester by running the test tire mounted on a 15×6JJ rim at an internal pressure of 230 kPa, a load of 3.43 kN, and a speed of 80 km/h and expressed as an index relative to the standard comparative example taken as 100. A higher index indicates a lower rolling resistance and thus better fuel economy.

<Flex Crack Growth Resistance>

Specimens were prepared from the vulcanized rubber sheets (vulcanizates) and subjected to a flex crack growth test in accordance with JIS K6260 "Rubber, vulcanized or thermoplastic—Determination of flex cracking and crack growth (De Mattia type)". In the test, the rubber sheets were bent by repeating flexing at 70% elongation one million times, and then the length of the generated crack was measured. The reciprocals of the measured values (lengths) are expressed as an index relative to the standard comparative example taken as 100. A higher index means that the growth of cracks was more suppressed, indicating better flex crack growth resistance.

TABLE 10

| | Sidewall | | | | | | | | |
|---|---|---|---|---|---|---|---|---|---|
| | Example | | | | | Comparative Example | | | |
| | 7-1 | 7-2 | 7-3 | 7-4 | 7-5 | 7-1 | 7-2 | 7-3 | 7-4 |
| Formulation (parts by mass) | | | | | | | | | |
| *Taraxacum kok-saghyz*-derived natural rubber A | 40 | — | — | — | — | — | — | — | — |
| *Taraxacum kok-saghyz*-derived natural rubber B | — | 40 | — | — | — | — | — | — | — |
| *Taraxacum kok-saghyz*-derived natural rubber C | — | — | 40 | 40 | 40 | — | — | — | — |
| *Hevea brasiliensis*-derived natural rubber | — | — | — | — | — | 40 | 40 | 40 | — |
| Synthetic polyisoprene rubber | — | — | — | — | — | — | — | — | 40 |
| BR | 60 | 60 | 60 | 60 | 60 | 60 | 60 | 60 | 60 |
| Carbon black E (N550) | 50 | 50 | 50 | 5 | 50 | 50 | 5 | 50 | 50 |
| Silica A (115GR) | — | — | — | 50 | — | — | 50 | — | — |
| Silane coupling agent A (Si69) | — | — | — | 4.4 | — | — | 4.4 | — | — |
| Oil | 8 | 8 | 8 | 8 | 5 | 8 | 8 | 5 | 8 |
| Resin A (Terpene) | — | — | — | — | 3 | — | — | 3 | — |
| Antioxidant 2 (6C) | 1.5 | 1.5 | 1.5 | 1.5 | 1.5 | 1.5 | 1.5 | 1.5 | 1.5 |
| Stearic acid | 2 | 2 | 2 | 2 | 2 | 2 | 2 | 2 | 2 |
| Zinc oxide | 3 | 3 | 3 | 3 | 3 | 3 | 3 | 3 | 3 |
| Wax | 2 | 2 | 2 | 2 | 2 | 2 | 2 | 2 | 2 |
| Sulfur | 1.5 | 1.5 | 1.5 | 1.5 | 1.5 | 1.5 | 1.5 | 1.5 | 1.5 |
| Vulcanization accelerator 1 (CBS) | 0.8 | 0.8 | 0.8 | 0.8 | 0.8 | 0.8 | 0.8 | 0.8 | 0.8 |
| Vulcanization accelerator 2 (DPG) | — | — | — | — | 0.4 | — | — | — | — |
| Evaluation | | | | | | | | | |
| Fuel economy index | 110 | 115 | 121 | 123 | 121 | 100 | 103 | 97 | 101 |
| Flex crack growth resistance index | 118 | 120 | 130 | 126 | 129 | 100 | 96 | 101 | 98 |

The above table demonstrates that the overall performance in terms of fuel economy and flex crack growth resistance was significantly improved in the examples using a combination of a natural rubber derived from *Taraxacum kok-saghyz* specified in the present application and carbon black and/or silica.

The invention claimed is:

1. A tire, comprising a rubber composition, the rubber composition comprising
    a natural rubber derived from *Taraxacum kok-saghyz* having a weight average molecular weight (Mw) of 5,000,000 or more and including polymers having a radius of gyration (Rz) of 130 nm or larger, wherein the Mw and Rz values are measured by FFF-MALS.

2. The tire according to claim 1,
    wherein the tire comprises a breaker formed from the rubber composition which further comprises at least one of carbon black or silica.

3. The tire according to claim 1,
    wherein the tire comprises a sidewall formed from the rubber composition which further comprises at least one of carbon black or silica.

4. The tire according to claim 1,
    wherein the rubber composition comprises, per 100 parts by mass of a rubber component therein, 30 parts by mass or more of carbon black.

5. The tire according to claim 1,
    wherein the rubber composition comprises, based on 100% by mass of a rubber component therein, 1% by mass or more of the natural rubber derived from *Taraxacum kok-saghyz*, and
    the rubber composition comprises, per 100 parts by mass of the rubber component, 10 parts by mass or more of a silica having a nitrogen adsorption specific surface area of 40 $m^2$/g or more.

6. The tire according to claim 1,
    wherein the rubber composition comprises, based on 100% by mass of a rubber component therein, 0.1 to 10.0% by mass of the natural rubber derived from *Taraxacum kok-saghyz*, and
    the rubber composition comprises, per 100 parts by mass of the rubber component, 10 parts by mass or more of a silica having a nitrogen adsorption specific surface area of 40 $m^2$/g or more.

7. The tire according to claim 1,
wherein the rubber composition comprises, per 100 parts by mass of a rubber component therein, 5 parts by mass or more of a silica having a nitrogen adsorption specific surface area of 40 m$^2$/g or more.

8. The tire according to claim 1,
wherein the tire comprises a base tread formed from the rubber composition,
the rubber composition comprises, based on 100% by mass of a rubber component therein, 1% by mass or more of the natural rubber derived from *Taraxacum kok-saghyz*, and
the rubber composition comprises, per 100 parts by mass of the rubber component, 10 parts by mass or more of silica.

9. A tire, comprising a rubber composition,
the rubber composition comprising
a natural rubber derived from *Taraxacum kok-saghyz* having a weight average molecular weight (Mw) of 5,000,000 or more and including polymers having an average radius of gyration (Rz) of 130 nm or larger over a weight average molecular weight (Mw) range of 5,000,000 to 50,000,000, wherein the Mw and Rz values are measured by FFF-MALS.

10. The tire according to claim 9,
wherein the tire comprises a breaker formed from the rubber composition which further comprises at least one of carbon black or silica.

11. The tire according to claim 9,
wherein the tire comprises a sidewall formed from the rubber composition which further comprises at least one of carbon black or silica.

12. The tire according to claim 9,
wherein the rubber composition comprises, per 100 parts by mass of a rubber component therein, 30 parts by mass or more of carbon black.

13. The tire according to claim 9,
wherein the rubber composition comprises, based on 100% by mass of a rubber component therein, 1% by mass or more of the natural rubber derived from *Taraxacum kok-saghyz*, and
the rubber composition comprises, per 100 parts by mass of the rubber component, 10 parts by mass or more of a silica having a nitrogen adsorption specific surface area of 40 m$^2$/g or more.

14. The tire according to claim 9,
wherein the rubber composition comprises, based on 100% by mass of a rubber component therein, 0.1 to 10.0% by mass of the natural rubber derived from *Taraxacum kok-saghyz*, and
the rubber composition comprises, per 100 parts by mass of the rubber component, 10 parts by mass or more of a silica having a nitrogen adsorption specific surface area of 40 m$^2$/g or more.

15. The tire according to claim 9,
wherein the rubber composition comprises, per 100 parts by mass of a rubber component therein, 5 parts by mass or more of a silica having a nitrogen adsorption specific surface area of 40 m$^2$/g or more.

16. The tire according to claim 9,
wherein the tire comprises a base tread formed from the rubber composition,
the rubber composition comprises, based on 100% by mass of a rubber component therein, 1% by mass or more of the natural rubber derived from *Taraxacum kok-saghyz*, and
the rubber composition comprises, per 100 parts by mass of the rubber component, 10 parts by mass or more of silica.

17. A tire, comprising a rubber composition,
the rubber composition comprising
a natural rubber derived from *Taraxacum kok-saghyz* having a weight average molecular weight (Mw) of 5,000,000 or more and including polymers having a first regression line from a plot of logarithm of radius of gyration (Rz) (log Rz) versus logarithm of weight average molecular weight (Mw) (log Mw), the first regression line having a slope of 0.25 or greater over a weight average molecular weight (Mw) range of 5,000,000 to 50,000,000, wherein the Mw and Rz values are measured by FFF-MALS.

18. The tire according to claim 17,
wherein the tire comprises a breaker formed from the rubber composition which further comprises at least one of carbon black or silica.

19. The tire according to claim 17,
wherein the tire comprises a sidewall formed from the rubber composition which further comprises at least one of carbon black or silica.

20. The tire according to claim 17,
wherein the rubber composition comprises, per 100 parts by mass of a rubber component therein, 30 parts by mass or more of carbon black.

21. The tire according to claim 17,
wherein the rubber composition comprises, based on 100% by mass of a rubber component therein, 1% by mass or more of the natural rubber derived from *Taraxacum kok-saghyz*, and
the rubber composition comprises, per 100 parts by mass of the rubber component, 10 parts by mass or more of a silica having a nitrogen adsorption specific surface area of 40 m$^2$/g or more.

22. The tire according to claim 17,
wherein the rubber composition comprises, based on 100% by mass of a rubber component therein, 0.1 to 10.0% by mass of the natural rubber derived from *Taraxacum kok-saghyz*, and
the rubber composition comprises, per 100 parts by mass of the rubber component, 10 parts by mass or more of a silica having a nitrogen adsorption specific surface area of 40 m$^2$/g or more.

23. The tire according to claim 17,
wherein the rubber composition comprises, per 100 parts by mass of a rubber component therein, 5 parts by mass or more of a silica having a nitrogen adsorption specific surface area of 40 m$^2$/g or more.

24. The tire according to claim 17,
wherein the tire comprises a base tread formed from the rubber composition,
the rubber composition comprises, based on 100% by mass of a rubber component therein, 1% by mass or more of the natural rubber derived from *Taraxacum kok-saghyz*, and
the rubber composition comprises, per 100 parts by mass of the rubber component, 10 parts by mass or more of silica.

\* \* \* \* \*